(12) United States Patent
Monroe et al.

(10) Patent No.: US 11,867,217 B2
(45) Date of Patent: Jan. 9, 2024

(54) THERMALLY STABILIZED FASTENER SYSTEM AND METHOD

(71) Applicants: James Alan Monroe, Syracuse, NY (US); Jeremy Sean McAllister, New York, NY (US); Jay Russell Zgarba, Sugar Land, TX (US)

(72) Inventors: James Alan Monroe, Syracuse, NY (US); Jeremy Sean McAllister, New York, NY (US); Jay Russell Zgarba, Sugar Land, TX (US)

( * ) Notice: Subject to any disclaimer, the term of this patent is extended or adjusted under 35 U.S.C. 154(b) by 0 days.

(21) Appl. No.: 17/981,401

(22) Filed: Nov. 5, 2022

(65) Prior Publication Data

US 2023/0058923 A1     Feb. 23, 2023

Related U.S. Application Data

(60) Division of application No. 16/735,587, filed on Jan. 6, 2020, now Pat. No. 11,506,238, which is a continuation-in-part of application No. 15/963,428, filed on Apr. 26, 2018, now Pat. No. 11,125,966, which is a continuation-in-part of application No. 15/217,594, filed on Jul. 22, 2016, now Pat. No. 10,822,670, which is a continuation-in-part of
(Continued)

(51) Int. Cl.
| | |
|---|---|
| *F16B 31/04* | (2006.01) |
| *F16B 43/00* | (2006.01) |
| *F16B 31/00* | (2006.01) |
| *F16B 31/06* | (2006.01) |
| *C22F 1/18* | (2006.01) |

(52) U.S. Cl.
CPC ............ *F16B 31/04* (2013.01); *C22F 1/183* (2013.01); *F16B 31/007* (2013.01); *F16B 31/06* (2013.01); *F16B 43/001* (2013.01)

(58) Field of Classification Search
None
See application file for complete search history.

(56) References Cited

U.S. PATENT DOCUMENTS

| | | | | | |
|---|---|---|---|---|---|
| 5,120,175 | A | * | 6/1992 | Arbegast | F16B 19/06 411/902 |
| 6,148,128 | A | * | 11/2000 | Jin | G02B 6/2938 398/1 |

(Continued)

*Primary Examiner* — George Wyszomierski
(74) *Attorney, Agent, or Firm* — Kevin Mark Klughart

(57) ABSTRACT

A thermally stabilized fastener system and method is disclosed. The disclosed system/method integrates a fastener (FAS) incorporating a faster retention head (FRH), fastener retention body (FRB), and fastener retention tip (FRT) to couple a mechanical member stack (MMS) in a thermally stabilized fashion using a fastener retention receiver (FRR). The MMS includes a temperature compensating member (TCM), a first retention member (FRM), and an optional second retention member (SRM). The TCM is constructed using a tailored thermal expansion coefficient (TTC) that permits the TCM to compensate for the thermal expansion characteristics of the FAS, FRM, and SRM such that the force applied by the FRH and FRR portions of the FAS to the MMS is tailored to a specific temperature force profile (TFP) over changes in MMS/FAS temperature. The TCM may be selected with a TTC to achieve a uniform TFP over changes in MMS/FAS temperature.

31 Claims, 96 Drawing Sheets

Related U.S. Application Data application No. 14/897,904, filed as application No. PCT/US2014/042105 on Jun. 12, 2014, now Pat. No. 10,557,182.

(60) Provisional application No. 62/490,877, filed on Apr. 27, 2017, provisional application No. 61/835,289, filed on Jun. 14, 2013.

(56) References Cited

U.S. PATENT DOCUMENTS

| | | | |
|---|---|---|---|
| 2015/0362391 A1* | 12/2015 | Suzuki | G05D 7/0635 137/511 |
| 2016/0169038 A1* | 6/2016 | Weaver | F01D 25/12 415/116 |

* cited by examiner

3800

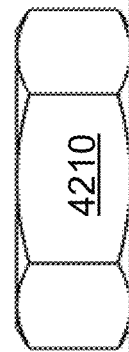
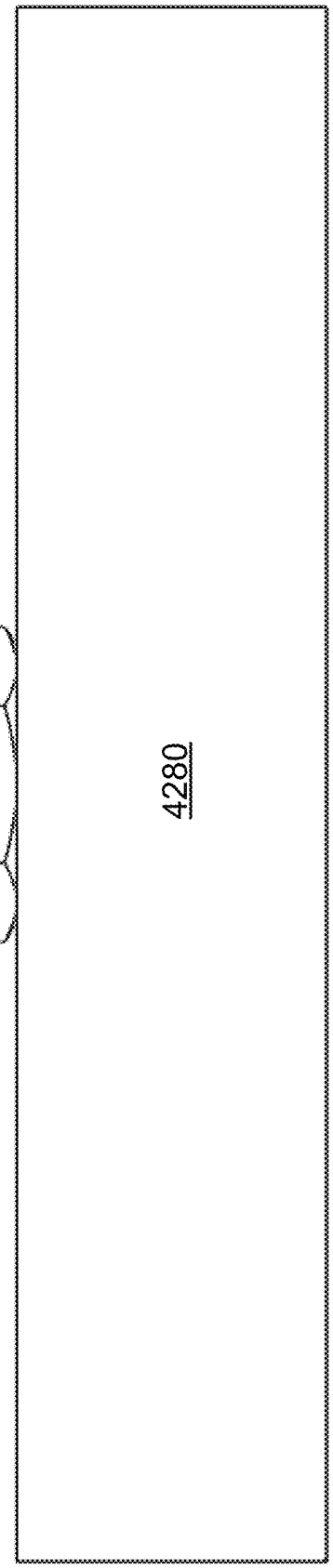
FIG. 42

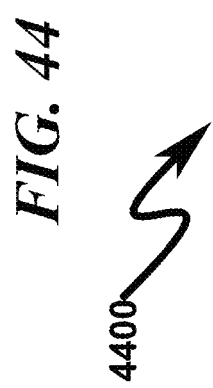
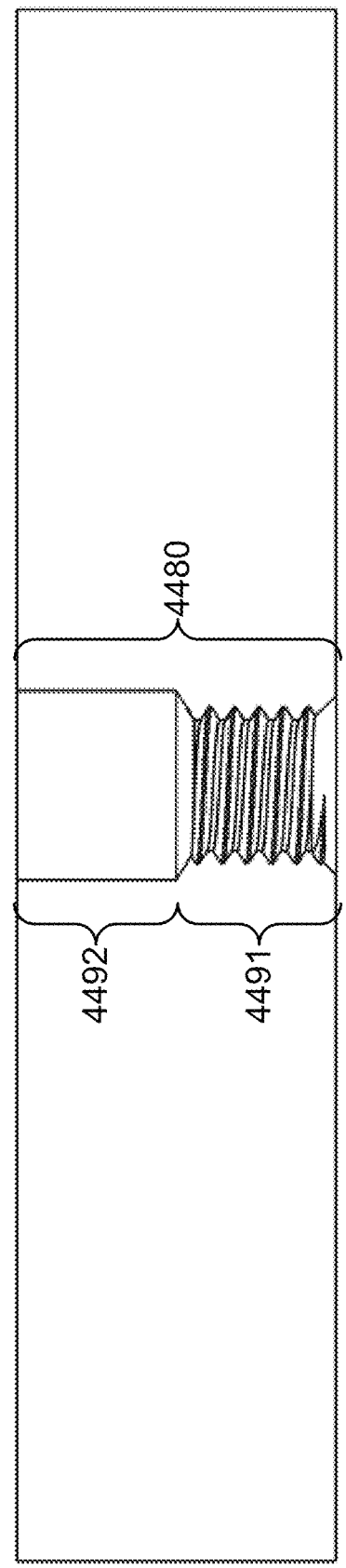
FIG. 44

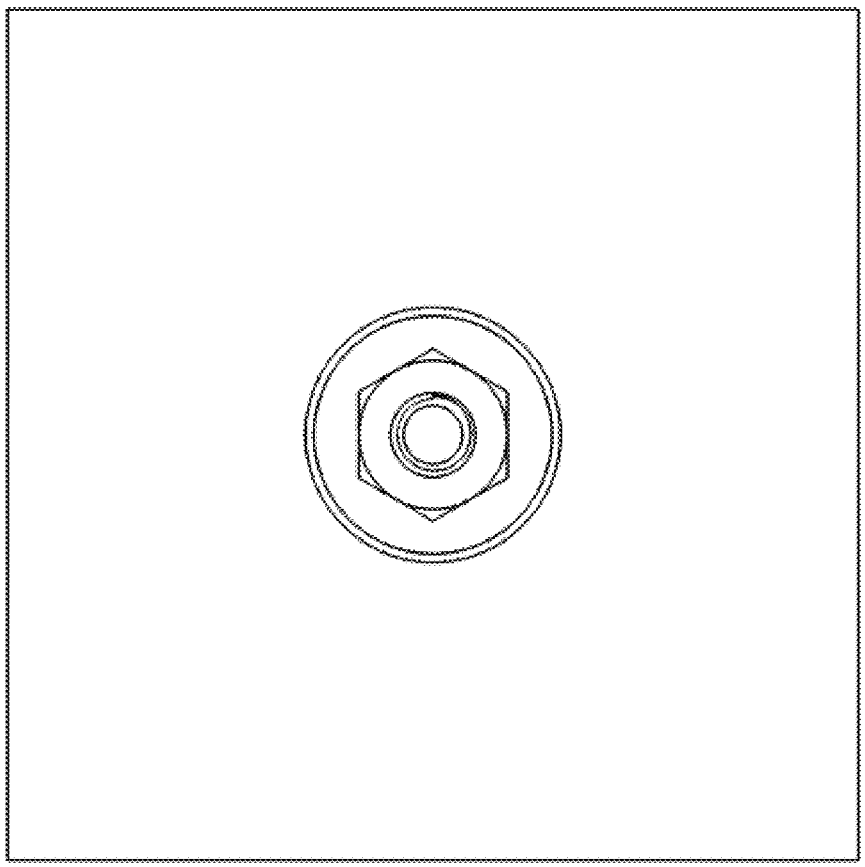
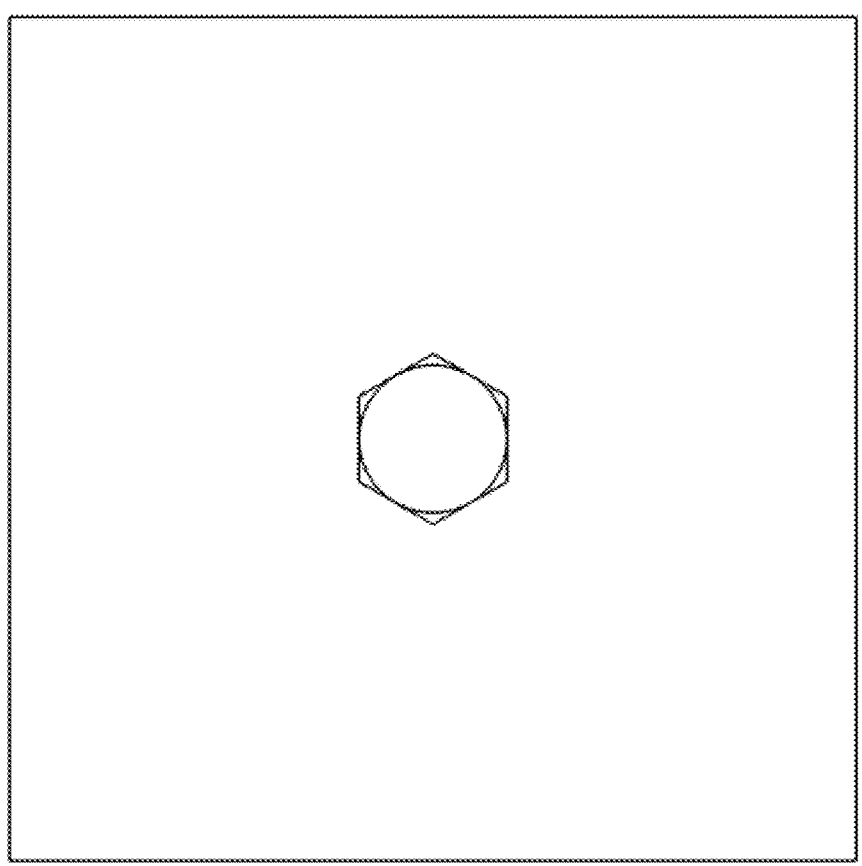
FIG. 61

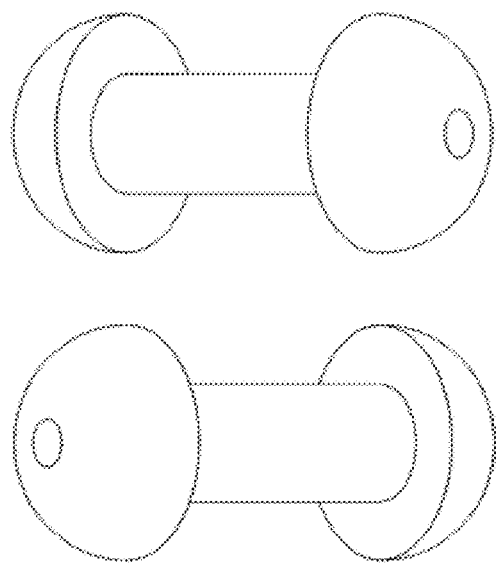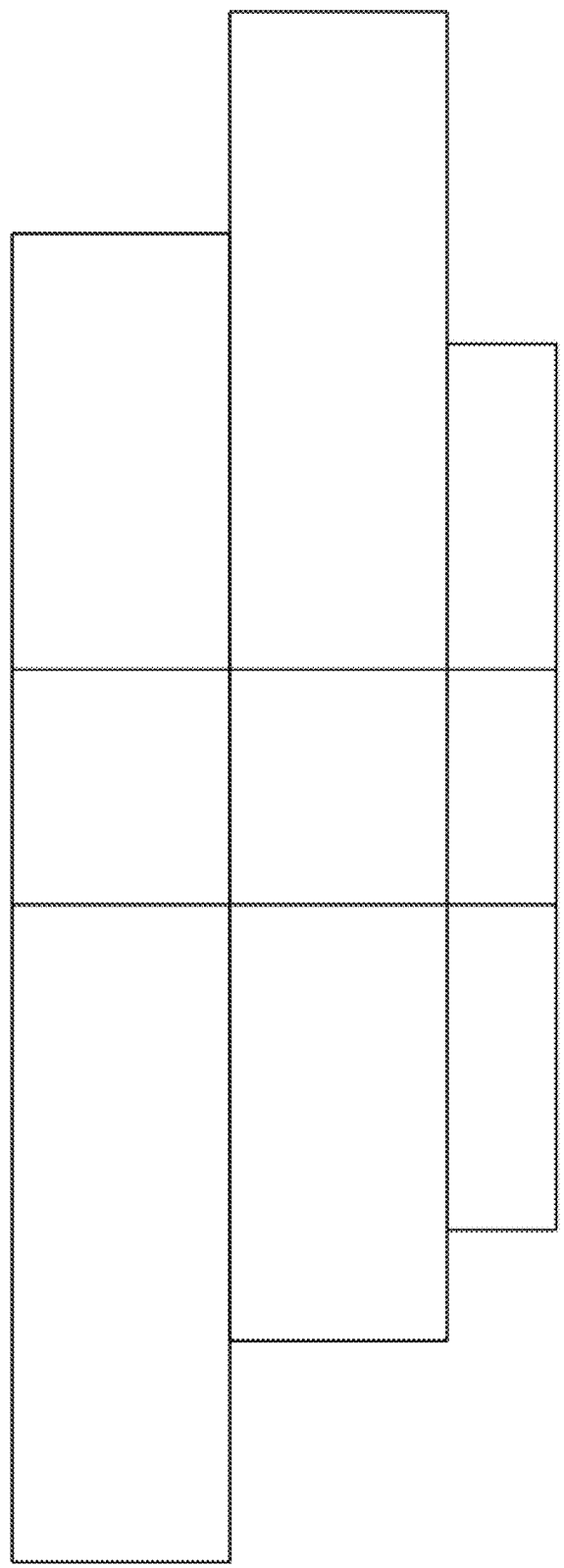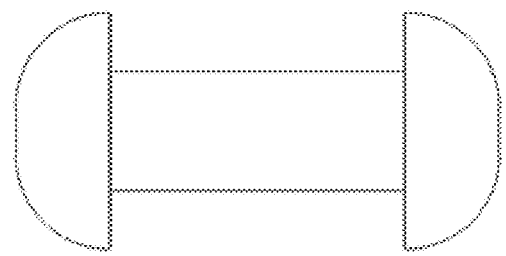
FIG. 68

THERMALLY STABILIZED FASTENER SYSTEM AND METHOD

CROSS REFERENCE TO RELATED APPLICATIONS

Divisional Patent Application

This patent application is a Divisional patent application (DIV) and incorporates by reference United States Utility Patent Application for THERMALLY STABILIZED FASTENER SYSTEM AND METHOD by inventors James Alan Monroe, Jeremy Sean McAllister, and Jay Russell Zgarba, filed with the USPTO on Jan. 6, 2020, with Ser. No. 16/735,587, EFS ID 38218309, confirmation number 5182, issued as U.S. Pat. No. 11,506,238 on 2022 Nov. 22.

U.S. Patent Applications

United States Utility Patent Application for THERMALLY STABILIZED FASTENER SYSTEM AND METHOD by inventors James Alan Monroe, Jeremy Sean McAllister, and Jay Russell Zgarba, filed with the USPTO on Jan. 6, 2020, with Ser. No. 16/735,587, EFS ID 38218309, confirmation number 5182, issued as U.S. Pat. No. 11,506,238 on 2022 Nov. 22 is a Continuation-In-Part (CIP) and incorporates by reference United States Utility Patent Application for CONTROLLED THERMAL COEFFICIENT PRODUCT SYSTEM AND METHOD by inventors James Alan Monroe, Ibrahim (nmn) Karaman, and Raymundo (nmn) Arroyave, filed with the USPTO on Jul. 22, 2016, with Ser. No. 15/217,594, EFS ID issued as U.S. patent Ser. No. 10/822,670 on 2020 Nov. 3.

United States Utility Patent Application for CONTROLLED THERMAL COEFFICIENT PRODUCT SYSTEM AND METHOD by inventors James Alan Monroe, Ibrahim (nmn) Karaman, and Raymundo (nmn) Arroyave, filed with the USPTO on Jul. 22, 2016, with Ser. No. 15/217,594, EFS ID 26434102, confirmation number 5258, issued as U.S. patent Ser. No. 10/822,670 on 2020 Nov. 3 is a Continuation-In-Part (CIP) patent application of and incorporates by reference United States Utility Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Dec. 11, 2015, with Ser. No. 14/897,904, published on May 12, 2016 as US20160130677A1, issued as U.S. Pat. No. 10,557,182 on 2020 Feb. 11.

United States Utility Patent Application for THERMALLY STABILIZED FASTENER SYSTEM AND METHOD by inventors James Alan Monroe, Jeremy Sean McAllister, and Jay Russell Zgarba, filed with the USPTO on Jan. 6, 2020, with Ser. No. 16/735,587, EFS ID 38218309, confirmation number 5182, issued as U.S. Pat. No. 11,506,238 on 2022 Nov. 22, claims benefit under 35 U.S.C. § 120 and incorporates by reference United States Utility Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Dec. 11, 2015, with Ser. No. 14/897,904, published on May 12, 2016 as US20160130677A1, issued as U.S. Pat. No. 10,557,182 on 2020 Feb. 11.

United States Utility Patent Application for THERMALLY STABILIZED FASTENER SYSTEM AND METHOD by inventors James Alan Monroe, Jeremy Sean McAllister, and Jay Russell Zgarba, filed with the USPTO on Jan. 6, 2020, with Ser. No. 16/735,587, EFS ID 38218309, confirmation number 5182, issued as U.S. Pat. No. 11,506,238 on 2022 Nov. 22, claims benefit under 35 U.S.C. § 120 and incorporates by reference United States Utility Patent Application for LENS ALIGNMENT SYSTEM AND METHOD by inventors James Alan Monroe, David Scott Content, Jeremy Sean McAllister, and Jay Russell Zgarba, filed with the USPTO on Apr. 26, 2018, with Ser. No. 15/963,428, EFSID 32454176, confirmation number 1064, issued as U.S. Pat. No. 11,125,966 on 2021 Sep. 21.

This application claims benefit under 35 U.S.C. § 120 and incorporates by reference United States Utility Patent Application for THERMALLY STABILIZED FASTENER SYSTEM AND METHOD by inventors James Alan Monroe, Jeremy Sean McAllister, and Jay Russell Zgarba, filed with the USPTO on Jan. 6, 2020, with Ser. No. 16/735,587, EFS ID 38218309, confirmation number 5182, issued as U.S. Pat. No. 11,506,238 on 2022 Nov. 22.

PCT Patent Applications

United States Utility Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Dec. 11, 2015, with Ser. No. 14/897,904, and published on May 12, 2016 as US20160130677A1, issued as U.S. Pat. No. 10,557,182 on 2020 Feb. 11, is a national stage United States Utility Patent Application of and incorporates by reference PCT Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Jun. 12, 2014, with serial number PCT/US2014/042105, and published on Dec. 18, 2014 as WO2014201239A2.

United States Utility Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Dec. 11, 2015, with Ser. No. 14/897,904, published on May 12, 2016 as US20160130677A1, issued as U.S. Pat. No. 10,557,182 on 2020 Feb. 11, claims benefit under 35 U.S.C. § 120 and incorporates by reference PCT Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Jun. 12, 2014, with serial number PCT/US2014/042105, and published on Dec. 18, 2014 as WO2014201239A2.

Provisional Patent Applications

PCT Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Jun. 12, 2014, with serial number PCT/US2014/042105, and published on Dec. 18, 2014 as WO2014201239A2 claims benefit under 35 U.S.C. § 119 and incorporates by reference United States Provisional Patent Application for SYSTEMS AND METHODS FOR TAILORING COEFFICIENTS OF THERMAL EXPANSION BETWEEN EXTREME POSITIVE AND EXTREME NEGATIVE VALUES by inventors James A. Monroe, Ibrahim Karaman, and Raymundo Arroyave, filed with the USPTO on Jun. 14, 2013, with Ser. No. 61/835,289.

United States Utility Patent Application for CONTROLLED THERMAL COEFFICIENT PRODUCT SYSTEM AND METHOD by inventors James Alan Monroe, Ibrahim (nmn) Karaman, and Raymundo (nmn) Arroyave, filed with the USPTO on Jul. 22, 2016, with Ser. No. 15/217,594, EFS ID 26434102, confirmation number 5258, issued as U.S. patent Ser. No. 10/822,670 on 2020 Nov. 3, claims benefit under 35 U.S.C. § 119 and incorporates by reference United States Provisional Patent Application for CONTROLLED THERMAL COEFFICIENT PRODUCT SYSTEM AND METHOD by inventor James A. Monroe, filed with the USPTO on Jul. 22, 2015, with Ser. No. 62/195,575, EFS ID 22993562, confirmation number 5403.

United States Utility Patent Application for LENS ALIGNMENT SYSTEM AND METHOD by inventors James Alan Monroe, David Scott Content, Jeremy Sean McAllister, and Jay Russell Zgarba, filed with the USPTO on Apr. 26, 2018, with Ser. No. 15/963,428, EFSID 32454176, confirmation number 1064, issued as U.S. Pat. No. 11,125,966 on 2021 Sep. 21 claims benefit under 35 U.S.C. 119 and incorporates by reference United States Provisional Patent Application for THERMALLY STABILIZED FASTENER SYSTEM AND METHOD by inventors James Alan Monroe, David Scott Content, Jeremy Sean McAllister, and Jay Russell Zgarba, filed with the USPTO on Apr. 27, 2017, with EFSID 29050356, Ser. No. 62/490,877, confirmation number 8425.

STANDARDS LITERATURE REFERENCES

This patent application includes by reference the standards literature publication document SAE AIR1754B Aerospace Information Report for "Washer, Thermal Compensating, Metric Series" from SAE International (www.sae.org), Issued 1981 December, Revised 2001 October, Reaffirmed 2012 October, Stabilized 2019 February, Superseding AIR1754A. SAE states in this document a rationale that: "This document has been determined to contain basic and stable technology which is not dynamic in nature." SAE provides a STABILIZED NOTICE in this document that reads: "This document has been declared 'Stabilized' by the SAE E-25 General Standards for Aerospace and Propulsion Systems Committee and will no longer be subjected to periodic reviews for currency. Users are responsible for verifying references and continued suitability of technical requirements. Newer technology may exist."

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relate to the product of and systems and methods for generating mechanical fastening systems that are thermally stabilized ("athermalized") over a wide temperature range. Without limitation, the present invention may be applied to situations where a plurality of components in a mechanical system must be constructed in a manner so as to maintain constant distances, tensions, or compressions along a common mechanical axis (CMA).

PRIOR ART AND BACKGROUND OF THE INVENTION

Standards Literature References

This patent application includes by reference the standards literature publication document SAE AIR1754B Aerospace Information Report for "Washer, Thermal Compensating, Metric Series" from SAE International (www.sae.org), Issued 1981 December, Revised 2001 October, Reaffirmed 2012 October, Stabilized 2019 February, Superseding AIR1754A. SAE states in this document a rationale that: "This document has been determined to contain basic and stable technology which is not dynamic in nature." SAE provides a STABILIZED NOTICE in this document that reads: "This document has been declared 'Stabilized' by the SAE E-25 General Standards for Aerospace and Propulsion Systems Committee and will no longer be subjected to periodic reviews for currency. Users are responsible for verifying references and continued suitability of technical requirements. Newer technology may exist."

This document, first issued in December 1981, details the use of thermally compensating washers and details the use of conventional A286, INCONEL 903, WASPALOY, Invar, or other materials known in the art to accomplish thermal compensation. Since this document was stabilized in February 2019 (38 years after first issuance) as of this date the document indicates that were no known methodologies of achieving thermally stabilized fasteners other than that provided in this SAE standard. As such, the present invention as described herein is novel with respect to the disclosure scope of this SAE document.

Long-Felt Industry Need for Thermally Stabilized Fasteners

All metals expand when hot and contract when cold. The positive thermal coefficient experienced by most metals can have a huge impact on industrial, aerospace, defense, or commercial applications that see deterioration in the performance, efficiency, and safety of their products due to severe temperature swings and/or vibration. For example, when cooled, aluminum shrinks significantly while a steel bolt shrinks to a lesser extent and as such a fastener joining these materials will loosen with decreasing temperature. When the same joint is heated, the aluminum expands more than the steel bolt and the joint can become over tight stretching or even breaking the bolt. This loosening during thermal cycling and vibration cause fatigue and bolt failure, a long standing major problem in a variety of industries. Specifically, this loosening causes problems for seals, gaskets, pumps, satellites, optics, precision equipment, automobiles, and autonomous vehicles that see performance reduction and equipment failures that cause safety concerns.

The present invention teaches the use of thermally compensating members (TCM) such as washers and other metallic forms to completely change the way engineers attack the thermal expansion problem all together. Using a simple temperature compensating metal washer that expands when cooled can take up the slack in a fastener joint and stabilize the clamping force of bolts used in this wide array of applications. By reacting opposite to other metals, it can keep a pump's bolting from coming loose, hold satellite components in place during launch and throughout the severe temperature swings in space, and maintain constant load on cryogenic assemblies found in multiple processing environments like liquefied natural gas (LNG) and scientific research labs.

The present invention allows engineers and designers in the aerospace industry to implement more reliable fastening solutions. This allows a reduction in the high cost of system failure associated with current fasteners that degrade over time due to loosening or over-tightening during large temperature swings. By offering a simple, passive solution to the age-old problem of thermal expansion in metals, the potential economic impact is significant, as these temperature stabilized fasteners allow engineers and scientists to do things they have never done before, all the while seeing reduced costs in maintenance programs, improved reliability, enhanced safety, and far better performance and efficiency in their product.

Commonly used solutions for battling changes in fastener load include: (1) building everything out of one material and (2) using split, wave spring, or Belleville washers. Unfortunately, using a single material locks engineers into unrealistic material property requirements. For example, while aluminum bolts would solve the aluminum fastening problem, they do not work well due to their low hardness, strength, and elastic modulus. Additionally, split, wave, and Belleville washers have limited utility under normal bolt loading conditions. John H. Bickford [1] describes these types of washers as being, "of questionable value," because, "their stiffness . . . is so much less than that of most fasteners." Richard T. Barrett in the NASA Fastener Design Manual [2] also states, "the washer is normally flat by the time the bolt is fully torqued" and concludes, "a lock washer of this type is useless for locking." These assertions have been echoed by others in the industry that describe how they just put them in and, "hope for the best." It would seem that the industry has a long-felt need to solve this fastener problem regarding thermal expansion issues in manufacturing.

Deficiencies in the Prior Art

Prior art thermally stabilized fastener systems typically suffer from the following characteristic deficiencies:
  Prior thermally stabilized fastener systems have a coefficient of thermal expansion (CTE) that cannot accurately be controlled.
  Prior thermally stabilized fastener systems have a coefficient of thermal expansion (CTE) that cannot be controlled across one or more axes of expansion.
  Prior thermally stabilized fastener systems have a coefficient of thermal expansion (CTE) that cannot be tailored to provide a customized expansion coefficient across one or more axes of expansion.
  Prior thermally stabilized fastener systems have a coefficient of thermal expansion (CTE) that cannot be tailored to provide a customized clamping load with temperature changes across one or more axes of expansion.
  Prior thermally stabilized fastener systems cannot provide a zero coefficient of thermal expansion (CTE) over one or more axes of expansion.
  Prior thermally stabilized fastener systems cannot provide a negative coefficient of thermal expansion (CTE) over one or more axes of expansion.

To date the prior art has not fully addressed these deficiencies.

OBJECTIVES OF THE INVENTION

Accordingly, the objectives of the present invention are (among others) to circumvent the deficiencies in the prior art and affect the following objectives:
  (1) Provide for a thermally stabilized fastener system/method for producing same that have a coefficient of thermal expansion (CTE) that can accurately be controlled.
  (2) Provide for a thermally stabilized fastener system/method for producing same in which the coefficient of thermal expansion (CTE) can be controlled across one or more axes of expansion.
  (3) Provide for a thermally stabilized fastener system/method for producing same in which the coefficient of thermal expansion (CTE) can be tailored to provide a customized expansion coefficient across one or more axes of expansion.
  (4) Provide for a thermally stabilized fastener system/method for producing the same in which the coefficient of thermal expansion (CTE) can be tailored to provide a customized clamping load with temperature changes across one or more axes of expansion.
  (5) Provide for a thermally stabilized fastener system/method for producing same that can produce a zero coefficient of thermal expansion (CTE) across one or more axes of expansion.
  (6) Provide for a thermally stabilized fastener system/method for producing same that can produce a negative coefficient of thermal expansion (CTE) across one or more axes of expansion.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

While all metals expand when hot and contract when cold, the recent development of tailored thermal expansion coefficient (TEC) materials allows the creation of metallic materials that do the opposite: they contract when heated and expand when cooled. This brand-new material property enables the creation of fasteners that compensate for the natural expansion and contraction of other materials being fastened and thus the creation of thermally stabilized fasteners as described herein.

The present invention generally addresses the need for thermally stabilized fastener systems having a known coefficient of thermal expansion (CTE) in the following manner. The use of a conventional fastener (FAS) and fastener retention receiver (FRR) that fix a first retention member (FRM) and/or a second retention member (SRM) is augmented via the use of a tailored temperature compensating member (TCM) along the mechanical fixation axis (MFA) of the FAS/FRR/FRM/SRM combination that has a thermal characteristic that complements that of the FAS/FRR/FRM/SRM thermal expansion characteristics. By properly fabricating the TCM to complement the thermal expansion and mechanical characteristics of the overall FAS/TCM/FRR/FRM/SRM combination mechanical fastener system, the mechanical load is made constant and thermally invariant. In some circumstances the FAS and/or FRR may be constructed of CTE material in this thermally stabilized fastener (TSF) configuration.

Details regarding the tailored CTE metallic material product (MMP) is disclosed within United States Utility patent application for CONTROLLED THERMAL COEFFICIENT PRODUCT SYSTEM AND METHOD by inventors James Alan Monroe, Ibrahim (nmn) Karaman, and Raymundo (nmn) Arroyave, filed with the USPTO on Jul. 22, 2016, with Ser. No. 15/217,594, EFS ID 26434102, confirmation number 5258, issued as U.S. patent Ser. No. 10/822, 670 on 2020 Nov. 3, and other patents/patent applications incorporated herein.

BRIEF DESCRIPTION OF THE DRAWINGS

For a fuller understanding of the advantages provided by the invention, reference should be made to the following detailed description together with the accompanying drawings wherein:

FIG. 42 illustrates a front view of a preferred exemplary 2-member TCM thermally stabilized fastener system embodiment;

FIG. 44 illustrates a front section view (with fastener hidden) of a preferred exemplary 2-member TCM thermally stabilized fastener system embodiment;

FIG. 61 illustrates top and bottom views of a preferred exemplary 3-member integrated RFF TCM thermally stabilized fastener system embodiment;

FIG. 68 illustrates a front section view (with fastener hidden) of a preferred exemplary TCM TSF rounded rivet thermally stabilized fastener system embodiment;

DESCRIPTION OF THE PRESENTLY PREFERRED EXEMPLARY EMBODIMENTS

Figure 1:
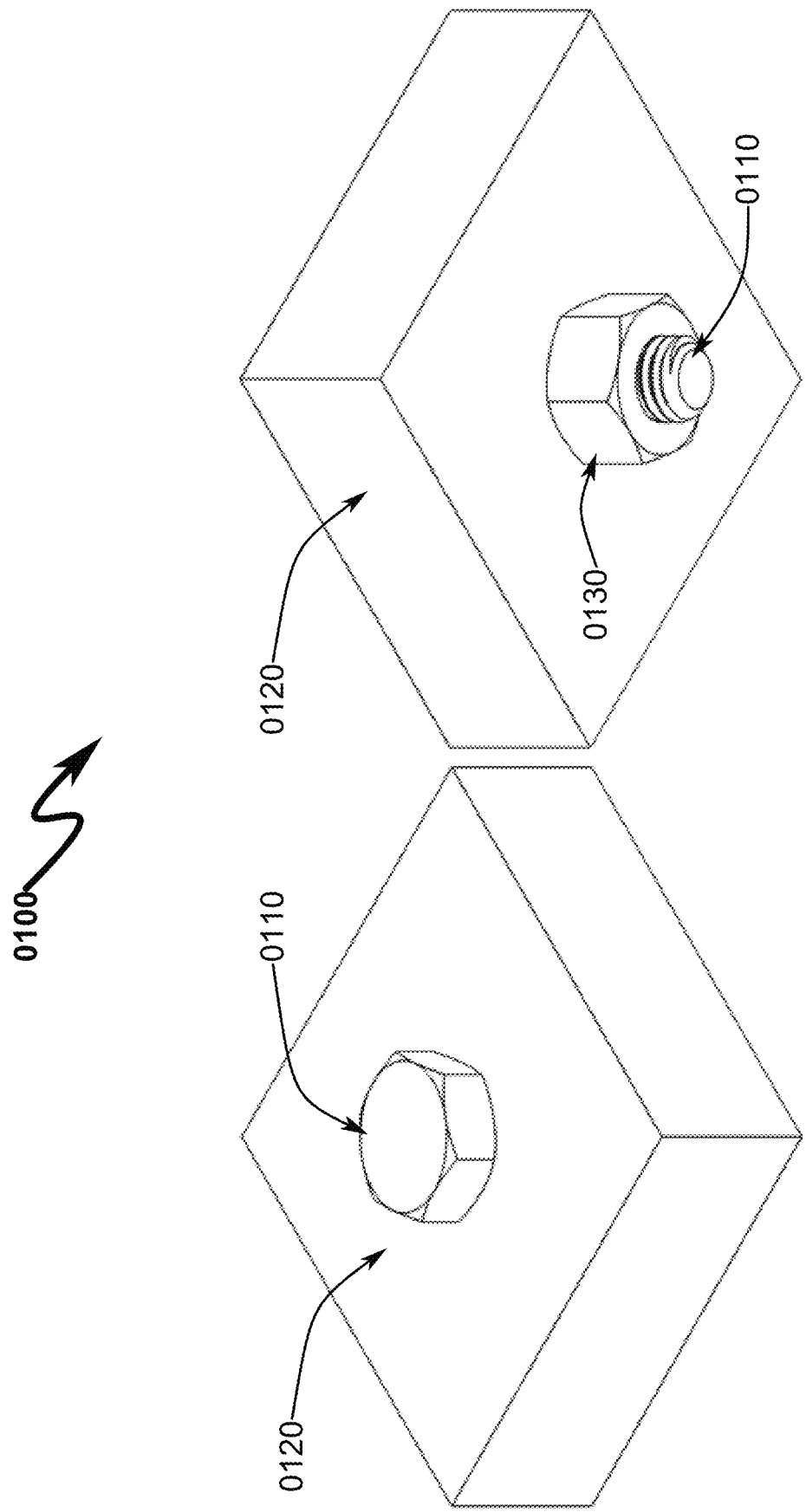
FIG. 1 illustrates top and bottom perspective views of a simple non-thermally compensated fastener system comprising a bolt, plate, and nut.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a THERMALLY STABILIZED FASTENER SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Tailored Thermal Expansion Coefficient (TEC) Defined

The term "tailored thermal expansion coefficient (TEC)" as used herein to describe the formulation and manufacture of the temperature compensating member (TCM) refers to the methods and products of material manufacture described in United States Utility Patent Applications that are included by reference in this patent application.

These patent applications teach the fabrication of metallic materials that have a range of tailored thermal expansion coefficients that are outside of those available using conventional A286, INCONEL 903, WASPALOY, Invar, or other materials known to those of skill in the art as described in the prior art included-by-reference document SAE AIR1754B Aerospace Information Report for "Washer, Thermal Compensating, Metric Series" from SAE International (www.sae.org), Issued 1981 December, Revised 2001 October, Reaffirmed 2012 October, Stabilized 2019 February, Superseding AIR1754A. Since this document was stabilized in February 2019 (38 years after first issuance) as of this date the document indicates that were no known methodologies of achieving thermally stabilized fasteners other than that provided in this SAE standard. As such, the present invention as described herein is novel with respect to the disclosure scope of this SAE document.

Mechanical Member Stack (MMS) Form Not Limitive

The present invention will be described generally in terms of a mechanical member stack (MMS) having several mechanical layers. These layers will be presented visually for purposes of illustration only, and the specific form of each layer is not limited by these visualizations. The mechanical member stack (MMS) may take many physical forms, many of which are not depicted herein but will be readily known by one of ordinary skill in the art.

Mechanical Member Stack (MMS) Sequence Not Limitive

The present invention will be described generally in terms of a mechanical member stack (MMS) having several mechanical layers. These layers will be presented visually for purposes of illustration only, and the specific sequence or order of each layer is not limited by these visualizations. The mechanical member stack (MMS) may take many sequenced physical forms, many of which are not depicted herein but will be readily known by one of ordinary skill in the art.

Fastener (FAS) May Be TCM Not Limitive

The present invention will be described generally in terms of a fastener (FAS) in conjunction with a MMS having several mechanical layers. While the MMS is shown herein as incorporating a temperature compensating member (TCM), the fastener (FAS) may incorporate a TCM characteristic as well. In a similar way that the fastener retention receiver (FRR) shown herein can incorporate a TCM characteristic, the fastener (FAS) may also be temperature compensating. This TCM characteristic may be in lieu of or in addition to a TCM within the MMS.

Fastener (FAS) Not Limitive

The present invention will be described generally in terms of a fastener (FAS) in conjunction with a MMS having several mechanical layers. The fastener will be presented visually for purposes of illustration only, and the specific form of the fastener is not limited by these visualizations. While bolts, cap screws, socket head cap screws, and a variety of rivet configurations are typically used as fasteners and may be shown herein, the term "fastener" should be interpreted generally and not limited to these forms.

Fastener Retention Receiver (FRR) Not Limitive

The present invention will be described generally in terms of a fastener retention receiver (FRR) in conjunction with a MMS having several mechanical layers. The fastener retention receiver (FRR) will be presented visually for purposes of illustration only, and the specific form of the fastener retention receiver (FRR) is not limited by these visualizations. While hexagonal nuts are typically used as fastener retention receiver (FRR) and may be shown herein, the term "fastener retention receiver (FRR)" should be interpreted generally and not limited to these forms. Furthermore, in some preferred exemplary embodiments that make use of rivet fasteners, the FRR may be integrated with the function of the fastener retention tip (FRT) such that the use of riveting tools to deform the FRT serve as the function of the FRR to secure the FAS to the MMS. Thus, mention of the FRR should include the anticipated possibility that the FRR is integrated with the FRT and is not a separate component of the overall fastener system.

Multi-Member TSF Exemplary Embodiments

The present invention may best be described in terms of several multi-member exemplary embodiments in which a temperature compensating member (TCM) is utilized in conjunction with other members of a mechanical fastener assembly to achieve an thermally stabilized fastener (TSF) having desired degree of thermal stability. The discussion below is not limitive of the scope of the claimed invention, but rather provides several concrete examples of the invention teachings as applied to several common application contexts.

MMS Aperture Not Limitive

The MMS as described herein includes passages or apertures through which the FRB of the FAS is passes through the MMS. While the FRH and the FRR are configured to mechanically couple elements within the MMS via the FRB and these apertures, the present invention makes no limitation as to the physical form of these apertures.

TCM Form Not Limitive

While the present invention may be described in some embodiments using a TCM having a washer form factor, the present invention is not limited to this particular form.

Theory of Operation (0100)-(0600)

Conventional Fastener Temperature Expansion Characteristics (0100)-(0300)

Figure 2:
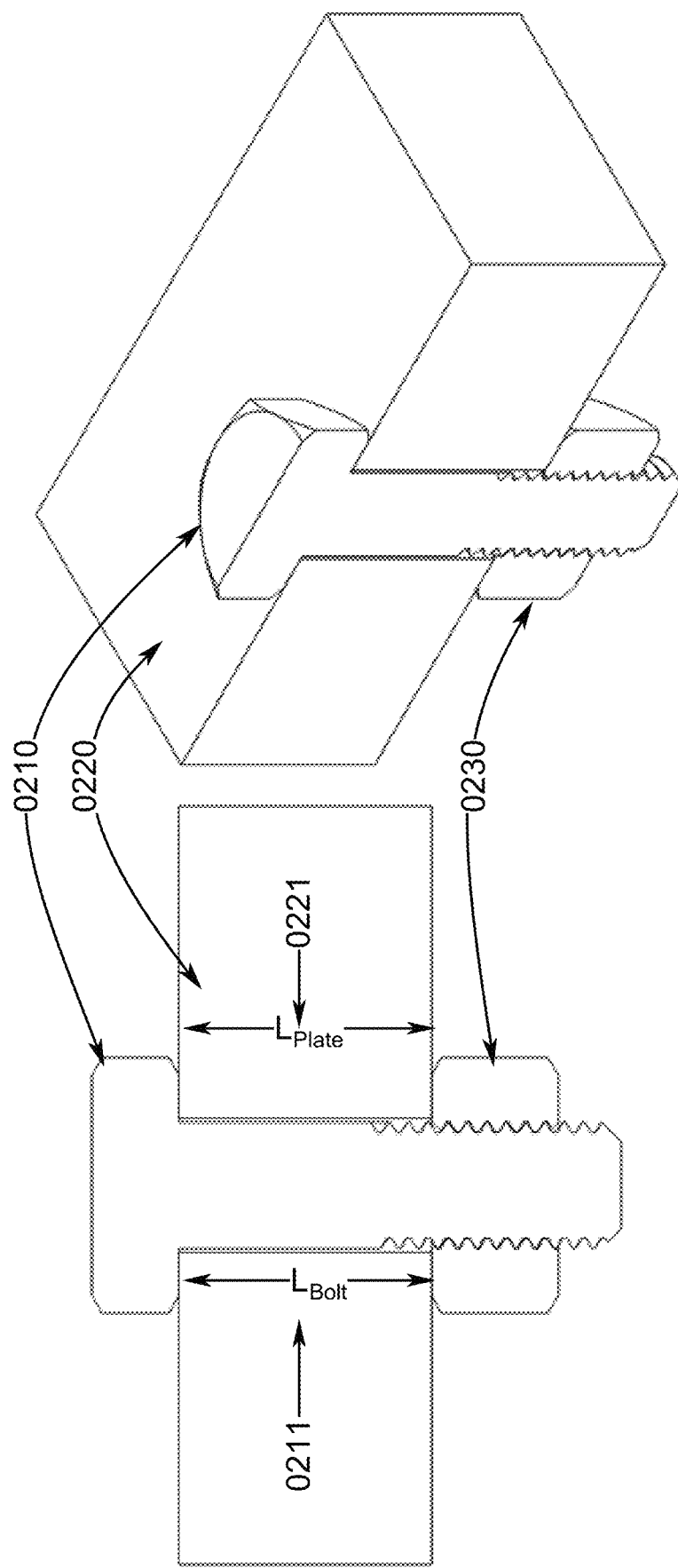
FIG. 2 illustrates front section and top front right perspective section views of a simple non-thermally compensated fastener system comprising a bolt, plate, and nut as originally fastened at an initial temperature.

FIG. 1 (0100)-FIG. 2 (0200) depicts a simple non-thermally compensated fastener system comprising a bolt (0110, 0210, 0310), plate (0120, 0220, 0320), and nut (0130, 0230, 0330) and will be used to describe issues relating to the temperature variance of a typical fastener system. From FIG. 2 (0200) it can be seen that for the bolt (0110, 0210, 0310) and nut (0130, 0230, 0330) to engage and capture the plate (0120, 0220, 0320), the engaged length (0211) of the bolt (0210) must be equal to that of the engaged thickness (0221) of the plate (0220). This mating process generally occurs at a common ambient mating temperature (AMT).

Figure 3:
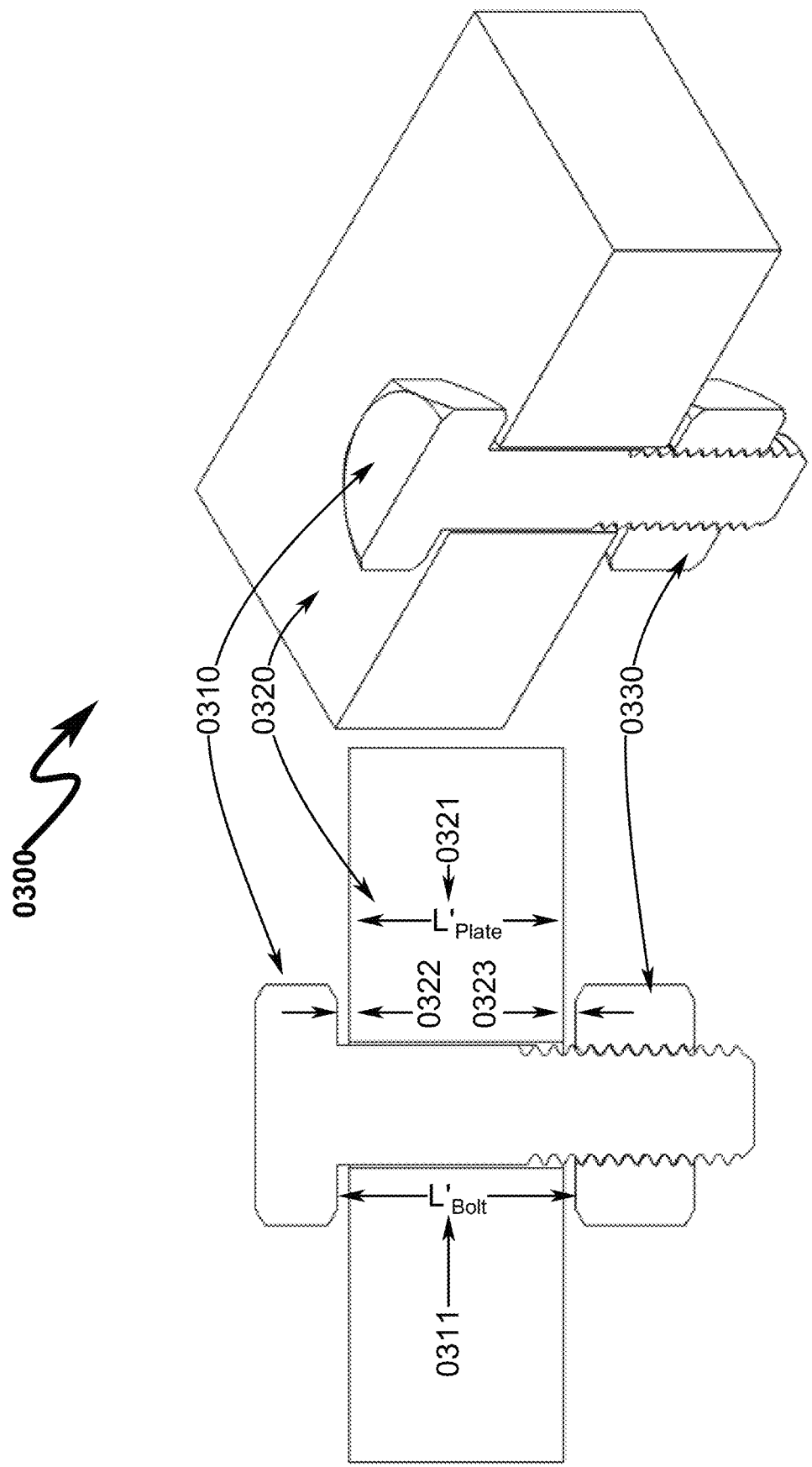
FIG. 3 illustrates front section and top front right perspective section views of a simple non-thermally compensated fastener system comprising a bolt, plate, and nut after experiencing a temperature differential that loosens the bolt.

However, this condition may change as temperature is increased or decreased from the AMT. For example, as generally depicted in FIG. 3 (0300) if the bolt's (0310) coefficient of thermal expansion is larger than the plate's (0320) coefficient of thermal expansion, the bolt (0310) may expand in length (0311) more than the plate (0320) expands (0321) with increasing temperature. Alternatively, if the bolt's (0310) coefficient of thermal expansion is smaller than the plate's (0320) coefficient of thermal expansion, the bolt (0310) may shrink in length (0311) less than the plate (0320) shrinks (0321) with decreasing temperature. Thus the bolt (0310)/nut (0330) combination may lose mating force with the plate (0320), causing bolt (0310) mating gaps (0322) and or nut (0330) mating gaps (0323) and a possible mechanical failure in the overall fastener system functionality.

While this example shows the bolt (0310) expanding more (0311) than the plate (0320) during heating or the bolt (0310) contracting less (0311) than the plate (0320) during cooling (0321), the opposite may also be true in which the bolt (0310) expands less than the plate (0320) during heating or the bolt (0310) contracts more (0311) than the plate (0320) during cooling in which the bolt (0310)/nut (0330) combination will exert additional force on the plate (0320) to the point that the bolt (0310)/nut (0330) combination and/or the plate (0320) may suffer deformation and/or catastrophic failure due to the increased force applied by the mismatch between the plate (0320) and the bolt (0310)/nut (0330) combination.

A common example found in industry would include a bolt (0310)/nut (0330) combination comprising mild steel having a fractional thermal expansion coefficient characteristic of $13 \times 10^{-6}/°$ C. used in conjunction with a plate (0320) comprising aluminum having a fractional thermal expansion coefficient characteristic of $24 \times 10^{-6}/°$ C. In this situation the bolt (0310)/nut (0330) combination and plate (0320) will experience a differential thermal expansion coefficient characteristic of $11 \times 10^{-6}/°$ C. The steel bolt (0310) may be stretched or the aluminum plate (0320) may severely deform as temperatures are increased beyond the AMT. If the temperatures are decreased significantly from the AMT, the aluminum plate (0320) will shrink at a greater rate than that of the steel bolt (0310)/nut (0330) combination, and thus bolt (0310)/plate (0320) and/or nut (0330)/plate (0320) slipping of the joint or even gaps (0322, 0323) may occur as generally depicted in FIG. 3 (0300).

Thermally Stabilized Fastener Temperature Expansion Characteristics (0400)-(0600)

Figure 4:
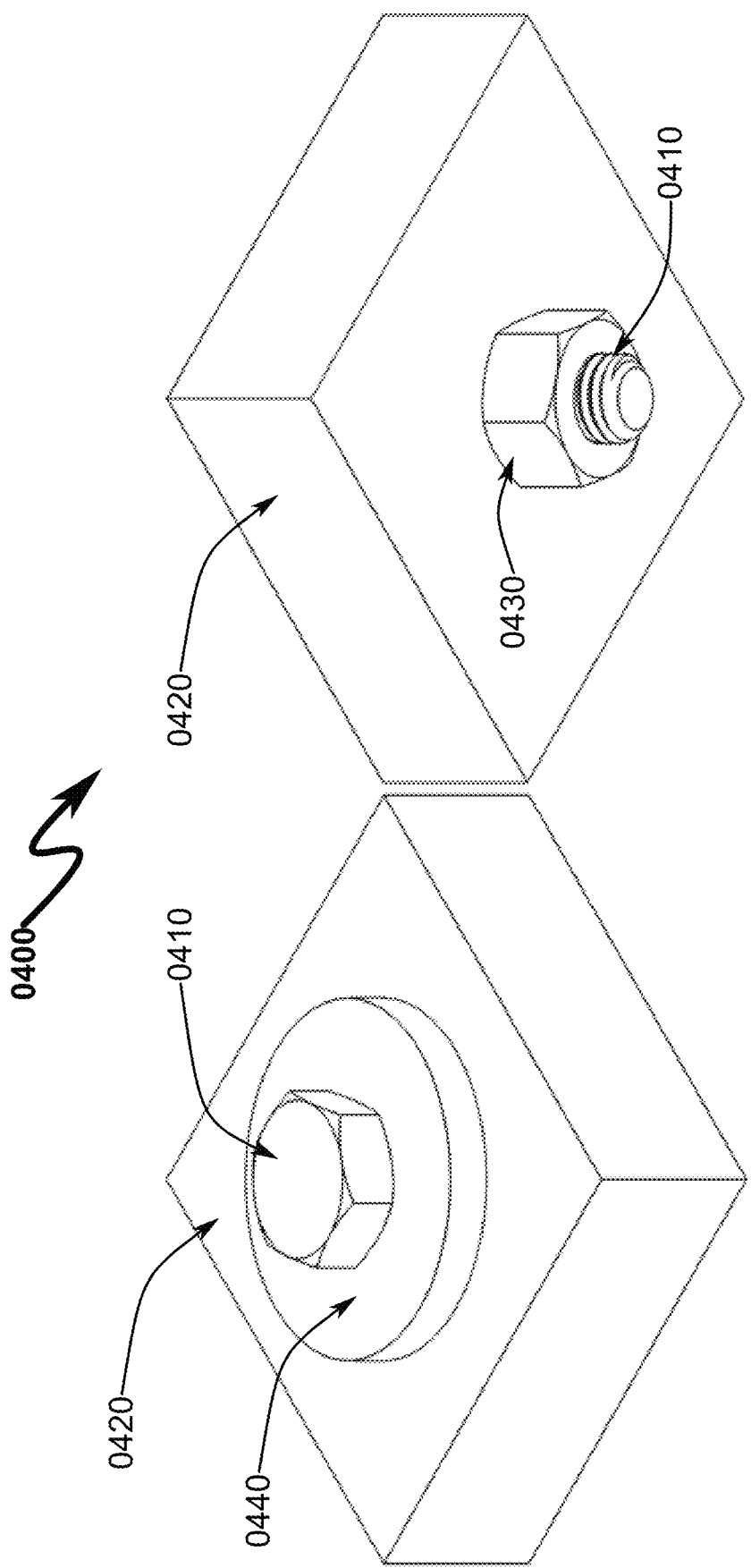
FIG. 4 illustrates top and bottom perspective views of a simple thermally stabilized fastener system comprising a bolt, plate, and nut.
Figure 5:
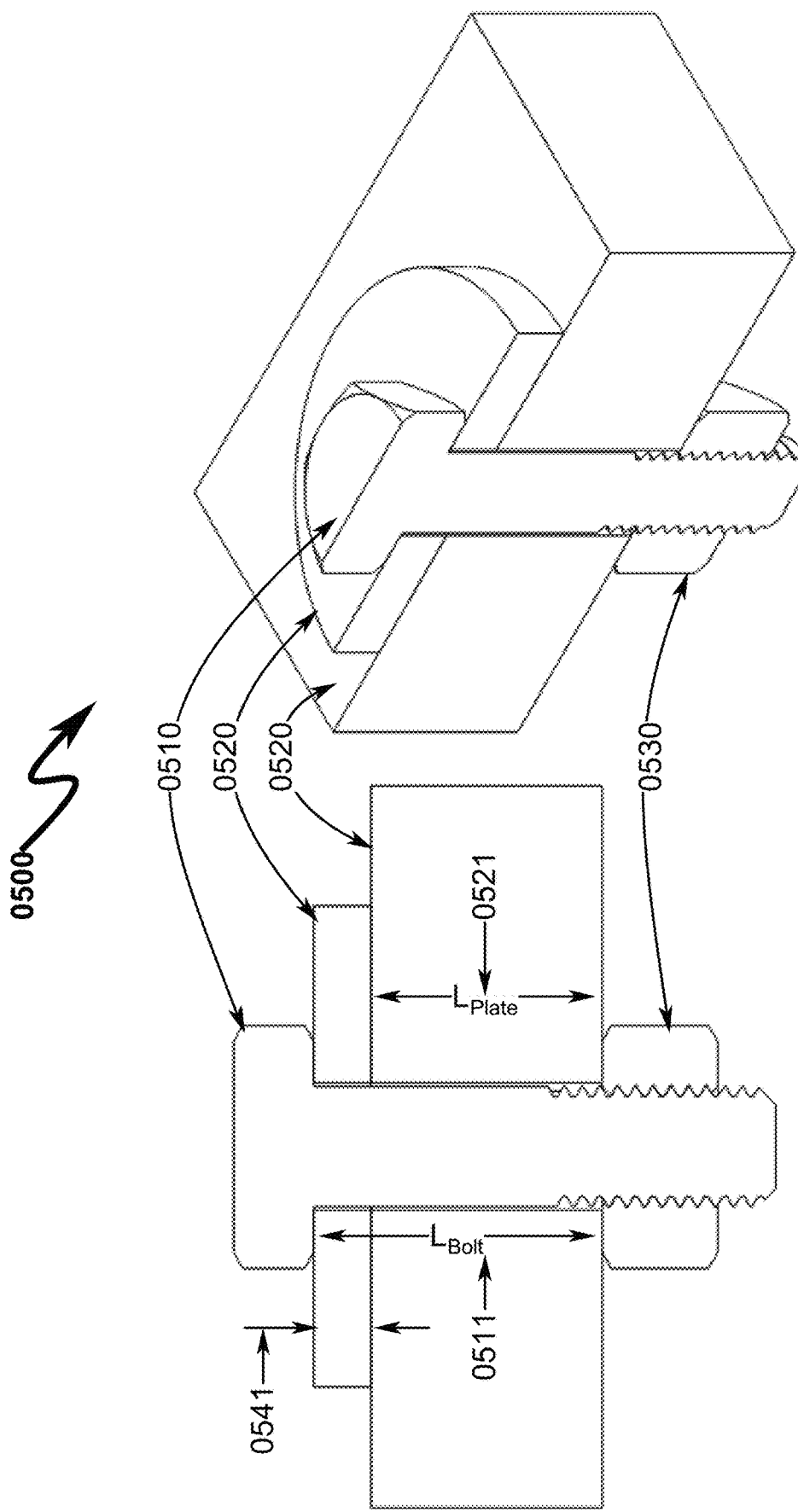
FIG. 5 illustrates front section and top front right perspective section views of a simple thermally stabilized fastener system comprising a bolt, plate, and nut as originally fastened at an initial temperature.
Figure 6:
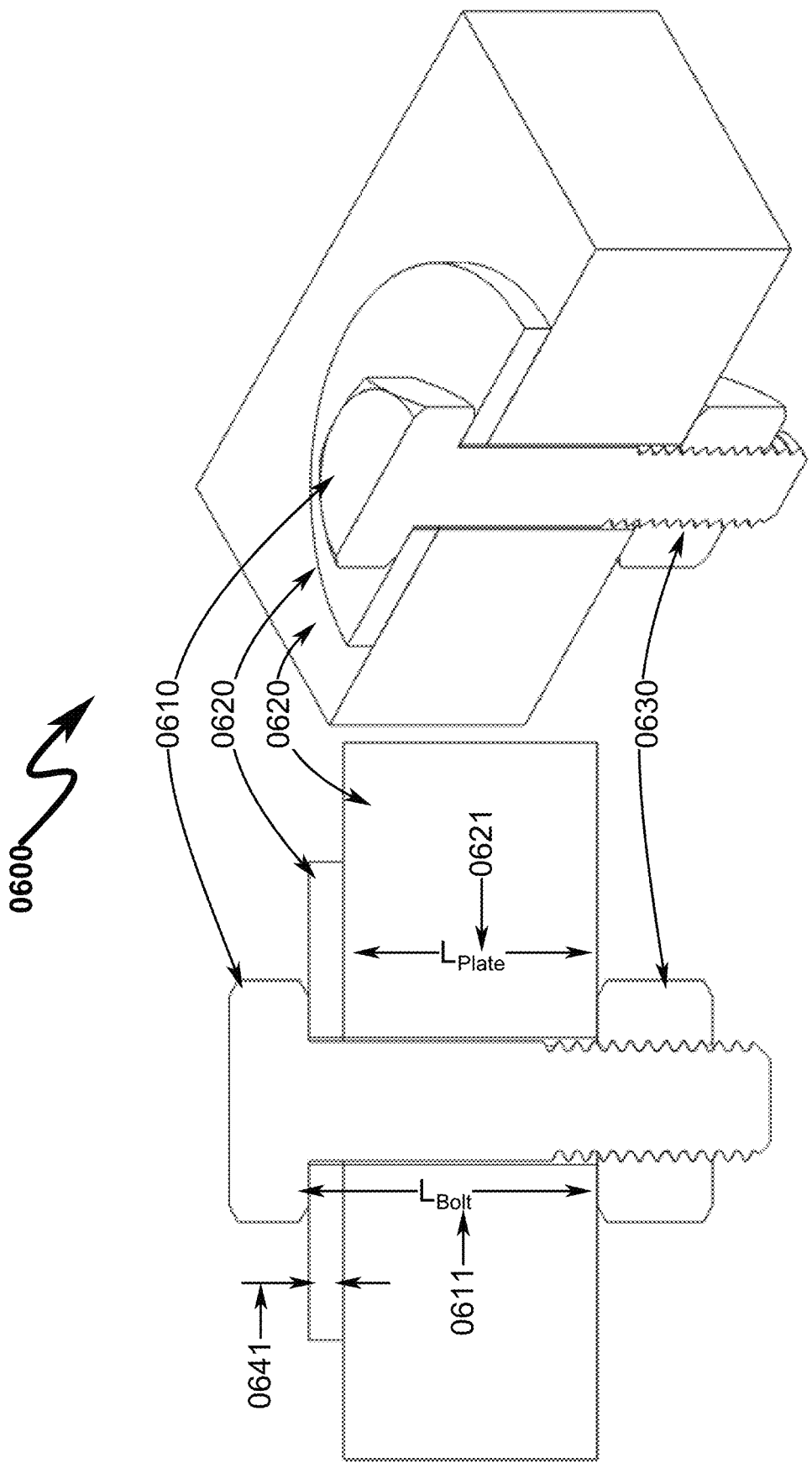
FIG. 6 illustrates front section and top front right perspective section views of a simple thermally stabilized fastener system comprising a bolt, plate, and nut after experiencing a temperature differential.

FIG. 4 (0400)-FIG. 6 (0600) depict a simple thermally compensated fastener system comprising a bolt (0410, 0510, 0610), plate (0420, 0520, 0620), nut (0430, 0530, 0630) and thermally compensating washer (0440, 0540, 0640). FIG. 4 (0400) and FIG. 5 (0500) depict the thermally compensated fastener combination in an AMT state where the bolt distance (0511) matches the combination of the plate thickness (0521) plus the thermally compensating washer (0540) thickness (0541).

Referencing the section views of FIG. 6 (0600) where the AMT has been changed such that the plate thickness (0621) has increased and the washer thickness (0641) has decreased to compensate for the difference in coefficient of thermal expansion between the bolt (0610) and the plate (0620) so as to maintain a constant force on the plate (0620) through the washer (0640) by the bolt (0610)/nut (0630) combination.

Derivation of Thermally Stabilized Fastener Sizing

The two strategies used to obtain a constant clamping force with a change in temperature to produce a thermally stabilized fastener (TSF) are: (1) hold the CTE of the temperature compensating member (TCM) constant and calculate the required thickness TCM thickness (2) hold the thickness of the TCM constant and calculate the required TCM CTE. The first approach is outlined generally in SAE AIR1754B Aerospace Information Report for "Washer, Thermal Compensating, Metric Series" whereas the second approach is novel due to the unique ability to control the thermal expansion of tailored thermal expansion alloys. The specific thickness and CTE values are dependent on the thickness of the members in the mechanical member stack (MMS) and the length of the fastener (FAS) which are derived from mechanical analysis of the fastener assembly using traditional engineering design. The general expression for the mechanical and thermal displacements experienced by a thermally stabilized fastener (TSF) assembly will be derived and the two special cases for determining the TCM thickness or CTE will be presented. The change in length of a TSF assembly with any number (n) of mechanical stacking members (MMS) can be expressed the following equation:

$$\Delta L_{FAS}^{Thermal} + \Delta L_{FAS}^{Mechanical} = (\Delta L_{TCM} + \Delta L_{FRM} + \Delta L_{SRM} + \ldots + \Delta L_{nRM})^{Thermal} + (\Delta L_{TCM} + \Delta L_{FRM} + \Delta L_{SRM} + \ldots + \Delta L_{nRM})^{Mechanical} \quad (1)$$

Where $\Delta L$ is the change in length due to thermal expansion or mechanical forces, FAS is the fastener, TCM is the thermal compensating member, FRM is the $1^{st}$ retention member, SRM is the $2^{nd}$ retention member, and nRM is the $n^{th}$ retention member where n is the number of retention members in the mechanical member stack (MMS). The change in length due to thermal expansion and changes in mechanical force can be expressed as:

$$\Delta L^{Thermal} = \alpha L^0 \Delta T \quad (2)$$

$$\Delta L^{Mechanical} = \frac{\Delta F L^0}{EA} \quad (3)$$

Where $\alpha$ is the material's coefficient of thermal expansion (CTE), $L^0$ is the original length of the member at room temperature, $\Delta T$ is the change in temperature, $\Delta F$ is the change in mechanical force, E is the material's elastic modulus, and A is the crossectional area of part that experiences the mechanical force. Substituting equations 2 and 3 into equation 1 and noticing that any change in force on the FAS is opposite and equal to a change in force on the MMS:

$$\Delta F_{RAs} = -\Delta F_{TCM} = -\Delta F_{FRM} = -\Delta F_{SRM} = -\Delta F_{nRM} = \Delta F \quad (4)$$

we obtain an expression for the change in force of the form:

$$\Delta F = \Delta T \frac{\left(\alpha_{TCM} L_{TCM}^0 + \alpha_{FRM} L_{FRM}^0 + \alpha_{SRM} L_{SRM}^0 + \ldots + \alpha_{nRm} L_{nRM}^0 - \alpha_{FAS} L_{FAS}^0\right)}{\left(\frac{L_{FAS}^0}{A_{FAS} E_{FAS}} + \frac{L_{TCM}^0}{A_{TCM} E_{TCM}} + \frac{L_{FRM}^0}{A_{FRM} E_{FRM}} + \frac{L_{SRM}^0}{A_{SRM} E_{SRM}} + \ldots + \frac{L_{nRM}^0}{A_{nRM} E_{nRM}}\right)} \quad (5)$$

This expression can be used to calculate the desired mechanical, thermal, and dimensional characteristics of the various parts of a fastener assembly to obtain a desired temperature force profile (TFP). A simplified case is when the desired TFP is zero as the temperature changes. To obtain no change in force, $\Delta F = 0$, with changes in temperature, $\Delta T$, equation 5 simplifies to:

$$\alpha_{FAS} L_{FAS}^0 = \alpha_{TCM} L_{TCM}^0 + \alpha_{FRM} L_{FRM}^0 + \alpha_{SRM} L_{SRM}^0 + \ldots + \alpha_{nRM} L_{nRM}^0 \quad (6)$$

Substituting the dependence of the FAS length, $L_{FAS}^0$, to the total MMS thickness:

$$L_{FAS}^0 = L_{TCM}^0 + L_{FRM}^0 + L_{SRM}^0 + \ldots + L_{nRM}^0 \quad (7)$$

into equation 6, we obtain the general expression for creating a TSF system that does not change clamping force with changing temperature:

$$L_{TCM}^0(\alpha_{TCM} - \alpha_{FAS}) = L_{FRM}^0(\alpha_{FAS} - \alpha_{FRM}) + L_{SRM}^0(\alpha_{FAS} - \alpha_{SRM}) + \ldots + L_{nRM}^0(\alpha_{FAS} - \alpha_{nRM}) \quad (8)$$

To calculate the required thickness of a TCM of a specific CTE, equation 8 is arranged into the following form:

$$L_{TCM}^0 = \frac{L_{FRM}^0(\alpha_{FAS} - \alpha_{FRM}) + L_{SRM}^0(\alpha_{FAS} - \alpha_{SRM}) + \ldots + L_{nRM}^0(\alpha_{FAS} - \alpha_{nRM})}{(\alpha_{TCM} - \alpha_{FAS})} \quad (9)$$

where everything on the right hand side of the equation is known. This formula is very similar to equation 1 for two mechanical members in the SAE AIR1754B Aerospace Information Report for "Washer, Thermal Compensating, Metric Series". The SAE standard is limited to only two members, called flanges in SAE AIR1754B, whereas equation 9 herein is generalized to any number, n, of mechanical members. Additionally, the SAE standard is limited to materials with known and unchangeable CTE values which is different for materials with tailored thermal expansion coefficients.

To calculate the required CTE of a TCM with a specific thickness, equation 8 is rearranged into the following form:

$$\alpha_{TCM} = \alpha_{FAS} + \frac{L_{FRM}^0(\alpha_{FAS} - \alpha_{FRM}) + L_{SRM}^0(\alpha_{FAS} - \alpha_{SRM}) + \ldots + L_{nRM}^0(\alpha_{FAS} - \alpha_{nRM})}{L_{TCM}^0} \quad (10)$$

The unique ability to tailor the thermal expansion opens the door for engineers to design fastener systems with this equation for the first time.

These general equations can be applied to any form of mechanical affixation where mechanical force must remain constant across temperature changes including but not limited to traditional fasteners that go through holes in the members to be clamped, such as bolts and rivets, and stack ups that are inside an internally threaded tube that houses members to be clamped with a retaining ring that engages the tube's threads.

Tailored Expansion Coefficient (TEC) Material Properties (0700)

Figure 7:
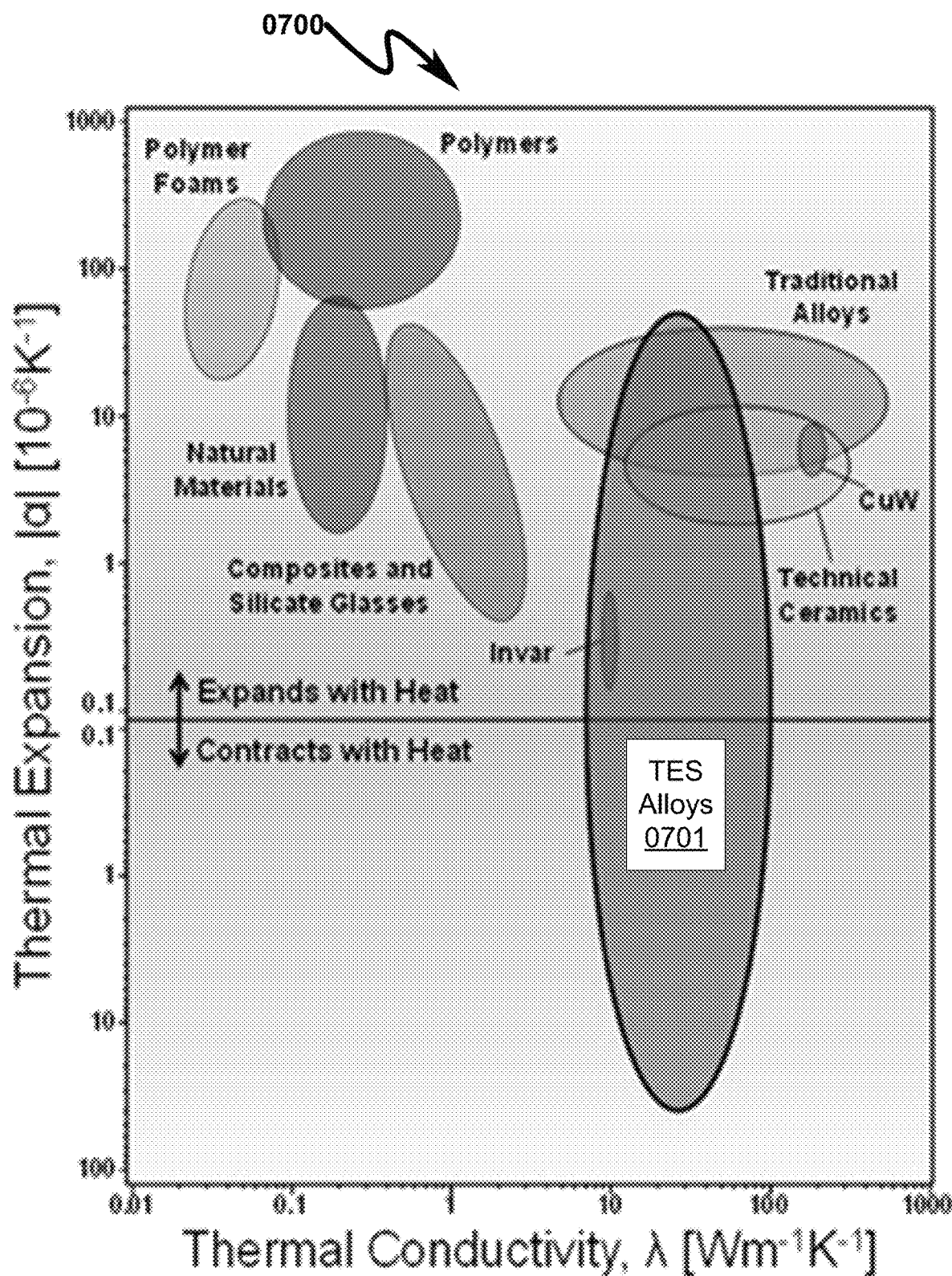
FIG. 7 illustrates a thermal expansion vs. thermal conductivity graph depicting various materials and their coefficients of thermal expansion with a particular emphasis on depicting the range of coefficients of expansion (COE) of tailored thermal expansion coefficient (TEC) materials.

FIG. 7 (0700) illustrates a thermal expansion vs. thermal conductivity graph depicting various materials and their coefficients of thermal expansion with a particular emphasis on depicting the range of coefficients of expansion (COE) of tailored thermal expansion coefficient (TEC) (0710) materials. It is instructive to note that the TEC materials (0710) depicted can include a range of negative temperature coefficients not possible using traditional material, including most metals. This ability to provide significant negative tailored thermal coefficients of expansion allow the TEC (0710) materials utilize with the present invention to thermally stabilize a wide range of materials and metals that were heretofore not possible to thermally stabilize in a deterministic manner.

Thermally Stabilized Fastener Method (0800)

Figure 8:
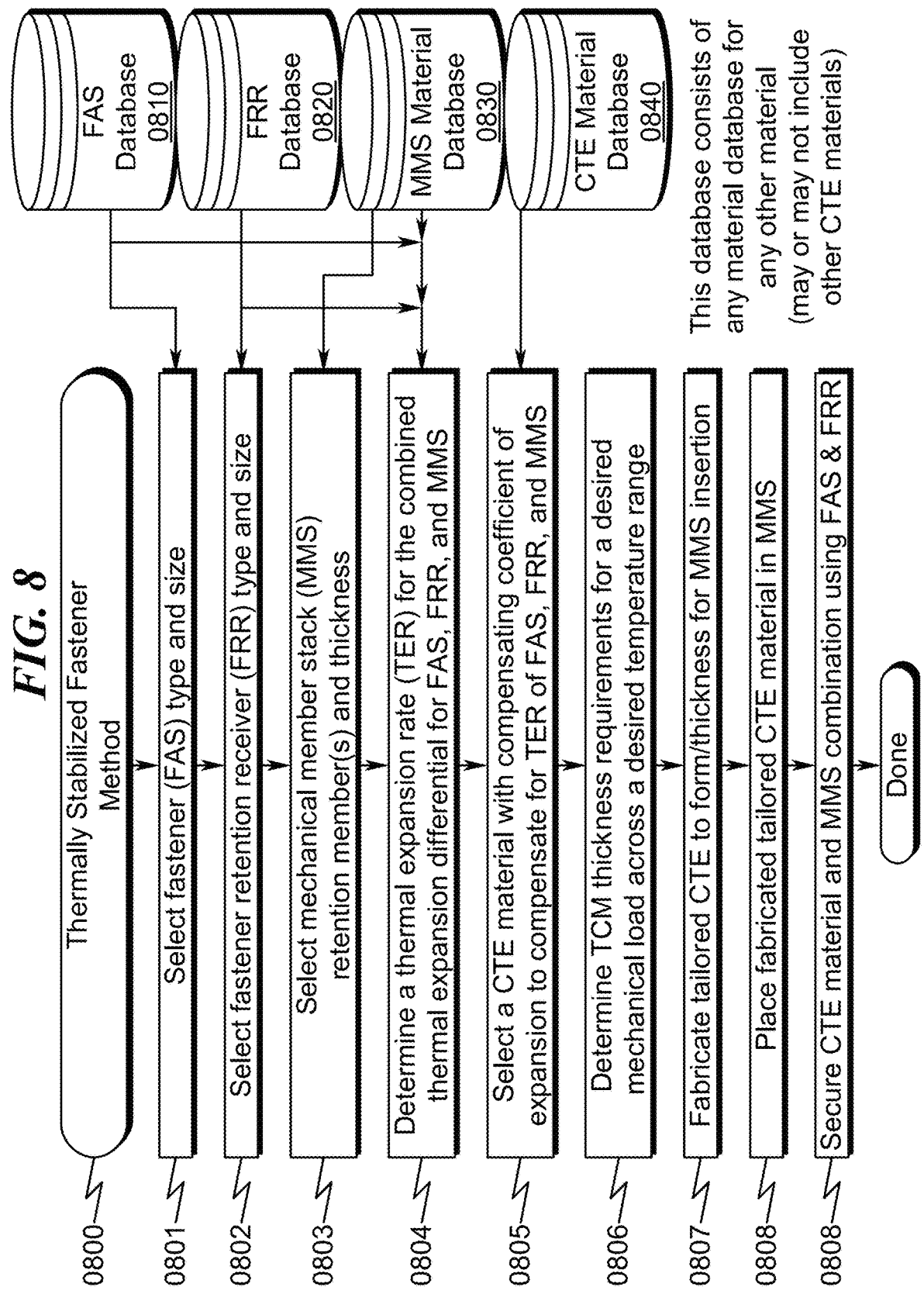
FIG. 8 illustrates a flowchart depicting a preferred exemplary method embodiment of the present invention as applied to implementing a thermally stabilized fastener.

The present invention may implement a method in which a thermally stabilized fastener is designed using TEC materials fabricated to compensate a FAS/FRR/MMS combination. In this thermally stabilized fastener methodology, as generally depicted in FIG. 8 (0800), the present invention may be broadly generalized as a thermally stabilized fastener (TSF) method comprising:

(1) Selecting a fastener (FAS) type and size (this may occur from one or more FAS databases (0810) using engineering design principles common to fastener selection and design) (0801);

(2) Selecting a fastener retention receiver (FRR) type and size (this may occur from one or more FRR databases (0820)) (0802);

(3) Selecting the mechanical member stack (MMS) retention member(s) and thickness(es) (this may occur from one or more material databases describing the materials in the MMS (0830)) (0803);

(4) Determining a thermal expansion rate (TER) for a combined thermal expansion differential for the FAS, the FRR, and the MMS (information for this calculation may occur from one or more FAS, FRR, and MMS databases (0810, 0820, 0830)) (0804);

(5) Selecting a tailored CTE material with a compensating coefficient of expansion to compensate for the TER of the combination of the FAS, the FRR, and the MMS (this selection may be defined in a CTE material database (0840)) (0805);

(6) Determining the TCM thickness requirements for a desired mechanical load across a desired temperature range (0806);

(7) Fabricating the tailored CTE material to a desired form and thickness for insertion in the MMS (0807);

(8) Placing the fabricated CTE material in the MMS (0808); and (9) Securing the CTE material and the MMS combination using the FAS and the FRR (0809).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

5-Member TCM TSF System Overview (0900)-(1600)

Figure 9:
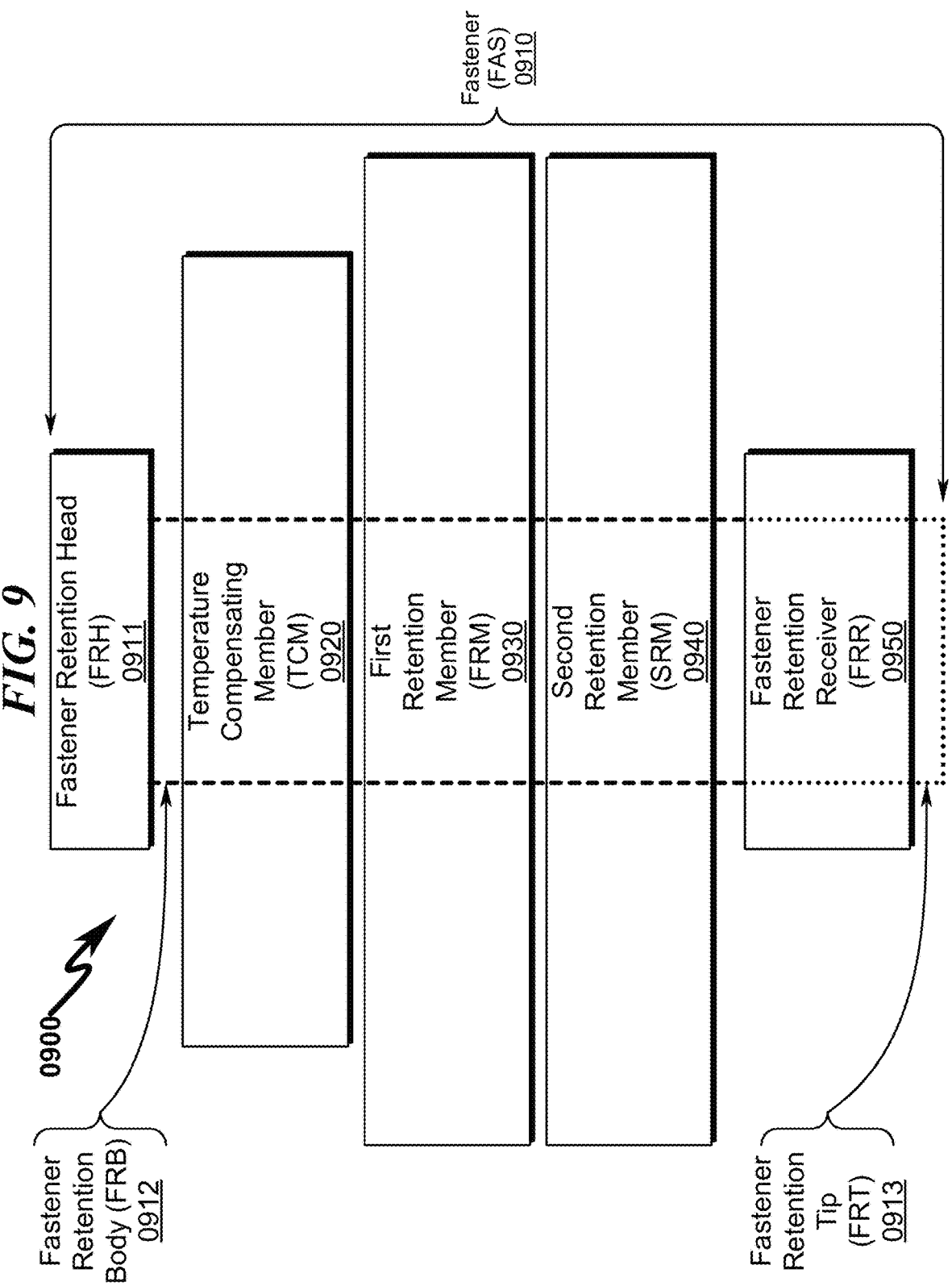
FIG. 9 illustrates a block diagram depicting a preferred exemplary 5-member thermally stabilized fastener system.

A general 5-member TCM TSF system can be seen by referencing FIG. 9 (0900) wherein a fastener (FAS) (0910) comprising a faster retention head (FRH) (0911), fastener retention body (FRB) (0912), and fastener retention tip (FRT) (0913) is used to couple a mechanical member stack (MMS) in a thermally stabilized fashion using a fastener retention receiver (FRR) (0950). The MMS in this example comprises a temperature compensating member (TCM) (0920), a first retention member (FRM) (0930), and a second retention member (SRM) (0940).

Figure 10:
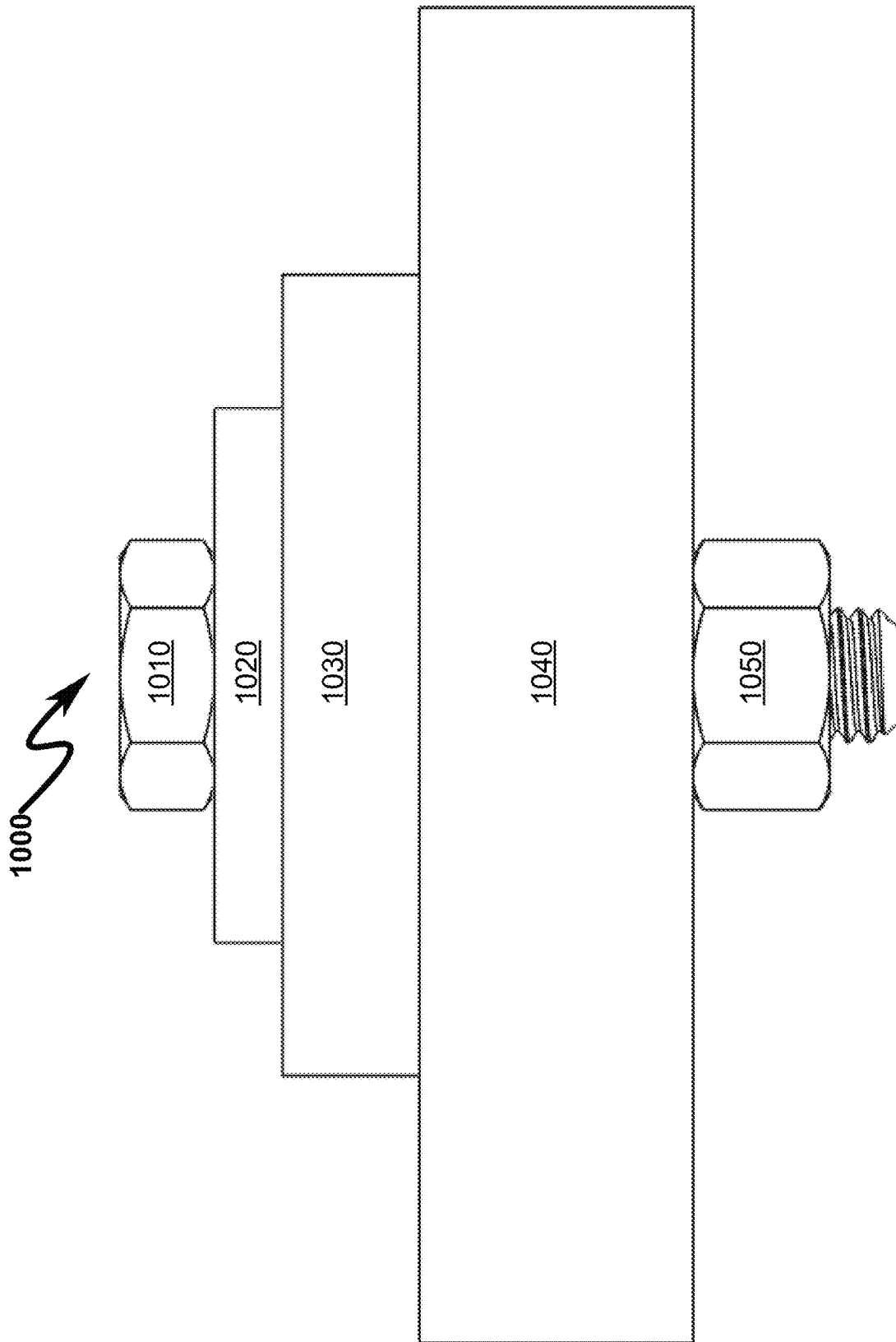
FIG. 10 illustrates a front view of a preferred exemplary 5-member thermally stabilized fastener system embodiment.
Figure 11:
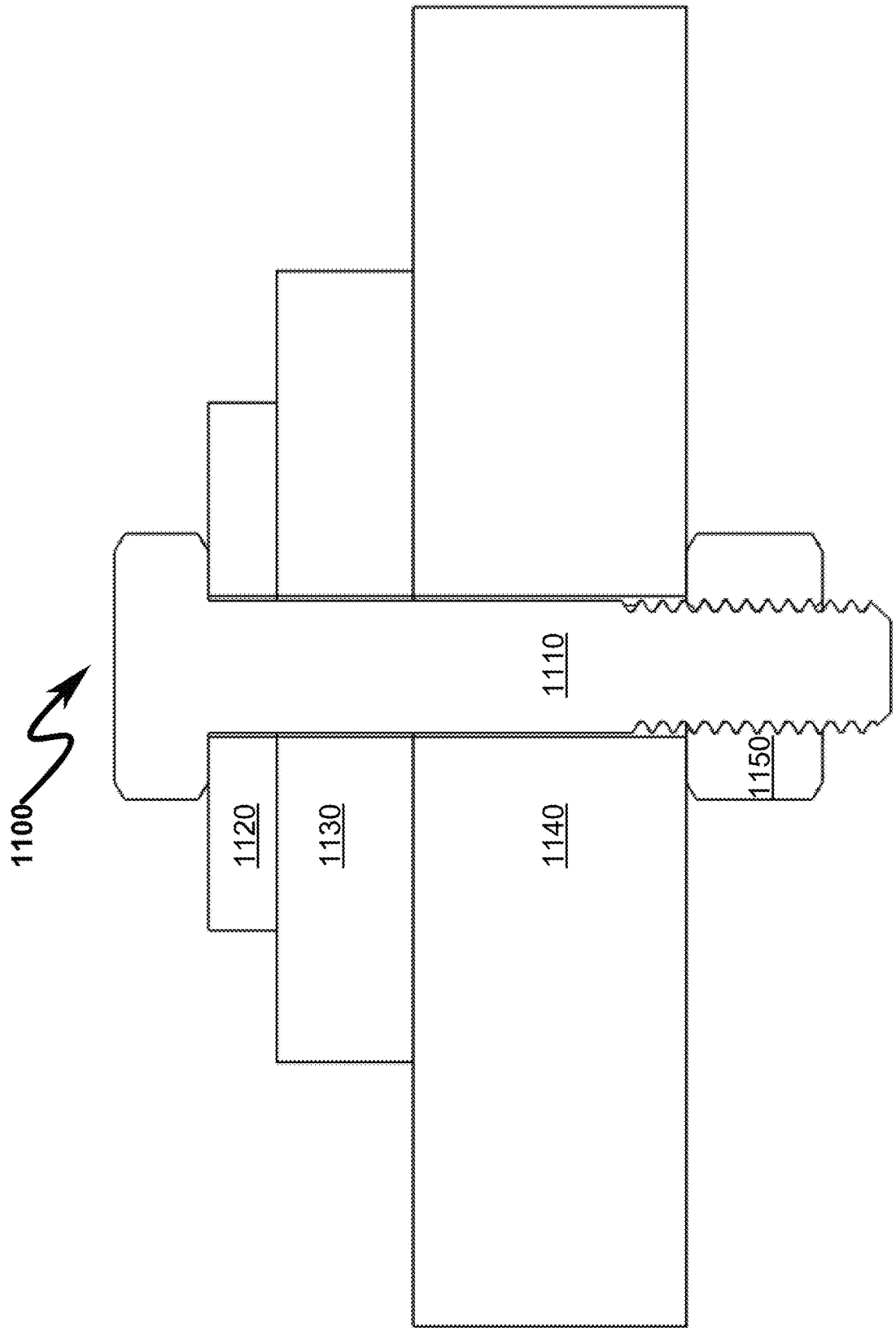
FIG. 11 illustrates a front section view of a preferred exemplary 5-member thermally stabilized fastener system embodiment.
Figure 12:
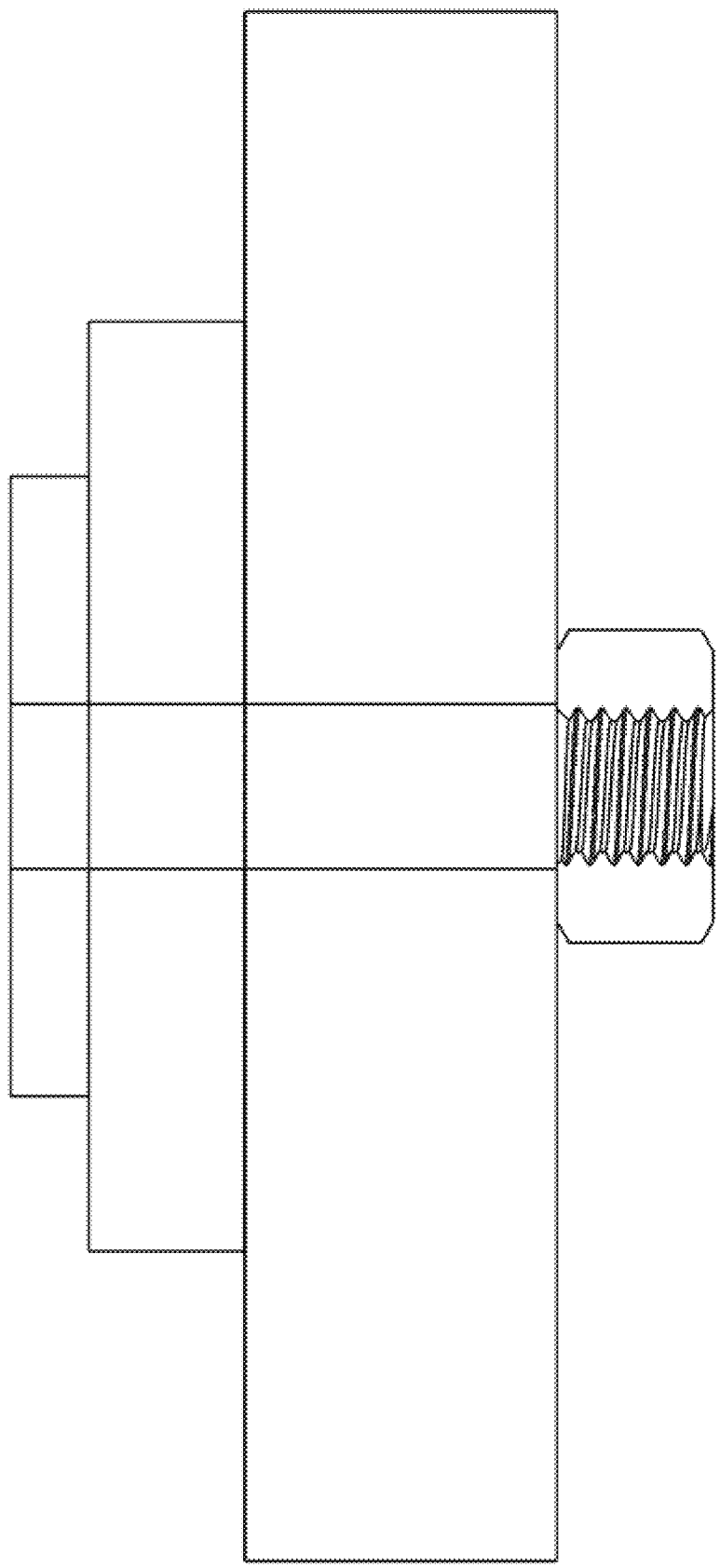
FIG. 12 illustrates a front section view (with fastener hidden) of a preferred exemplary 5-member thermally stabilized fastener system embodiment.
Figure 13:
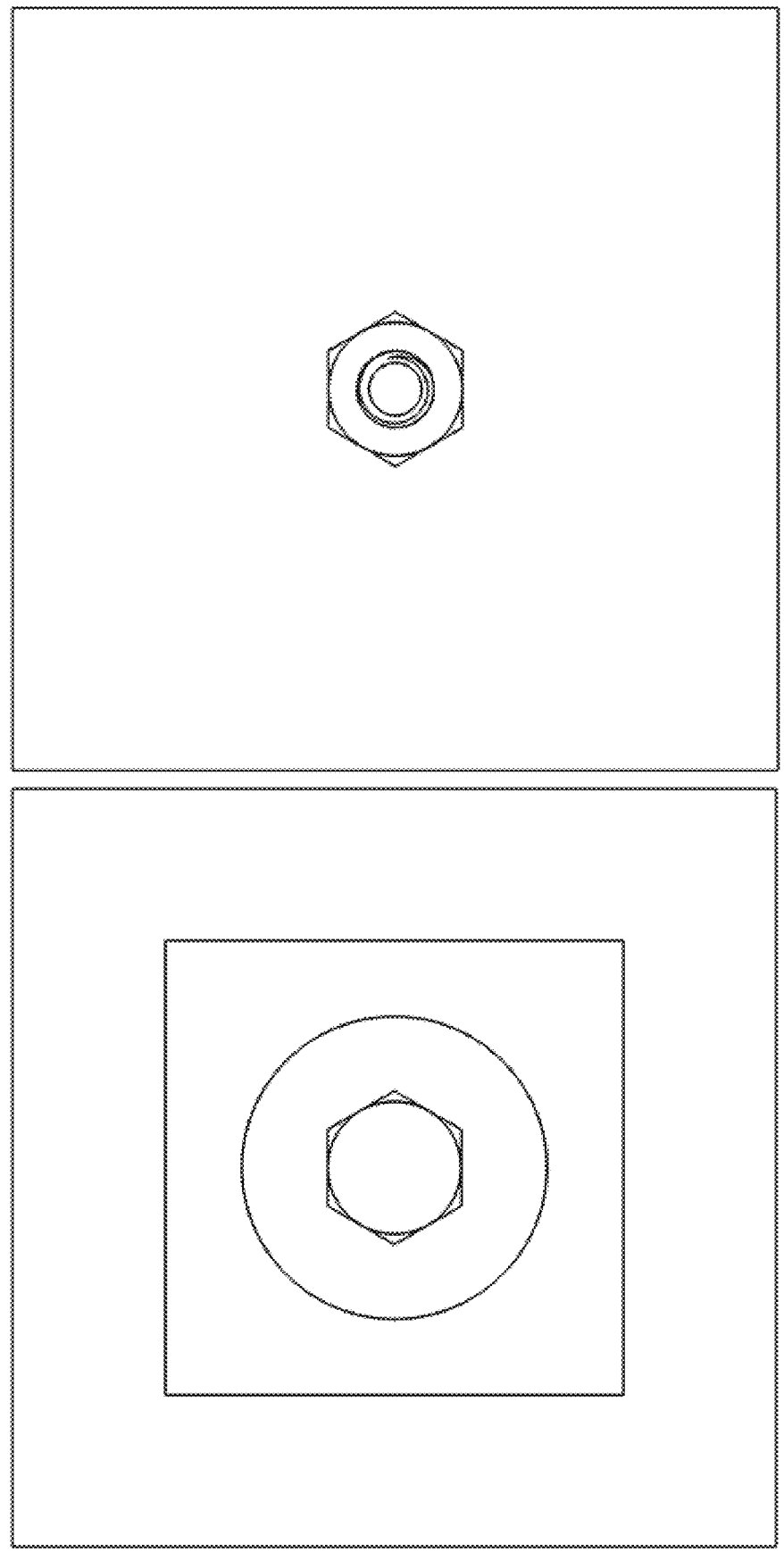
FIG. 13 illustrates top and bottom views of a preferred exemplary 5-member thermally stabilized fastener system embodiment.
Figure 14:
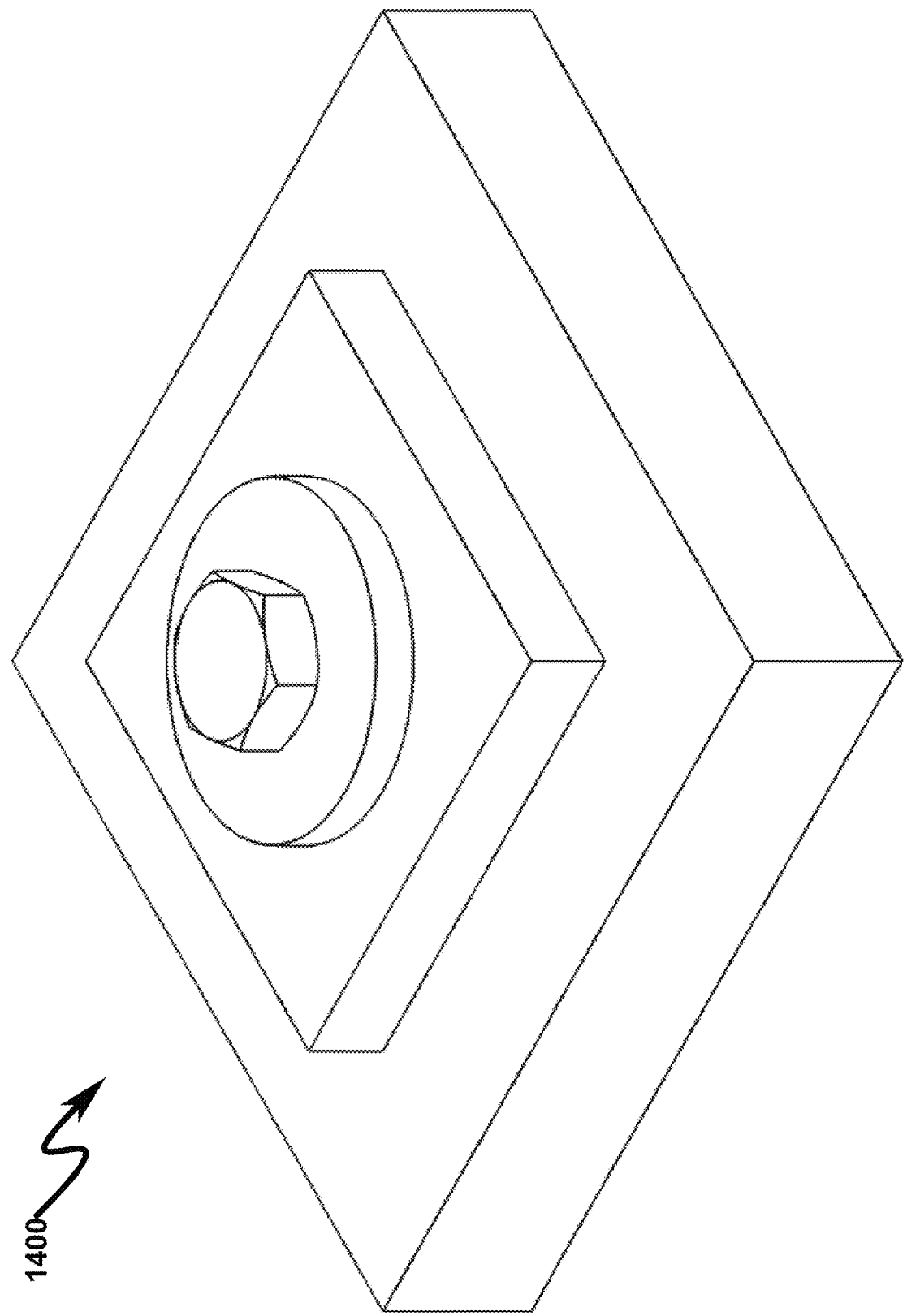
FIG. 14 illustrates a top front right perspective view of a preferred exemplary 5-member thermally stabilized fastener system embodiment.
Figure 15:
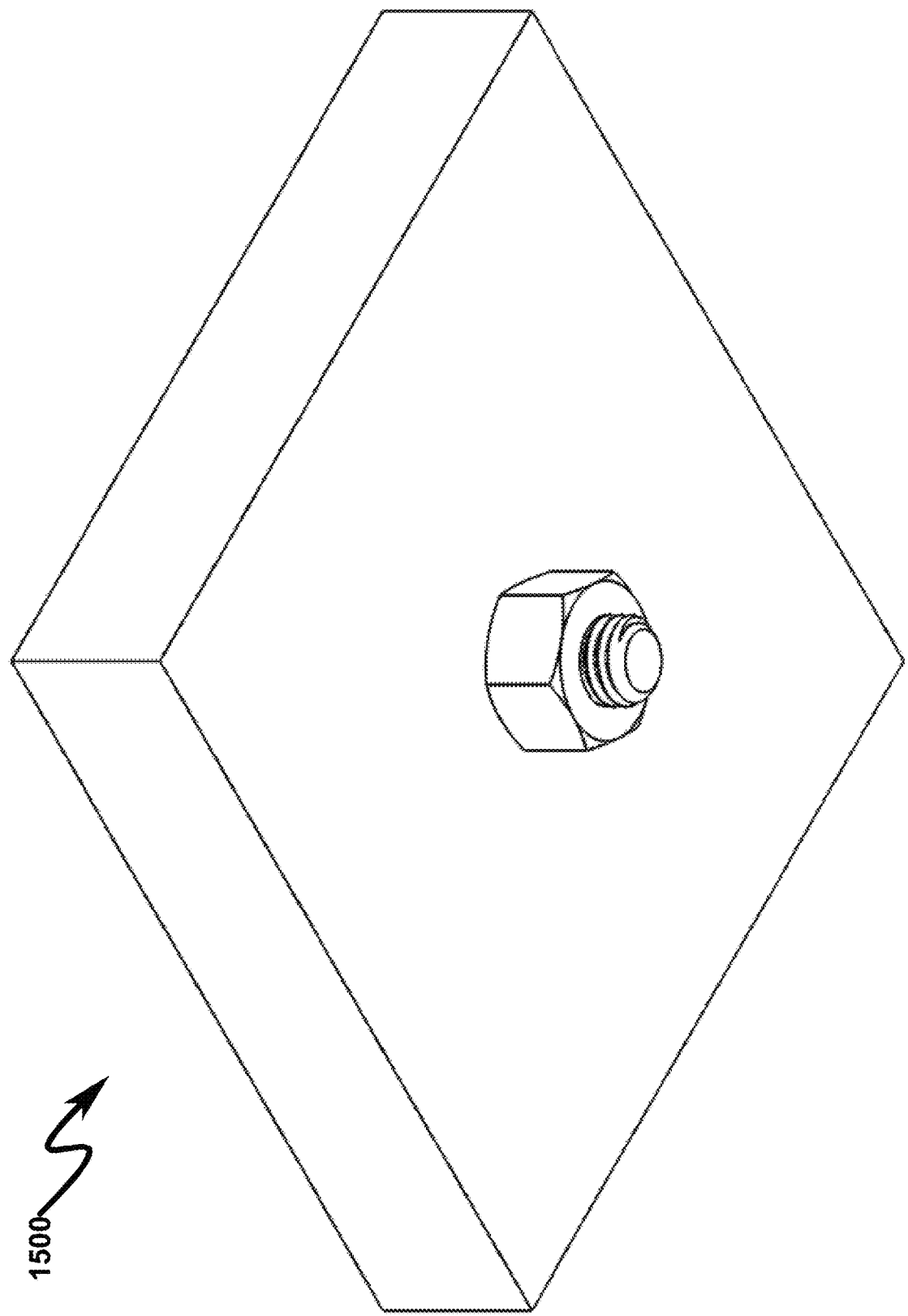
FIG. 15 illustrates a bottom front right perspective view of a preferred exemplary 5-member thermally stabilized fastener system embodiment.
Figure 16:
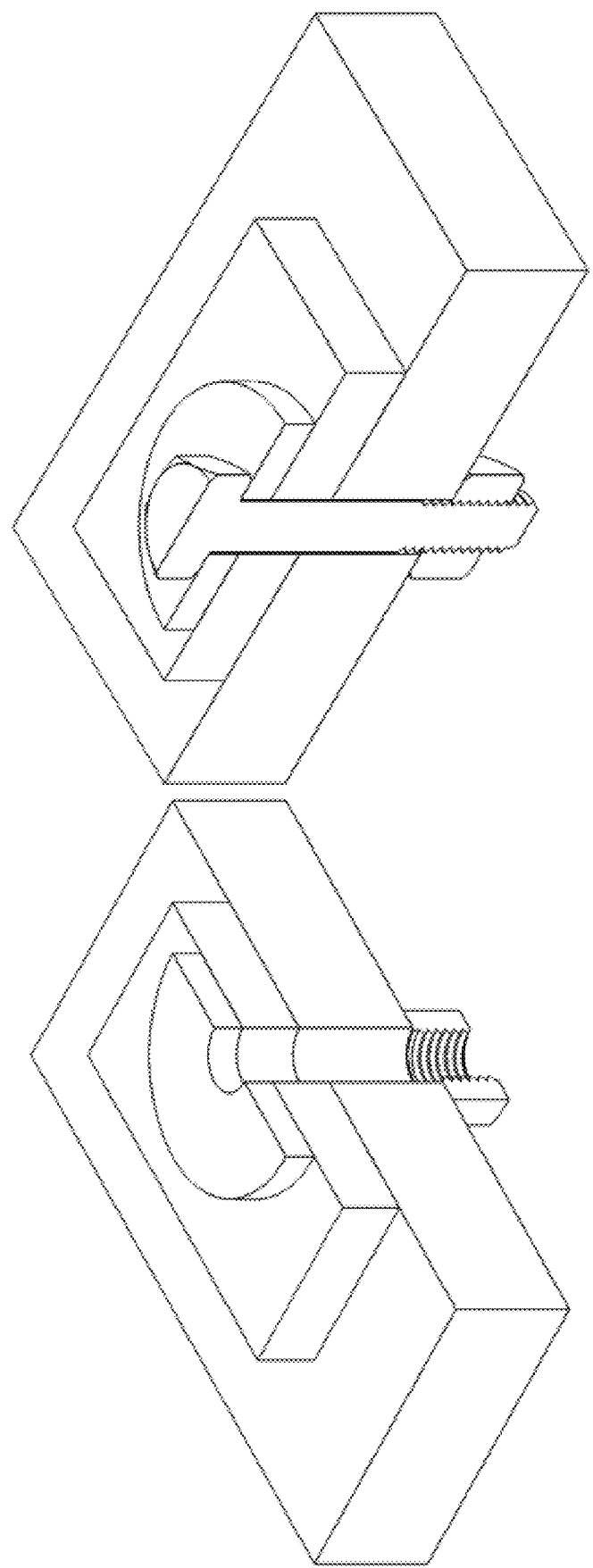
FIG. 16 illustrates a top front right perspective side section view (with fastener hidden) and a top front right perspective front section view of a preferred exemplary 5-member thermally stabilized fastener system embodiment.

This general construction may be illustrated by example as depicted in FIG. 10 (1000)-FIG. 16 (1600) wherein the fastener (FAS) (1010, 1110) is depicted as having a hexagonal bolt FRH, the fastener retention receiver (FRR) (1050, 1150) as a hexagonal nut, and the MMS as comprising a temperature compensating member (TCM) (1020, 1120), a first retention member (FRM) (1030, 1130), and a second retention member (SRM) (1040, 1140).

4-Member TCM Integrated TSF System Overview (1700)-(2400)

Figure 17:
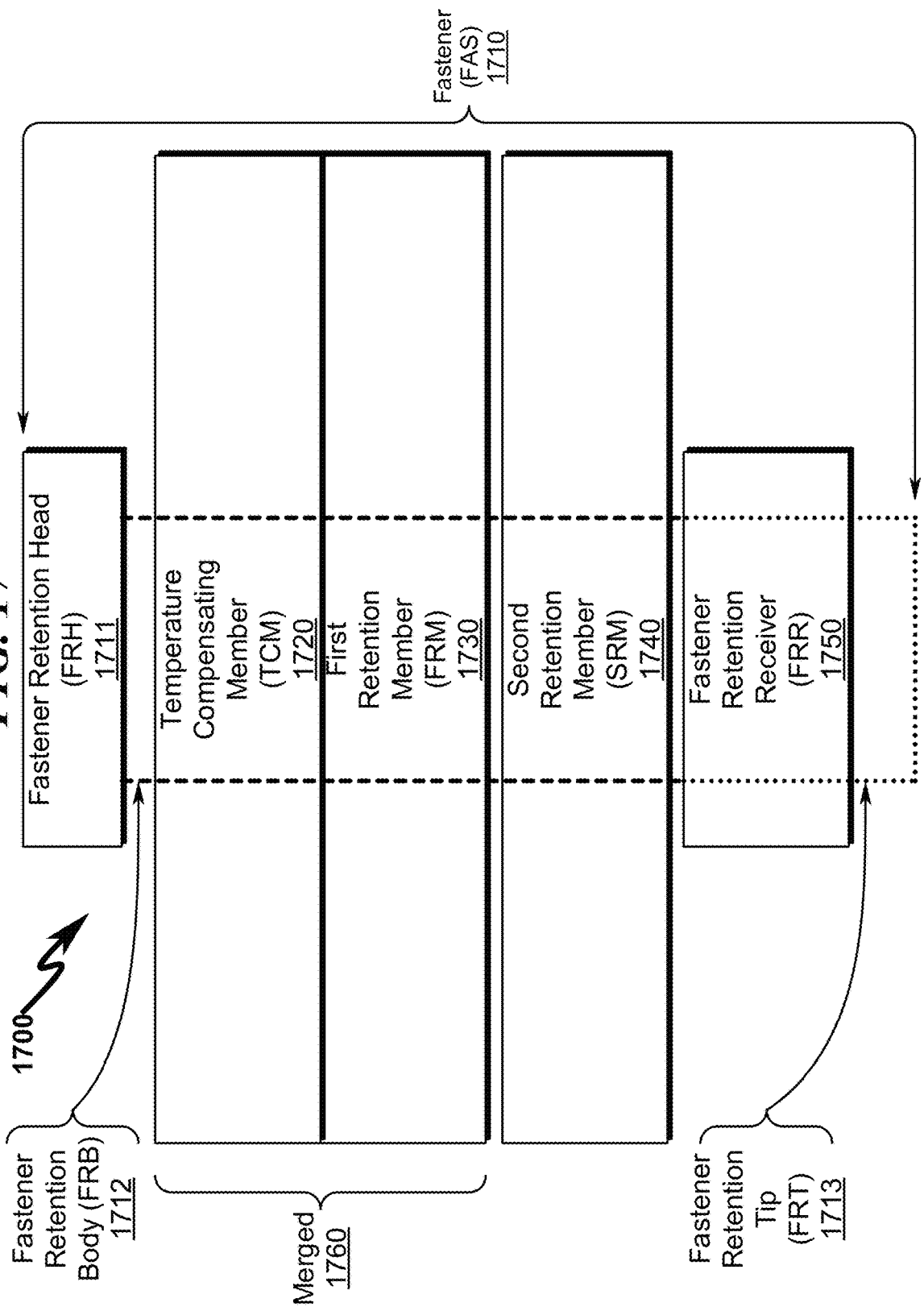
FIG. 17 illustrates a block diagram depicting a preferred exemplary 4-member integrated TCM thermally stabilized fastener system.

A general 4-member TCM integrated TSF system can be seen by referencing FIG. 17 (1700) wherein a fastener (FAS) (1710) comprising a faster retention head (FRH) (1711), fastener retention body (FRB) (1712), and fastener retention tip (FRT) (1713) is used to couple a mechanical member stack (MMS) in a thermally stabilized fashion using a fastener retention receiver (FRR) (1750). The MMS in this example comprises a temperature compensating member (TCM) (1720) merged (1760) with a first retention member (FRM) (1730), and a second retention member (SRM) (1740).

Figure 18:
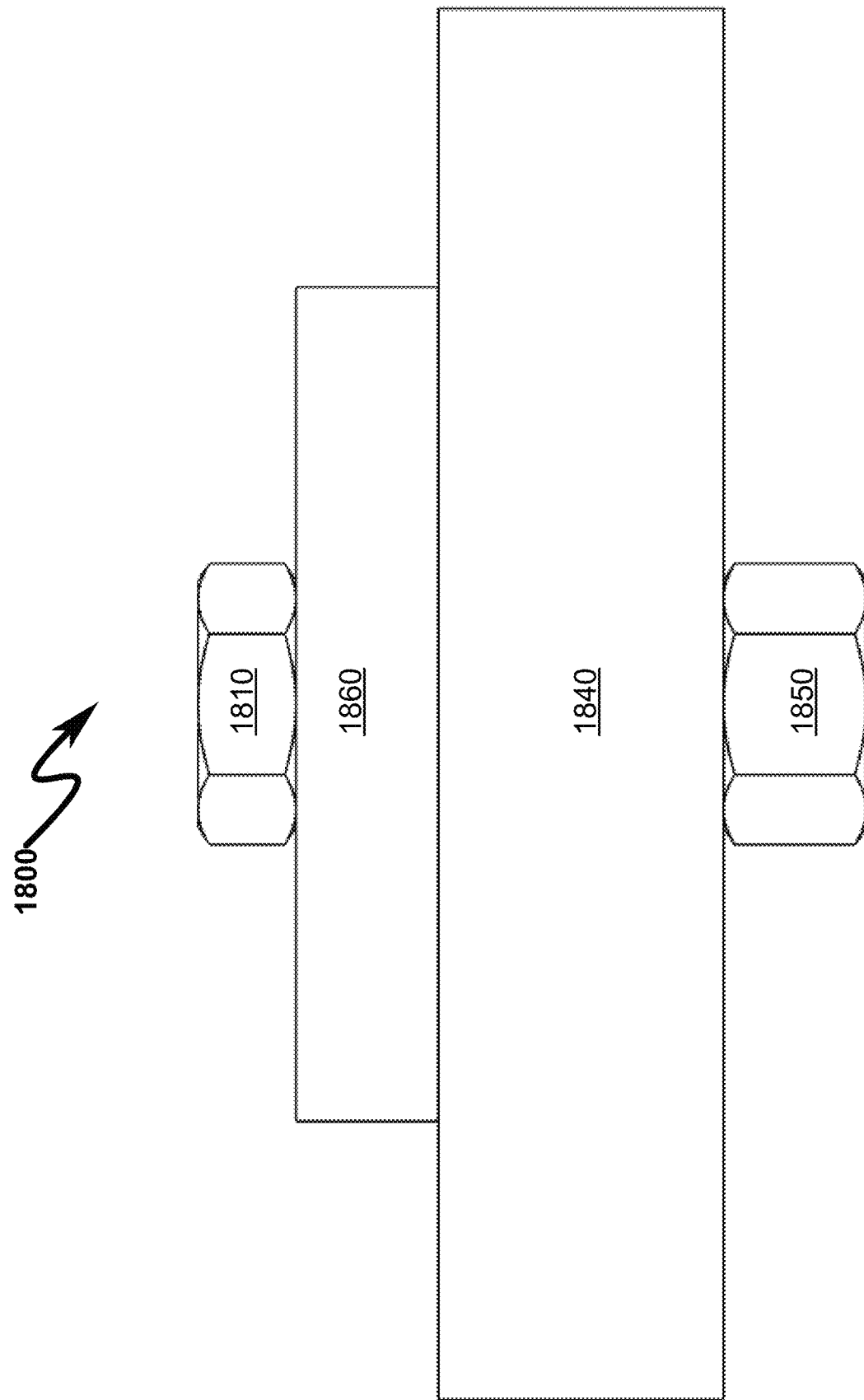
FIG. 18 illustrates a front view of a preferred exemplary 4-member integrated TCM thermally stabilized fastener system embodiment.
Figure 19:
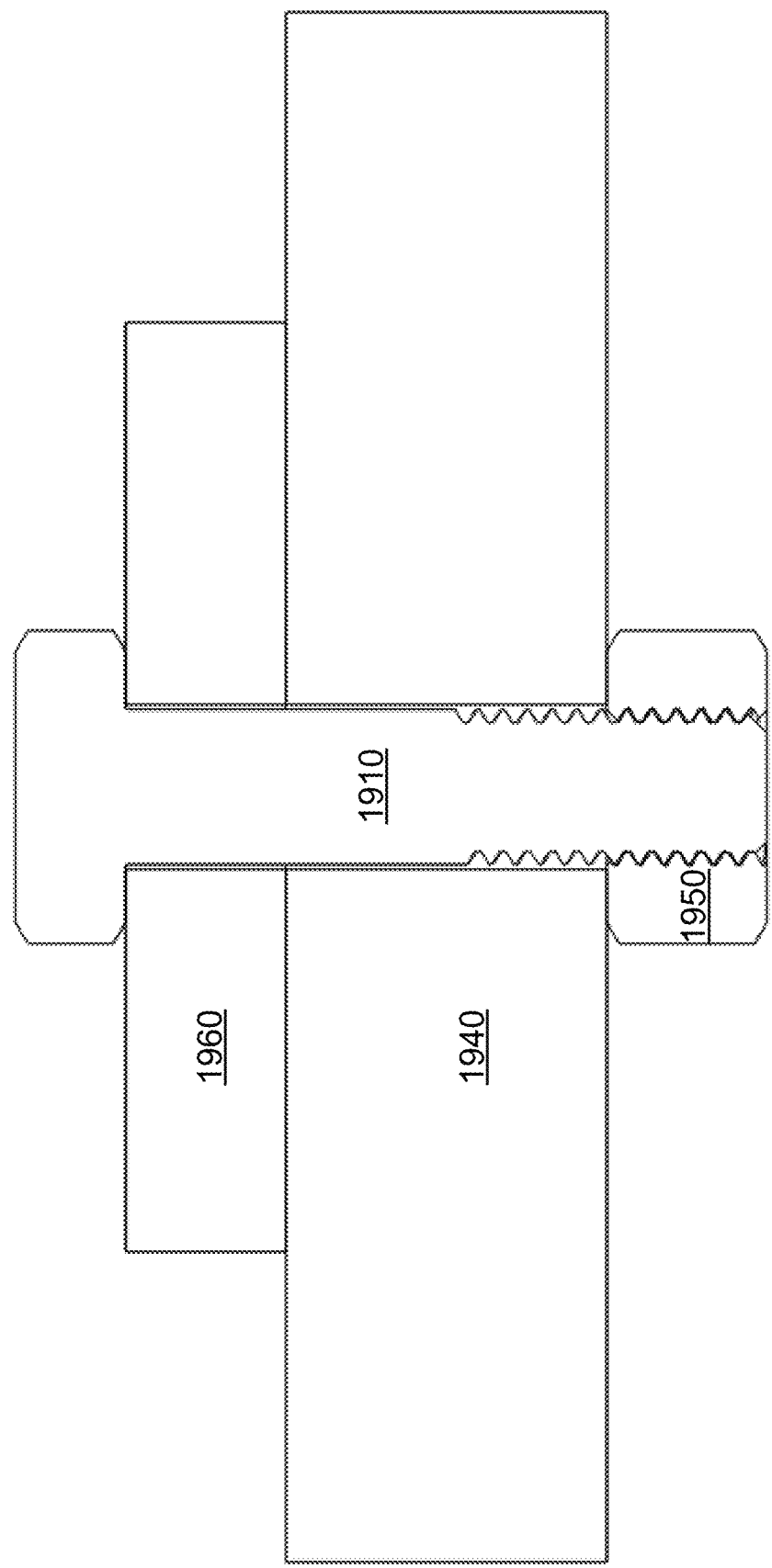
FIG. 19 illustrates a front section view of a preferred exemplary 4-member integrated TCM thermally stabilized fastener system embodiment.
Figure 20:
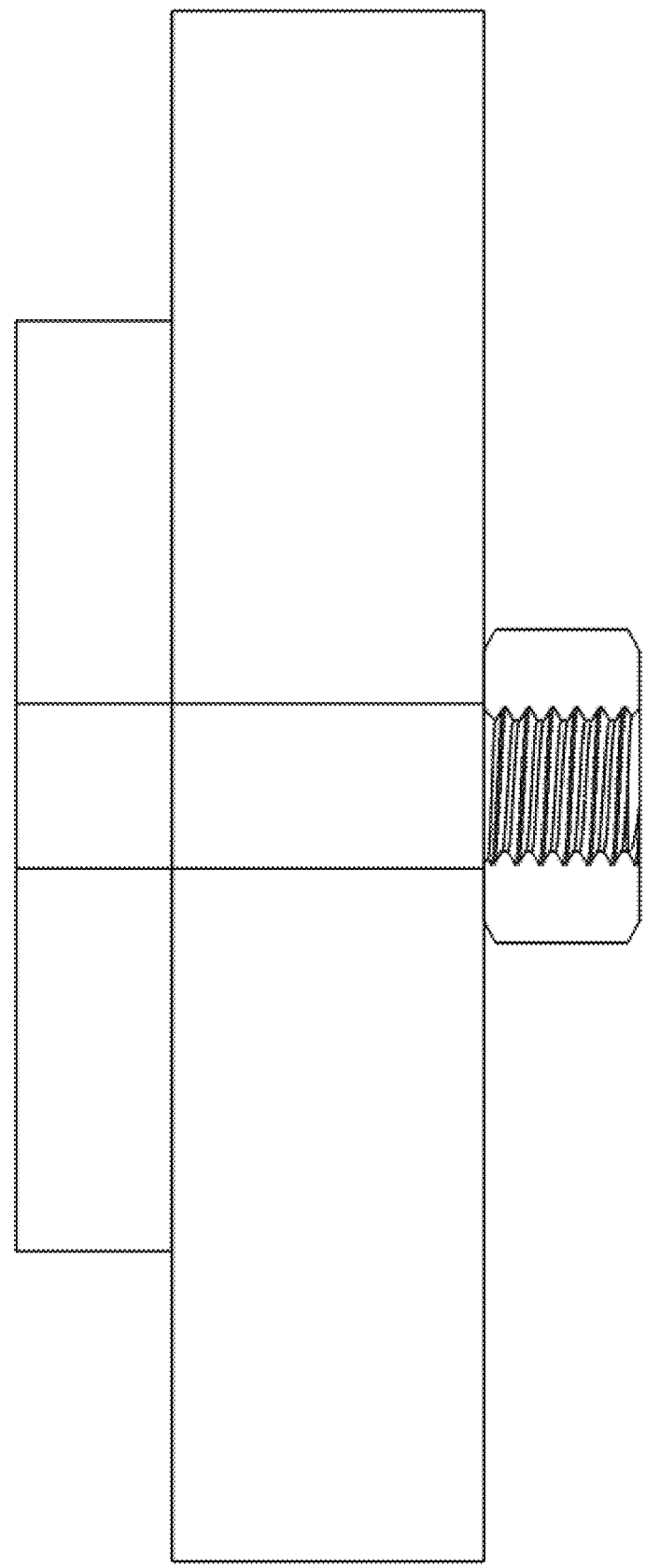
FIG. 20 illustrates a front section view (with fastener hidden) of a preferred exemplary 4-member integrated TCM thermally stabilized fastener system embodiment.
Figure 21:
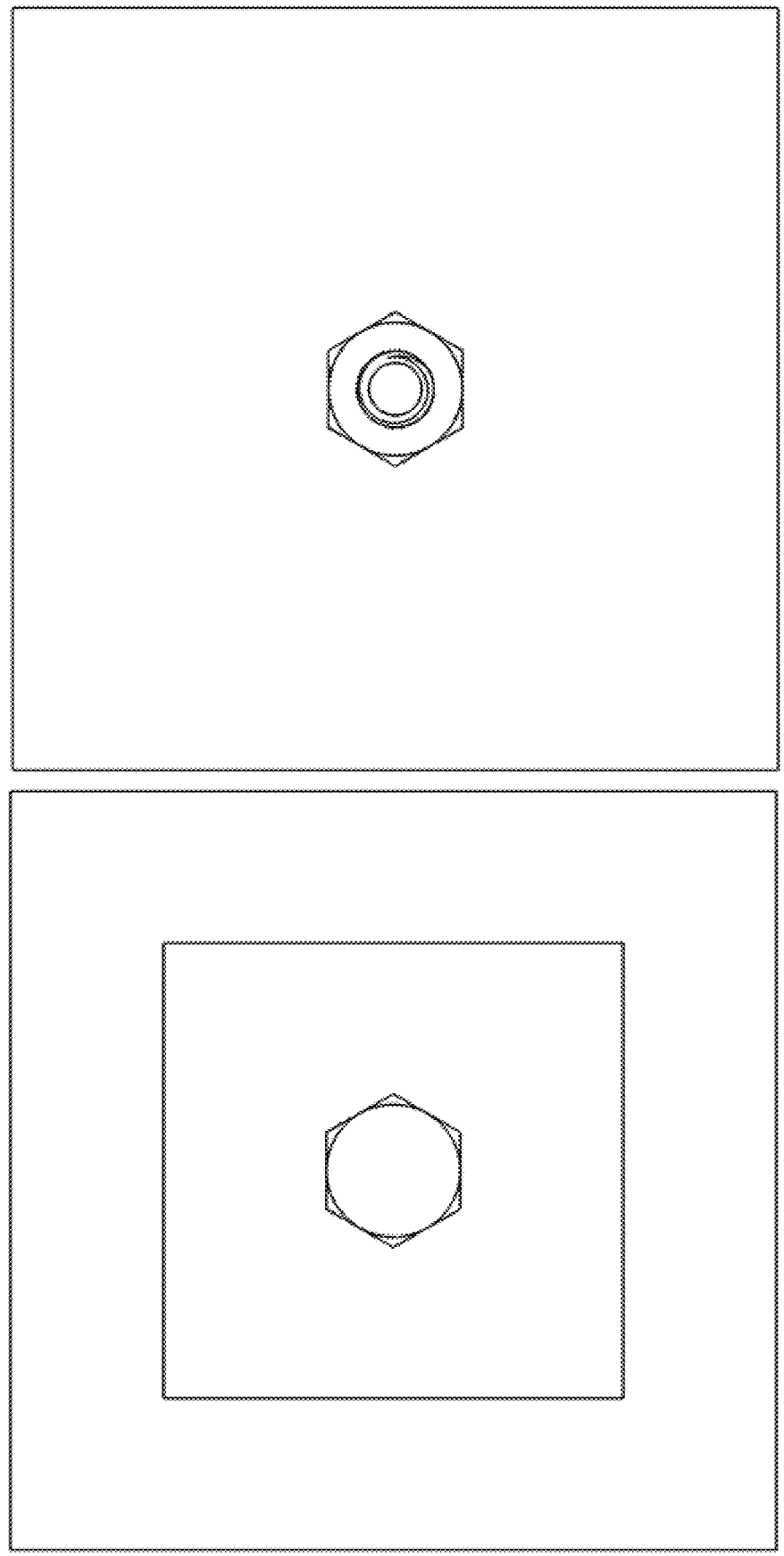
FIG. 21 illustrates top and bottom views of a preferred exemplary 4-member integrated TCM thermally stabilized fastener system embodiment.
Figure 22:
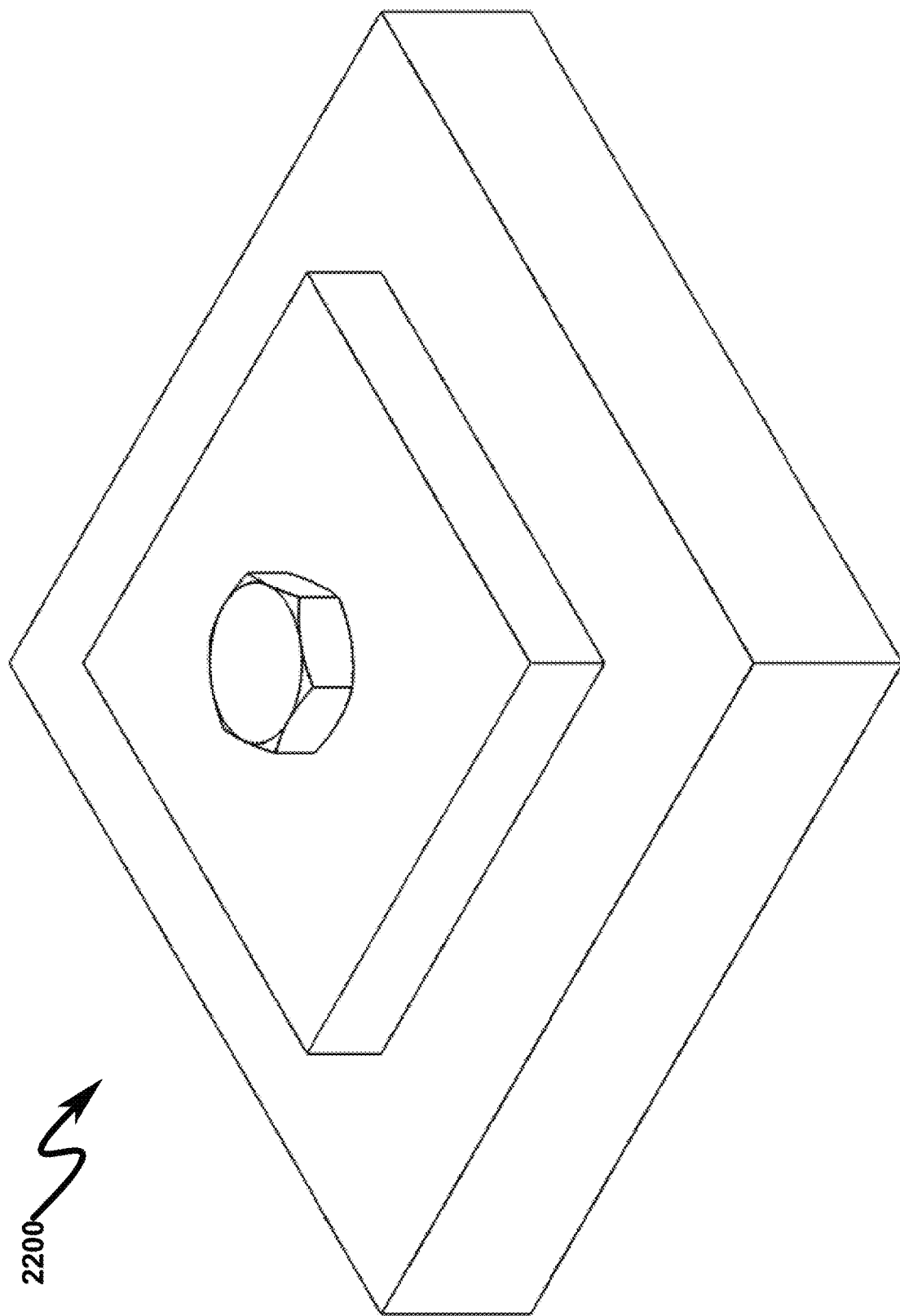
FIG. 22 illustrates a top front right perspective view of a preferred exemplary 4-member integrated TCM thermally stabilized fastener system embodiment.
Figure 23:
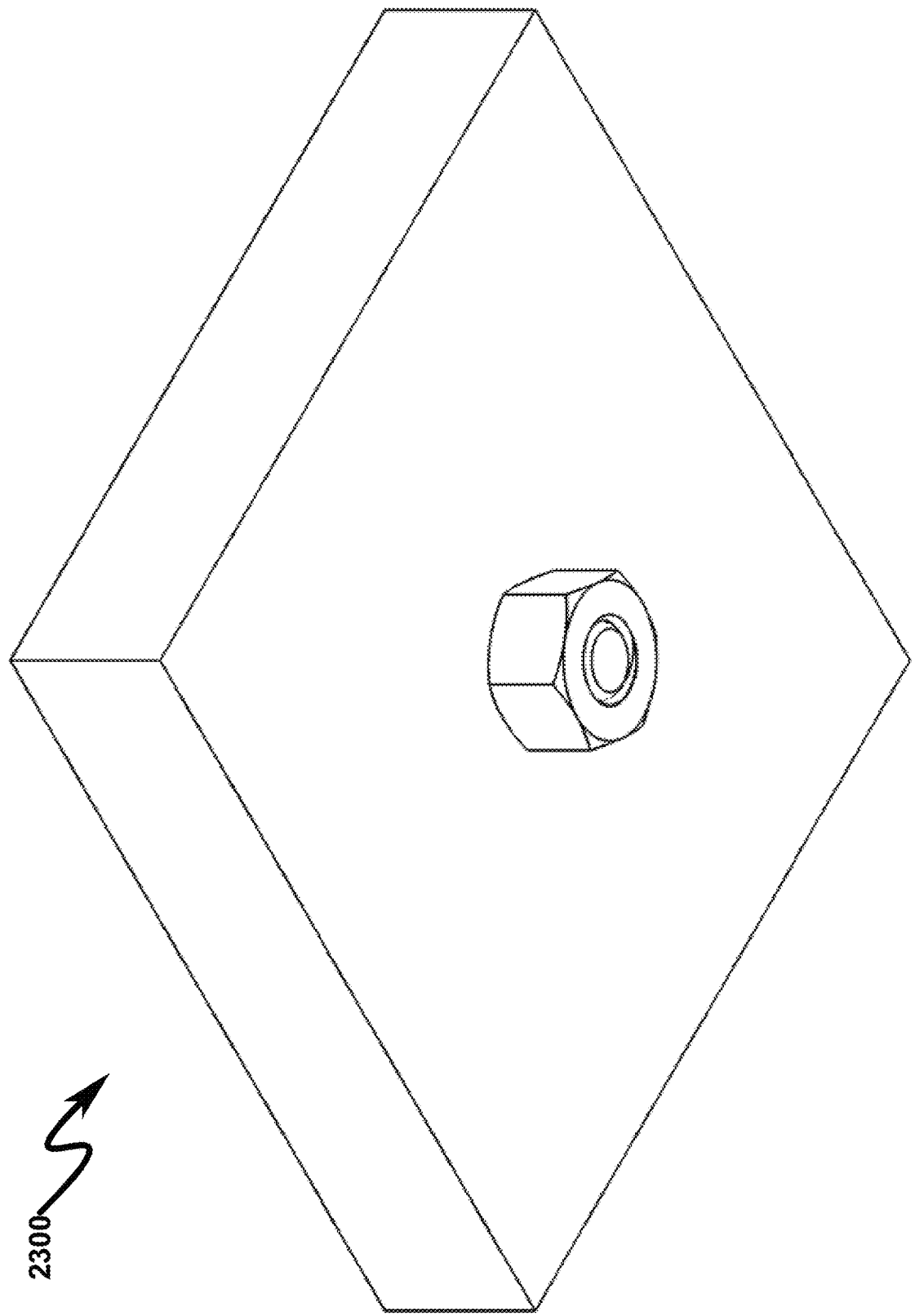
FIG. 23 illustrates a bottom front right perspective view of a preferred exemplary 4-member integrated TCM thermally stabilized fastener system embodiment.
Figure 24:
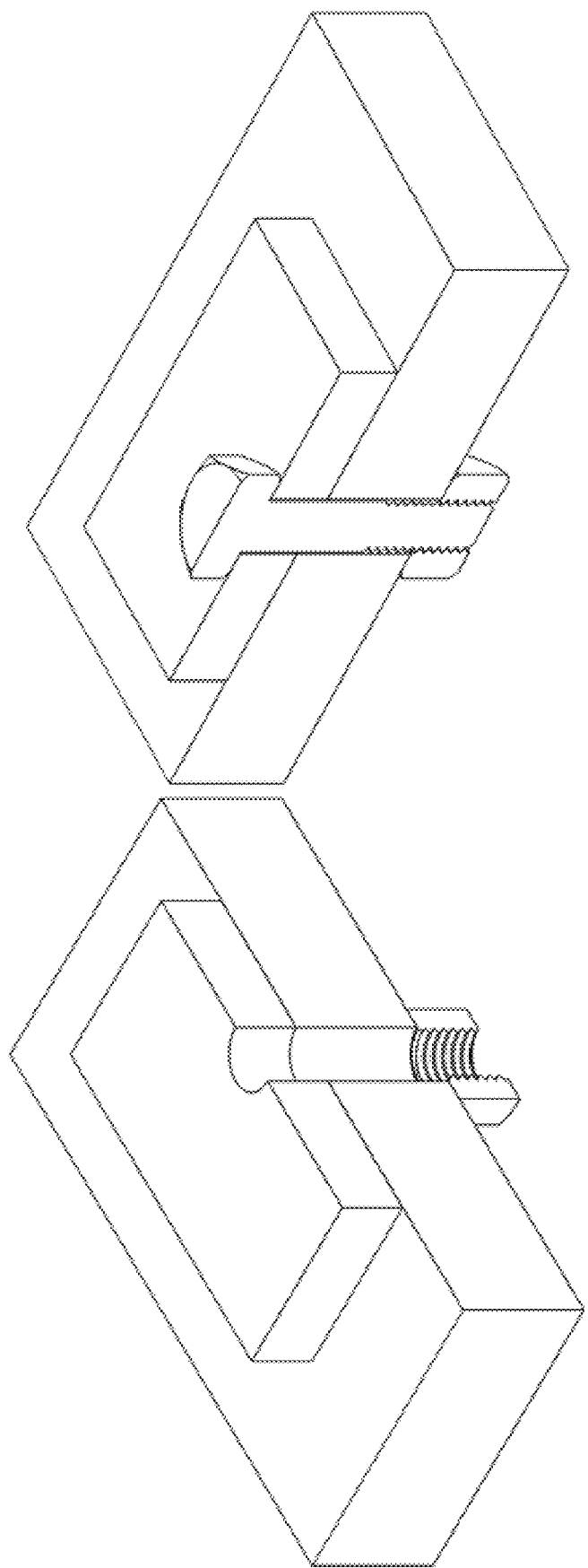
FIG. 24 illustrates a top front right perspective side section view (with fastener hidden) and a top front right perspective front section view of a preferred exemplary 4-member integrated TCM thermally stabilized fastener system embodiment.

This general construction may be illustrated by example as depicted in FIG. 18 (1800)-FIG. 24 (2400) wherein the fastener (FAS) (1810, 1910) is depicted as having a hexagonal bolt FRH, the fastener retention receiver (FRR) (1850, 1950) as a hexagonal nut, and the MMS as comprising a temperature compensating member (TCM) (1820, 1920) merged (1860) with a first retention member (FRM) (1830, 1930), and a second retention member (SRM) (1840, 1940).

4-Member TCM Isolated TSF System Overview (2500)-(3200)

Figure 25:
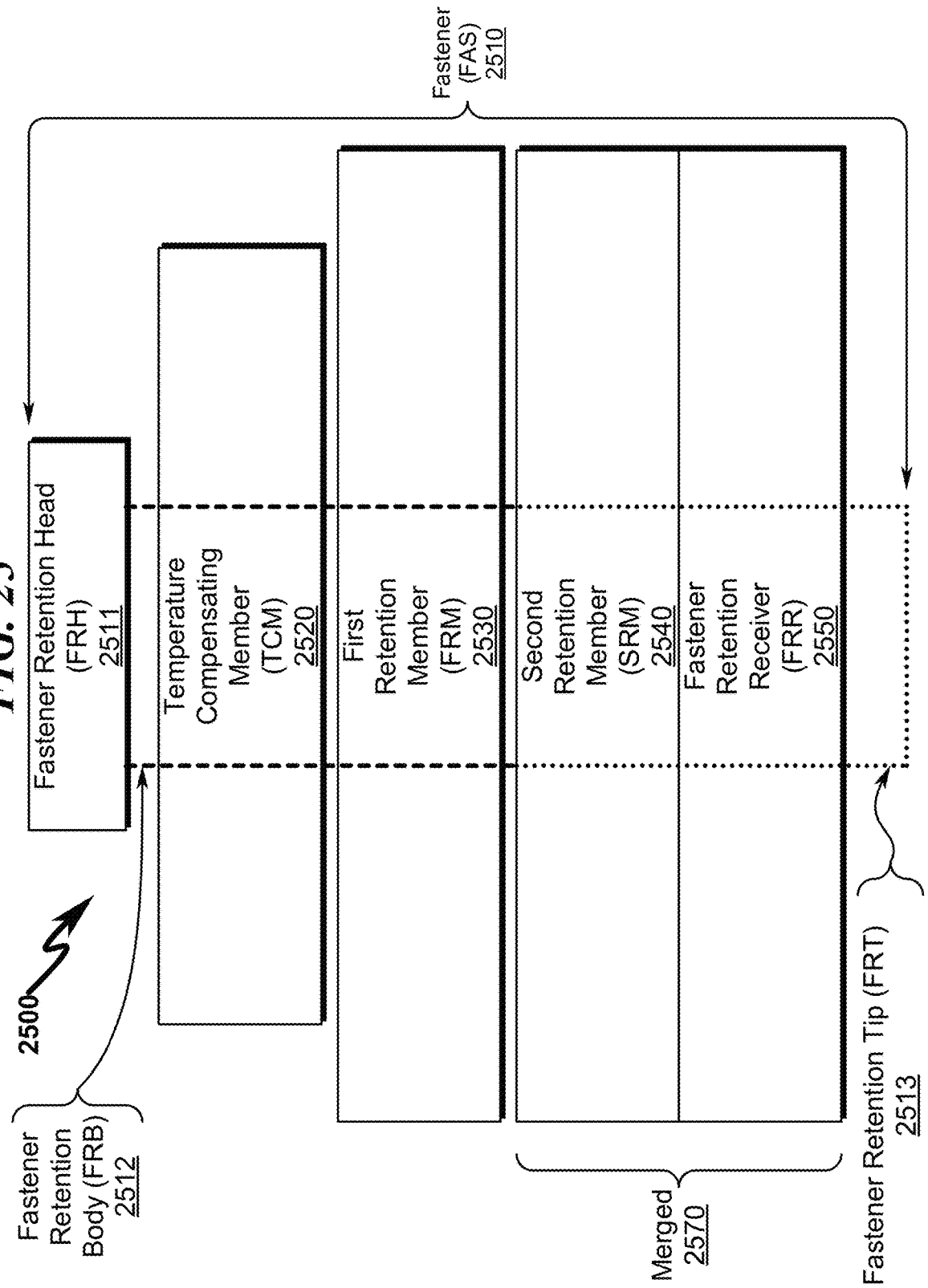
FIG. 25 illustrates a block diagram depicting a preferred exemplary 4-member isolated TCM thermally stabilized fastener system.

A general 4-member TCM isolated TSF system can be seen by referencing FIG. 25 (2500) wherein a fastener (FAS) (2510) comprising a faster retention head (FRH) (2511), fastener retention body (FRB) (2512), and fastener retention tip (FRT) (2513) is used to couple a mechanical member stack (MMS) in a thermally stabilized fashion using a fastener retention receiver (FRR) (2550). The MMS in this example comprises a temperature compensating member (TCM) (2520), a first retention member (FRM) (2530), and a second retention member (SRM) (2540) merged (2570) with the fastener retention receiver (FRR) (2550).

Figure 26:
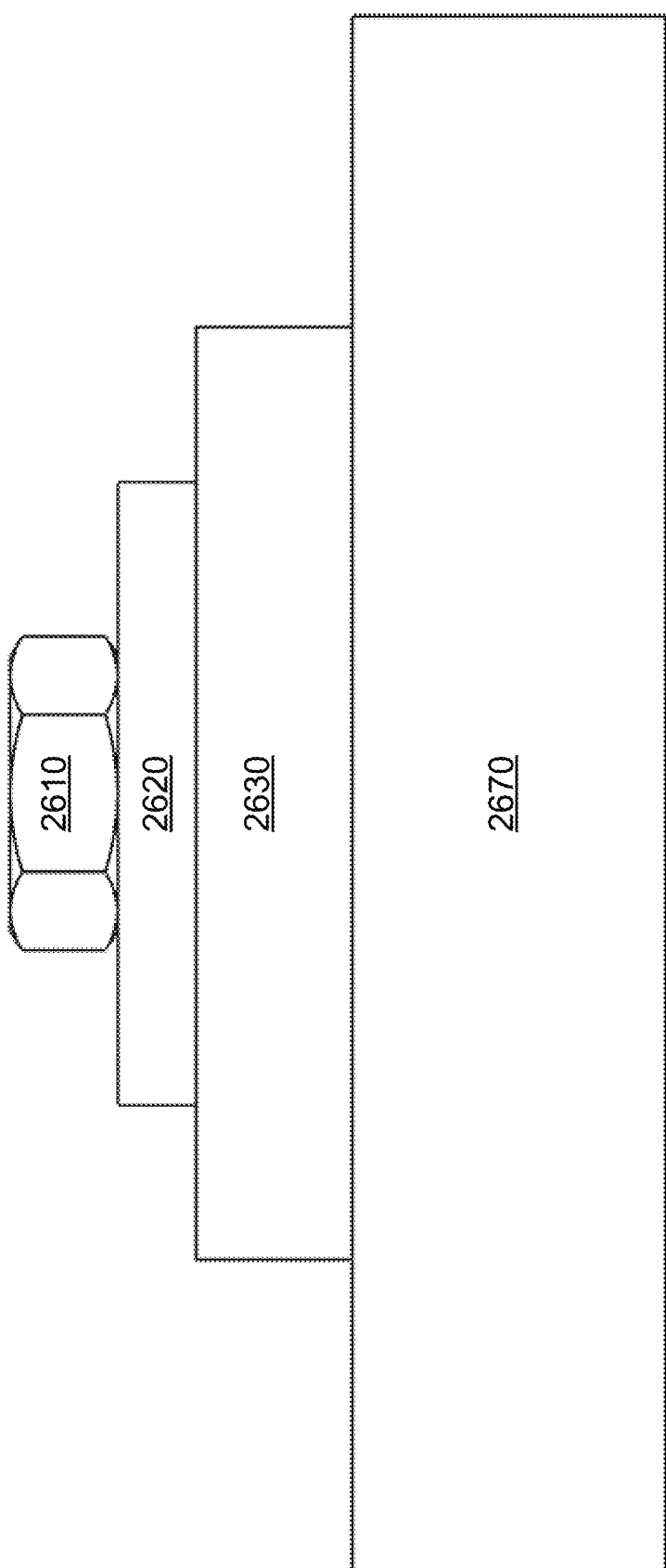
FIG. 26 illustrates a front view of a preferred exemplary 4-member isolated TCM thermally stabilized fastener system embodiment.
Figure 27:
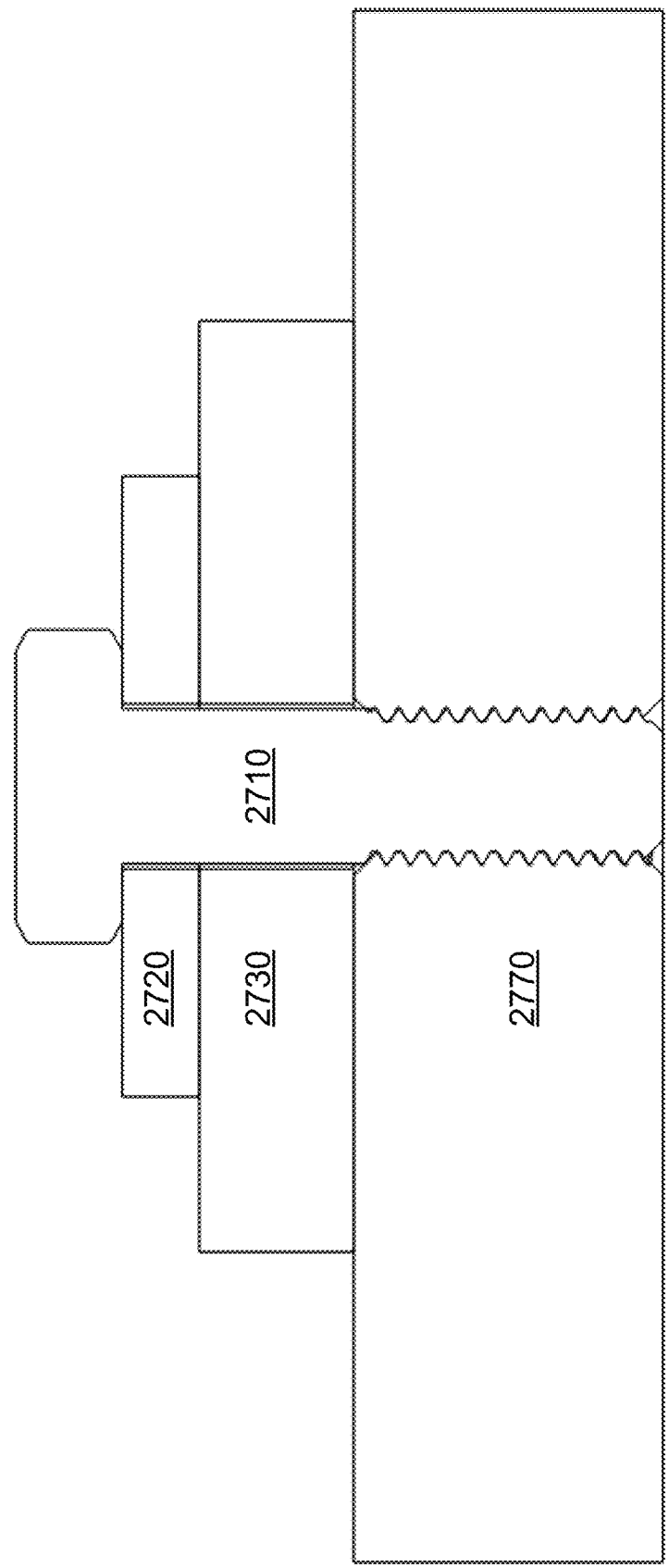
FIG. 27 illustrates a front section view of a preferred exemplary 4-member isolated TCM thermally stabilized fastener system embodiment.
Figure 28:
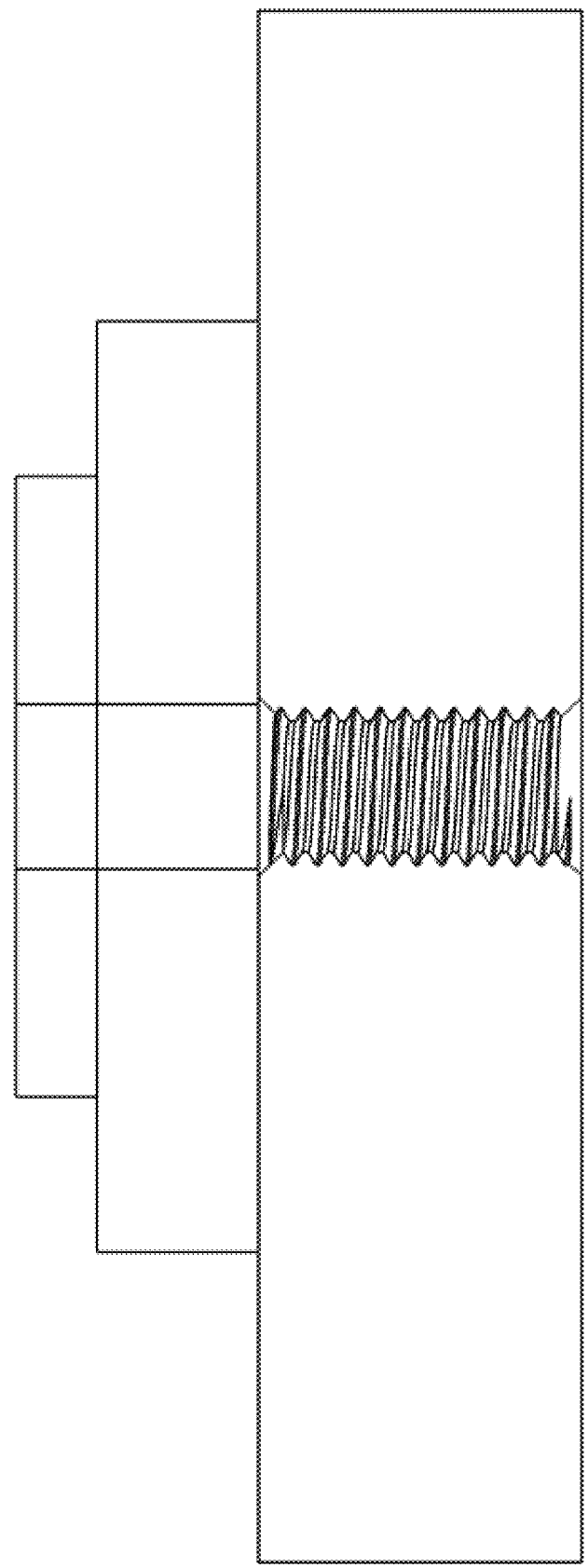
FIG. 28 illustrates a front section view (with fastener hidden) of a preferred exemplary 4-member isolated TCM thermally stabilized fastener system embodiment.
Figure 29:
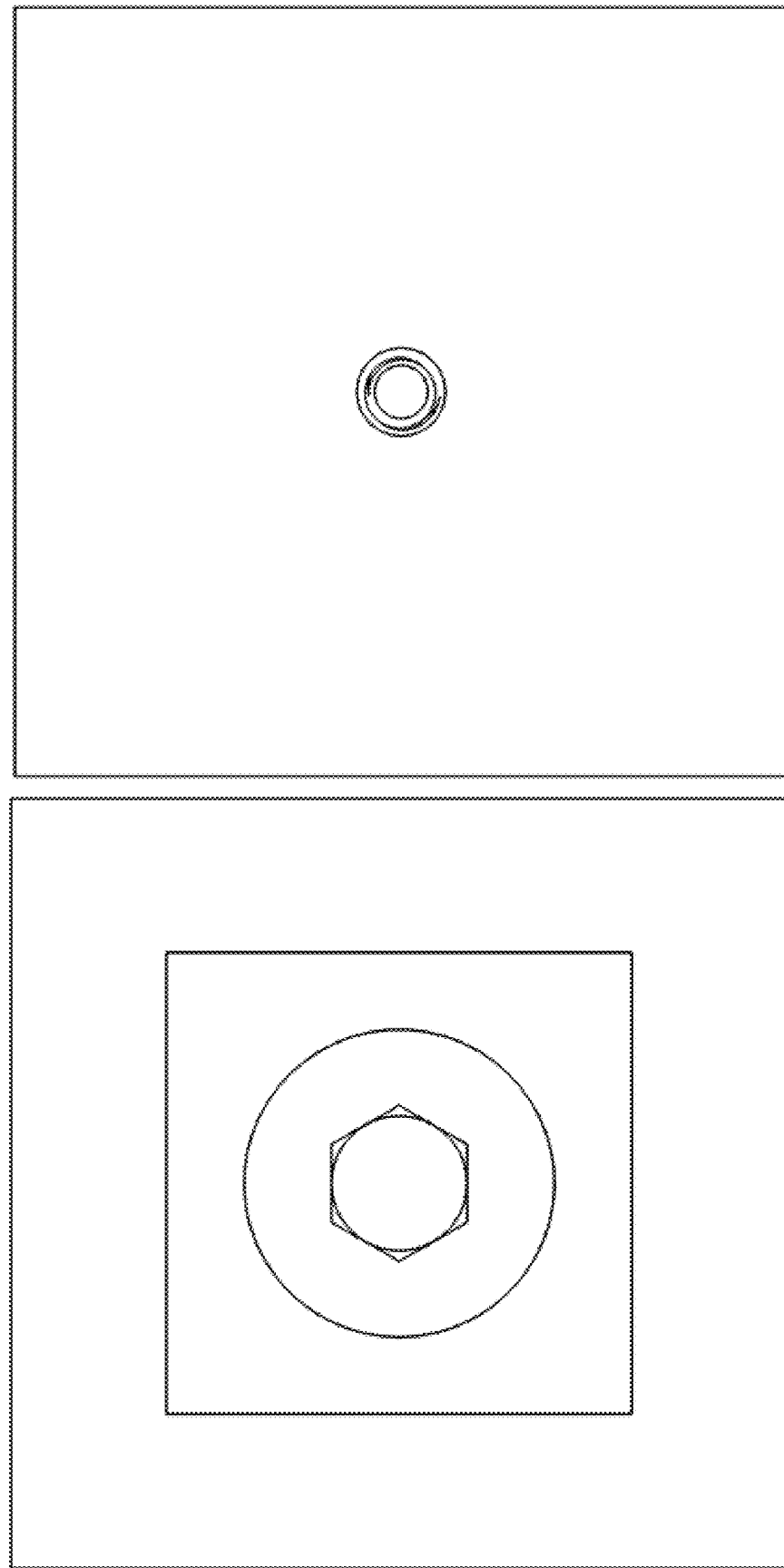
FIG. 29 illustrates top and bottom views of a preferred exemplary 4-member isolated TCM thermally stabilized fastener system embodiment.
Figure 30:
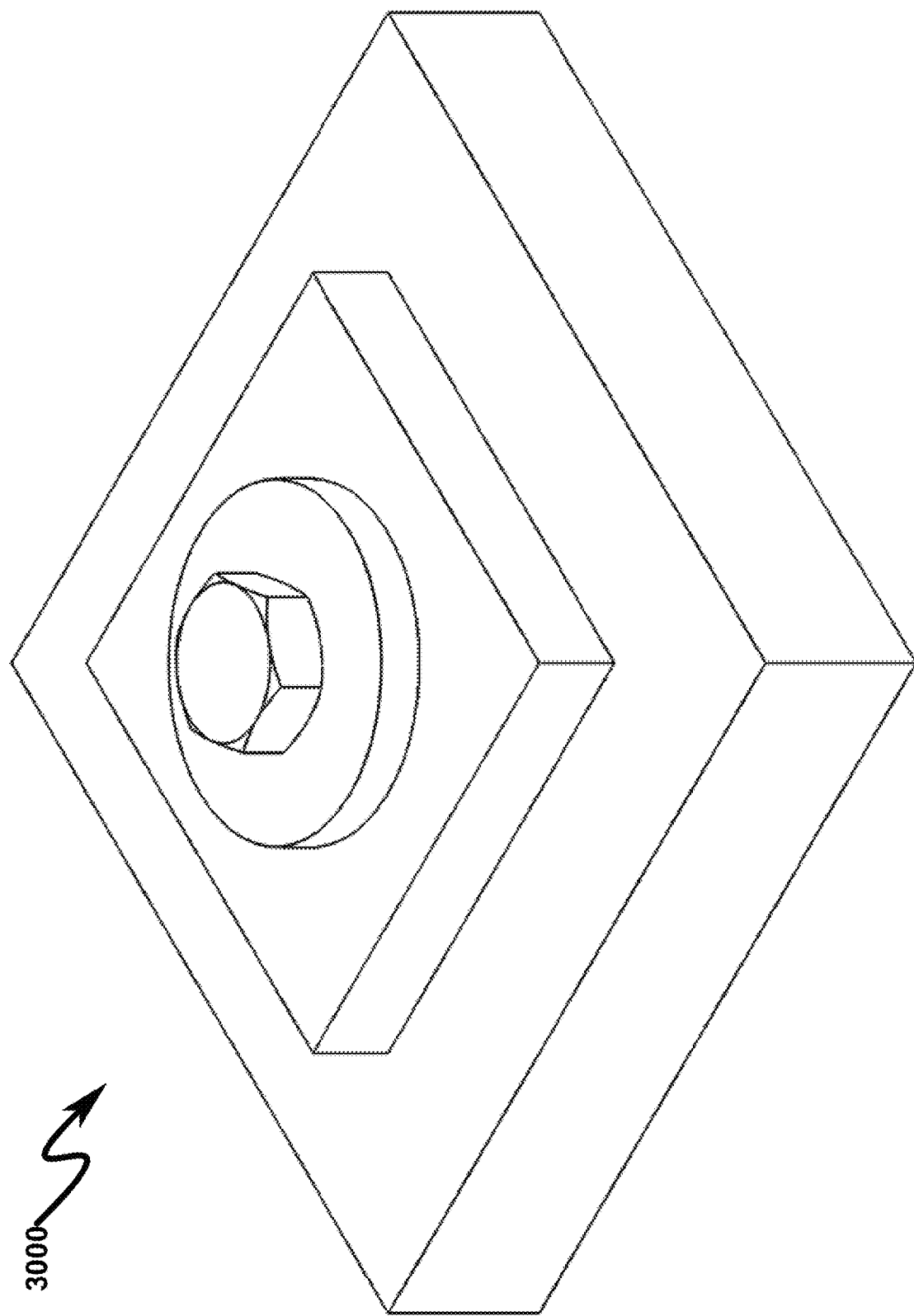
FIG. 30 illustrates a top front right perspective view of a preferred exemplary 4-member isolated TCM thermally stabilized fastener system embodiment.
Figure 31:
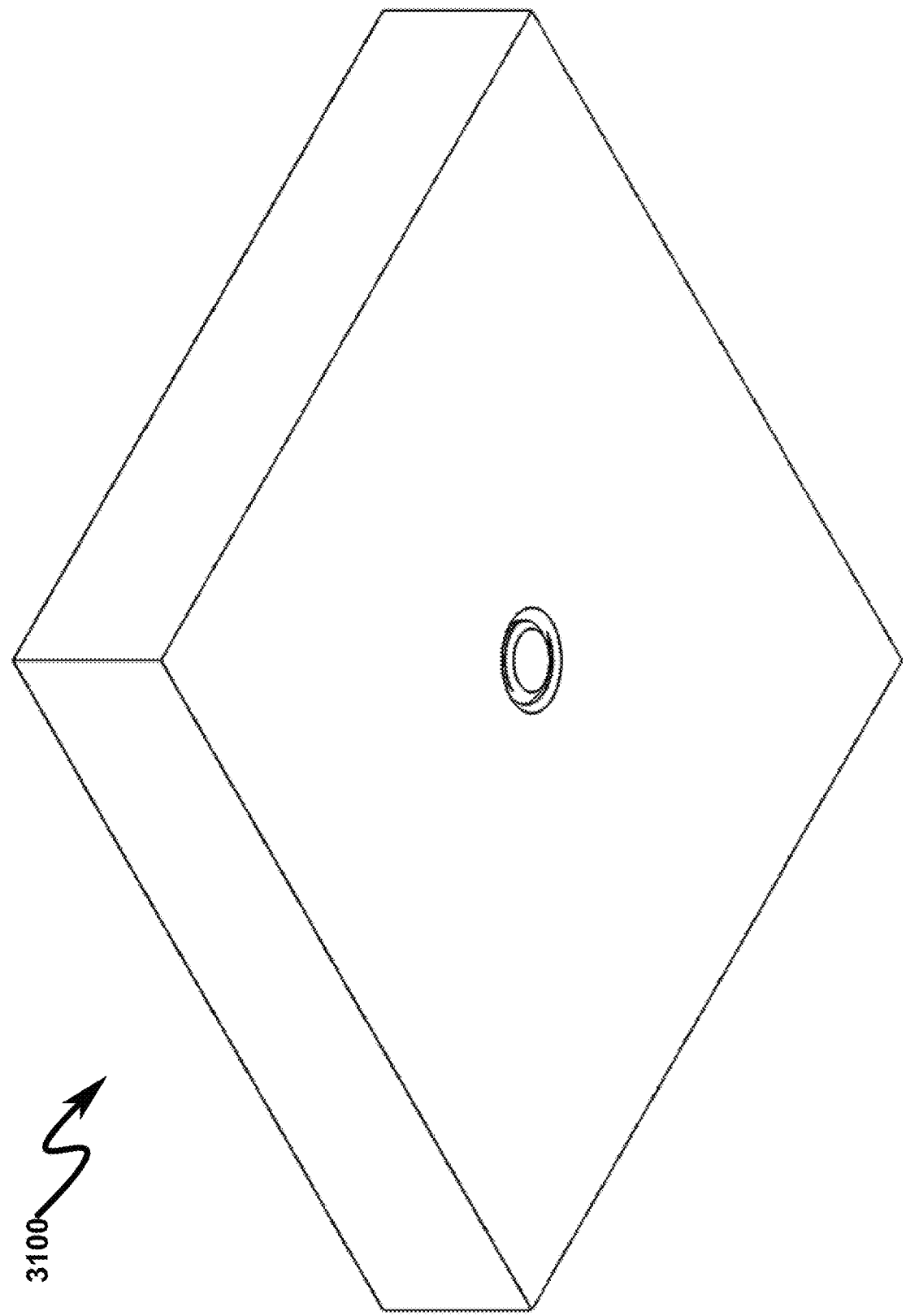
FIG. 31 illustrates a bottom front right perspective view of a preferred exemplary 4-member isolated TCM thermally stabilized fastener system embodiment.
Figure 32:
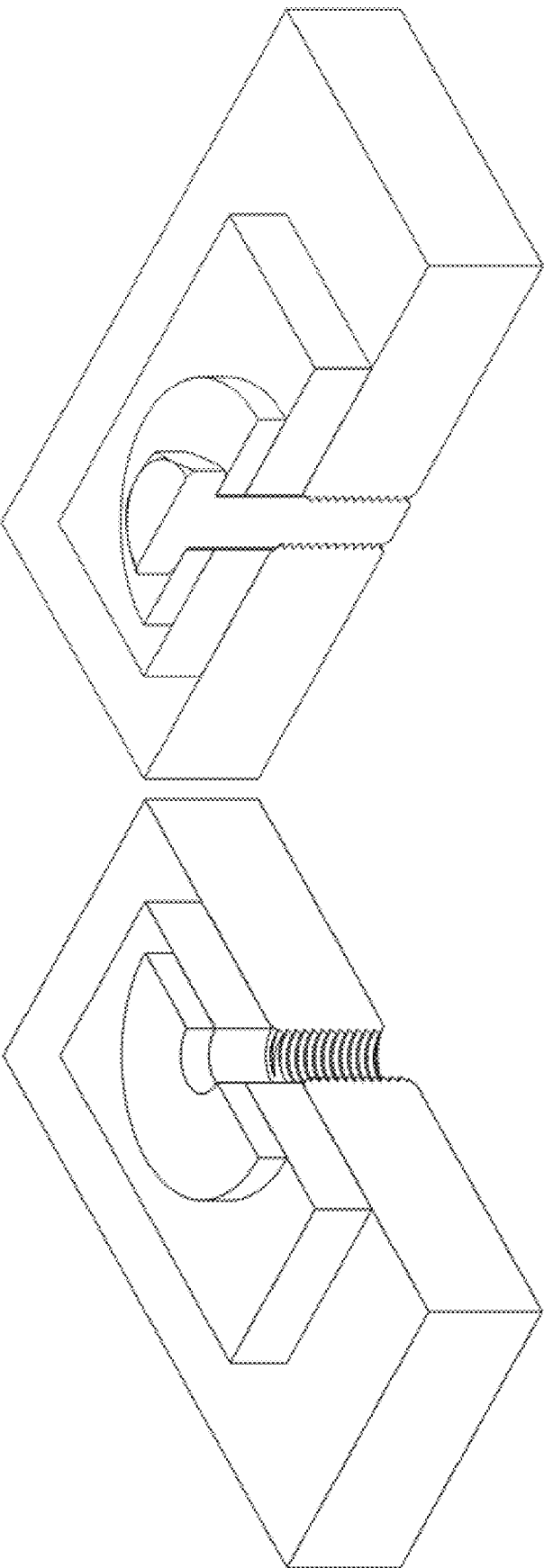
FIG. 32 illustrates a top front right perspective side section view (with fastener hidden) and a top front right perspective front section view of a preferred exemplary 4-member isolated TCM thermally stabilized fastener system embodiment.

This general construction may be illustrated by example as depicted in FIG. 26 (2600)-FIG. 32 (3200) wherein the fastener (FAS) (2610, 2710) is depicted as having a hexagonal bolt FRH, the fastener retention receiver (FRR) merged (2670, 2770) with the second retention member (SRM), and the MMS as comprising a temperature compensating member (TCM) (2620, 2720), a first retention member (FRM) (2630, 2730), and a second retention member (SRM) merged (2670, 2770) with a fastener retention receiver (FRR).

3-Member TCM TSF System Overview (3300)-(4000)

Figure 33:
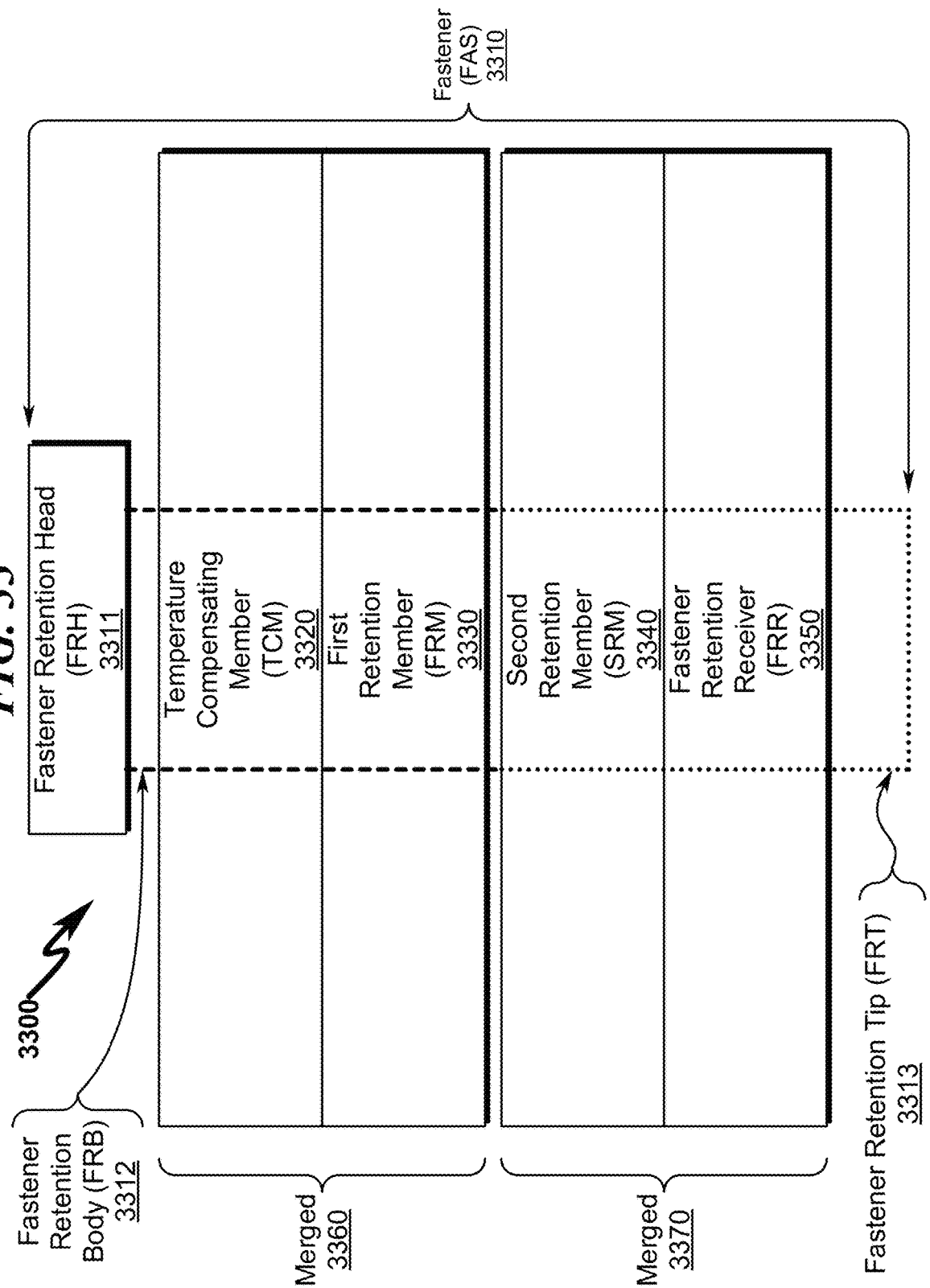
FIG. 33 illustrates a block diagram depicting a preferred exemplary 3-member TCM thermally stabilized fastener system.

A general 3-member TCM TSF system can be seen by referencing FIG. 33 (3300) wherein a fastener (FAS) (3310) comprising a faster retention head (FRH) (3311), fastener retention body (FRB) (3312), and fastener retention tip (FRT) (3313) is used to couple a mechanical member stack (MMS) in a thermally stabilized fashion using a fastener retention receiver (FRR) (3350). The MMS in this example comprises a temperature compensating member (TCM) (3320) merged (3360) with a first retention member (FRM) (3330), and a second retention member (SRM) (3340) merged (3370) with a fastener retention receiver (FRR) (3350).

Figure 34:
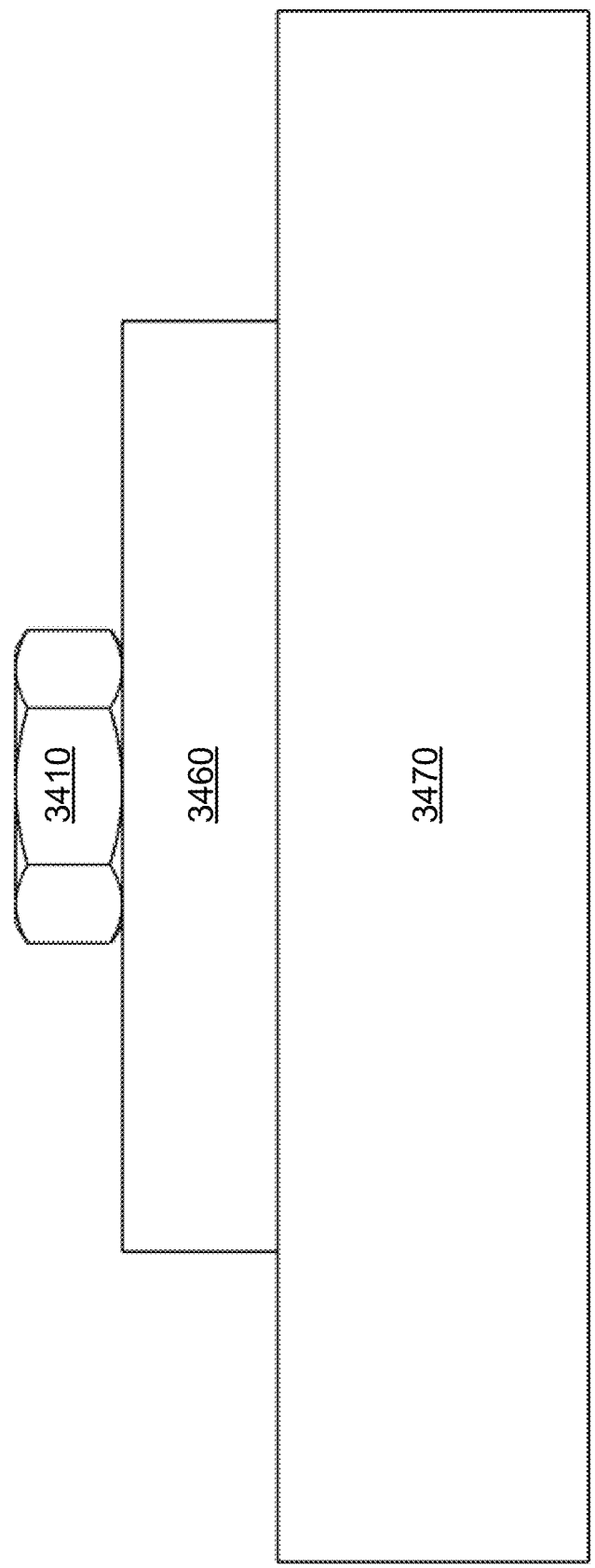
FIG. 34 illustrates a front view of a preferred exemplary 3-member TCM thermally stabilized fastener system embodiment.
Figure 35:
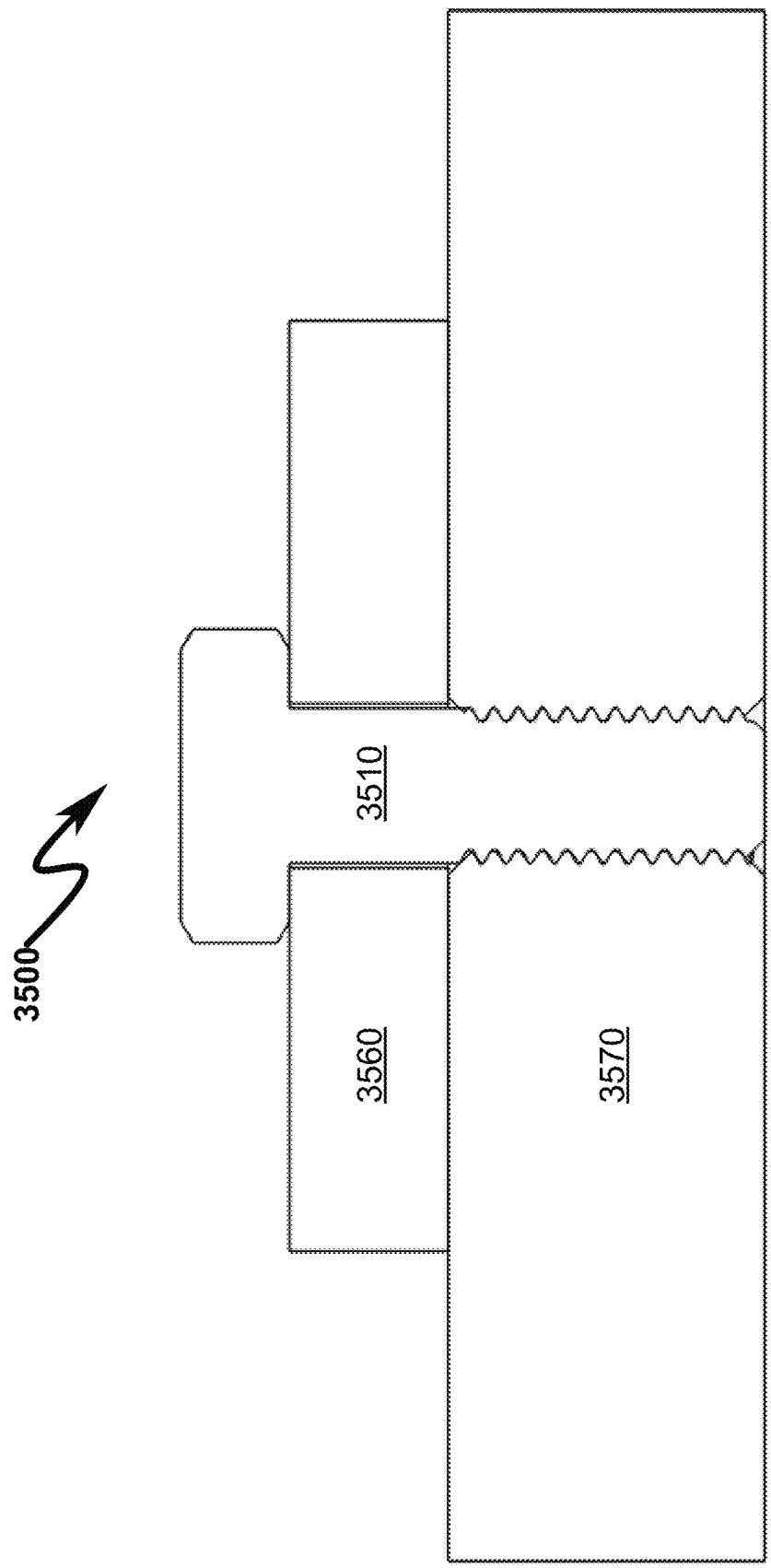
FIG. 35 illustrates a front section view of a preferred exemplary 3-member TCM thermally stabilized fastener system embodiment.
Figure 36:
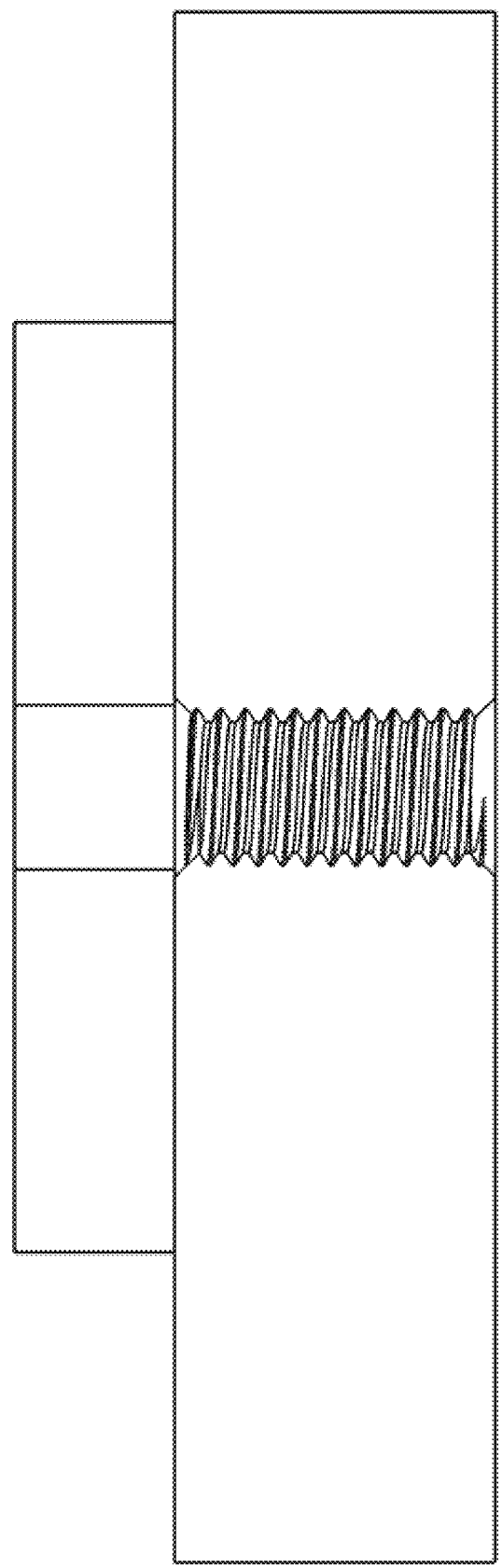
FIG. 36 illustrates a front section view (with fastener hidden) of a preferred exemplary 3-member TCM thermally stabilized fastener system embodiment.
Figure 37:
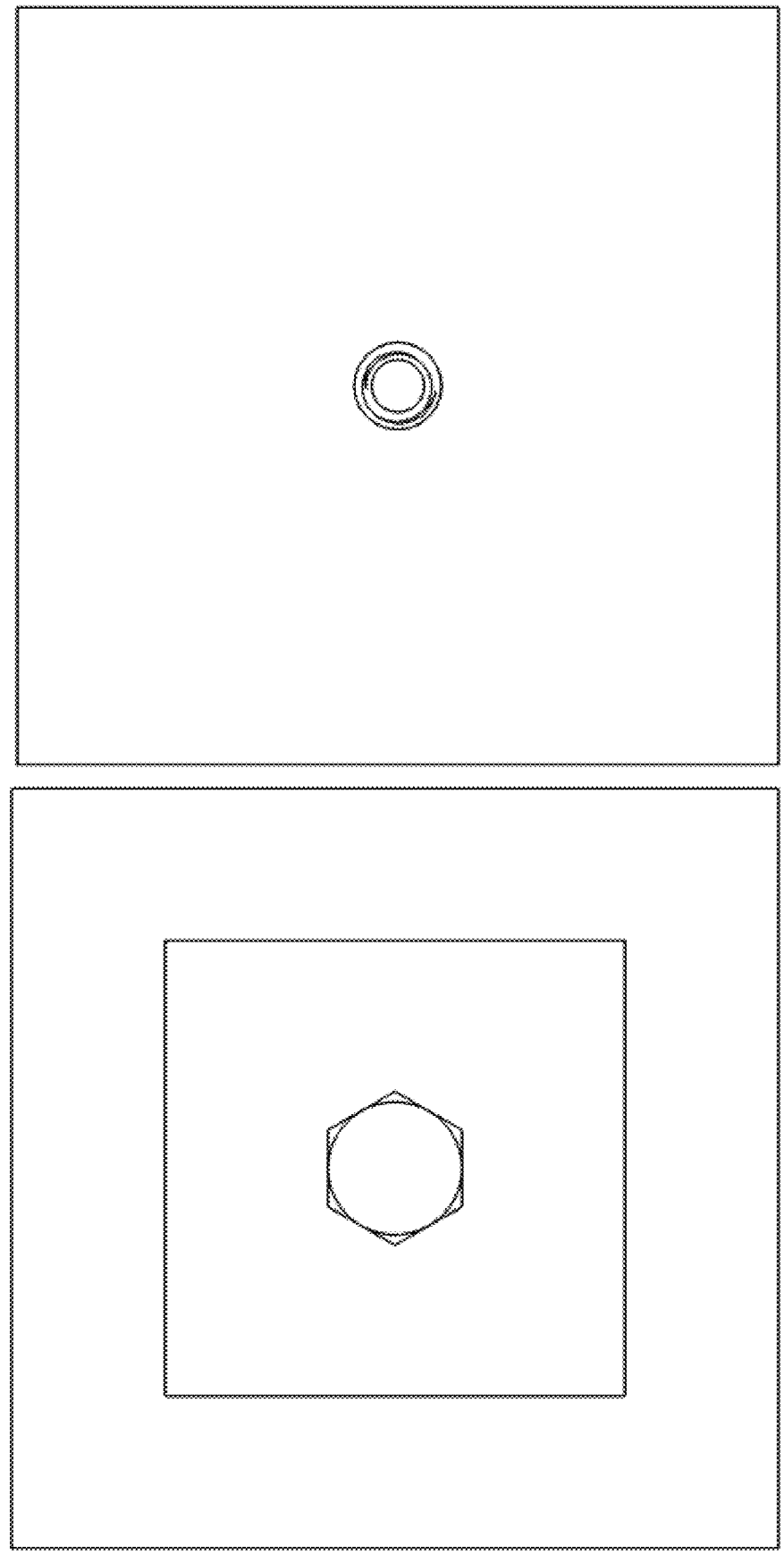
FIG. 37 illustrates top and bottom views of a preferred exemplary 3-member TCM thermally stabilized fastener system embodiment.
Figure 38:
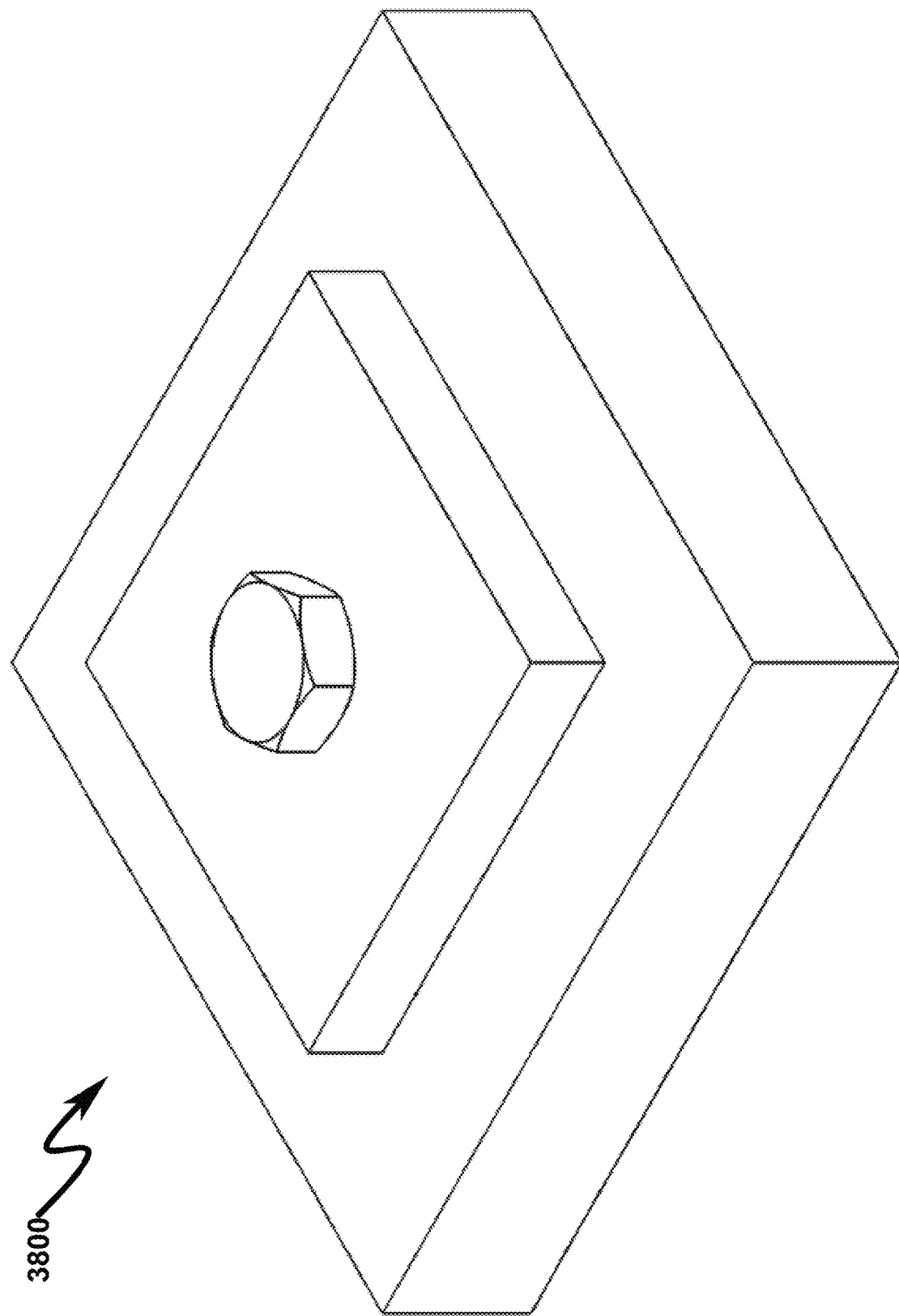
FIG. 38 illustrates a top front right perspective view of a preferred exemplary 3-member TCM thermally stabilized fastener system embodiment.
Figure 39:
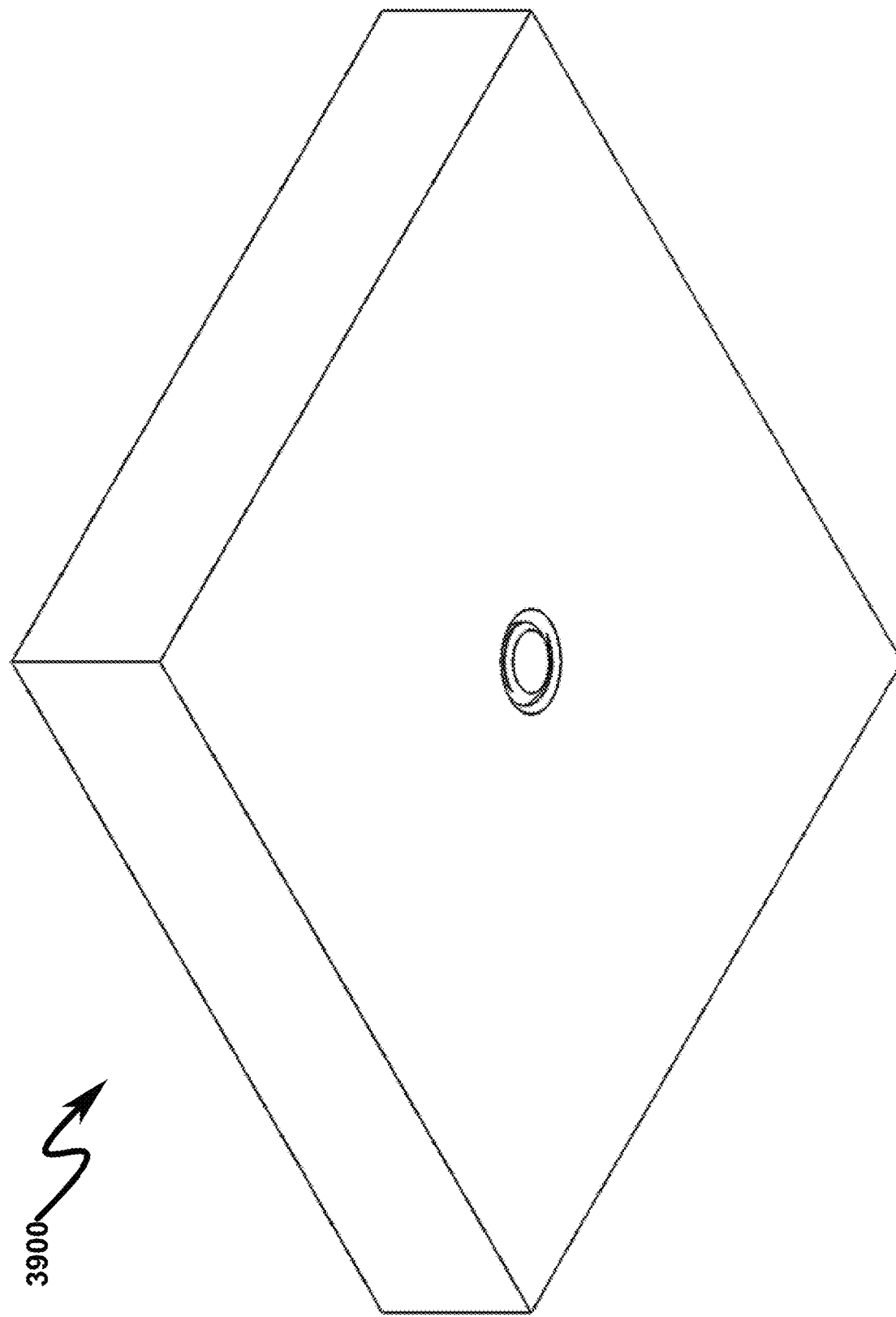
FIG. 39 illustrates a bottom front right perspective view of a preferred exemplary 3-member TCM thermally stabilized fastener system embodiment.
Figure 40:
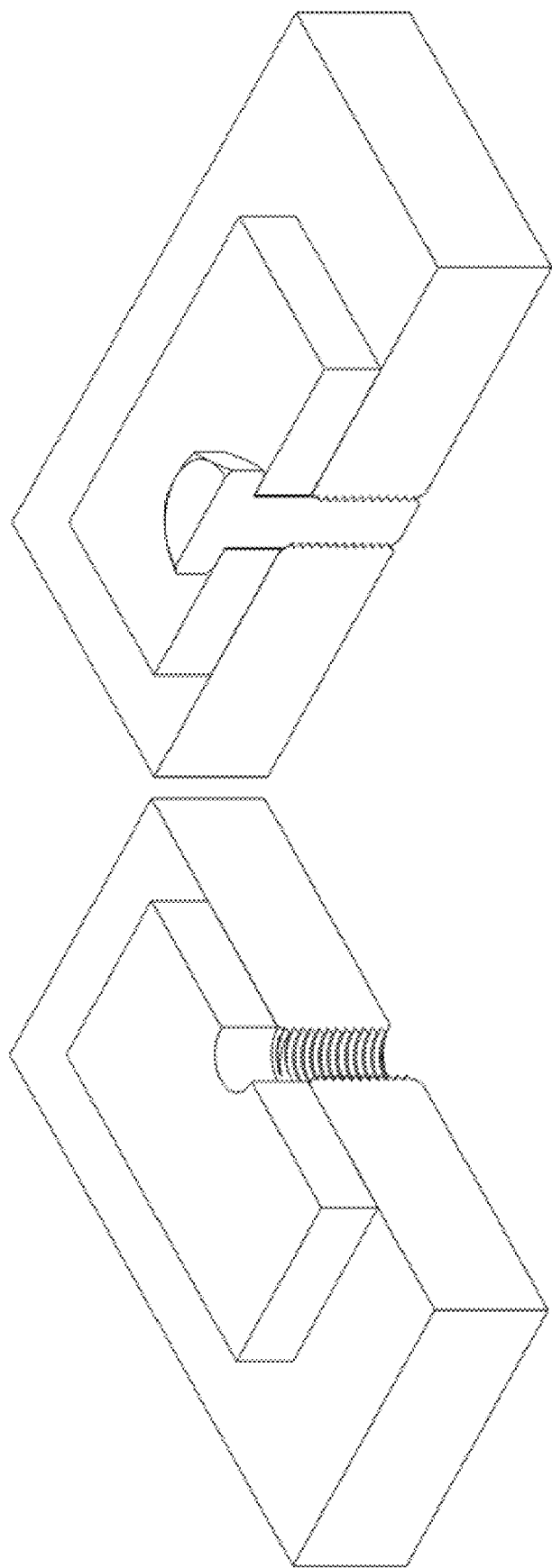
FIG. 40 illustrates a top front right perspective side section view (with fastener hidden) and a top front right perspective front section view of a preferred exemplary 3-member TCM thermally stabilized fastener system embodiment.

This general construction may be illustrated by example as depicted in FIG. 34 (3400)-FIG. 40 (4000) wherein the fastener (FAS) (3410, 3510) is depicted as having a hexagonal bolt FRH, the fastener retention receiver (FRR) merged (3470, 3570) with the second retention member (SRM), and the MMS as comprising a temperature compensating member (TCM) merged (3460, 3560) with a first retention member (FRM), and a second retention member (SRM) merged (3470, 3570) with a fastener retention receiver (FRR).

2-Member TCM TSF System Overview (4100)-(4800)

Figure 41:
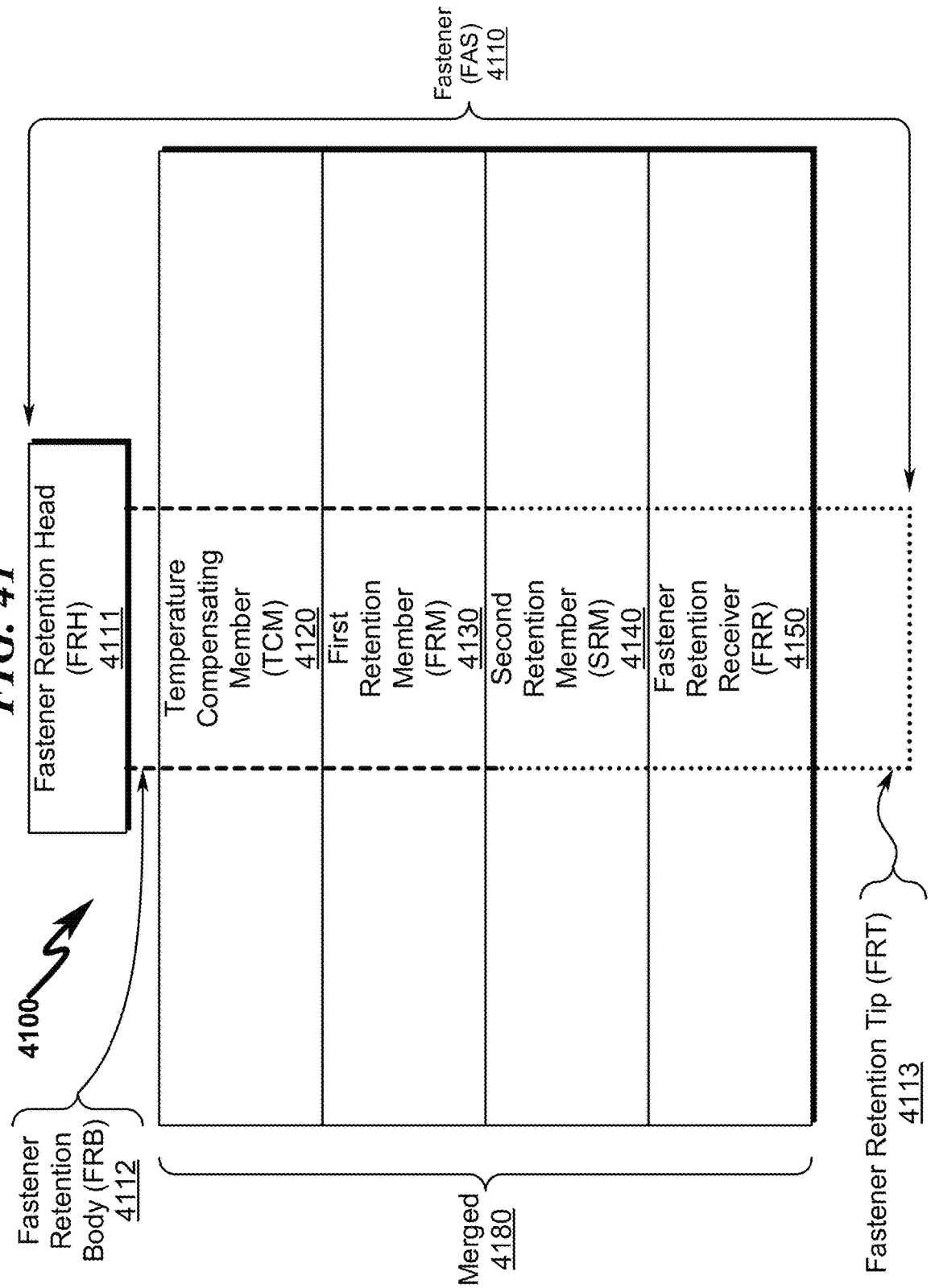
FIG. 41 illustrates a block diagram depicting a preferred exemplary 2-member TCM thermally stabilized fastener system.

A general 2-member TCM TSF system can be seen by referencing FIG. 41 (4100) wherein a fastener (FAS) (4110) comprising a faster retention head (FRH) (4111), fastener retention body (FRB) (4112), and fastener retention tip (FRT) (4113) is used to couple a mechanical member stack (MMS) in a thermally stabilized fashion using a fastener retention receiver (FRR) (4150). The MMS in this example comprises a temperature compensating member (TCM) (4120), a first retention member (FRM) (4130), and a second retention member (SRM) (4140).

Figure 48:
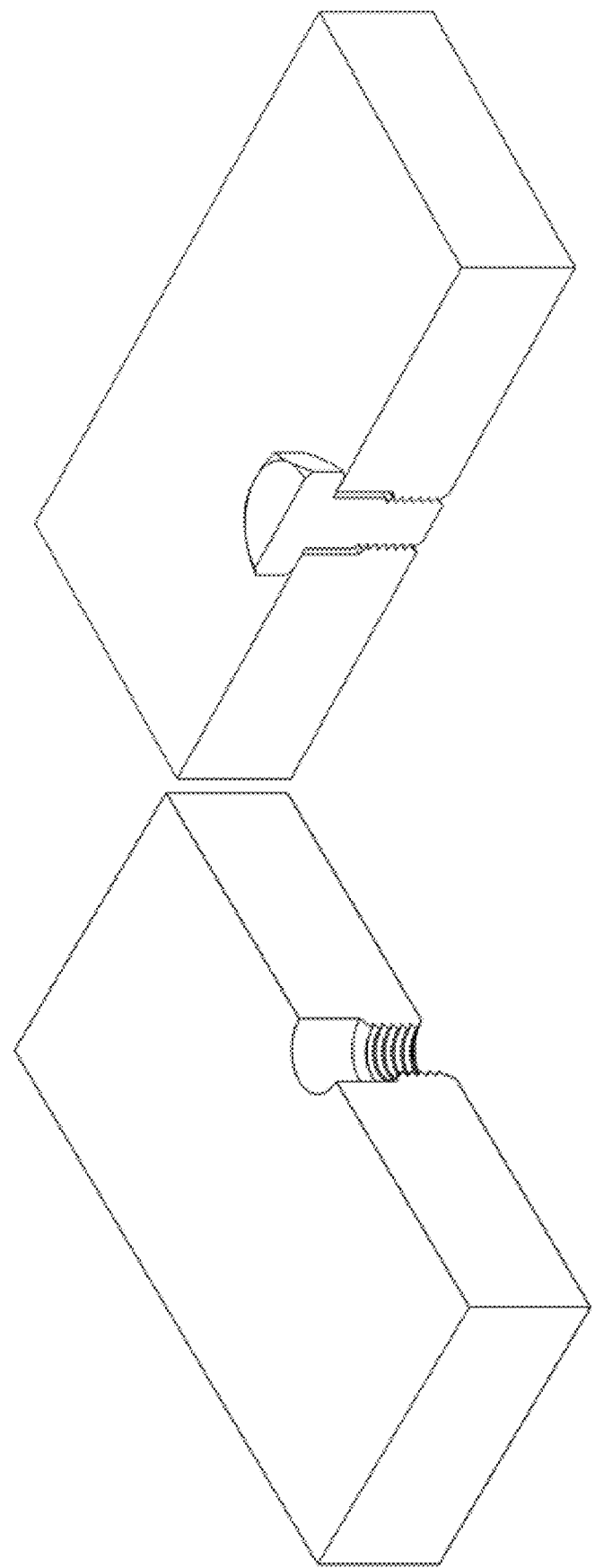
FIG. 48 illustrates a top front right perspective side section view (with fastener hidden) and a top front right perspective front section view of a preferred exemplary 2-member TCM thermally stabilized fastener system embodiment.

This general construction may be illustrated by example as depicted in FIG. 42 (4200)-FIG. 48 (4800) wherein the fastener (FAS) (4210, 4310) is depicted as having a hexagonal bolt FRH, the fastener retention receiver (FRR) merged (4280, 4380) with the temperature compensating member (TCM), a first retention member (FRM), and a second retention member (SRM).

Figure 43:
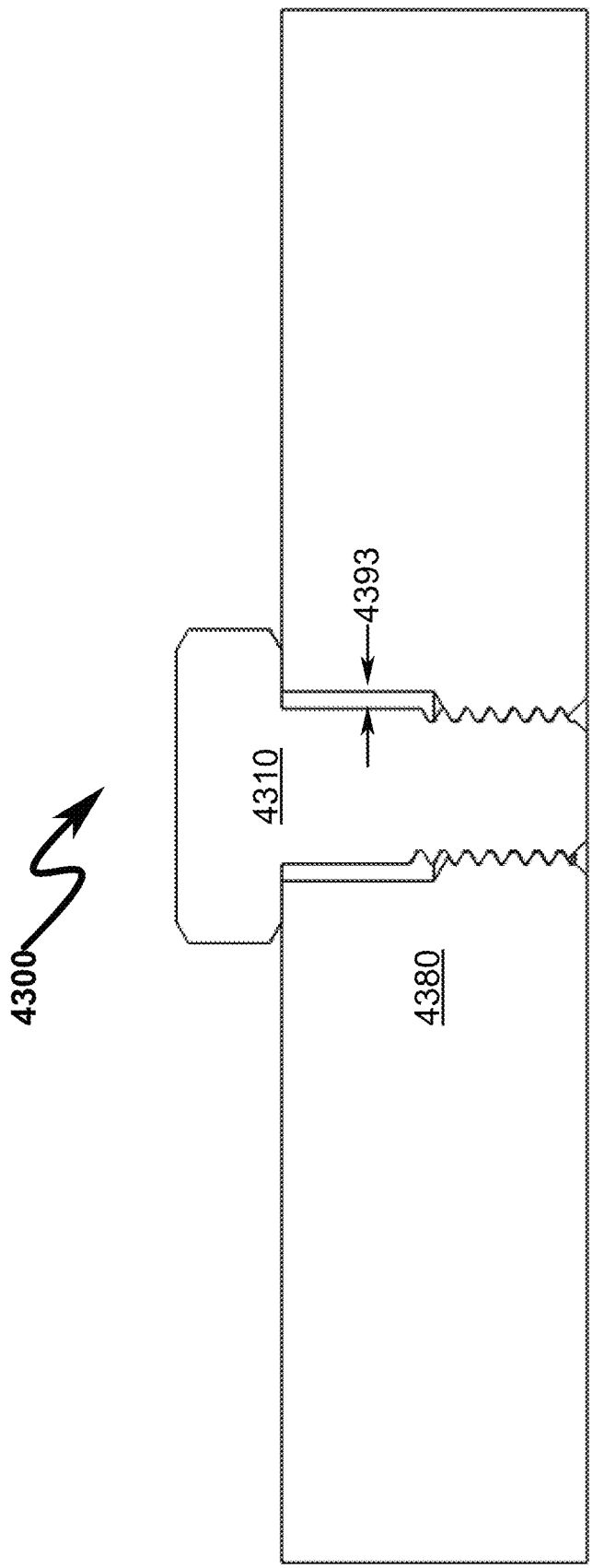
FIG. 43 illustrates a front section view of a preferred exemplary 2-member TCM thermally stabilized fastener system embodiment.
Figure 45:
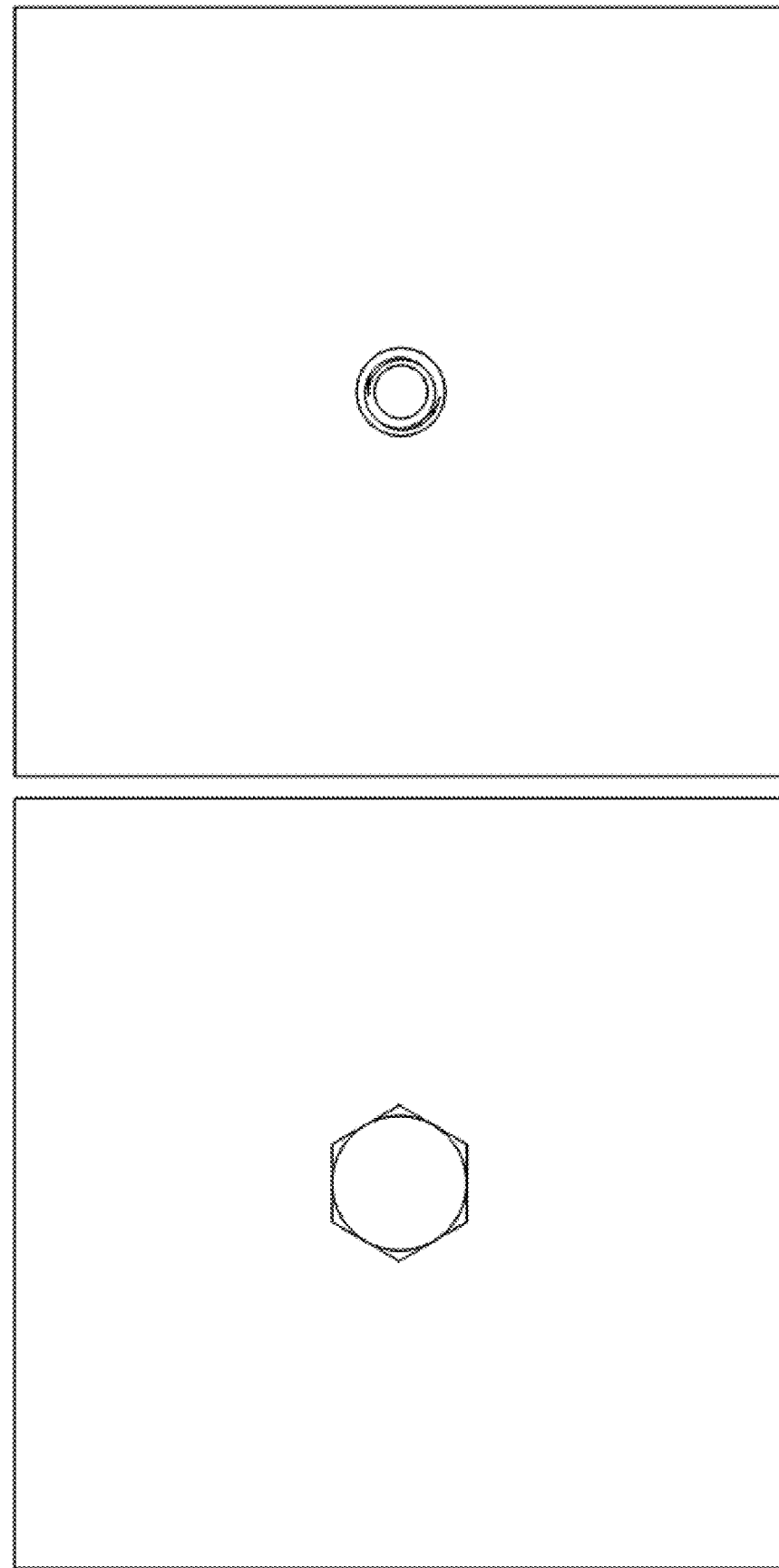
FIG. 45 illustrates top and bottom views of a preferred exemplary 2-member TCM thermally stabilized fastener system embodiment.
Figure 46:
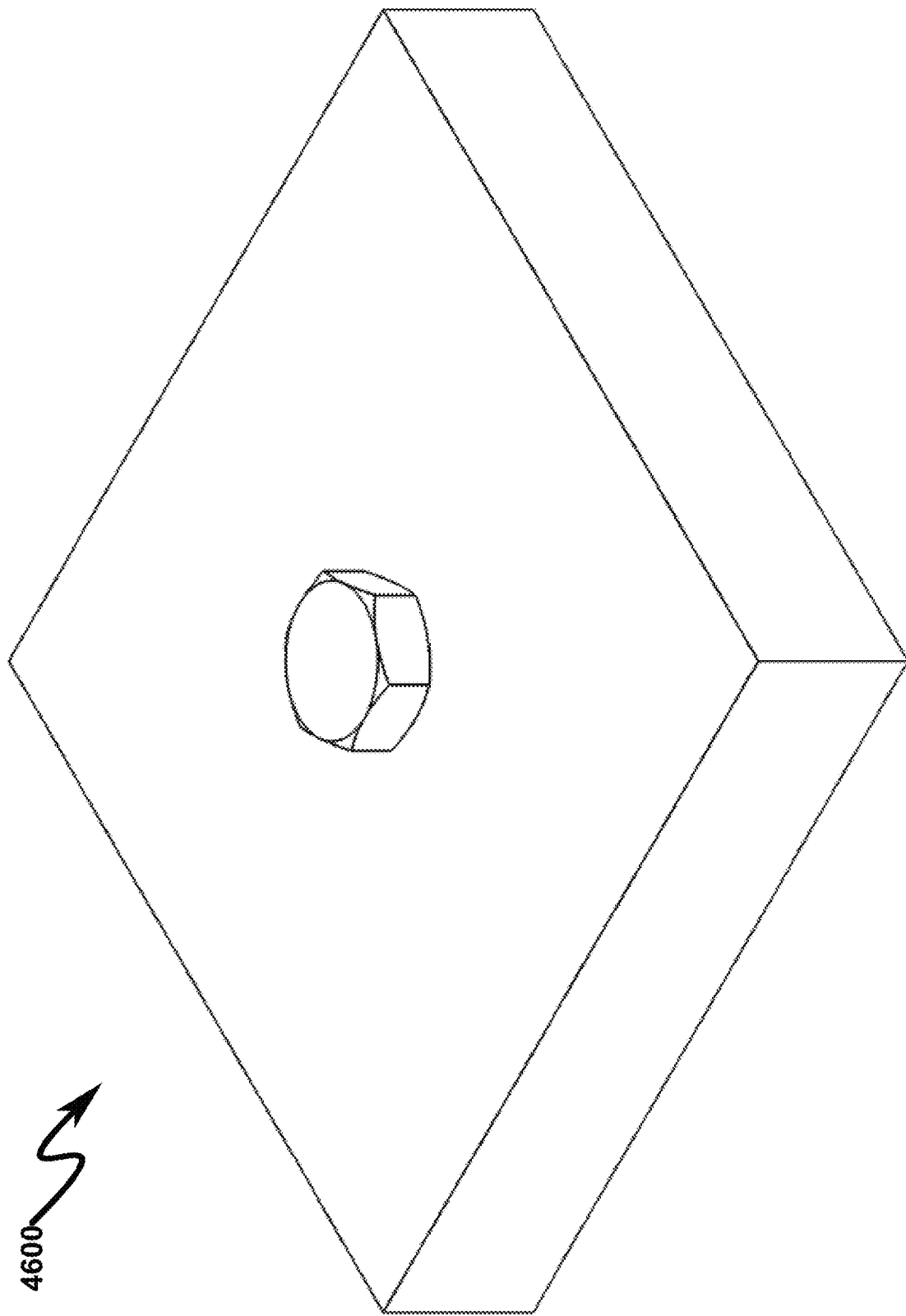
FIG. 46 illustrates a top front right perspective view of a preferred exemplary 2-member TCM thermally stabilized fastener system embodiment.
Figure 47:
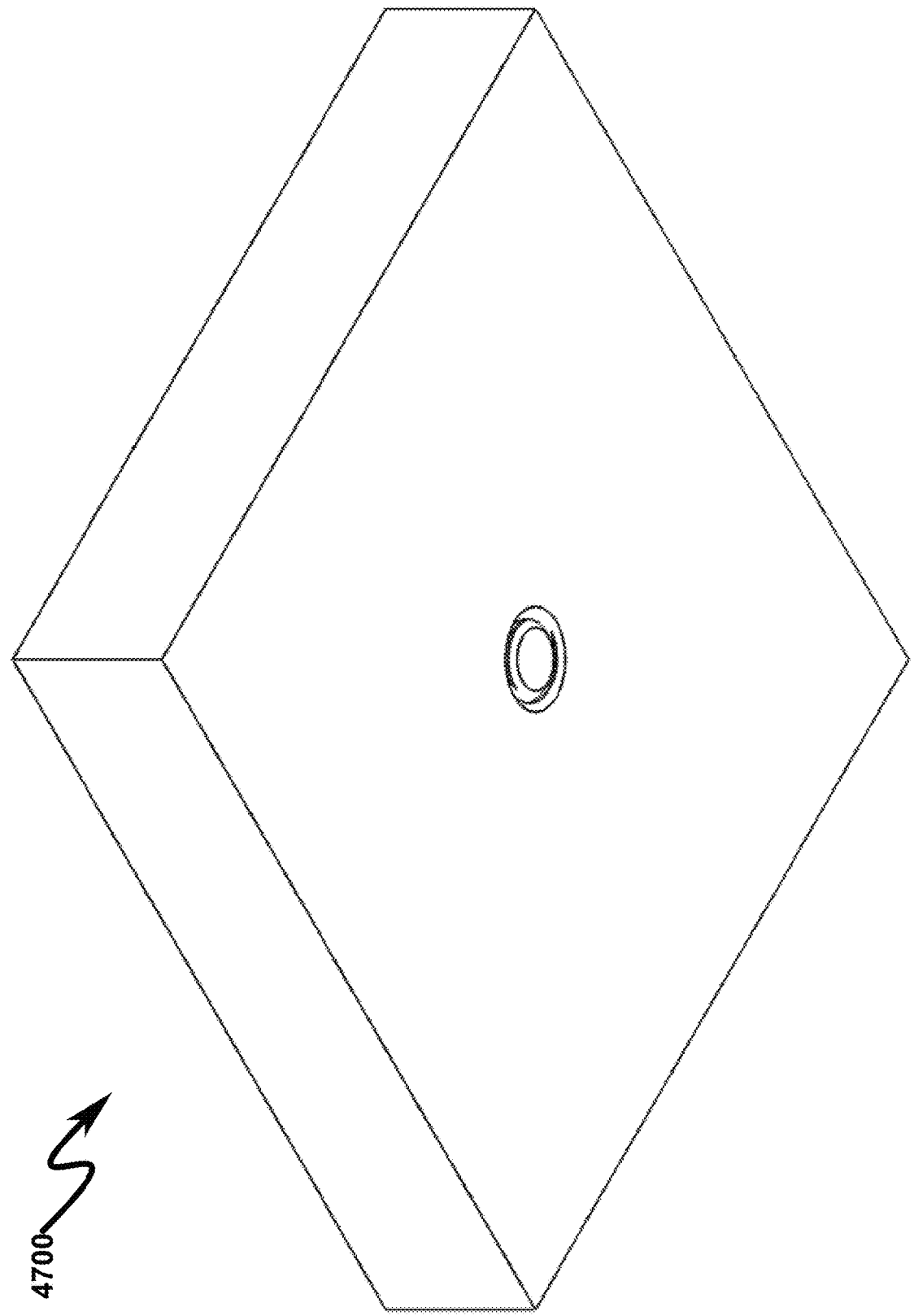
FIG. 47 illustrates a bottom front right perspective view of a preferred exemplary 2-member TCM thermally stabilized fastener system embodiment.

As generally depicted in FIG. 43 (4300)-FIG. 44 (4400), the fastener (FAS) (4310) may only thread (4491) a portion of the MMS, with a counter-bore (4492) providing a gap (4393) along the sides of the fastener (FAS) (4310), such that the counter-bore (4492) portion of the merged MMS provides the thermal compensation necessary to thermally stabilize the fastener (FAS) (4310) along this portion (4492) of the fastener (FAS) (4310) body.

4-Member TCM Integrated RFF TSF System Overview (4900)-(5600)

Figure 49:
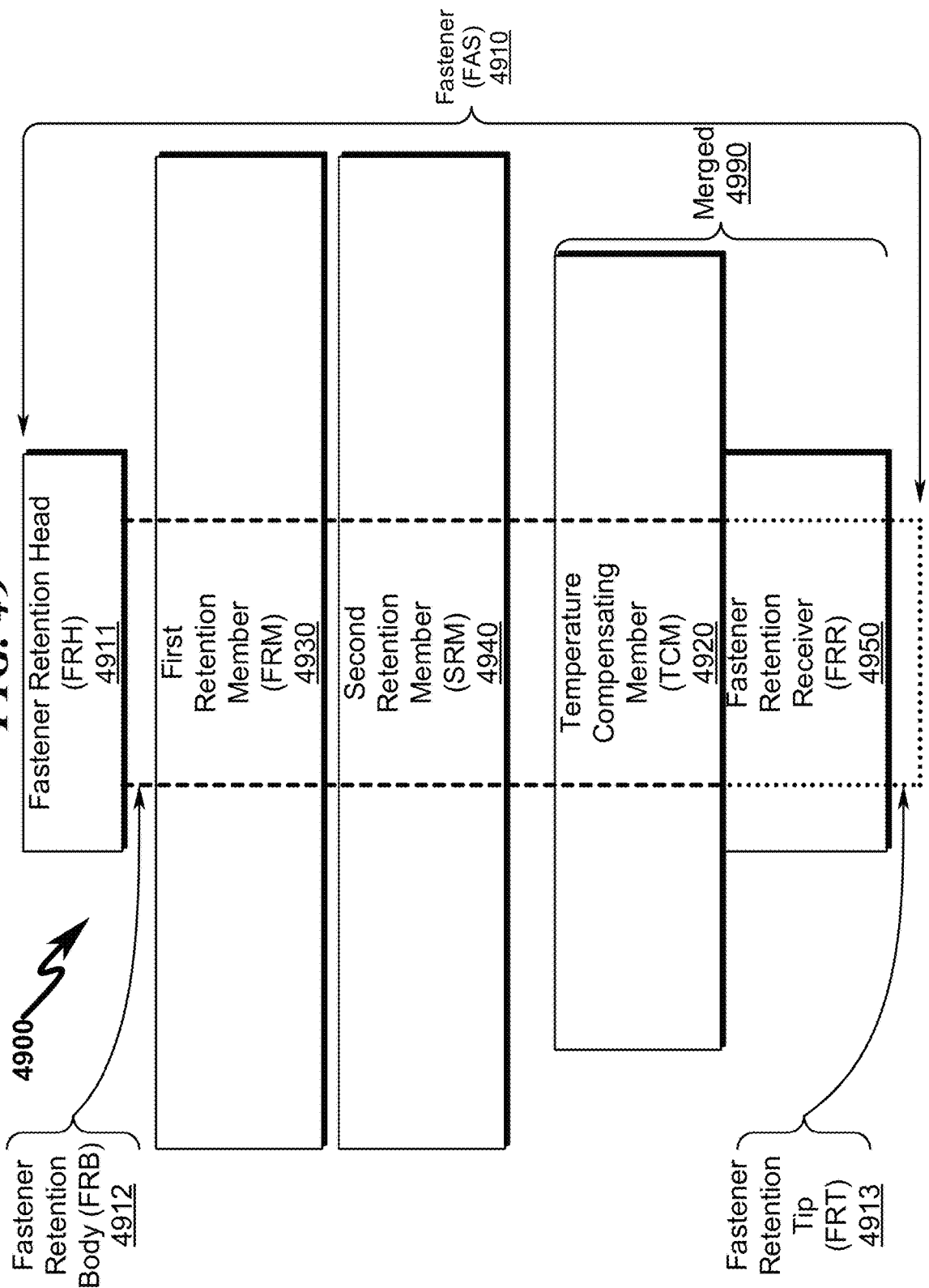
FIG. 49 illustrates a block diagram depicting a preferred exemplary 4-member integrated RFF TCM thermally stabilized fastener system.

A general 4-member TCM integrated RFF TSF fastener system can be seen by referencing FIG. 49 (4900) wherein a fastener (FAS) (4910) comprising a faster retention head (FRH) (4911), fastener retention body (FRB) (4912), and fastener retention tip (FRT) (4913) is used to couple a mechanical member stack (MMS) in a thermally stabilized fashion using a fastener retention receiver (FRR) (4950) merged (4990) with a temperature compensating member (TCM) (4920). The MMS in this example comprises a first retention member (FRM) (4930), and a second retention member (SRM) (4940) a temperature compensating member (TCM) (4920), and the merged (4990) temperature compensating member (TCM) (4920) and fastener retention receiver (FRR) (4950).

Figure 50:
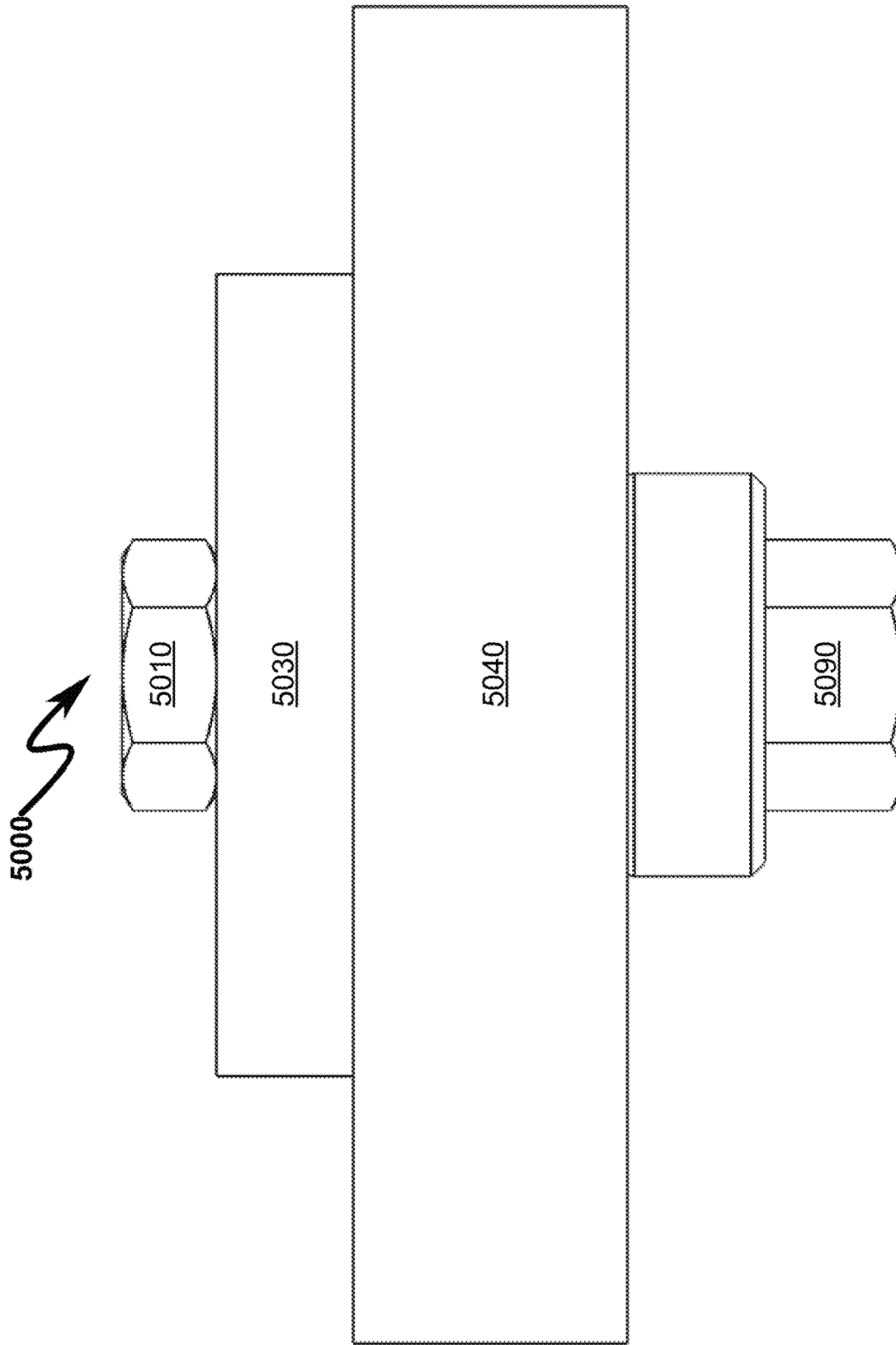
FIG. 50 illustrates a front view of a preferred exemplary 4-member integrated RFF TCM thermally stabilized fastener system embodiment.
Figure 56:
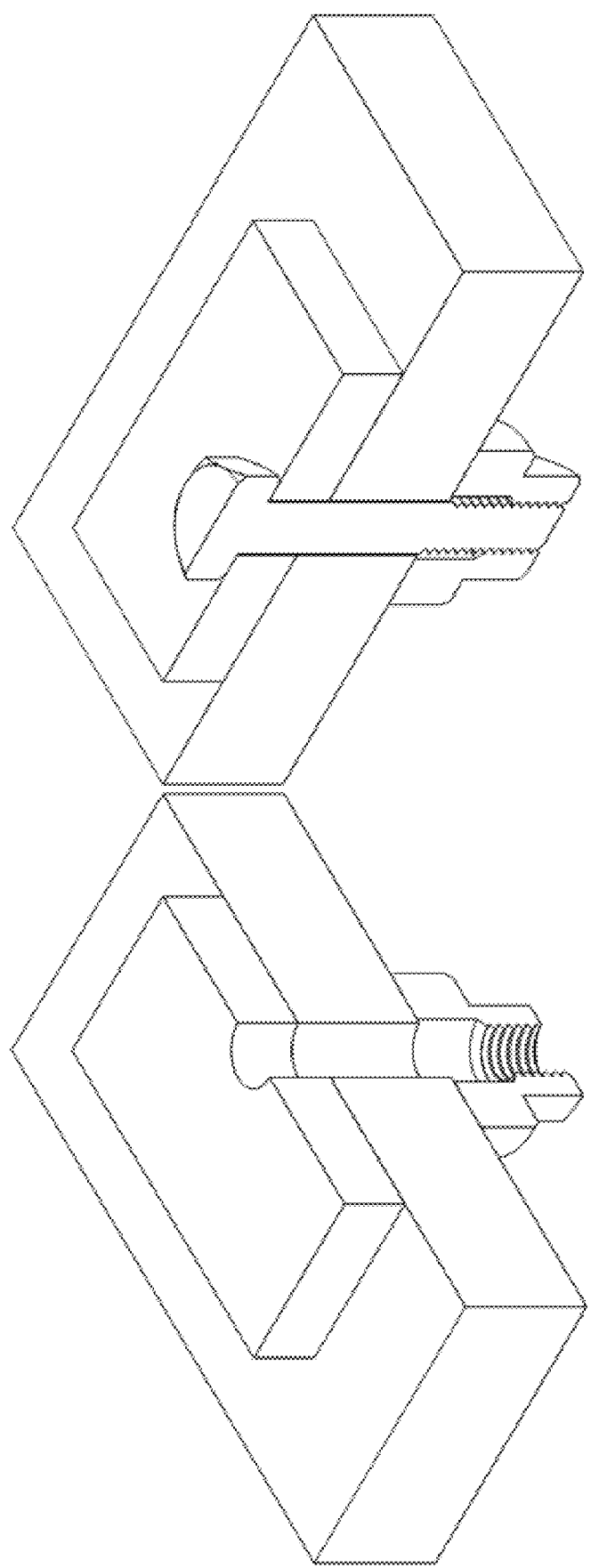
FIG. 56 illustrates a top front right perspective side section view (with fastener hidden) and a top front right perspective front section view of a preferred exemplary 4-member integrated RFF TCM thermally stabilized fastener system embodiment.

This general construction may be illustrated by example as depicted in FIG. 50 (5000)-FIG. 56 (5600) wherein the fastener (FAS) (5010, 5110) is depicted as having a hexagonal bolt FRH, the fastener retention receiver (FRR) merged (5090, 5190) with the temperature compensating member (TCM), and the MMS as comprising a first retention member (FRM) (5030, 5130), a second retention member (SRM) (5040, 5140), and the merged (5090, 5190) temperature compensating member (TCM) with the fastener retention receiver (FRR).

Figure 51:
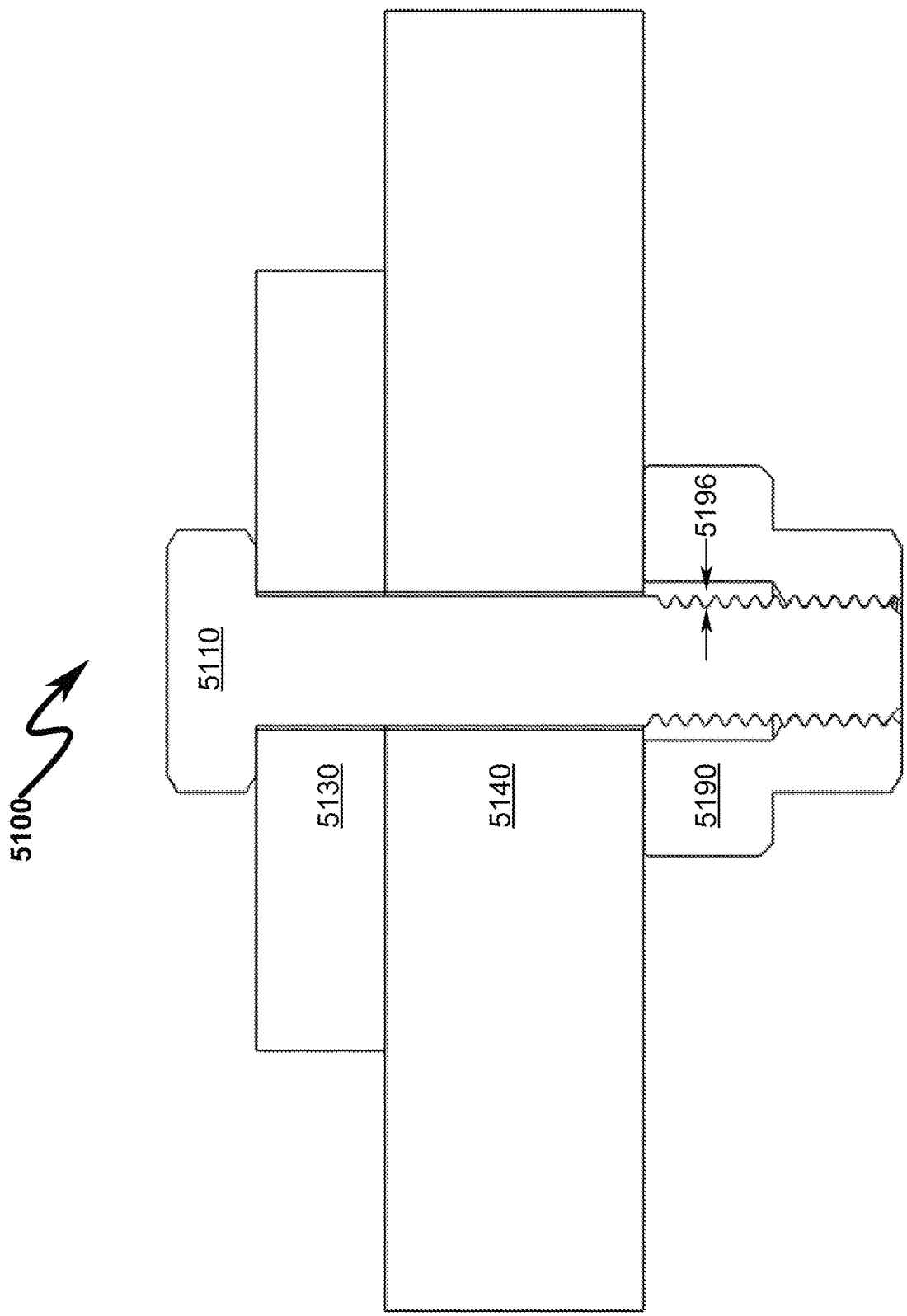
FIG. 51 illustrates a front section view of a preferred exemplary 4-member integrated RFF TCM thermally stabilized fastener system embodiment.
Figure 52:
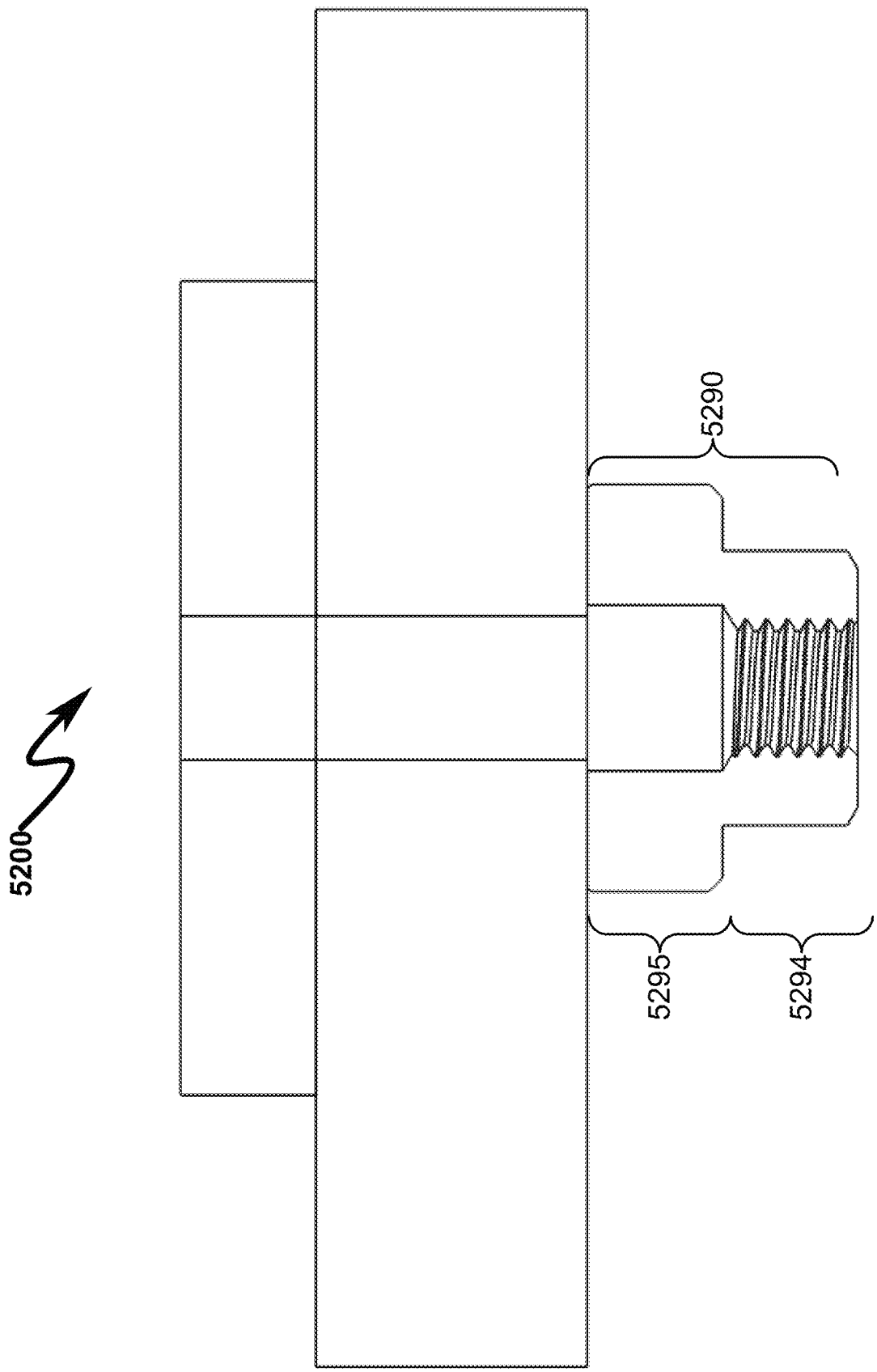
FIG. 52 illustrates a front section view (with fastener hidden) of a preferred exemplary 4-member integrated RFF TCM thermally stabilized fastener system embodiment.
Figure 53:
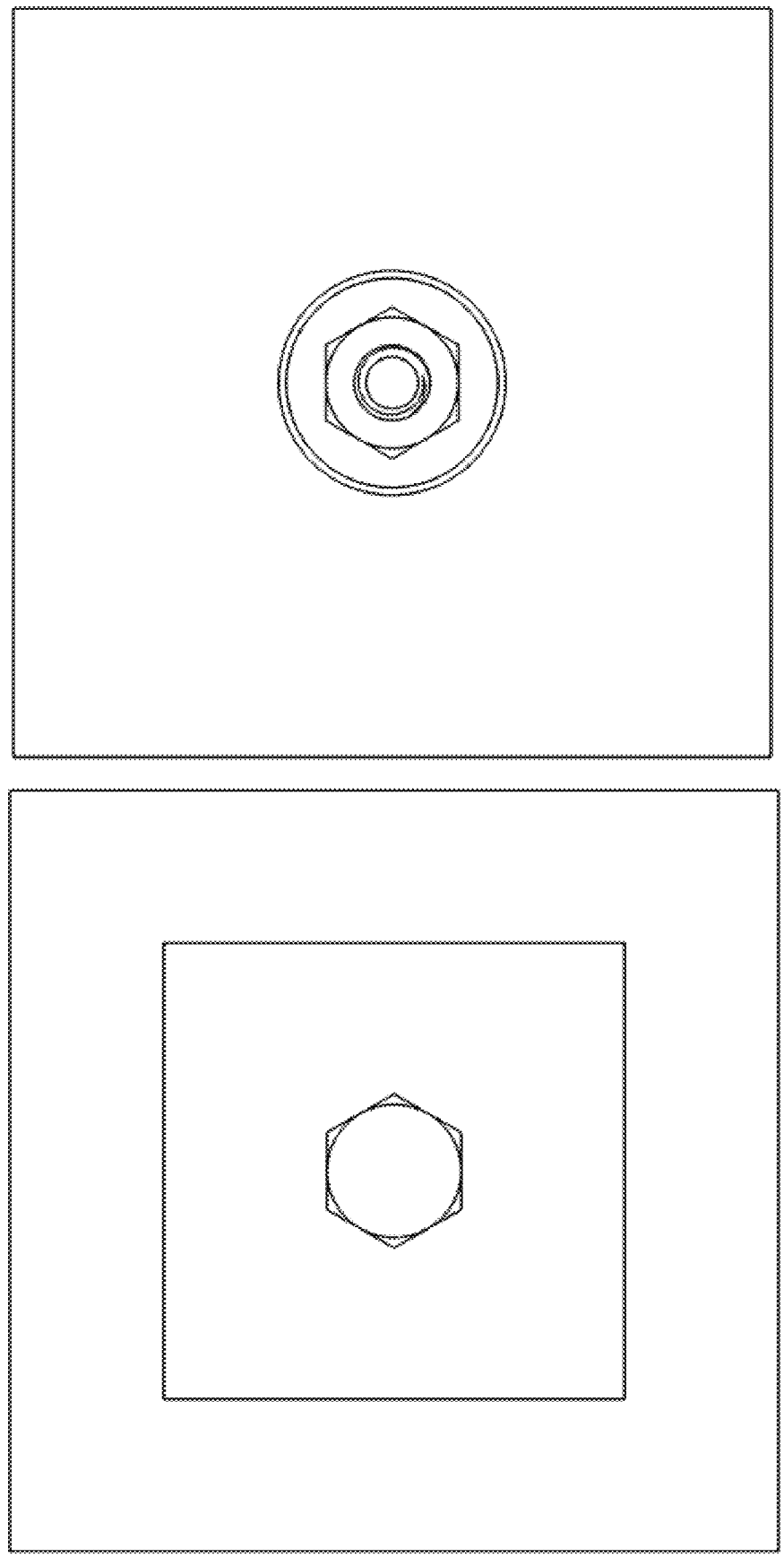
FIG. 53 illustrates top and bottom views of a preferred exemplary 4-member integrated RFF TCM thermally stabilized fastener system embodiment.
Figure 54:
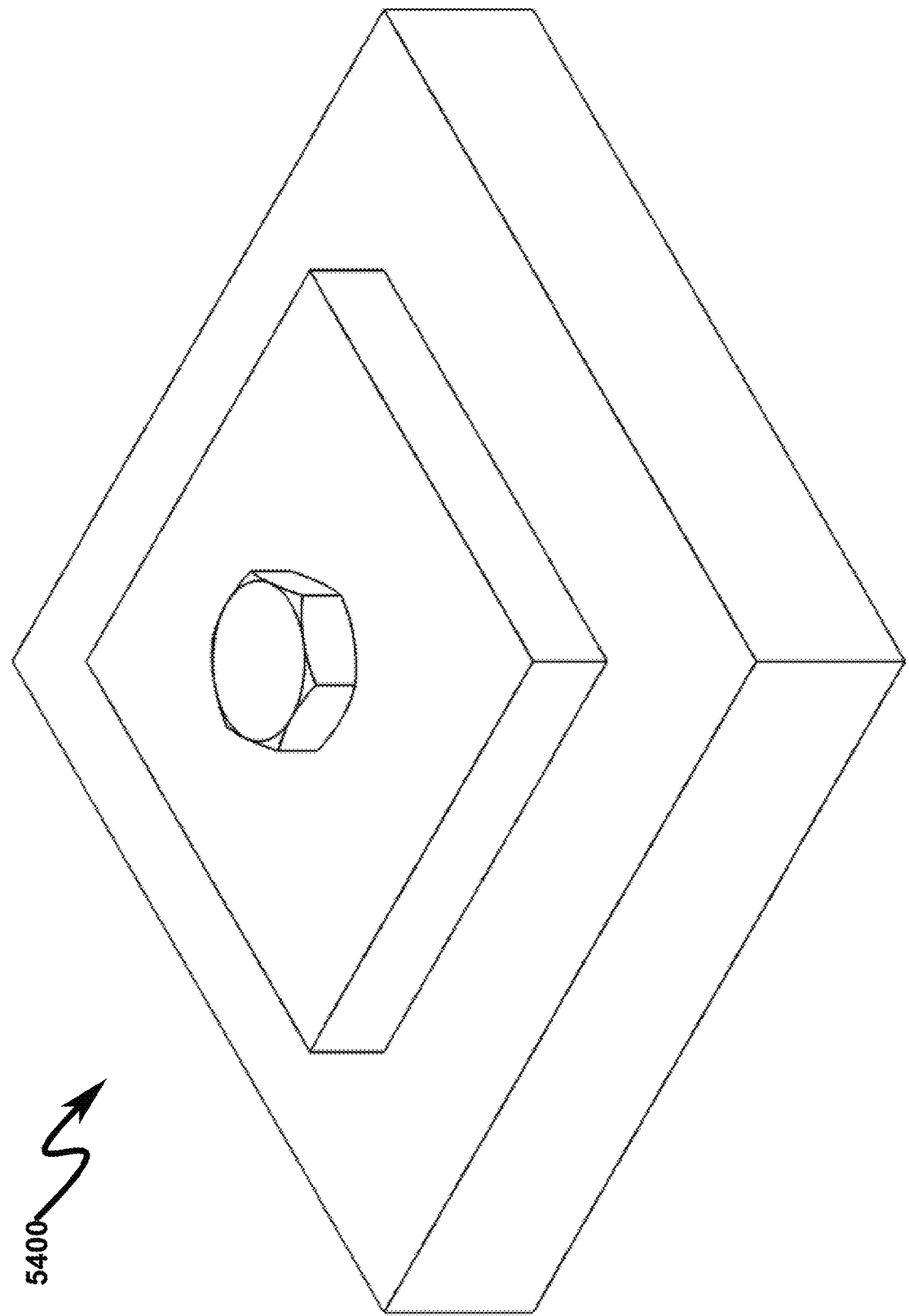
FIG. 54 illustrates a top front right perspective view of a preferred exemplary 4-member integrated RFF TCM thermally stabilized fastener system embodiment.
Figure 55:
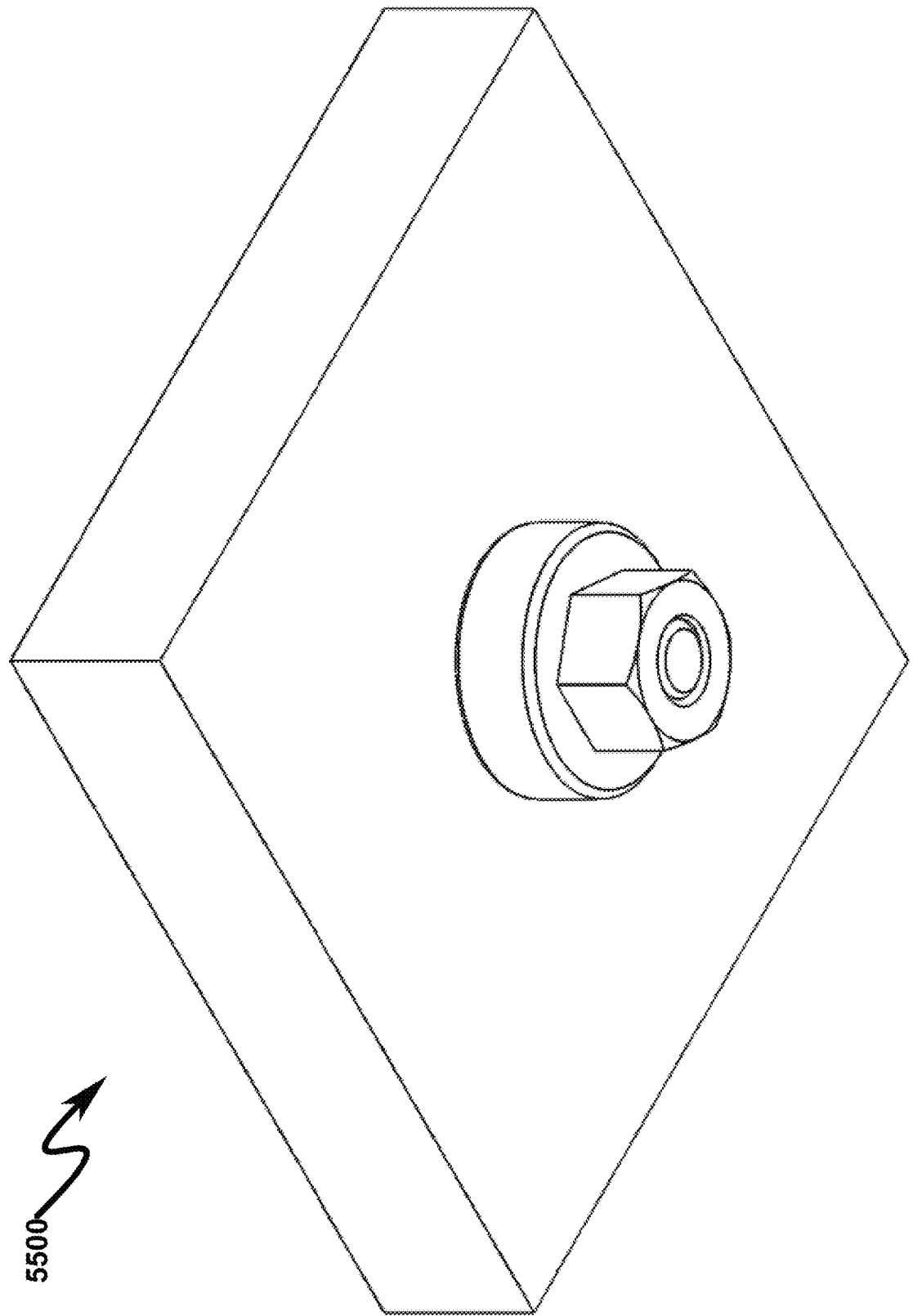
FIG. 55 illustrates a bottom front right perspective view of a preferred exemplary 4-member integrated RFF TCM thermally stabilized fastener system embodiment.

As generally depicted in FIG. 51 (5100)-FIG. 52 (5200), the fastener (FAS) (5110) may only engage the merged (5190, 5290) temperature compensating member (TCM) and fastener retention receiver (FRR) via some threaded (5294) portion of the MMS, with a counter-bore (5295) providing a gap (5196) along the sides of the fastener (FAS) (5110), such that the counter-bore (5295) portion of the merged MMS provides the thermal compensation necessary to thermally stabilize the fastener (FAS) (5110) along this portion (5295) of the fastener (FAS) (5110) body.

This configuration provides for a thermally stabilized fastener retention receiver (FRR) that may compensate for thermal variations in a given fastener without the need for additional hardware in a MMS stack. These configurations may be suitable in environments where additional MMS stacking would not be practical or physically possible.

3-Member TCM Integrated RFF TSF System Overview (5700)-(6400)

Figure 57:
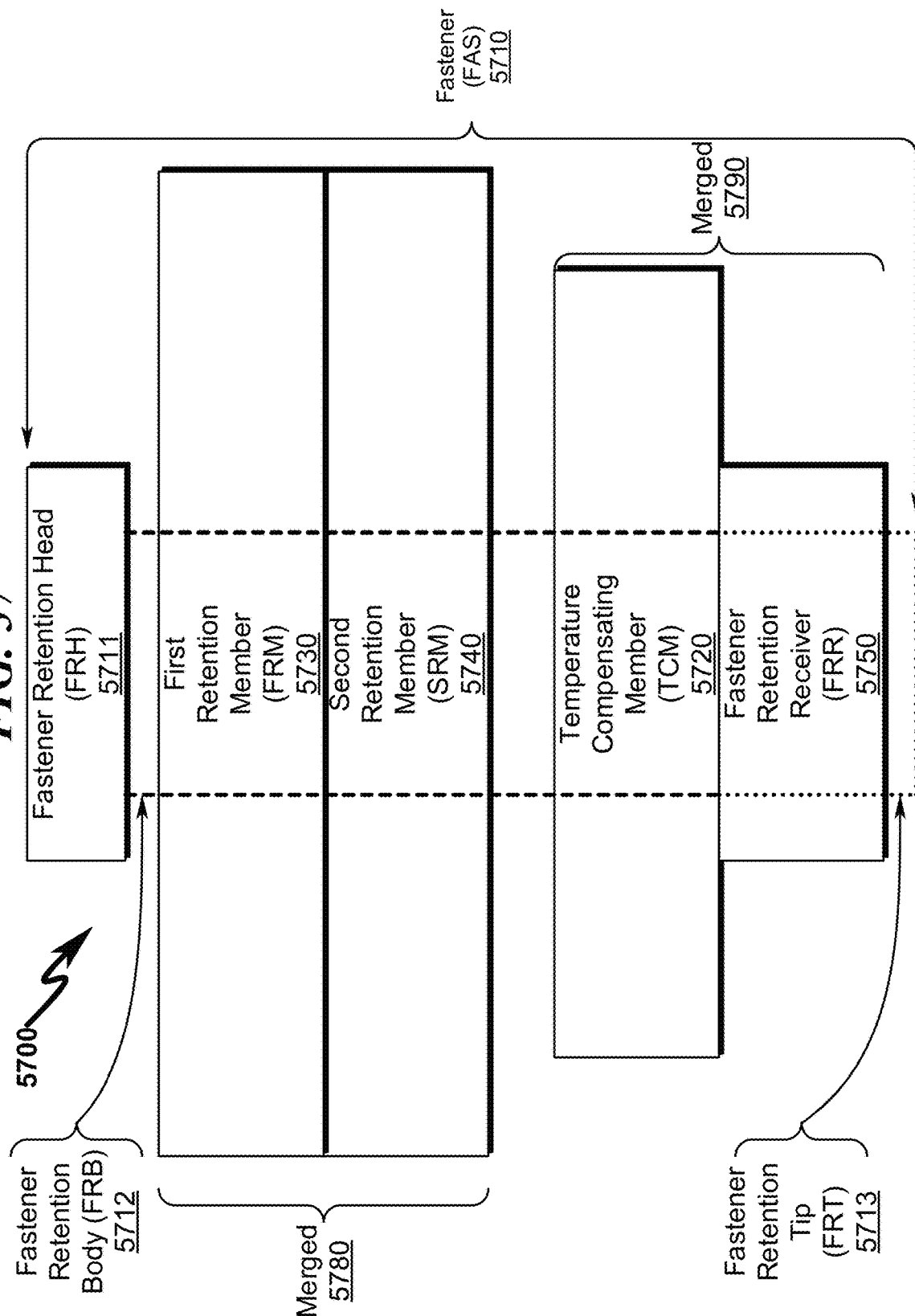
FIG. 57 illustrates a block diagram depicting a preferred exemplary 3-member integrated RFF TCM thermally stabilized fastener system.
Figure 58:
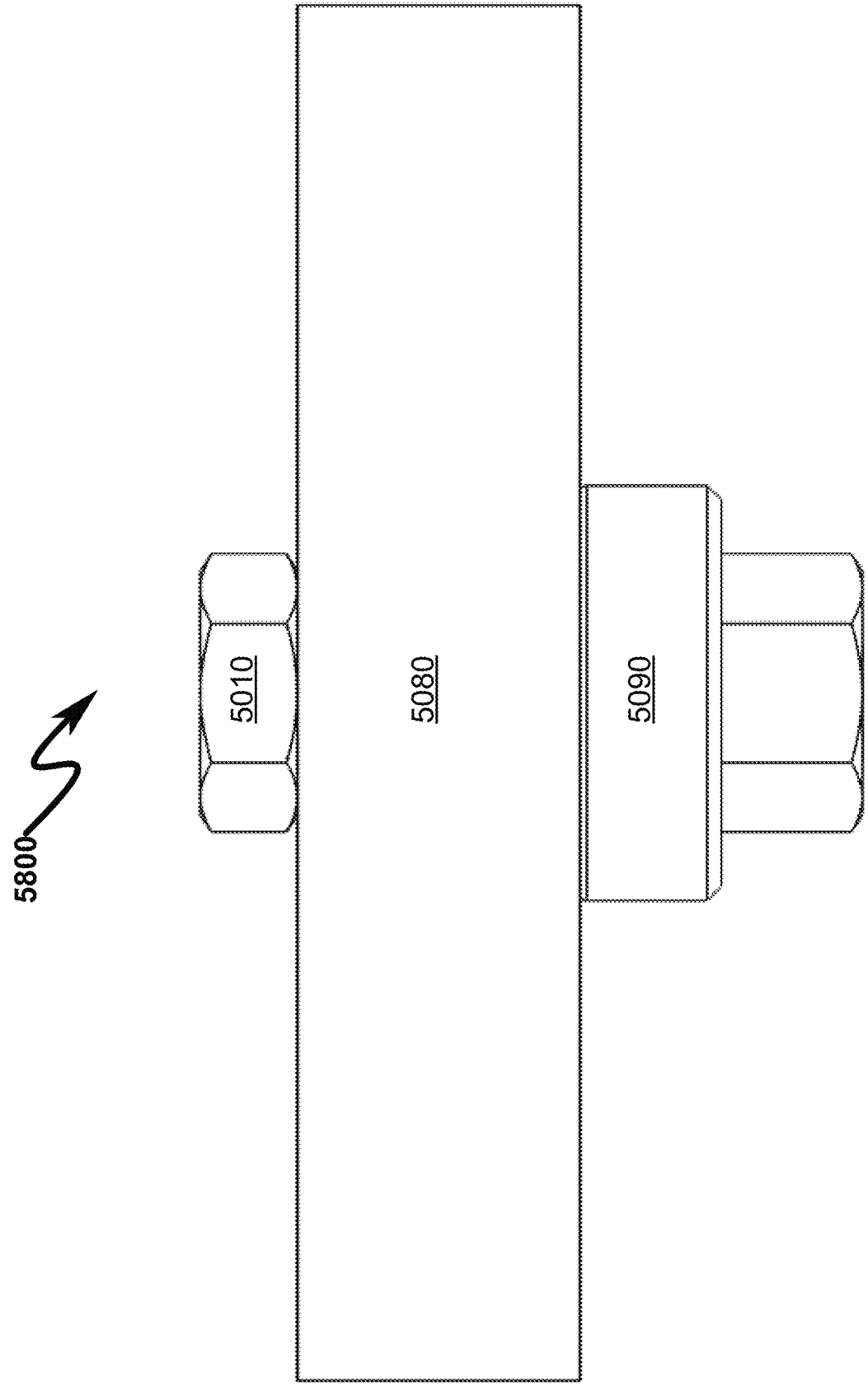
FIG. 58 illustrates a front view of a preferred exemplary 3-member integrated RFF TCM thermally stabilized fastener system embodiment.

A general 3-member TCM integrated RFF TSF fastener system can be seen by referencing FIG. 57 (5700) wherein a fastener (FAS) (5710) comprising a faster retention head (FRH) (5711), fastener retention body (FRB) (5712), and fastener retention tip (FRT) (5713) is used to couple a mechanical member stack (MMS) in a thermally stabilized fashion using a temperature compensating member (TCM) (5720) merged (5780) with a fastener retention receiver (FRR) (5750). The MMS in this example comprises a first retention member (FRM) (5730) merged (5780) with a second retention member (SRM) (5740) with a temperature compensating member (TCM) (5720) merged with the fastener retention receiver (FRR) (5750).

Figure 64:
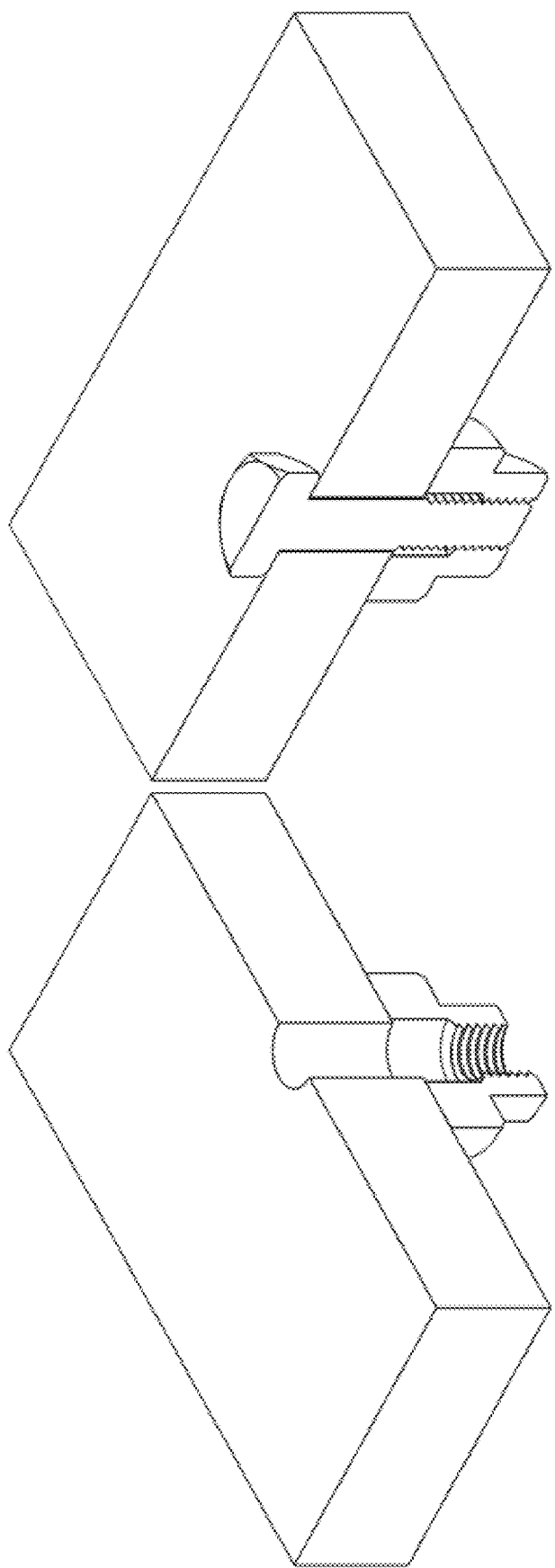
FIG. 64 illustrates a top front right perspective side section view (with fastener hidden) and a top front right perspective front section view of a preferred exemplary 3-member integrated RFF TCM thermally stabilized fastener system embodiment.

This general construction may be illustrated by example as depicted in FIG. 57 (5700)-FIG. 64 (6400) wherein the fastener (FAS) (5810, 5910) is depicted as having a hexagonal bolt FRH, the fastener retention receiver (FRR) is merged (5890, 5990) with the temperature compensating member (TCM), and the MMS as comprising a first retention member (FRM) merged (5880) with a second retention member (SRM).

Figure 59:
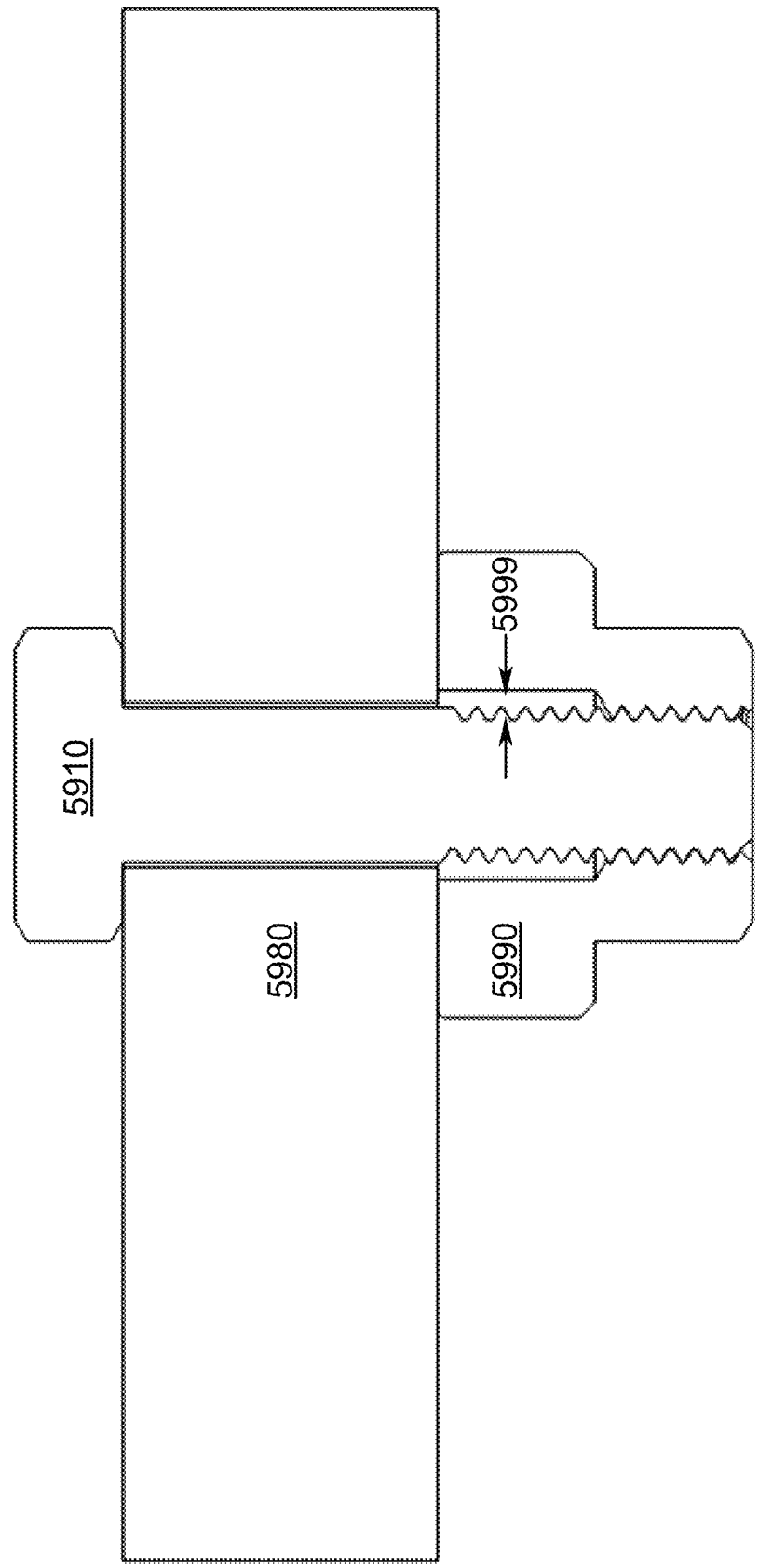
FIG. 59 illustrates a front section view of a preferred exemplary 3-member integrated RFF TCM thermally stabilized fastener system embodiment.
Figure 60:
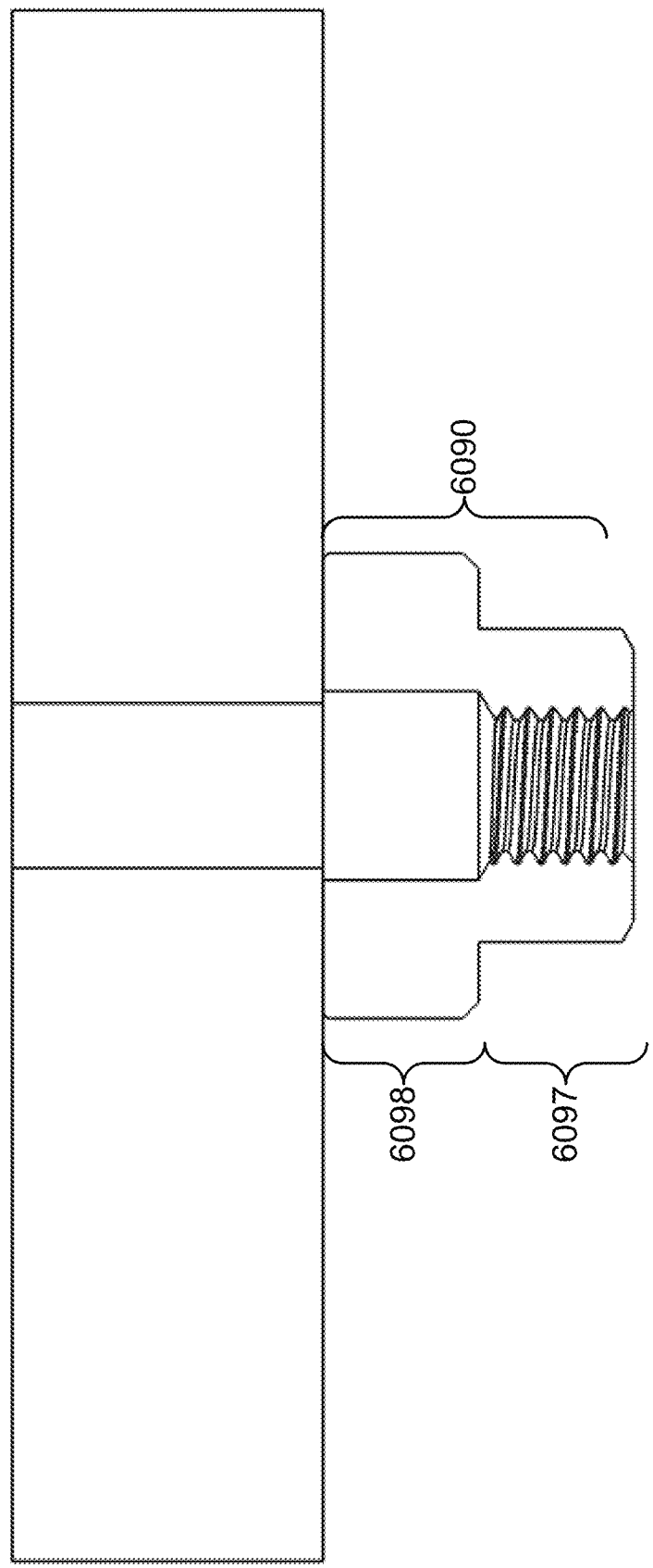
FIG. 60 illustrates a front section view (with fastener hidden) of a preferred exemplary 3-member integrated RFF TCM thermally stabilized fastener system embodiment.
Figure 62:
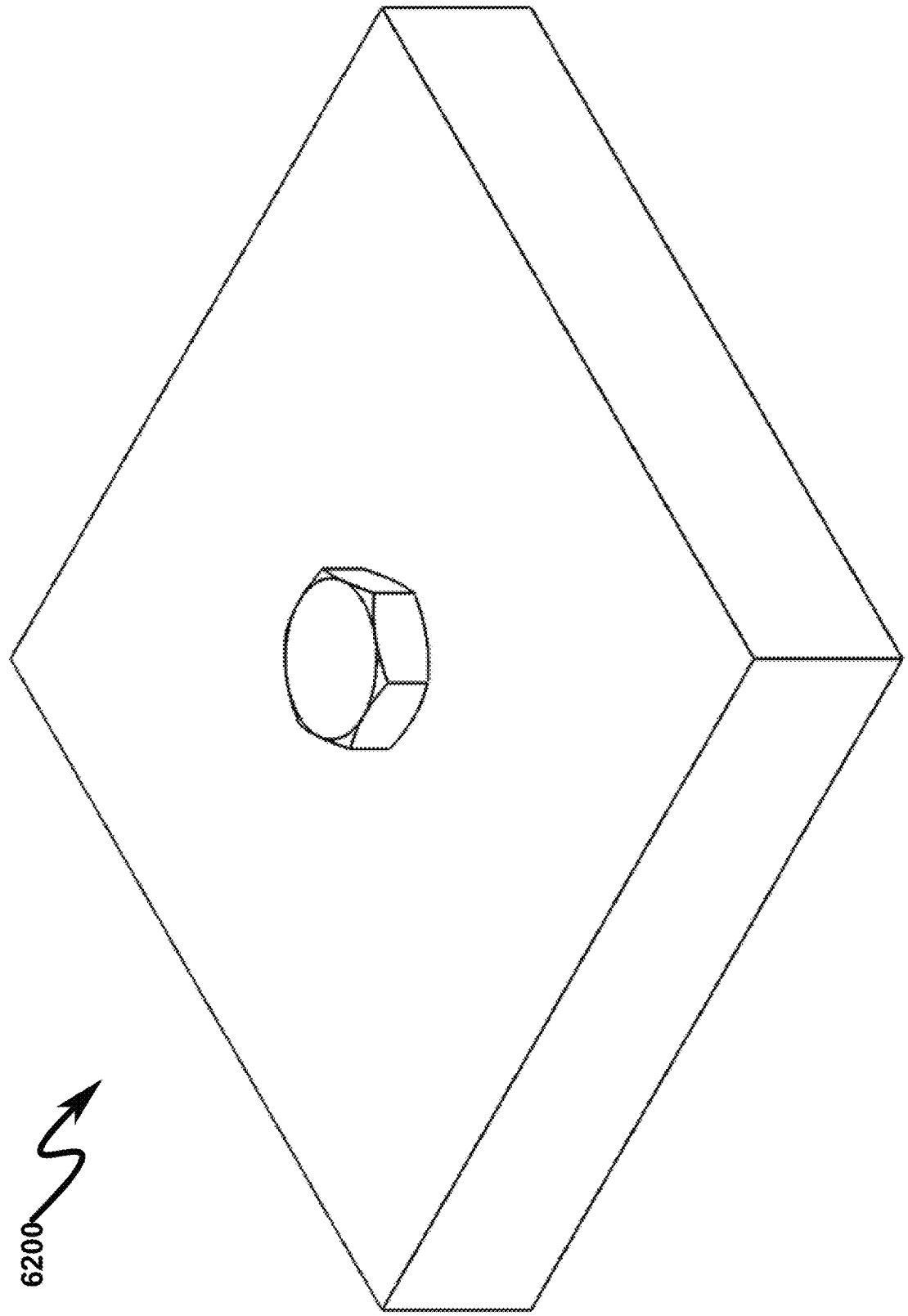
FIG. 62 illustrates a top front right perspective view of a preferred exemplary 3-member integrated RFF TCM thermally stabilized fastener system embodiment.
Figure 63:
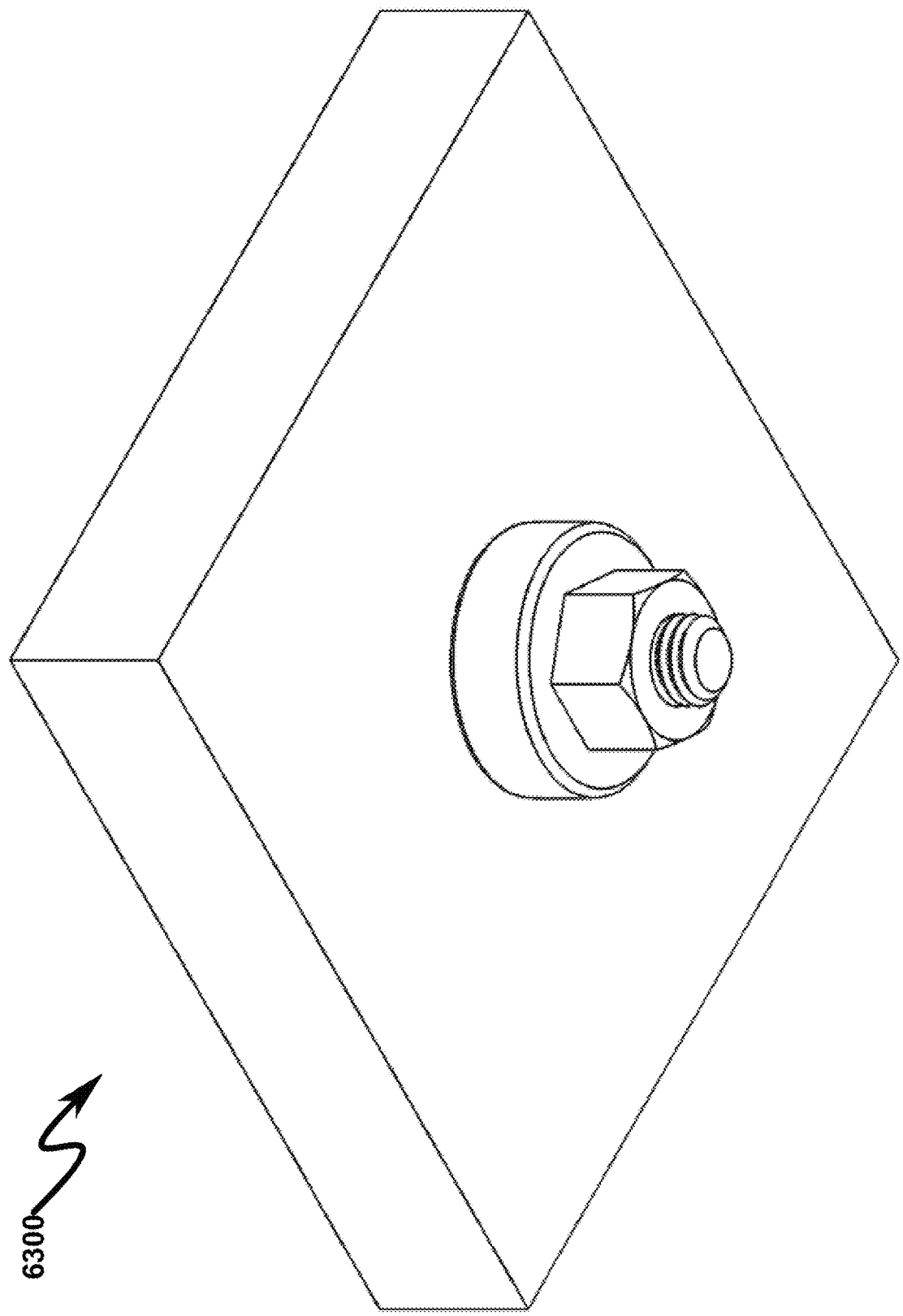
FIG. 63 illustrates a bottom front right perspective view of a preferred exemplary 3-member integrated RFF TCM thermally stabilized fastener system embodiment.

As generally depicted in FIG. 59 (5900)-FIG. 60 (6000), the fastener (FAS) (5910) may only engage the merged (5990, 6090) temperature compensating member (TCM) and fastener retention receiver (FRR) via some threaded (6097) portion of the MMS, with a counter-bore (6098) providing a gap (5999) along the sides of the fastener (FAS) (5910), such that the counter-bore (6098) portion of the merged MMS provides the thermal compensation necessary to thermally stabilize the fastener (FAS) (5910) along this portion (6098) of the fastener (FAS) (5910) body.

This configuration provides for a thermally stabilized fastener retention receiver (FRR) that may compensate for thermal variations in a given fastener without the need for additional hardware in a MMS stack. These configurations may be suitable in environments where additional MMS stacking would not be practical or physically possible.

TCM TSF Rounded Rivet System Overview (6500)-(7200)

Figure 65:
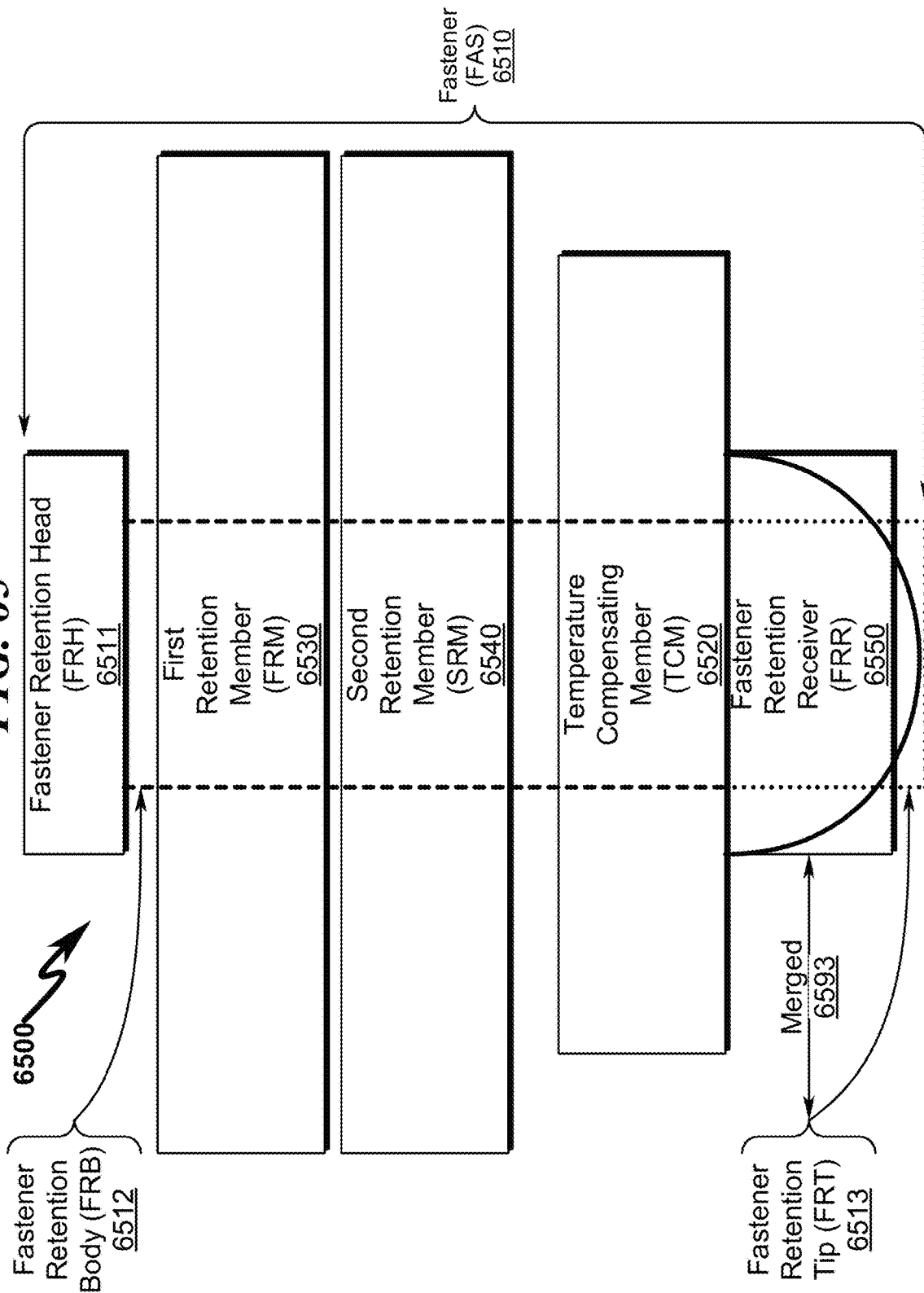
FIG. 65 illustrates a block diagram depicting a preferred exemplary TCM TSF rounded rivet thermally stabilized fastener system.
Figure 66:
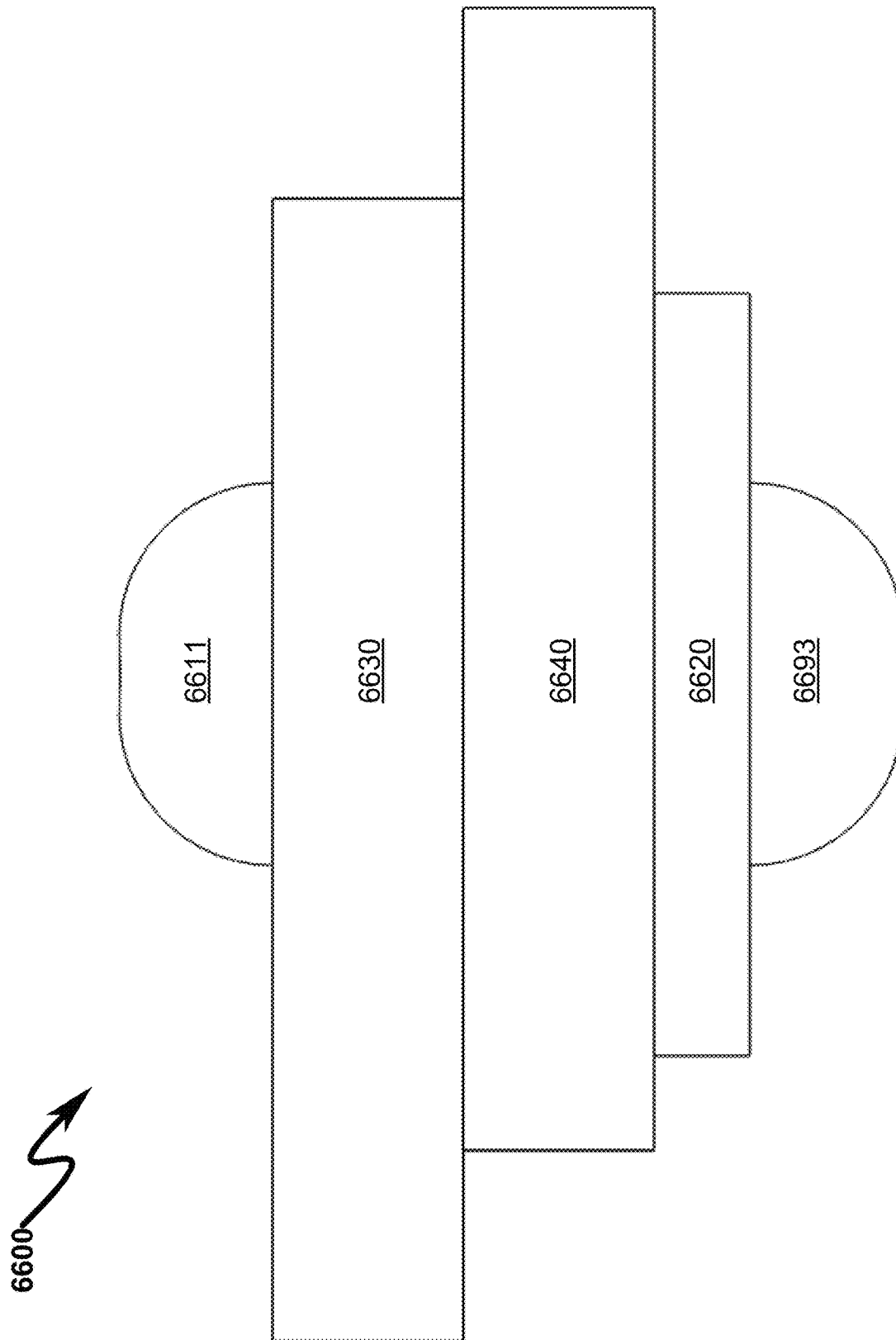
FIG. 66 illustrates a front view of a preferred exemplary TCM TSF rounded rivet thermally stabilized fastener system embodiment.
Figure 67:
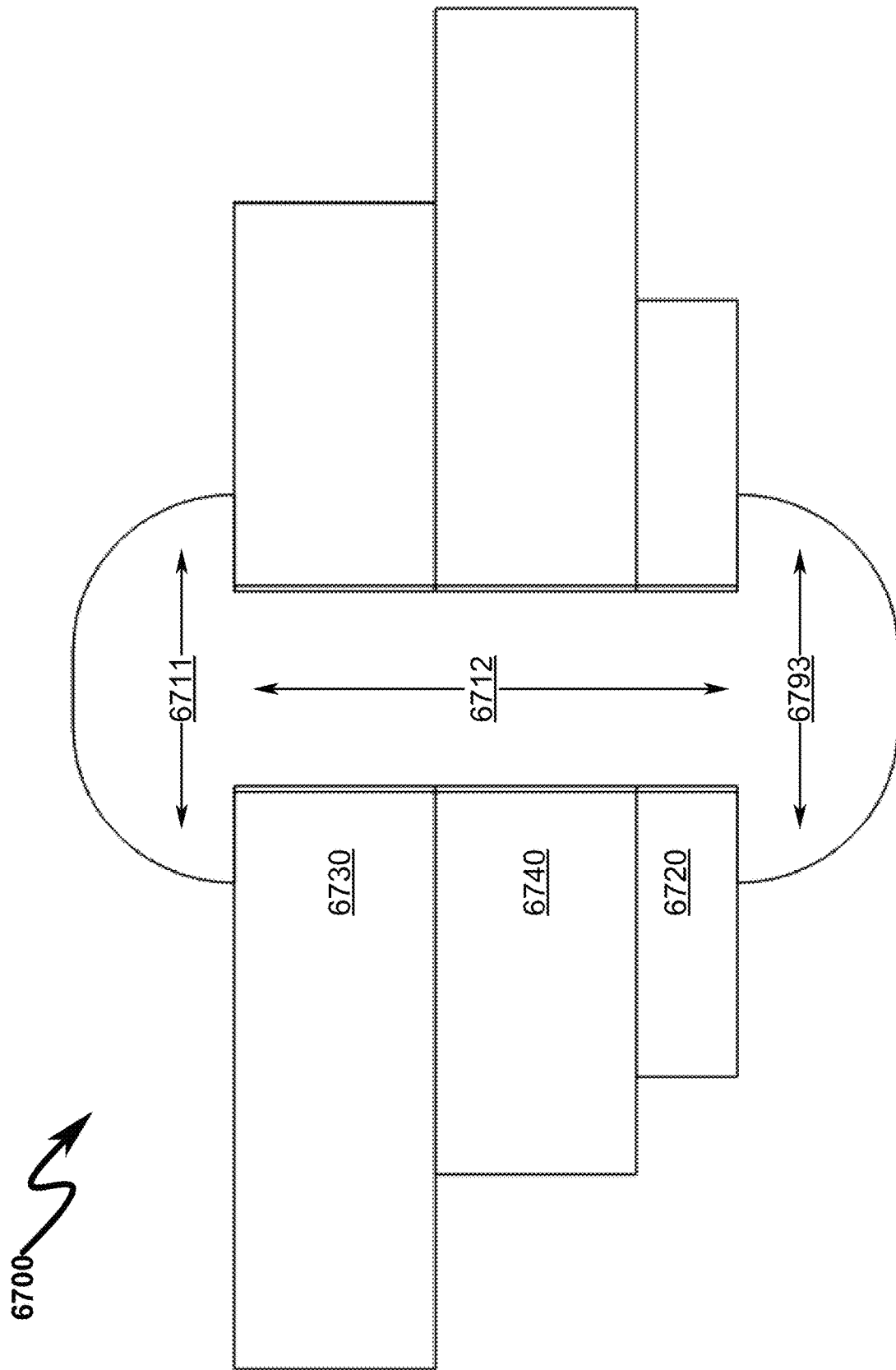
FIG. 67 illustrates a front section view of a preferred exemplary TCM TSF rounded rivet thermally stabilized fastener system embodiment and front, top perspective, and bottom perspective views of the rivet fastener.
Figure 69:
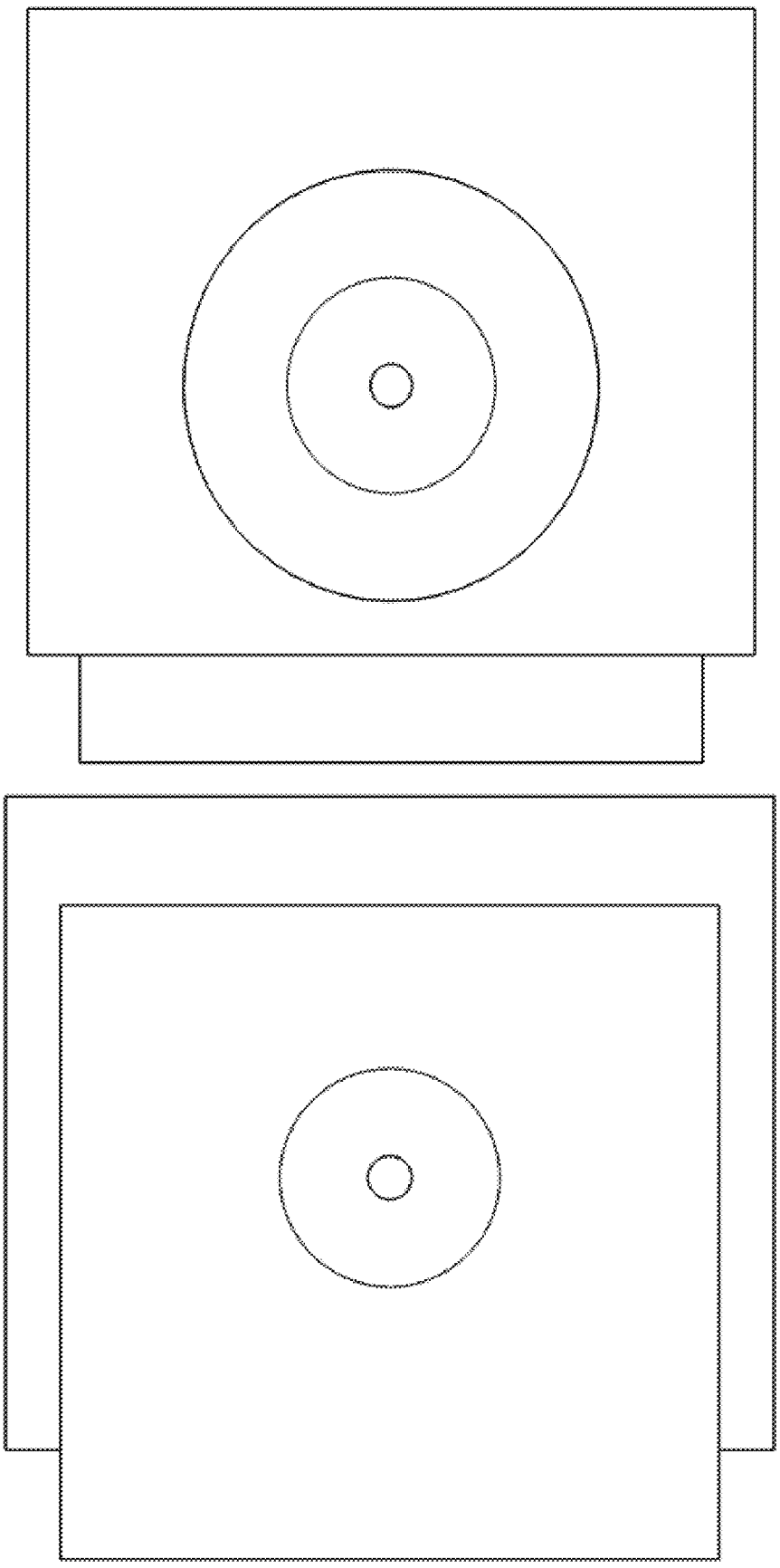
FIG. 69 illustrates top and bottom views of a preferred exemplary TCM TSF rounded rivet thermally stabilized fastener system embodiment.
Figure 70:
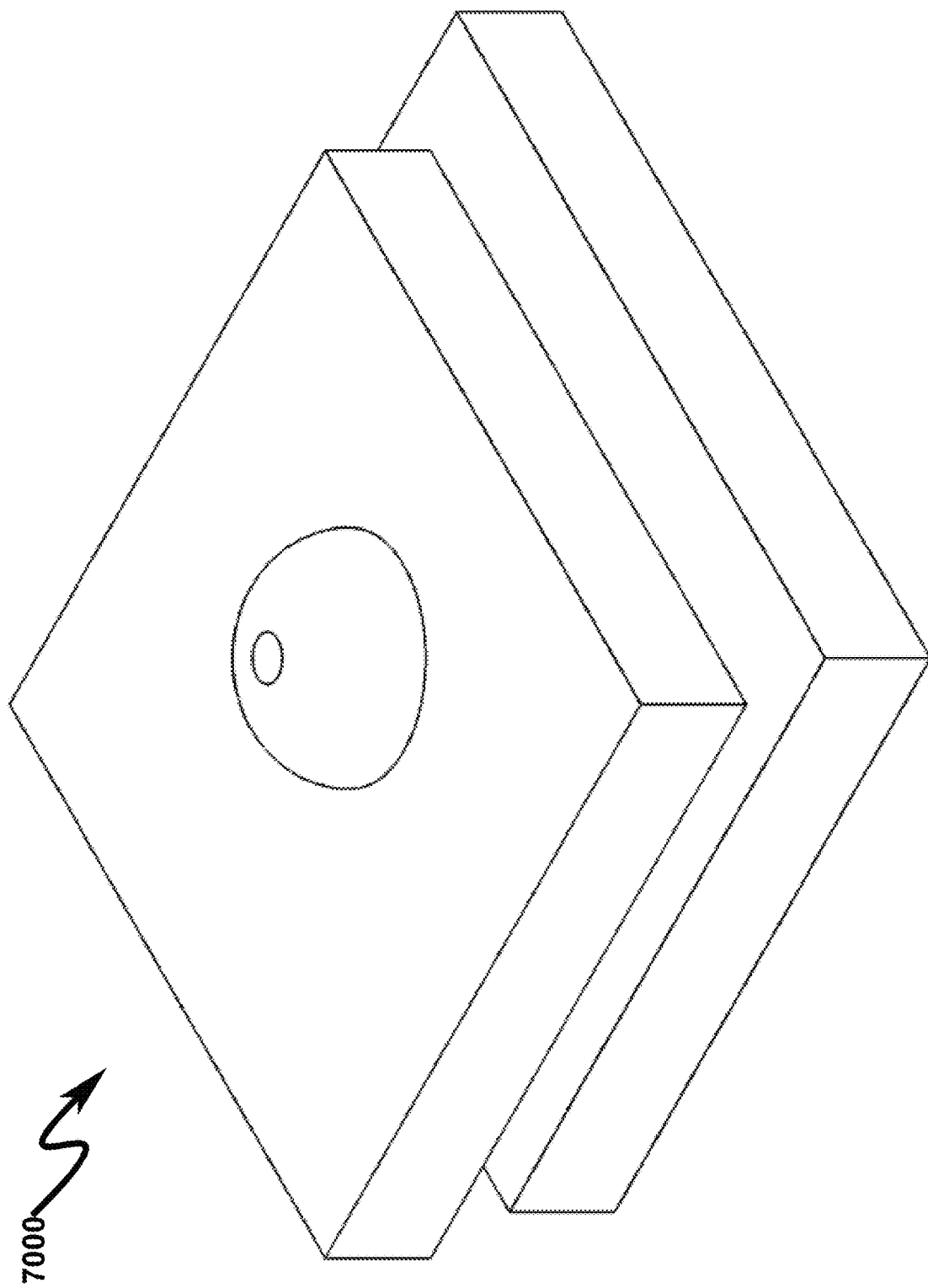
FIG. 70 illustrates a top front right perspective view of a preferred exemplary TCM TSF rounded rivet thermally stabilized fastener system embodiment.
Figure 71:
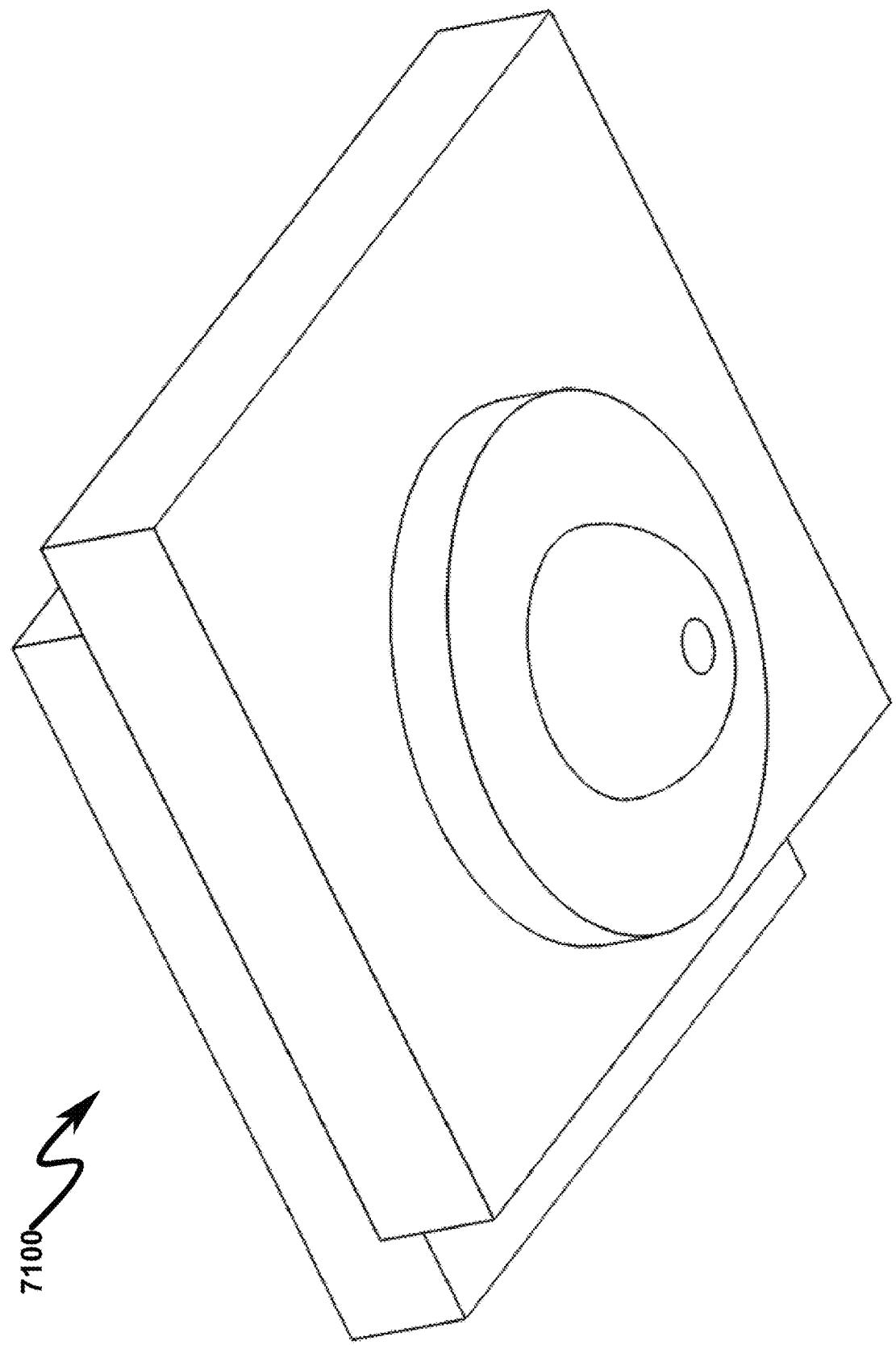
FIG. 71 illustrates a bottom front right perspective view of a preferred exemplary TCM TSF rounded rivet thermally stabilized fastener system embodiment.
Figure 72:
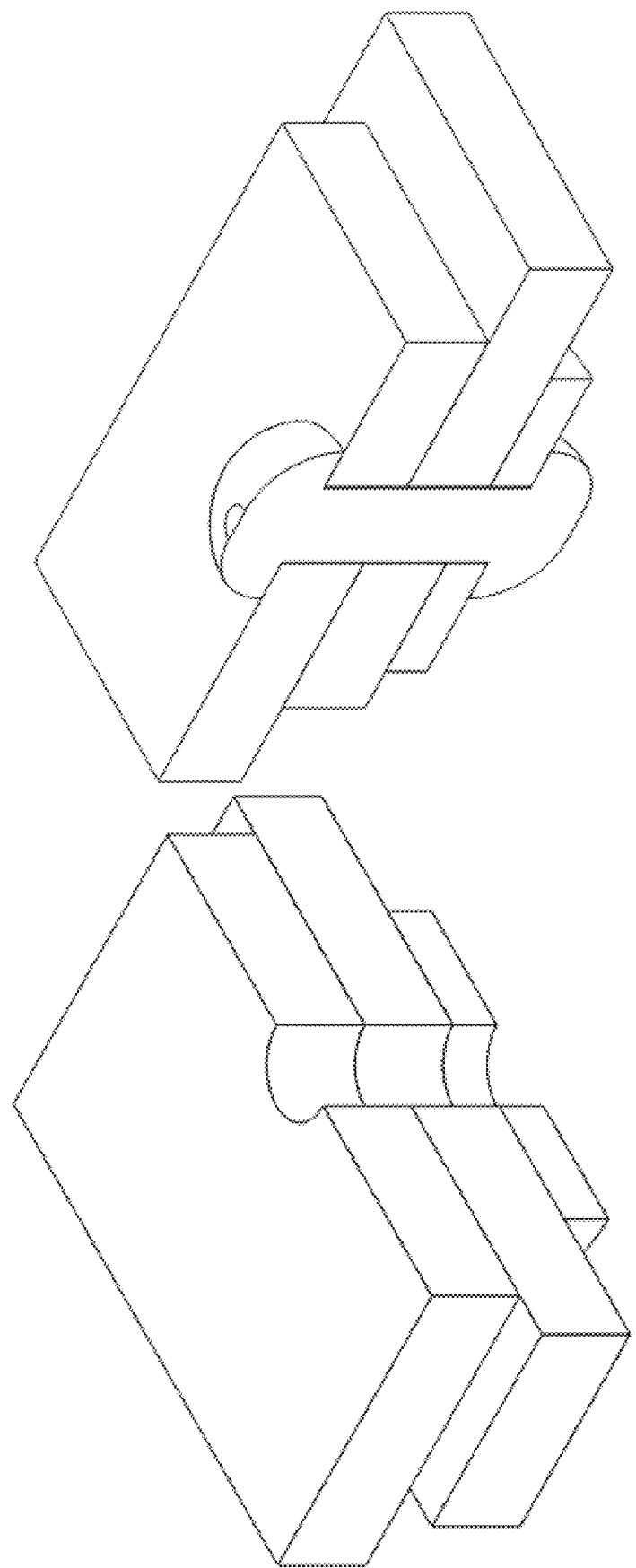
FIG. 72 illustrates a top front right perspective side section view (with fastener hidden) and a top front right perspective front section view of a preferred exemplary TCM TSF rounded rivet thermally stabilized fastener system embodiment.

A TCM TSF configuration utilizing a rounded rivet fastener is generally depicted in FIG. 65 (6500)-FIG. 72 (7200). Here it can be seen that the fastener (6510) comprises a rounded rivet that constrains the MMS comprising the temperature compensating member (TCM) (6520, 6620, 6720), first retention member (FRM) (6530, 6630, 6730), and second retention member (SRM) (6540, 6640, 6740). The FRR (6550) is merged (6593, 6693, 6793) with the FAS (6510) by use of mechanical deformation of the FRT (6513) to form a secondary rivet head (SRH) (6593). This SRH (6593) deformation may take many forms that are well known to those skilled in the art, including but not limited to rounded head and flattened cylindrical head formations.

TCM TSF Spread Rivet System Overview (7300)-(8000)

Figure 73:
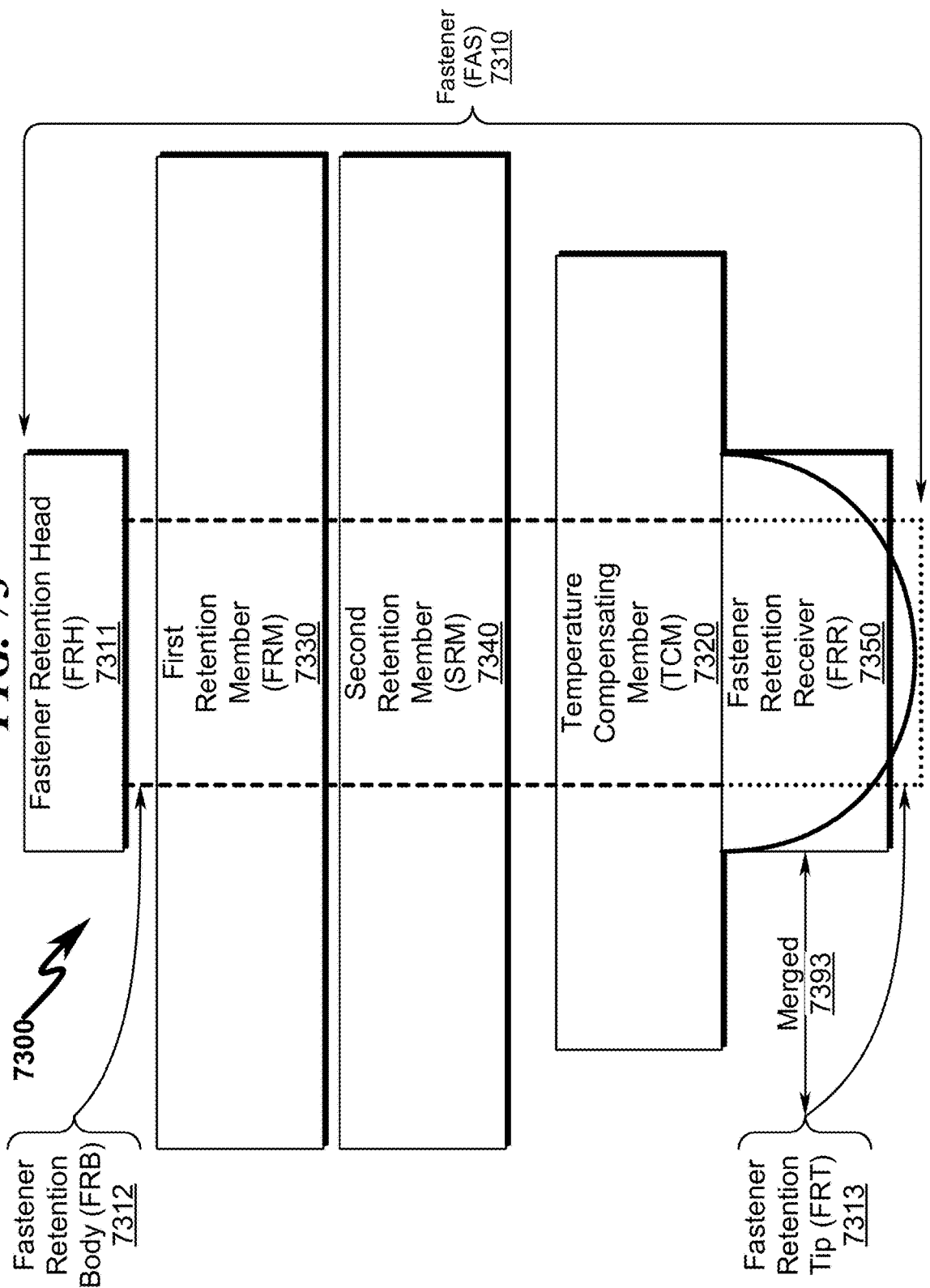
FIG. 73 illustrates a block diagram depicting a preferred exemplary TCM TSF spread rivet thermally stabilized fastener system.
Figure 74:
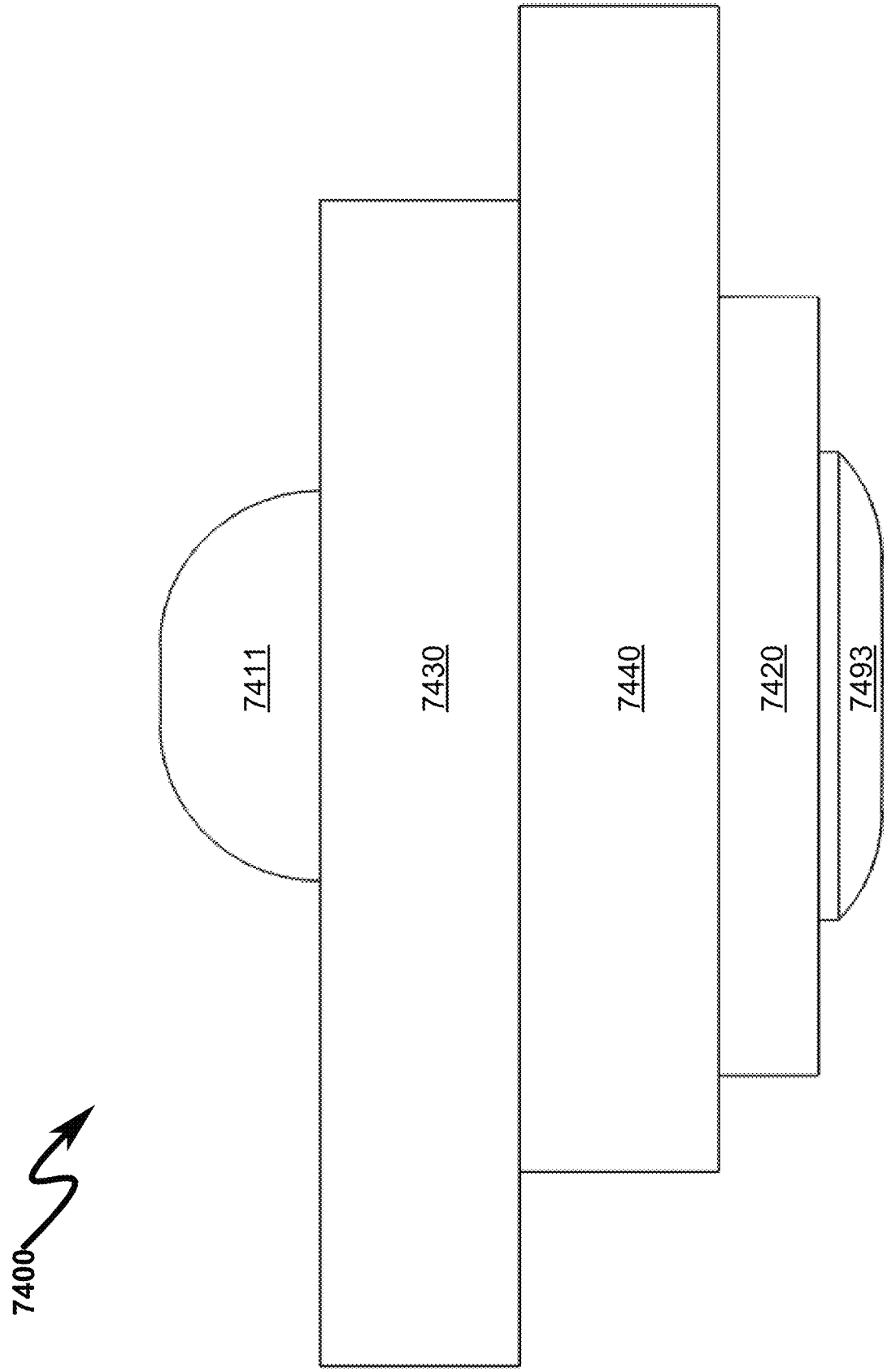
FIG. 74 illustrates a front view of a preferred exemplary TCM TSF spread rivet thermally stabilized fastener system embodiment.
Figure 75:
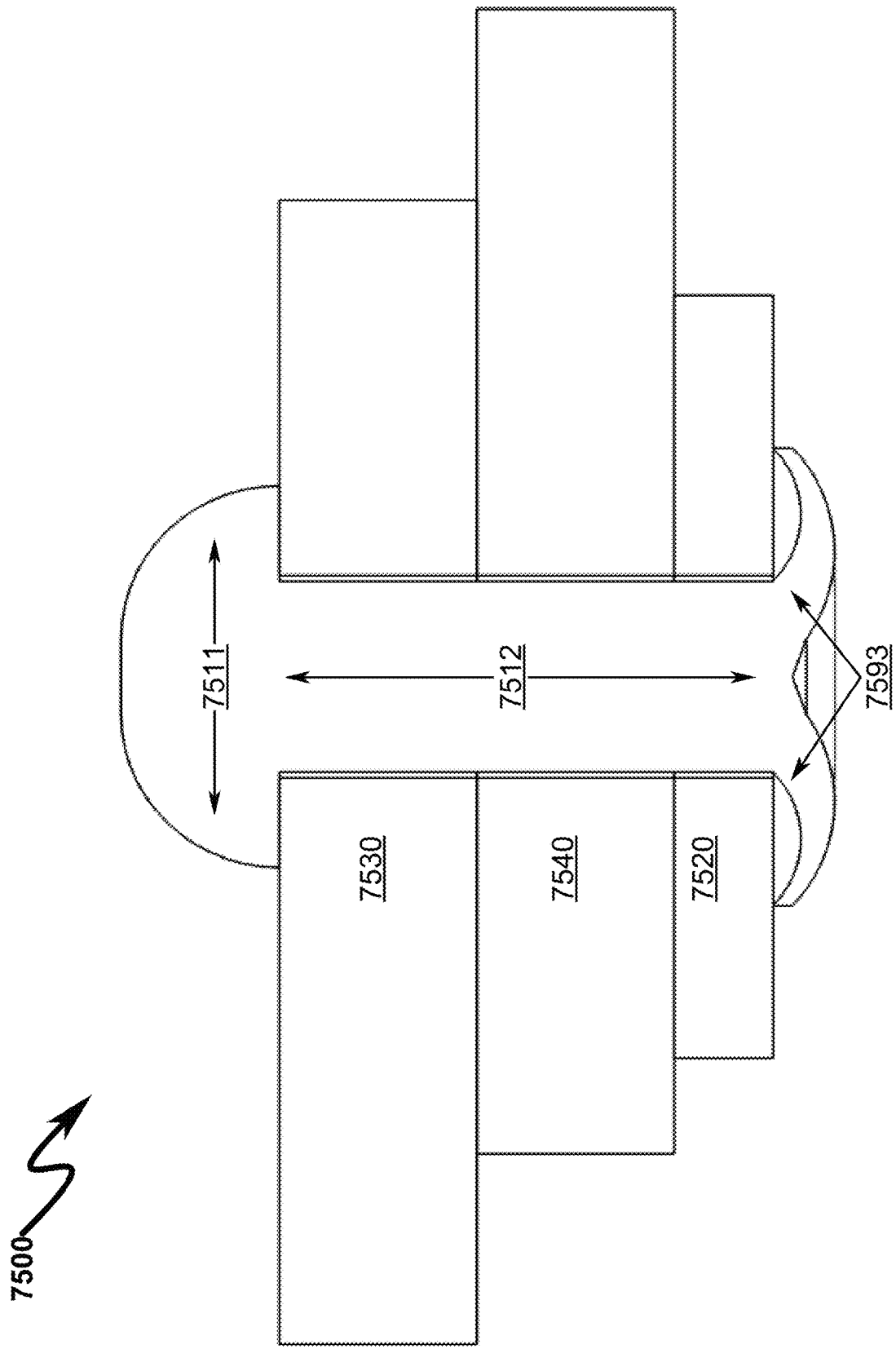
FIG. 75 illustrates a front section view of a preferred exemplary TCM TSF spread rivet thermally stabilized fastener system embodiment and front, top perspective, and bottom perspective views of the rivet fastener.
Figure 76:
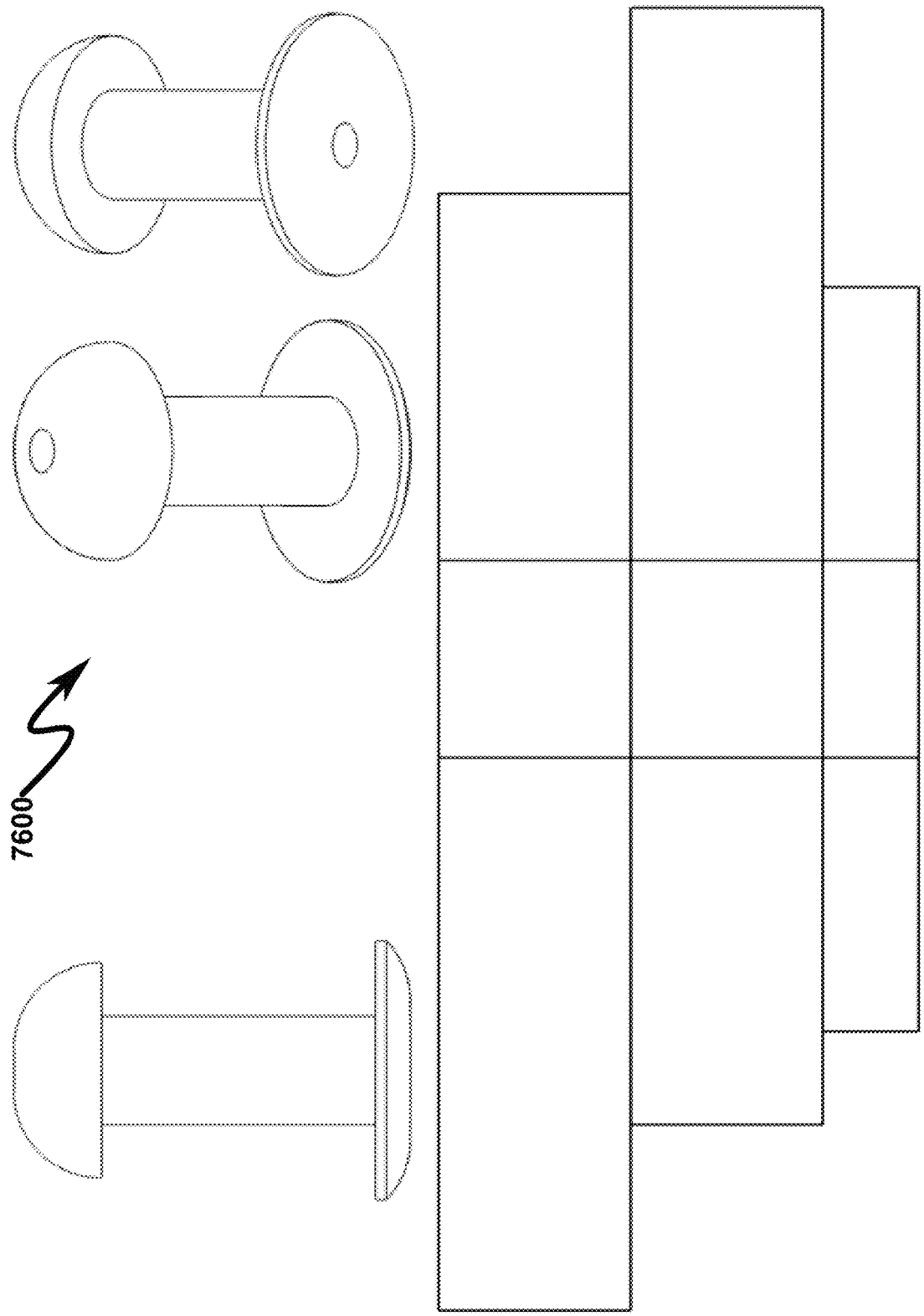
FIG. 76 illustrates a front section view (with fastener hidden) of a preferred exemplary TCM TSF spread rivet thermally stabilized fastener system embodiment.
Figure 77:
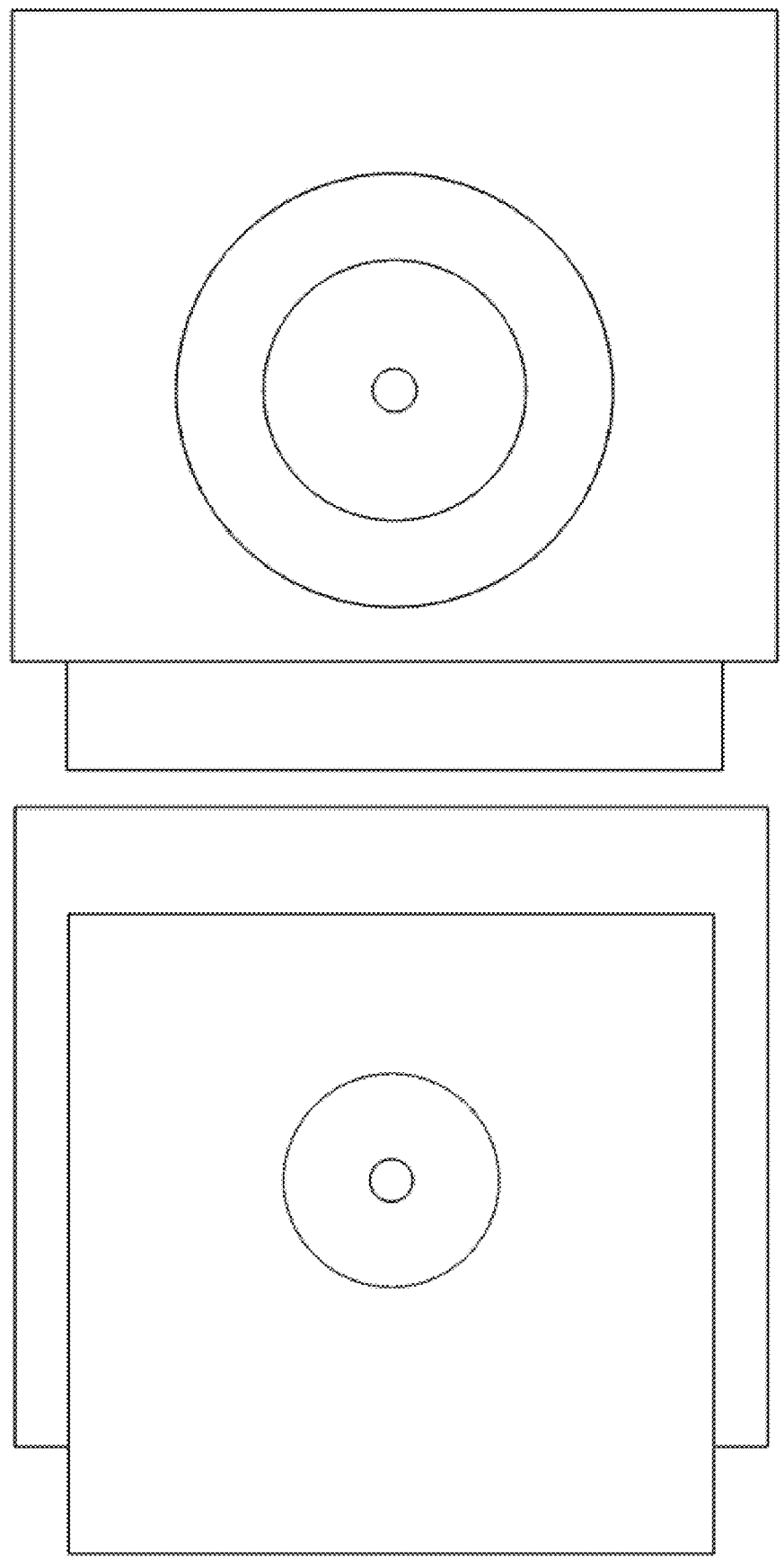
FIG. 77 illustrates top and bottom views of a preferred exemplary TCM TSF spread rivet thermally stabilized fastener system embodiment.
Figure 78:
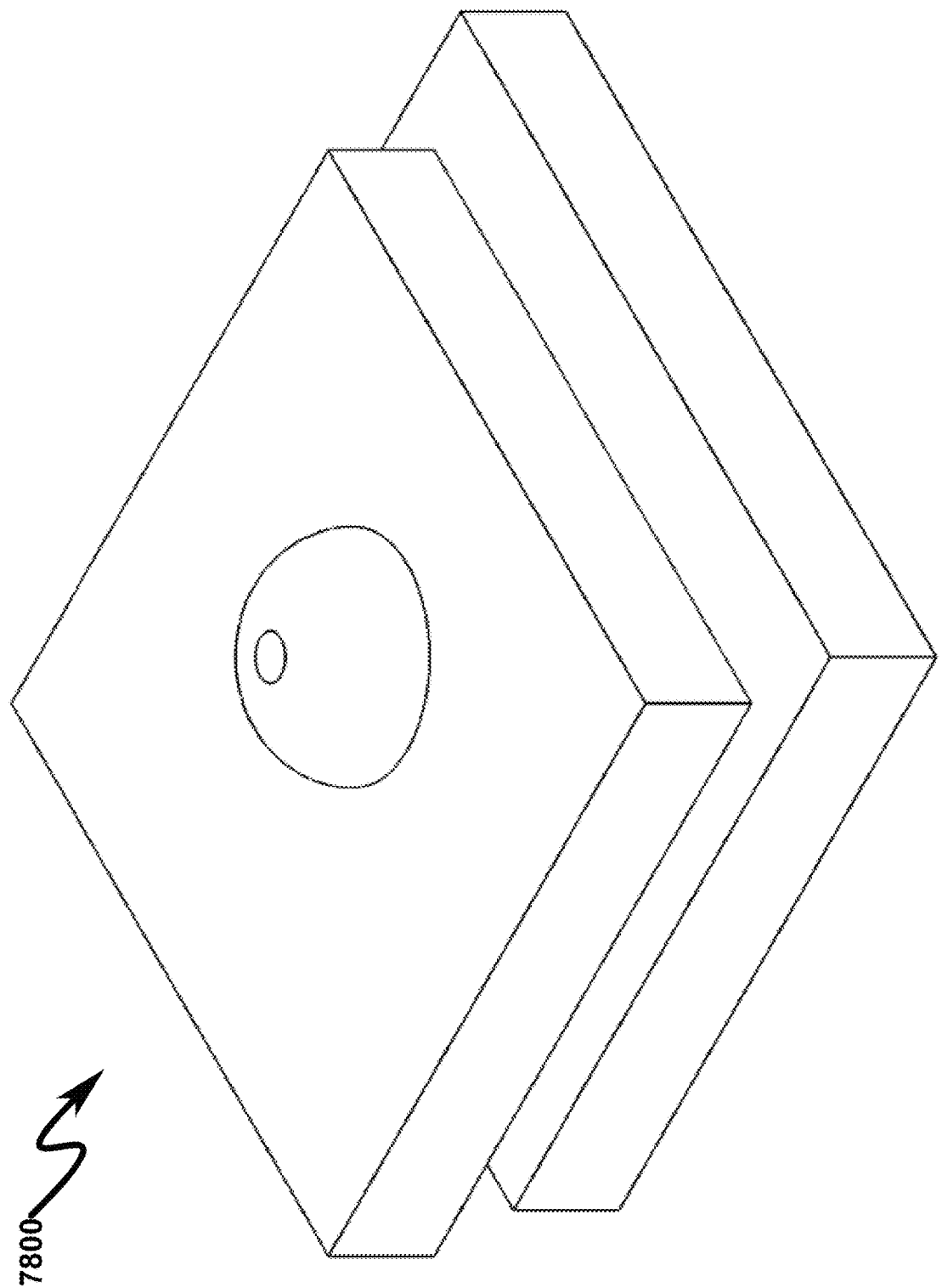
FIG. 78 illustrates a top front right perspective view of a preferred exemplary TCM TSF spread rivet thermally stabilized fastener system embodiment.
Figure 79:
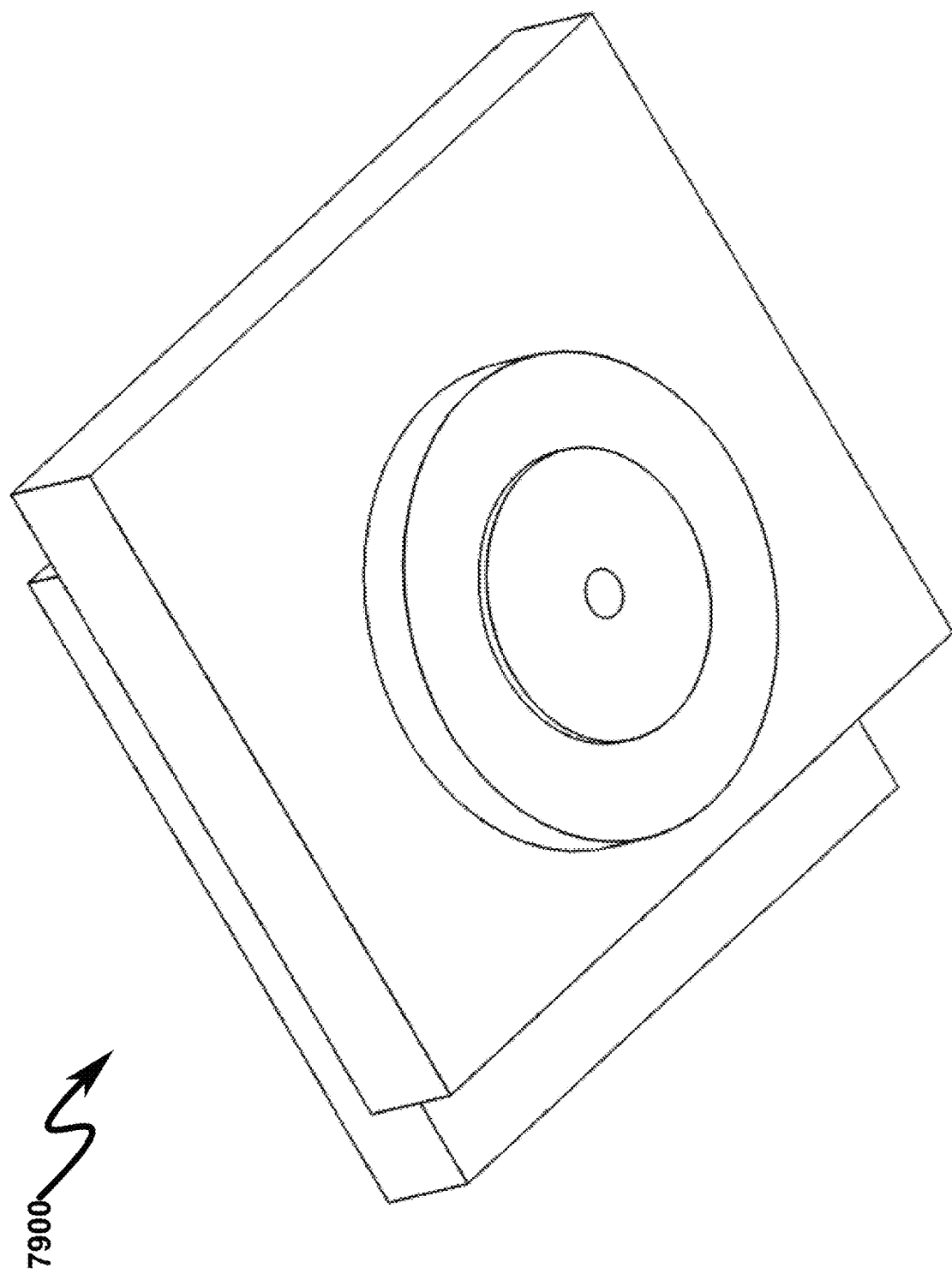
FIG. 79 illustrates a bottom front right perspective view of a preferred exemplary TCM TSF spread rivet thermally stabilized fastener system embodiment.
Figure 80:
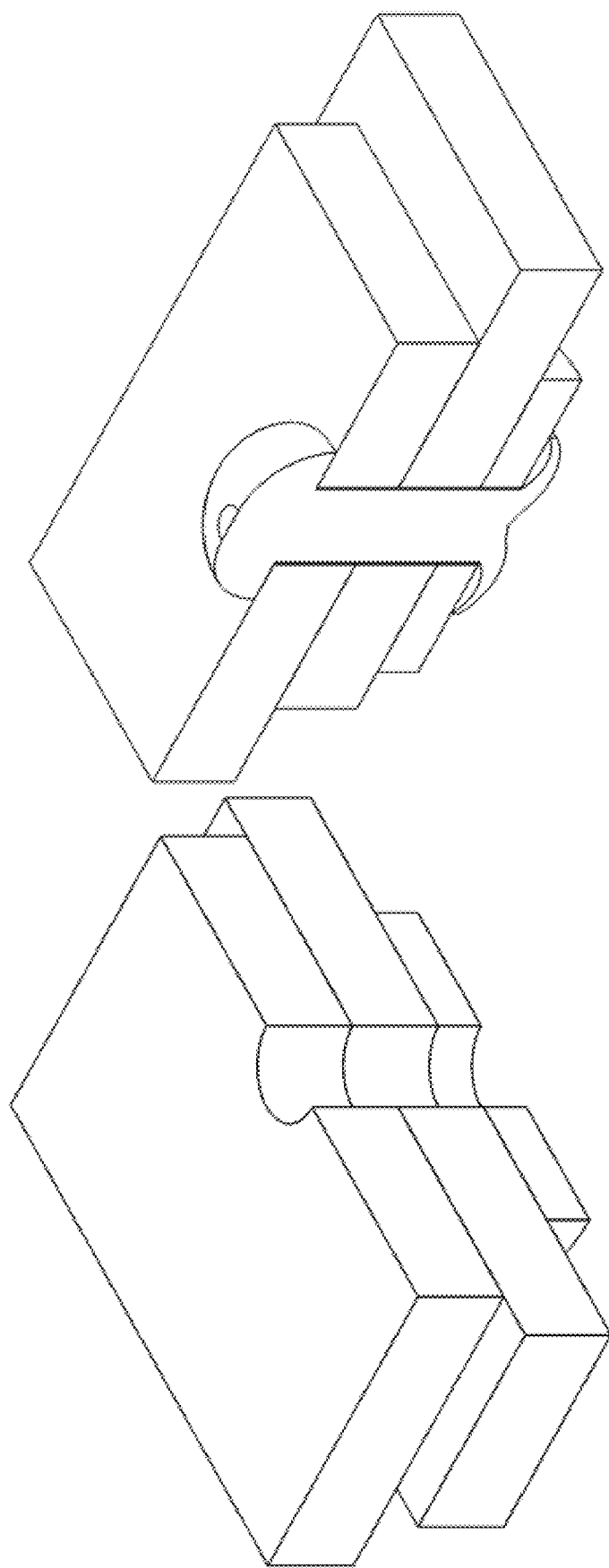
FIG. 80 illustrates a top front right perspective side section view (with fastener hidden) and a top front right perspective front section view of a preferred exemplary TCM TSF spread rivet thermally stabilized fastener system embodiment.

A TCM TSF configuration utilizing a spread rivet fastener is generally depicted in FIG. 73 (7300)-FIG. 80 (8000). Here it can be seen that the fastener (7310) comprises a rounded rivet that constrains the MMS comprising the temperature compensating member (TCM) (7320, 7420, 7520), first retention member (FRM) (7330, 7430, 7530), and second retention member (SRM) (7340, 7440, 7540). The FRR (7350) is merged (7393, 7493, 7593) with the FAS (7310) by use of mechanical deformation of the FRT (7313) to form a secondary rivet head (SRH) (7393) in the form of a spread rivet head. This SRH (7393) deformation may take many forms that are well known to those skilled in the art, including but not limited to spread head and flat head formations.

TCM TSF Pop Rivet System Overview (8100)-(8800)

Figure 81:
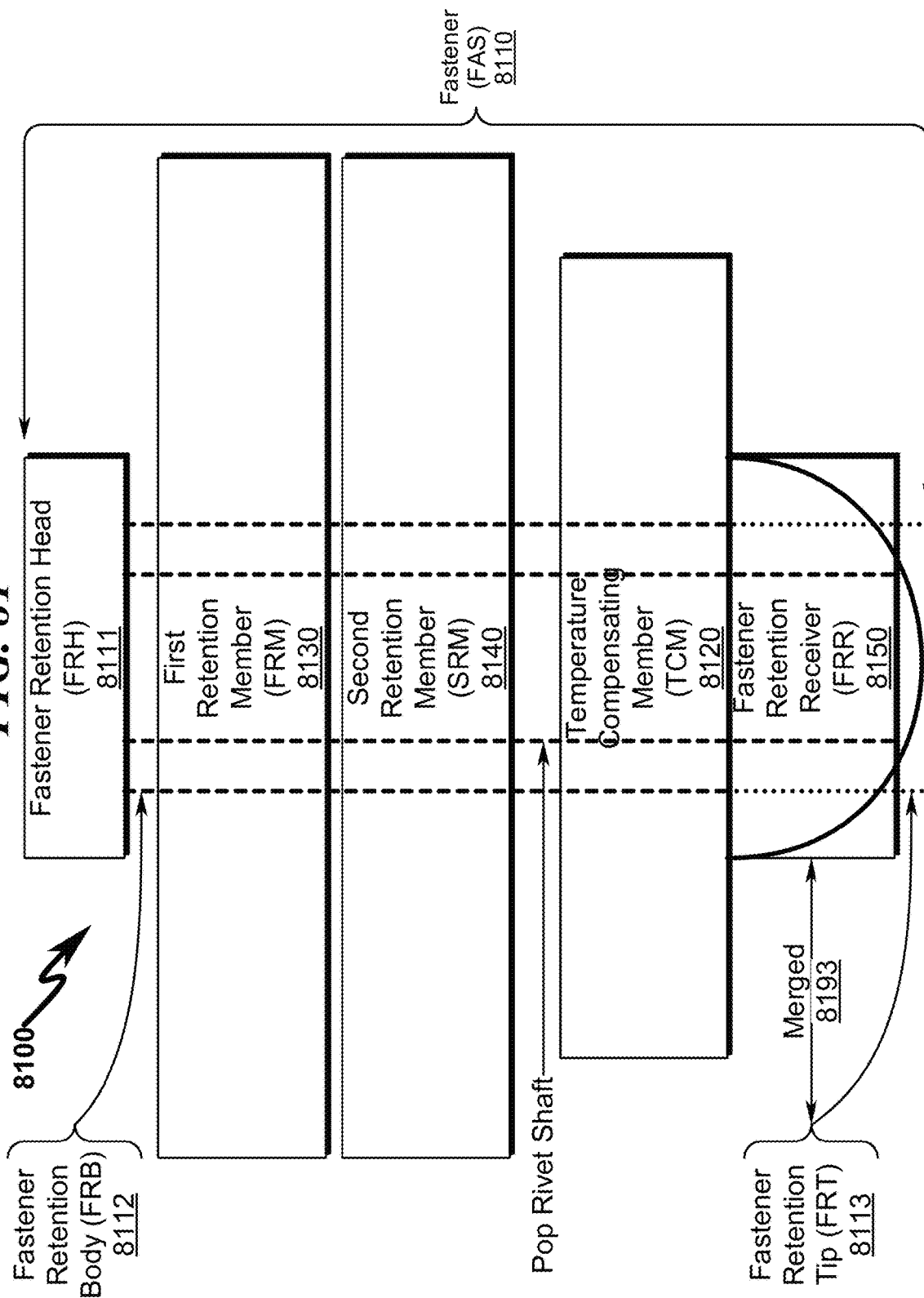
FIG. 81 illustrates a block diagram depicting a preferred exemplary TCM TSF pop rivet thermally stabilized fastener system.
Figure 82:
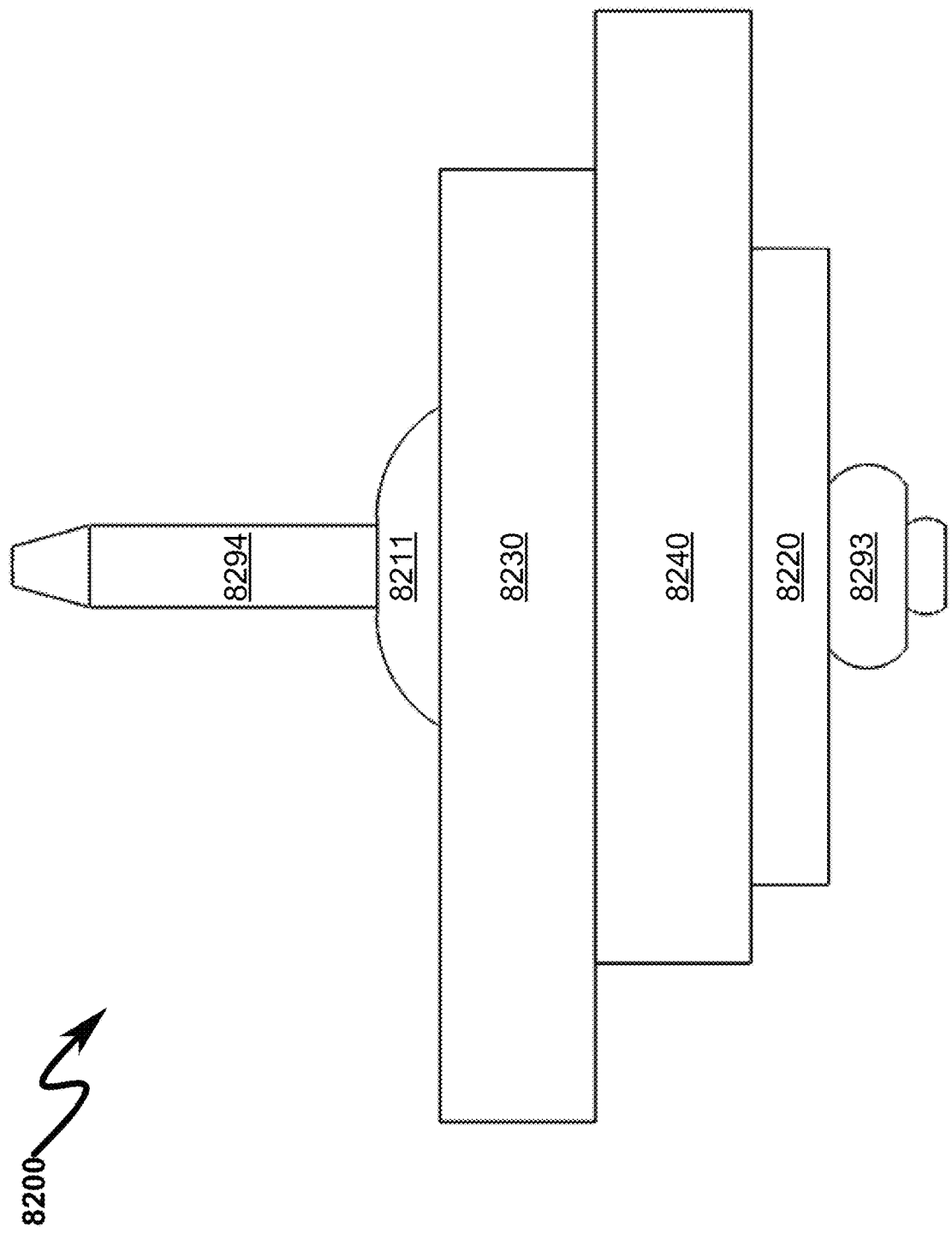
FIG. 82 illustrates a front view of a preferred exemplary TCM TSF pop rivet thermally stabilized fastener system embodiment.
Figure 83:
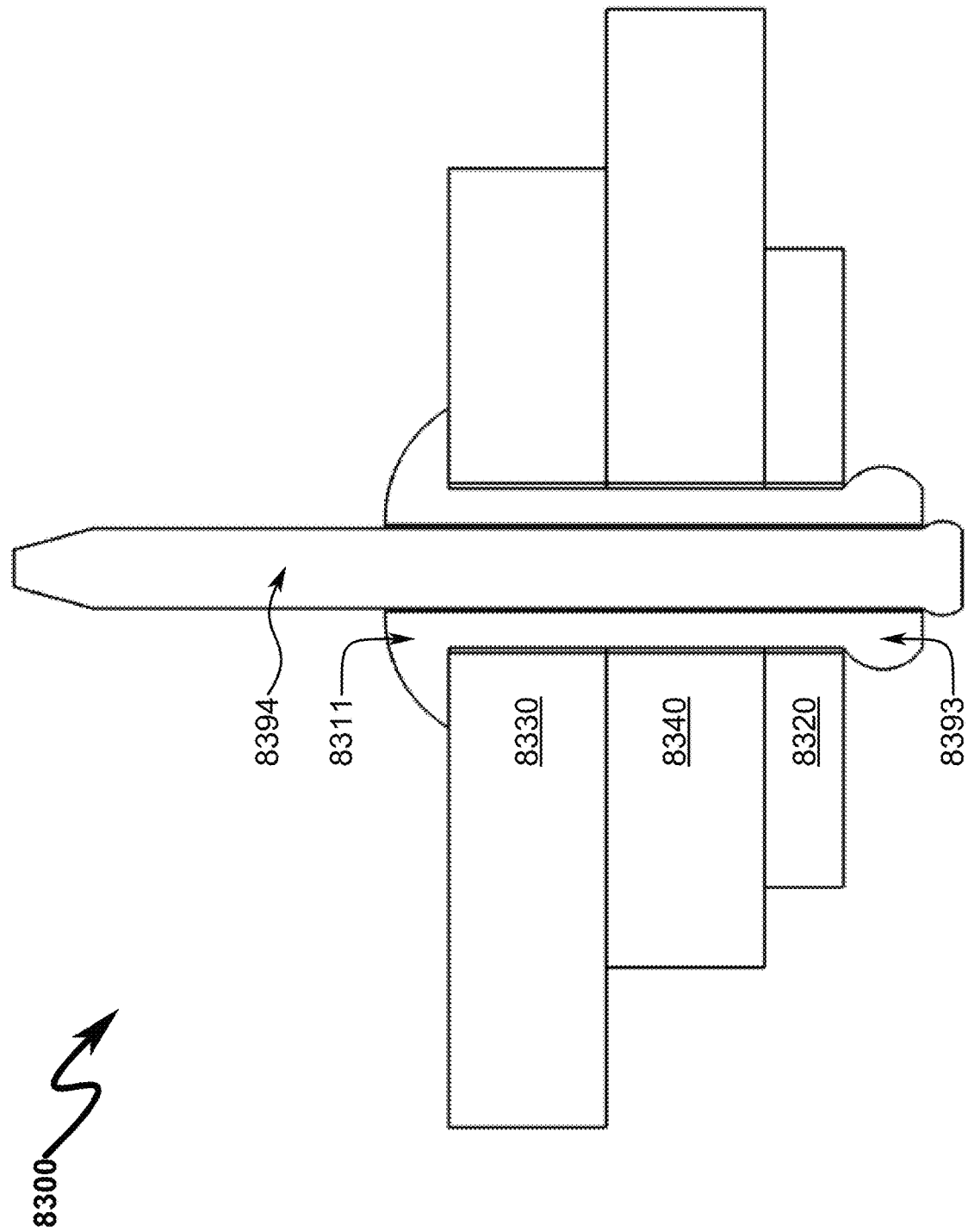
FIG. 83 illustrates a front section view of a preferred exemplary TCM TSF pop rivet thermally stabilized fastener system embodiment.
Figure 84:
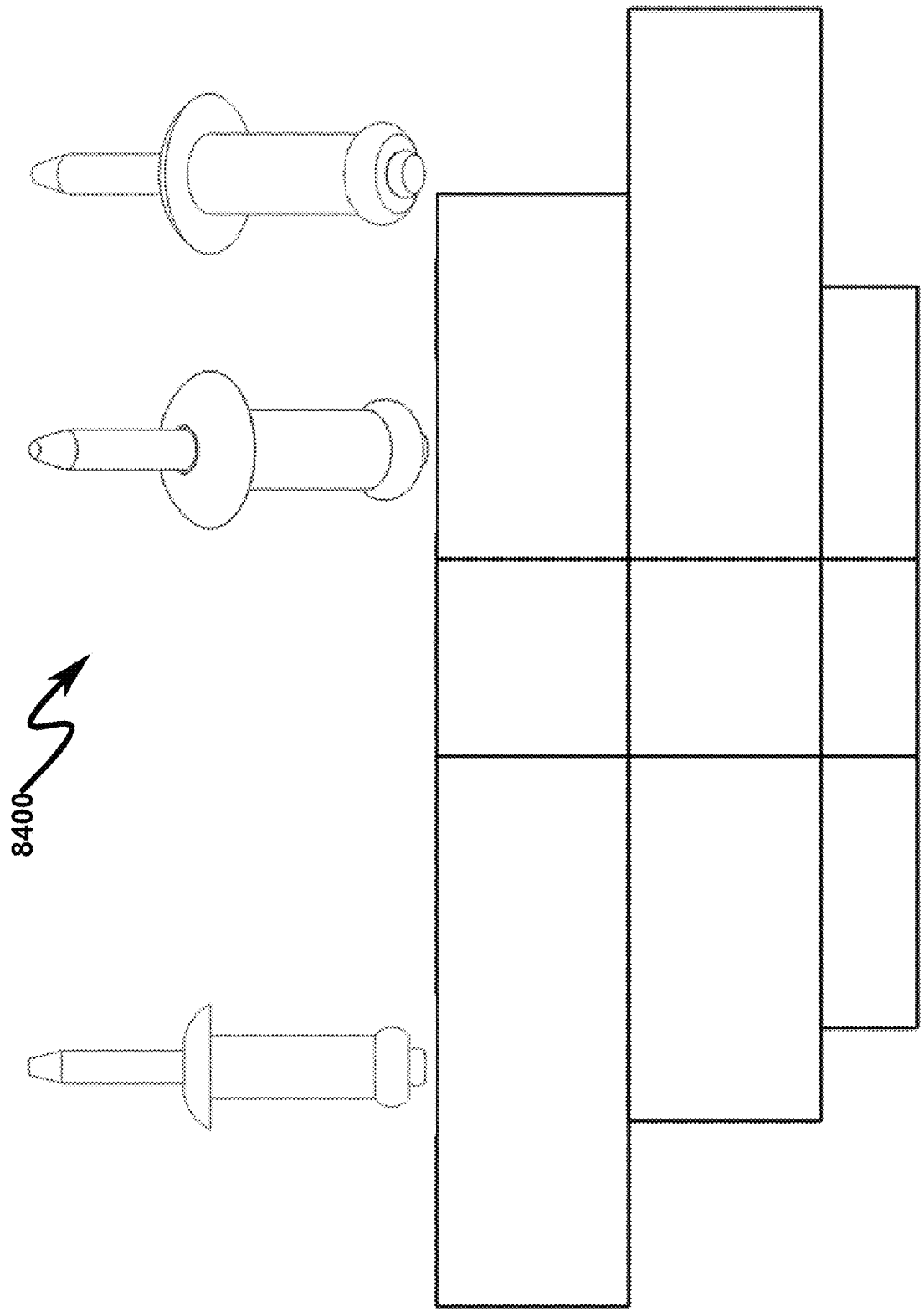
FIG. 84 illustrates a front section view (with fastener hidden) of a preferred exemplary TCM TSF pop rivet thermally stabilized fastener system embodiment and front, top perspective, and bottom perspective views of the rivet fastener.
Figure 85:
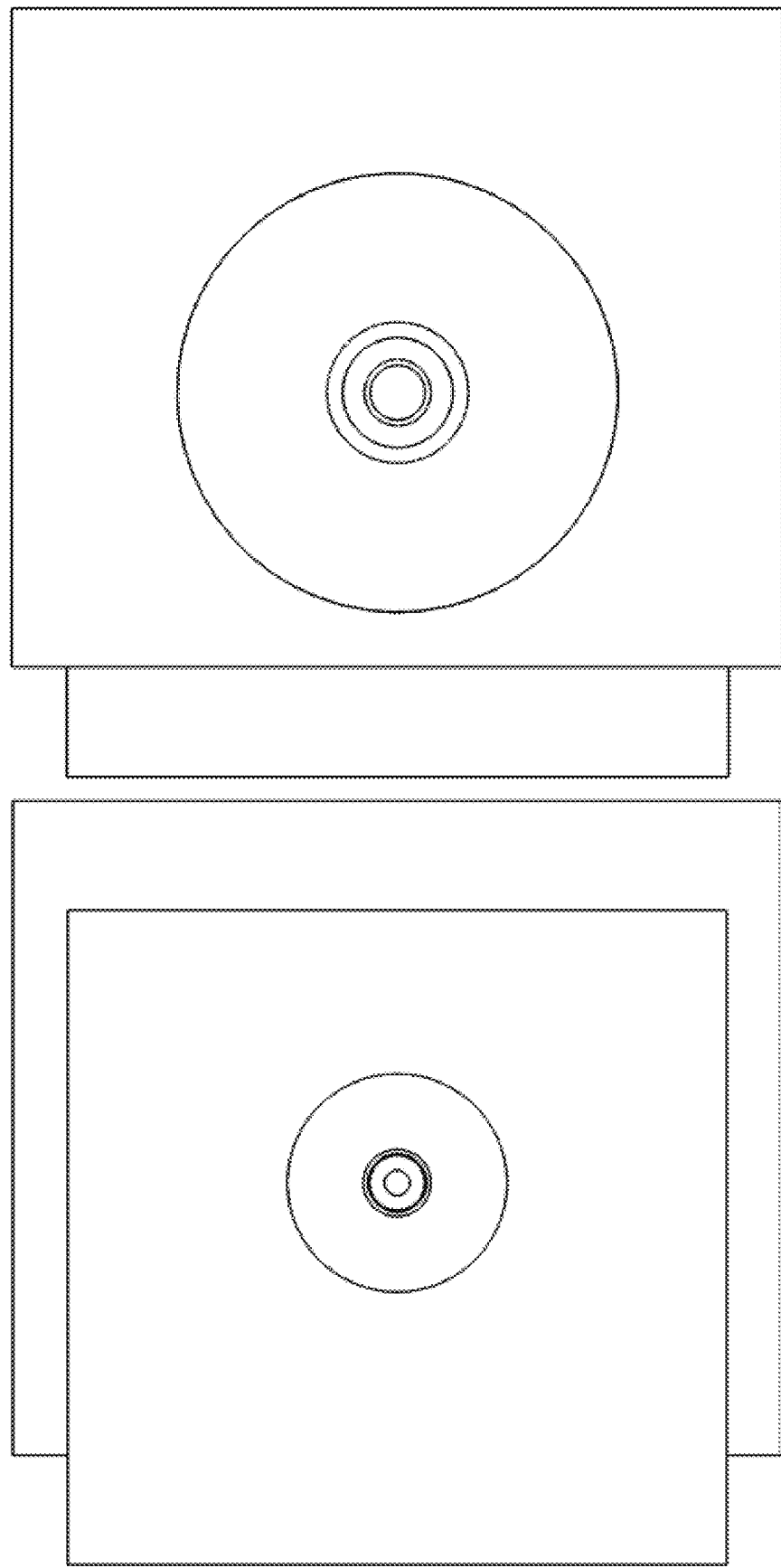
FIG. 85 illustrates top and bottom views of a preferred exemplary TCM TSF pop rivet thermally stabilized fastener system embodiment.
Figure 86:
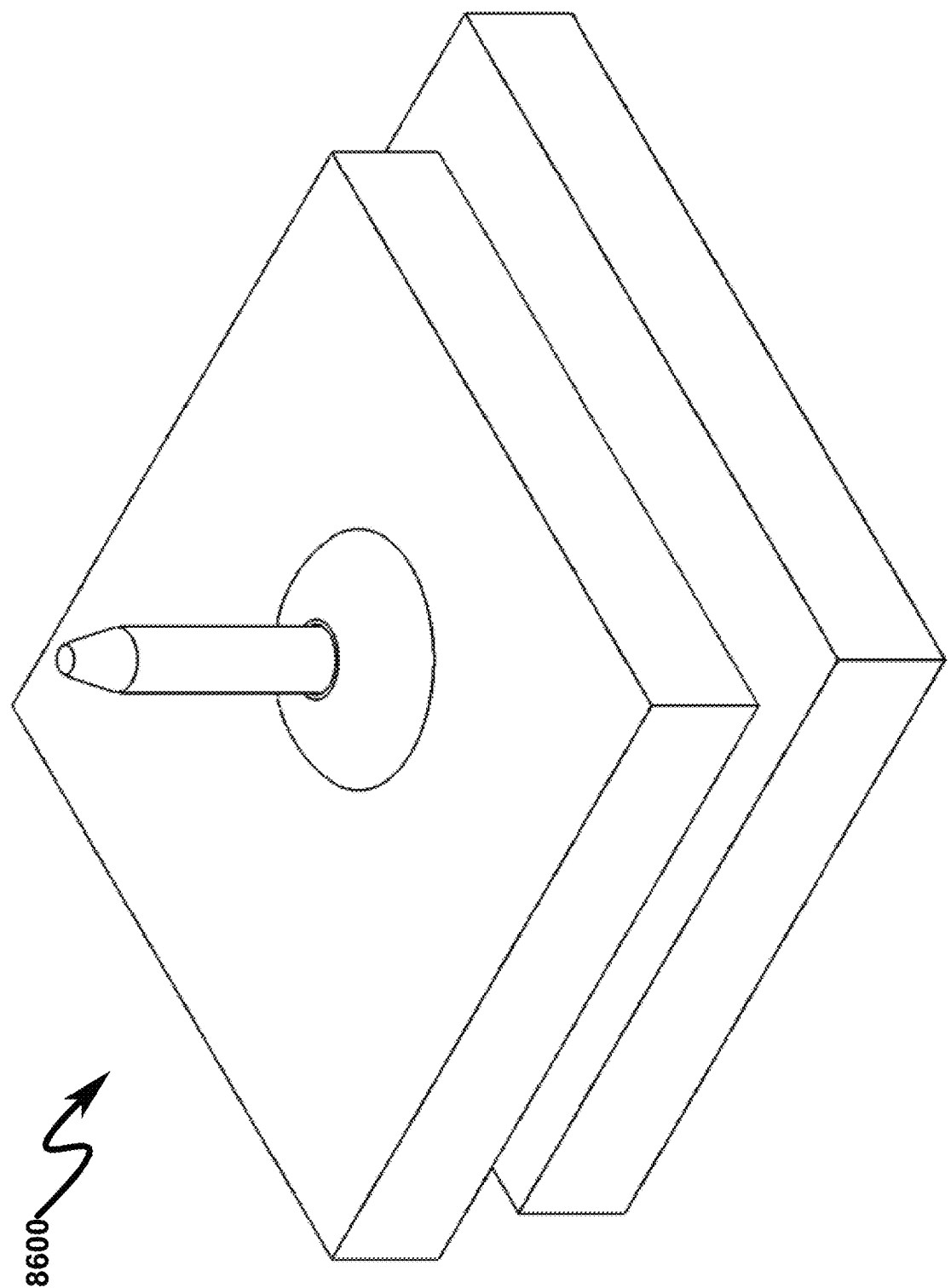
FIG. 86 illustrates a top front right perspective view of a preferred exemplary TCM TSF pop rivet thermally stabilized fastener system embodiment.
Figure 87:
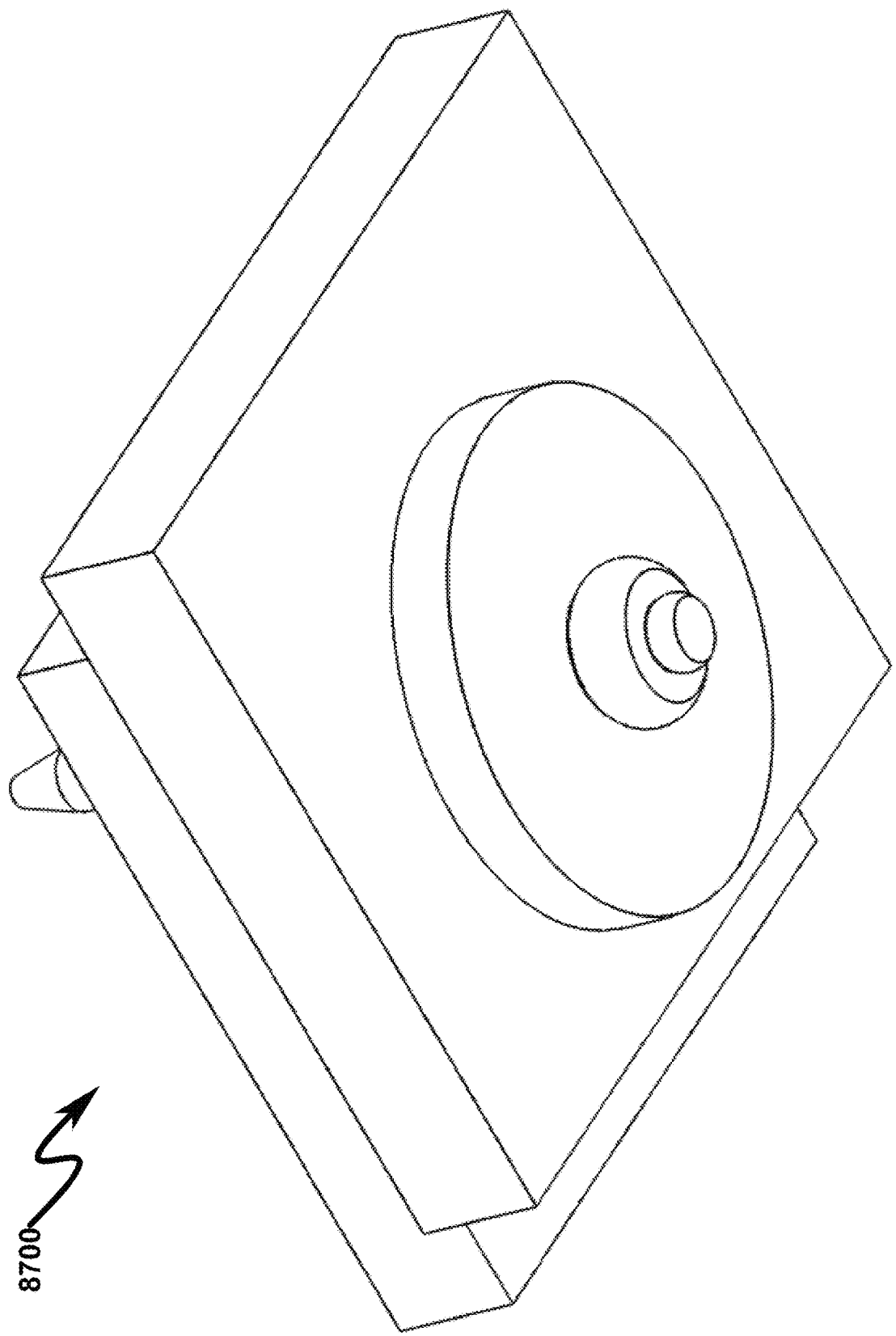
FIG. 87 illustrates a bottom front right perspective view of a preferred exemplary TCM TSF pop rivet thermally stabilized fastener system embodiment.
Figure 88:
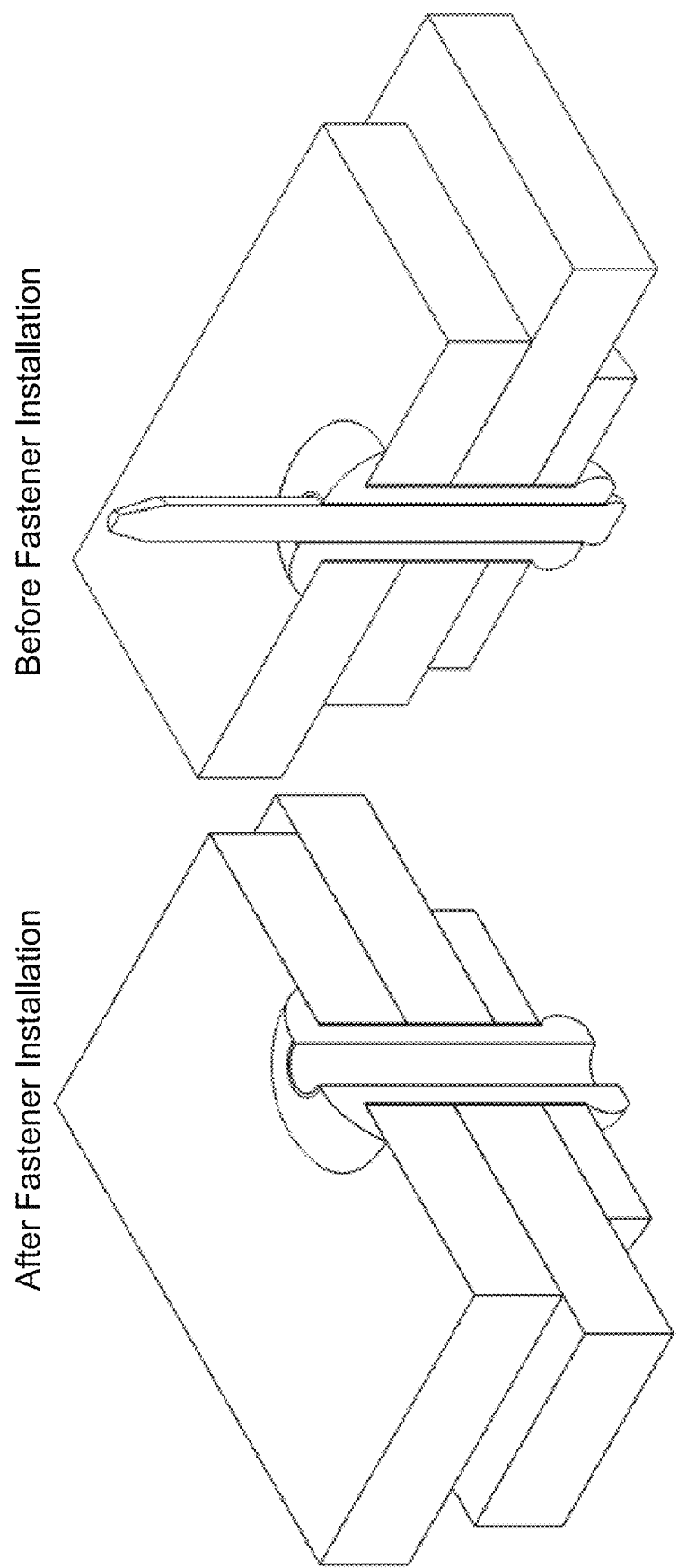
FIG. 88 illustrates a top front right perspective side section view (with pop rivet shaft hidden) and a top front right perspective front section view of a preferred exemplary TCM TSF pop rivet thermally stabilized fastener system embodiment.

A TCM TSF configuration utilizing a pop rivet fastener is generally depicted in FIG. 81 (8100)-FIG. 88 (8800). Here it can be seen that the fastener (7310) comprises a flat head pop rivet that constrains the MMS comprising the temperature compensating member (TCM) (8120, 8220, 8320), first retention member (FRM) (8130, 8230, 8330), and second retention member (SRM) (8140, 8240, 8340). The FRR (8150) is merged (8193, 8293, 8393) with the FAS (8110) by use of mechanical deformation of the FRT (8113) to form a secondary rivet head (SRH) (8193, 8293, 8393) in the form of a pop rivet shaft (8194, 8294, 8394) spread rivet head. This SRH (8193, 8293, 8393) deformation may take many forms that are well known to those skilled in the art, including but not limited to spread head and flat head formations. The pop rivet shaft (8194, 8294, 8394) is generally pulled from the remainder of the fastener via mechanical means, leaving the resulting fastener having the profile as generally depicted in the after/before section view diagrams of FIG. 88 (8800).

TCM TSF Tubular Fastener System Overview (8900)-(9600)

Figure 89:
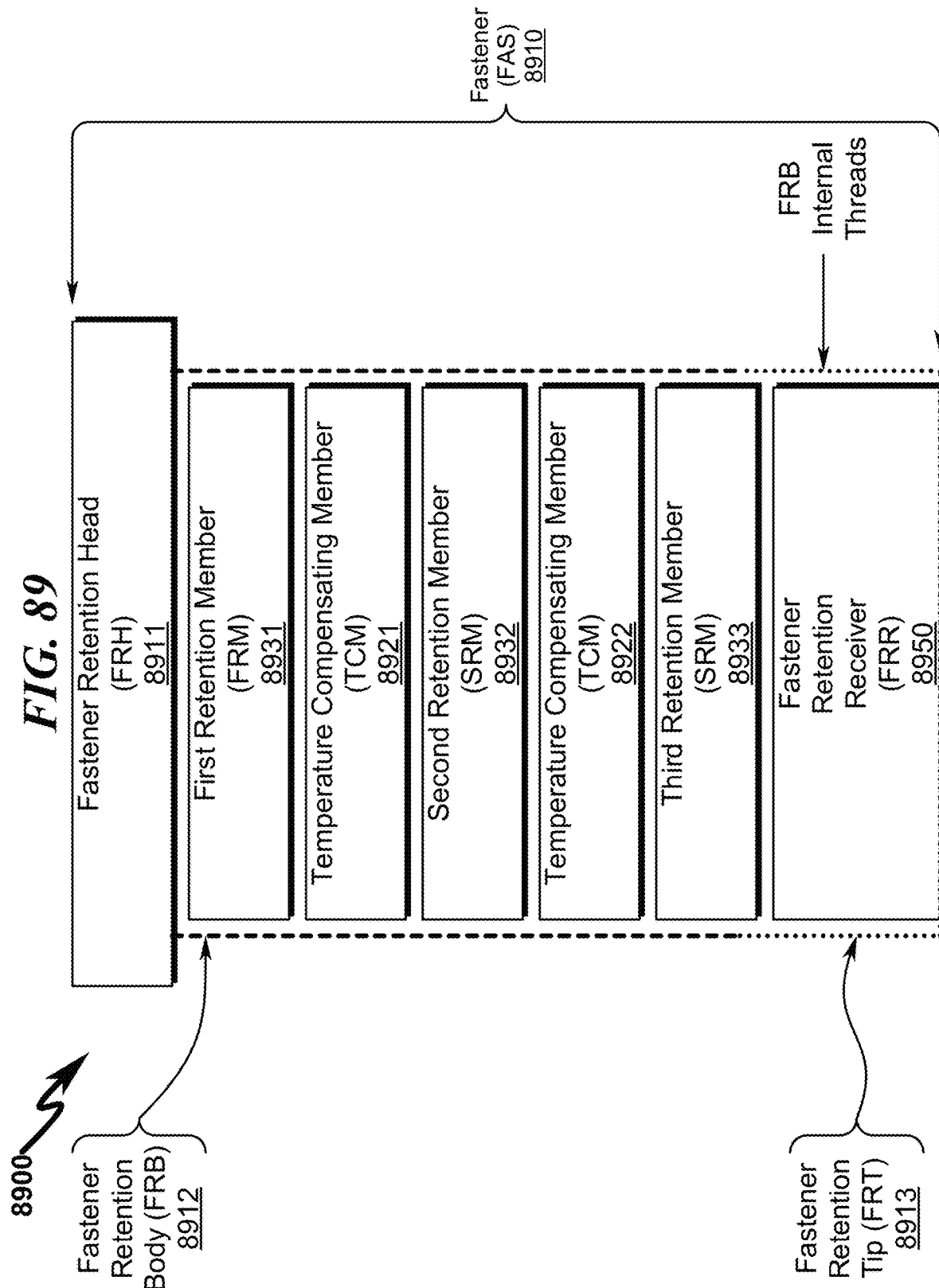
FIG. 89 illustrates a block diagram depicting a preferred exemplary tubular thermally stabilized fastener (TSF)
Figure 90:
FIG. 90 illustrates right top front and top left rear perspective views of an exemplary tubular thermally stabilized fastener (TSF) system as taught by the present invention incorporating a plurality of optical lenses (POL) contained within a lens retaining tube (LRT) and separated along a common optical axis (COA) with one or more focal length separators (FLS)
Figure 91:
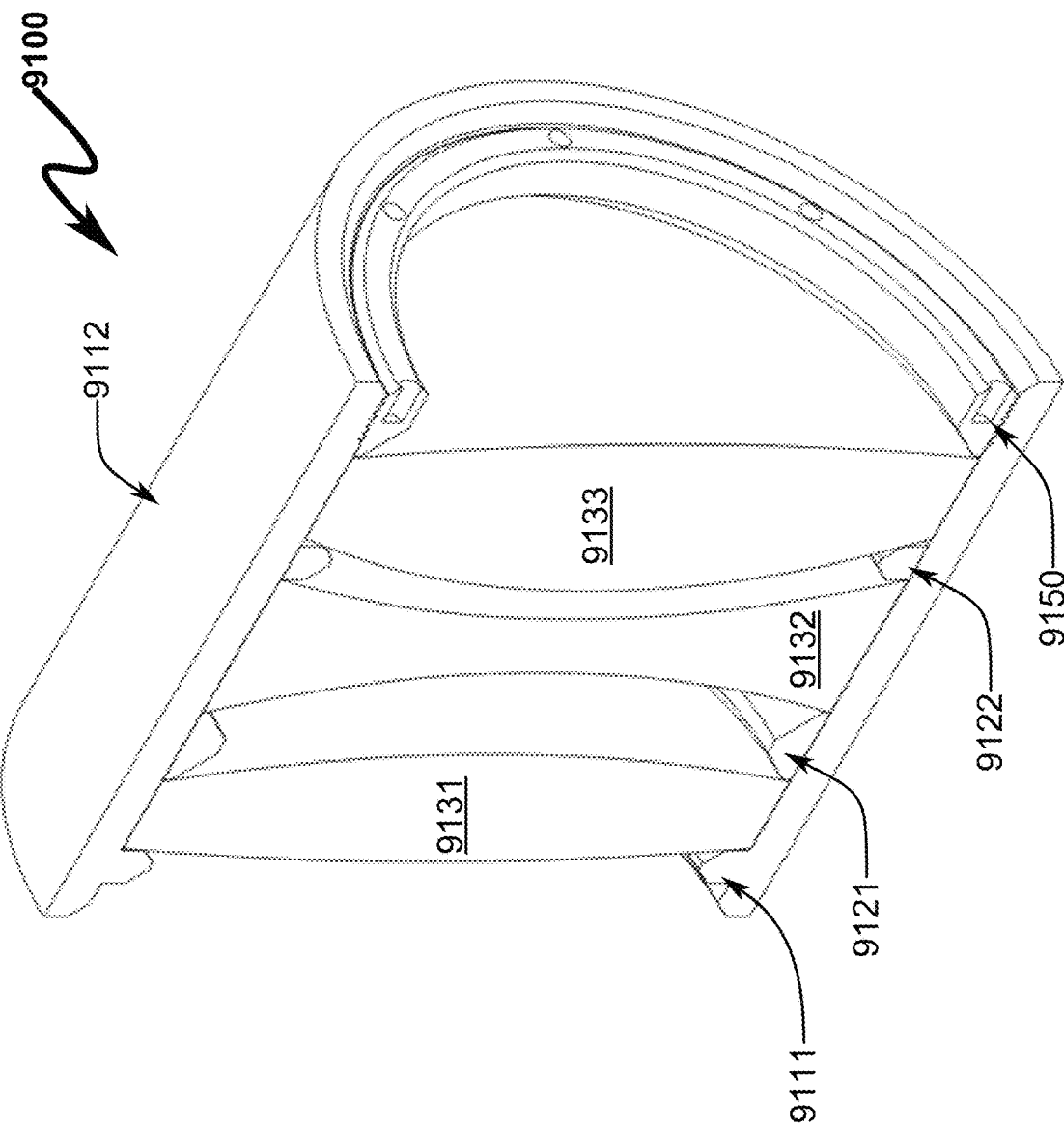
FIG. 91 illustrates a right top front perspective front section view of an exemplary tubular thermally stabilized fastener (TSF) system as taught by the present invention incorporating a plurality of optical lenses (POL) contained within a lens retaining tube (LRT) and separated along a common optical axis (COA) with one or more focal length separators (FLS)
Figure 92:
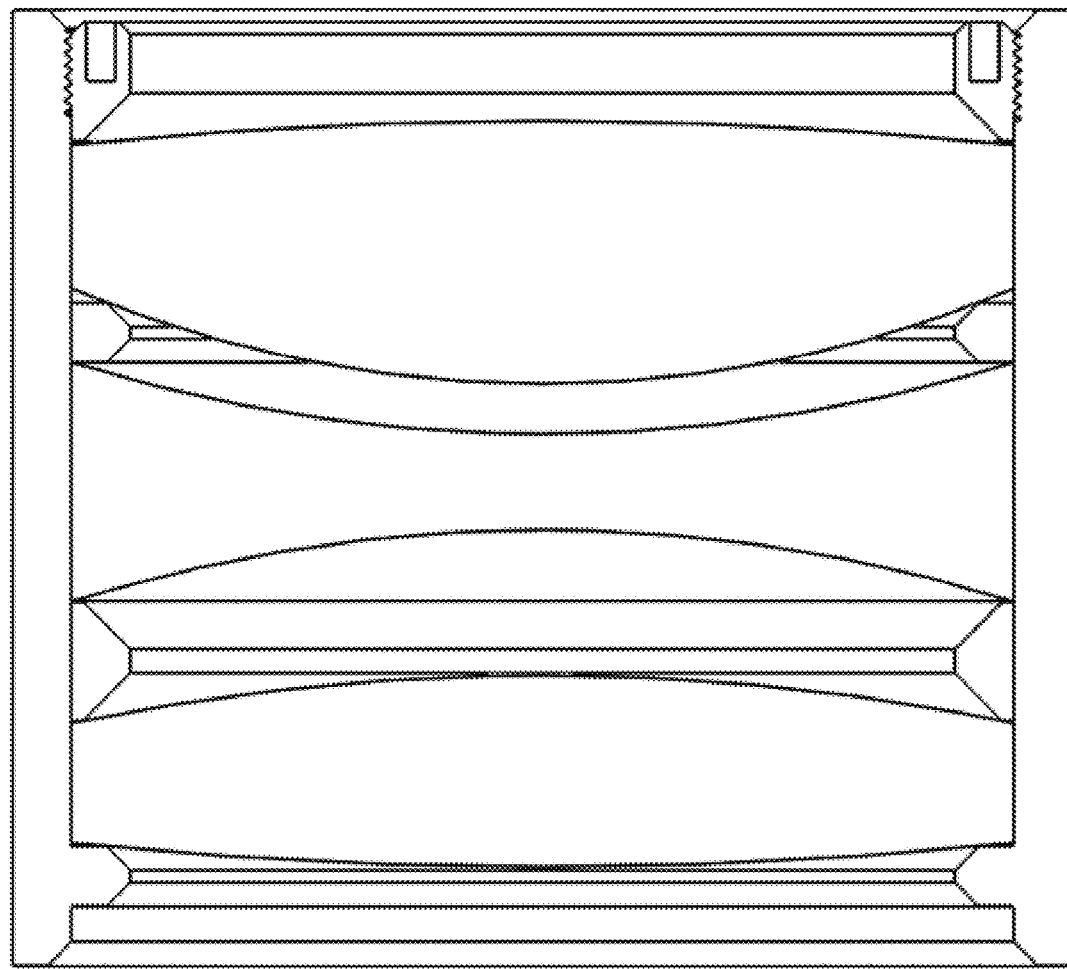
FIG. 92 illustrates a front section view of an exemplary tubular thermally stabilized fastener (TSF) system as taught by the present invention incorporating a plurality of optical lenses (POL) contained within a lens retaining tube (LRT) and separated along a common optical axis (COA) with one or more focal length separators (FLS)
Figure 93:
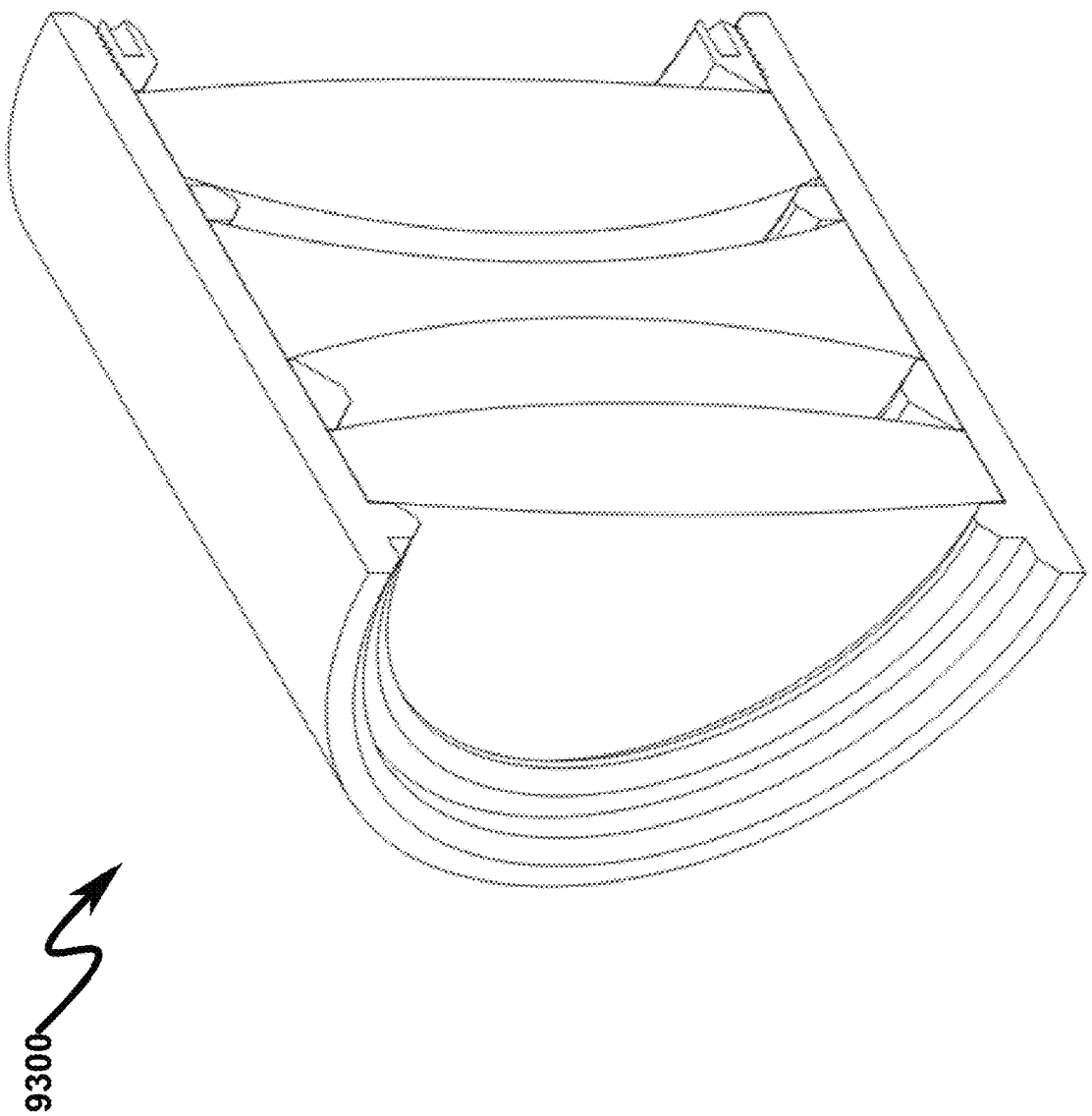
FIG. 93 illustrates a left top front perspective front section view of an exemplary tubular thermally stabilized fastener (TSF) system as taught by the present invention incorporating a plurality of optical lenses (POL) contained within a lens retaining tube (LRT) and separated along a common optical axis (COA) with one or more focal length separators (FLS)
Figure 94:
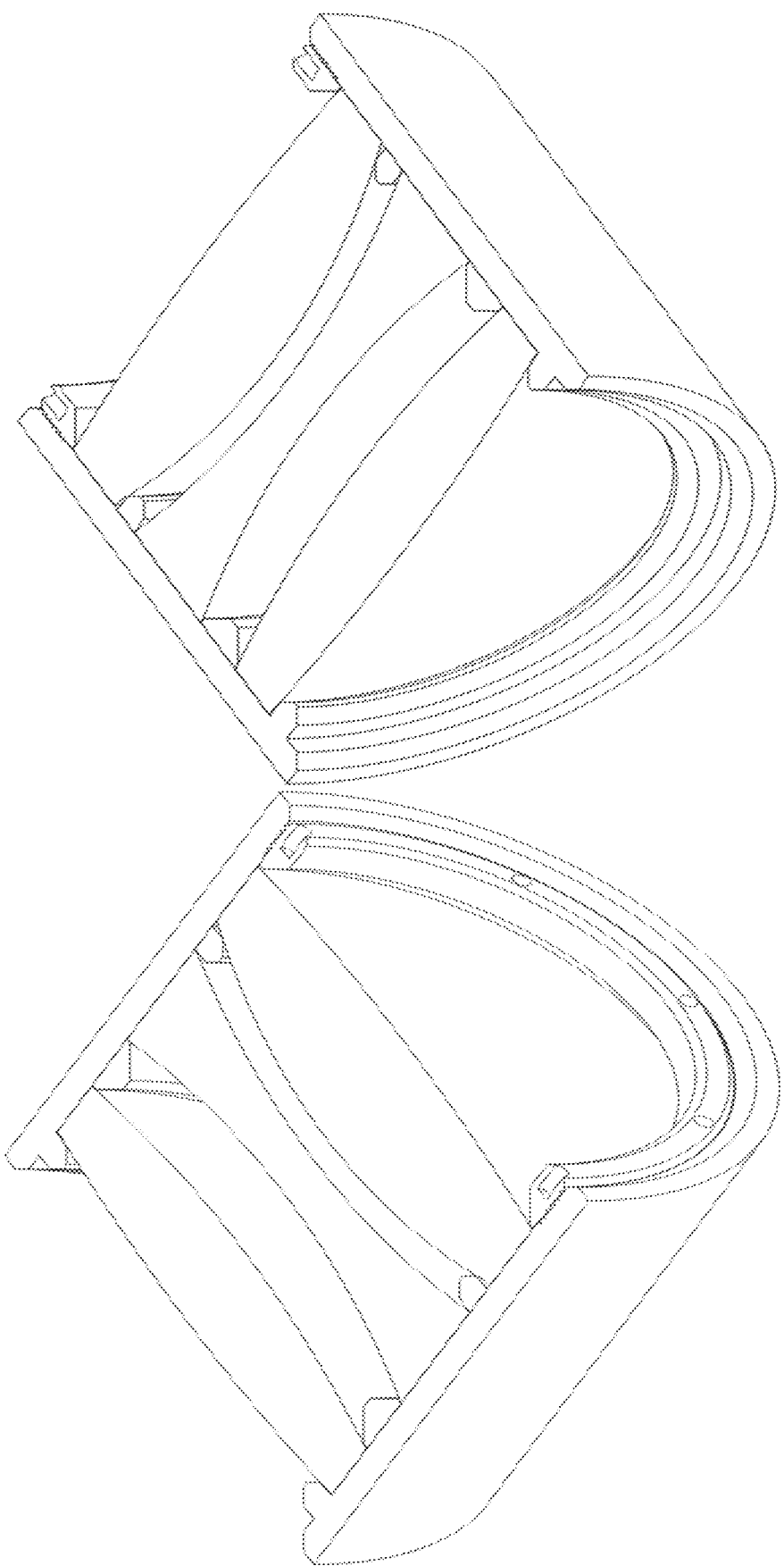
FIG. 94 illustrates right top front and left top rear perspective top section views of an exemplary tubular thermally stabilized fastener (TSF) system as taught by the present invention incorporating a plurality of optical lenses (POL) contained within a lens retaining tube (LRT) and separated along a common optical axis (COA) with one or more focal length separators (FLS)
Figure 95:
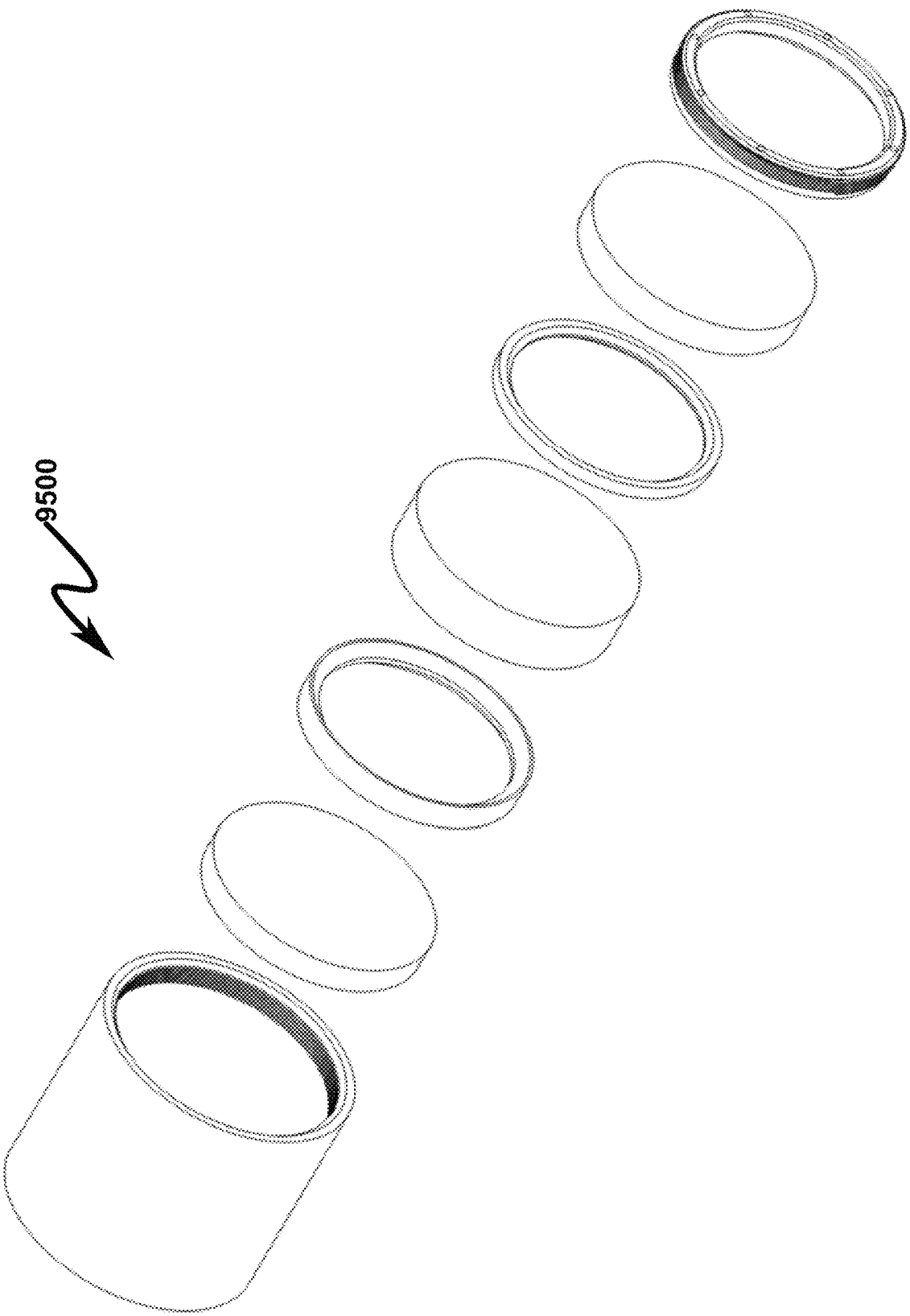
FIG. 95 illustrates a right top front perspective assembly view of an exemplary tubular thermally stabilized fastener (TSF) system as taught by the present invention incorporating a plurality of optical lenses (POL) contained within a lens retaining tube (LRT) and separated along a common optical axis (COA) with one or more focal length separators (FLS)
Figure 96:
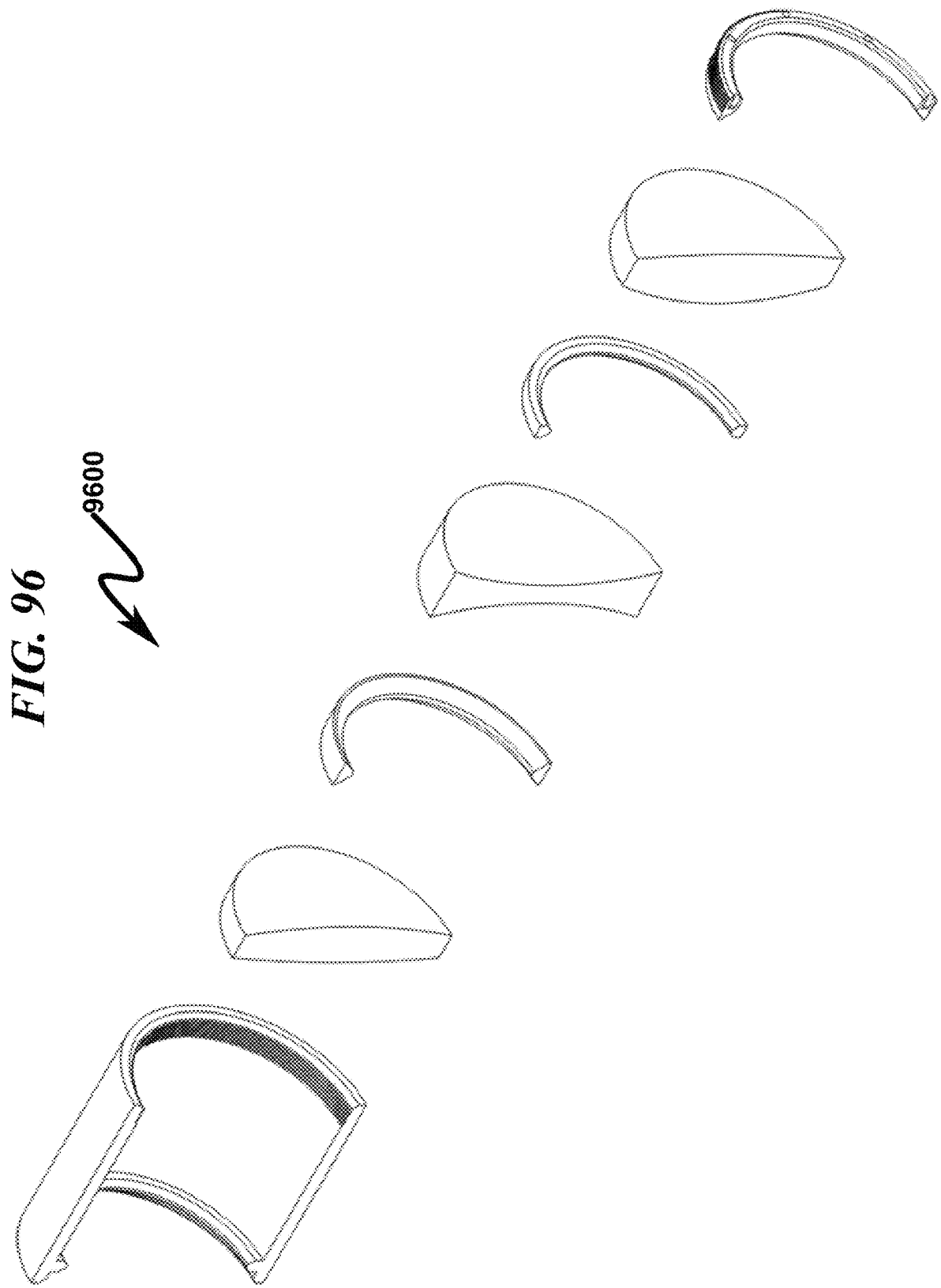
FIG. 96 illustrates a right top front perspective assembly front section view of an exemplary tubular thermally stabilized fastener (TSF) system as taught by the present invention incorporating a plurality of optical lenses (POL) contained within a lens retaining tube (LRT) and separated along a common optical axis (COA) with one or more focal length separators (FLS).

As generally depicted in FIG. 89 (8900)-FIG. 96 (9600), the present invention may be applied to situations where the fastener is in a tubular rod form such that the FRR engages the tubular rod surface internally. In this situation, the TSF is thermally stabilized via use of TSM spacers within the interior of the tube. Referencing the detail section view of FIG. 91 (9100) that describes a three-member MMS, it can be seen that in this example the MMS comprises three lenses (9131, 9132, 9133) that are retained by the FRH (9111), FRB (9112), and FRR (9150). TCM elements (9121, 9122) serve as thermal spacer elements to achieve the desired thermal compensation for the MMS to both define the force on these elements but also their relative position within the fastener (FAS) (9110) tube body, thus thermally stabilizing the optical pathway along the longitudinal optical axis of the lenses. In this example the FRR (9150) contains male threads that engage within the tubular interior of the FAS (9110), but other forms of attachment are also possible and well within the skill of one practiced in the art.

Fastener (FAS) TCM Integration

With any of the thermally stabilized fastener configurations shown in FIG. 9 (0900)-FIG. 96 (9600), the fastener (FAS) as indicated in the diagrams may incorporate a thermally compensated material such that the TCM component as shown may be augmented by a thermal characteristic in the fastener (FAS) or replaced by a fastener (FAS) having a compensating thermal characteristic such that the fastener (FAS) acts as the TCM in the overall MMS.

Exemplary TCM Materials

The TCM candidate materials may be selected from a list of materials that have been discovered to exhibit the required CTE when combined as indicated below:

$Ti_{100-A}X_A$ (X=at least one of Ni, Nb, Mo, Ta, Pd, Pt, or combinations thereof) (A=0 to 75 atomic percent composition), $Ti_{100-A-B}Ni_AX_B$ (X=at least one of Pd, Hf, Zr, Al, Pt, Au, Fe, Co, Cr, Mo, V, O or combinations thereof) (A=0 to 55 atomic percent composition and B=0 to 75 atomic percent composition such that A+B<100), $Ti_{100-A-B}Nb_AX_B$ (X=at least one of Al, Sn, Ta, Hf, Zr, Al, Au, Pt, Fe, Co, Cr, Mo, V, 0, or combinations thereof) (A=0 to 55 atomic percent composition and B=0 to 75 atomic percent composition such that A+B<100), $Ti_{100-A-B}Ta_AX_B$ (X=at least one of Al, Sn, Nb, Zr, Mo, Al, Au, Pt, Fe, Co, Cr, Hf, V, 0, or combinations thereof) (A=0 to 55 atomic percent composition and B=0 to 75 atomic percent composition such that A+B<100), $Ni_{100-A-B}Mn_AX_B$ (X=at least one of Ga, In, Sn, Al, Sb, Co, or combinations thereof) (A=0 to 50 atomic percent composition and B=0 to 50 atomic percent composition such that A+B<100), $Ni_{100-A-B-C}Mn_ACo_BX_C$ (X=at least one of Ga, In, Sn, Al, Sb, or combinations thereof) (A=0 to 50 atomic percent composition, B=0 to 50 atomic percent composition, and C=0 to 50 atomic percent composition such that A+B+C<100), $Ni_{100-A-B}Fe_AGa_B$ (A=0 to 50 atomic percent composition and B=0 to 50 atomic percent composition such that A+B<100), $CU_{100-A}X_A$ (X=at least one of Zn, Ni, Mn, Al, Be, or combinations thereof) (A=0 to 75 atomic percent composition), $Cu_{100-A-B}Al_AX_B$ (X=at least one of Zn, Ni, Mn, Be, or combinations thereof) (A=0 to 50 atomic percent composition and B=0 to 50 atomic percent composition such that A+B<100), $Cu_{100-A-B-C}Mn_AAl_BX_C$ (X=at least one of Zn, Ni, Be, or combinations thereof) (A=0 to 50 atomic percent composition, B=0 to 50 atomic percent composition, and C=0 to 50 atomic percent composition such that A+B+C<100), $Co_{100-A-B}Ni_AX_B$ (X=at least one of Al, Ga, Sn, Sb, In, or combinations thereof) (A=0 to 50 atomic percent composition and B=0 to 50 atomic percent composition such that A+B<100), $Fe_{100-A-B}Mn_AX_B$ (X=at least one of Ga, Ni, Co, Al, Ta, Si, or combinations thereof) (A=0 to 50 atomic percent composition and B=0 to 50 atomic percent composition such that A+B<100), $Fe_{100-A-B}Ni_AX_B$ (X=at least one of Ga, Mn, Co, Al, Ta, Si, or combinations thereof) (A=0 to 50 atomic percent composition and B=0 to 50 atomic percent composition such that A+B<100), $Fe_{100-A-B-C}Ni_ACO_BAl_CX_D$ (X=at least one of Ti, Ta, Nb, Cr, W or combinations thereof) (A=0 to 50 atomic percent composition, B=0 to 50 atomic percent composition, C=0 to 50 atomic percent composition, and D=0 to 50 atomic percent composition such that A+B+C+D<100), $Fe_{100-A-B-C}Ni_ACO_BTi_CX_D$ (X=at least one of Al, Ta, Nb, Cr, W or combinations thereof) (A=0 to 50 atomic percent composition, B=0 to 50 atomic percent composition, C=0 to 50 atomic percent composition, and D=0 to 50 atomic percent composition such that A+B+C+D<100), and combinations thereof that exhibit martensitic transformation.

NiTi, NiTiPd, NiTiHf, NiTiPt, NiTiAu, NiTiZr, NiMn, NiMnGa, NiMnSn, NiMnIn, NiMnAl, NiMnSb, NiCoMn, NiCoMnGa, NiCoMnSn, NiCoMnAl, NiCoMnIn, NiCoMnSb, NiFeGa, MnFeGa, TiNb, TiMo, TiNbAl, TiNbSn, TiNbTa, TiNbZr, TiNbO, CuMnAlNi, CuMnAl, CuZnAl, CuNiAl, CuAlBe, CoNi, CoNiAl, CoNiGa, FeMn, FeMnGa, FeMnNi, FeMnCo, FeMnAl, FeMnTa, FeMnNiAl, FeNiCoAl, FeNiCoAlTa, FeNiCoAlTi, FeNiCoAlNb, FeNiCoAlW, FeNiCoAlCr, FeMnSi, FeNiCo, FeNiCoTi, as well as derivations and combinations thereof that exhibit martensitic transformation.

Other TCM materials may be utilized as described in United States Utility Patent Application for CONTROLLED THERMAL COEFFICIENT PRODUCT SYSTEM AND METHOD by inventors James Alan Monroe, Ibrahim (nmn) Karaman, and Raymundo (nmn) Arroyave, filed with the USPTO on Jul. 22, 2016, with Ser. No. 15/217,594, EFS ID 26434102, confirmation number 5258, and other patents/patent applications incorporated herein.

System Summary

The present invention system may be broadly generalized as a thermally stabilized fastener system comprising:
(a) One or more plates stacked together that require a clamping load to maintain structural integrity of an assembly;
(b) A mechanical fastener that is placed through an aperture in the plate(s) and carries the clamping load;
(c) One or more plates with a selected thermal expansion coefficient and thickness which compensates for the thermal expansion mismatch between said plates and the mechanical fastener; and (d) A securing body that attaches to the mechanical fastener and applies the clamping load on the fastener system.

This general system summary may be augmented by the various elements described herein to produce a wide variety of invention embodiments consistent with this overall design description.

System Embodiment Alternatives

The present invention may utilize a number of tailored thermally compensate materials. While the creation of these CTE TCM materials may vary based on a number of manufacturing processes detailed in the incorporated patent documents, several preferred system alternatives will now be presented.

First Alternative System Summary

A first alternative present invention system embodiment may be broadly generalized as a thermally stabilized fastener (TSF) system comprising:
(a) fastener (FAS);
(b) fastener retention receiver (FRR); and
(c) mechanical member stack (MMS);
wherein:
the FAS comprises a fastener retention head (FRH), a fastener retention body (FRB), and a fastener retention tip (FRT);
the FRR comprises an engaging surface conforming to the FRT;
the MMS comprises a temperature compensating member (TCM) and at least a first retention member (FRM);
the FRB of the FAS is positioned pass through an aperture in the MMS;
the FRH and the FRR are configured to mechanically couple elements within the MMS via the FRB and the aperture;
the TCM comprises a metallic material having a tailored thermal expansion coefficient (TTC);
the TTC is selected to compensate for thermal expansion characteristics of the FAS and at least the FRM within the MMS such that force applied by the FRH and the FRR portions of the FAS to the MMS is tailored to a specific temperature force profile (TFP) over changes in temperature of the FAS and MMS;
the TCM is constructed by manufacturing a metallic material with a tailored thermal expansion coefficient in a selected range, comprising:
plastically deforming the metallic material comprising a first phase and a first thermal expansion coefficient;
transforming, in response to the plastic deforming, at least some of the first phase into a second phase; and
orienting the metallic material in at least one selected orientation;
wherein:
the metallic material comprises an alloy with a mixture of phases;
the mixture of phases comprises at least one phase capable of a martensitic transformation that is embedded in another phase or phases that may or may not be capable of martensitic transformation;
the second phase comprises martensite;
the plastic deforming comprises mechanical deformation;
the metallic material, subsequent to the plastic deformation, comprises a second thermal expansion coefficient;
the second thermal expansion coefficient is within a selected range; and
the second thermal expansion coefficient quantifies thermal expansion of the metallic material in at least one selected direction.

This general system summary may be augmented by the various elements described herein to produce a wide variety of invention embodiments consistent with this overall design description.

Second Alternative System Summary

A second alternative present invention system embodiment may be broadly generalized as a thermally stabilized fastener (TSF) system comprising:
(a) fastener (FAS);
(b) fastener retention receiver (FRR); and
(c) mechanical member stack (MMS);
wherein:
the FAS comprises a fastener retention head (FRH), a fastener retention body (FRB), and a fastener retention tip (FRT);
the FRR comprises an engaging surface conforming to the FRT;
the MMS comprises a temperature compensating member (TCM) and at least a first retention member (FRM);
the FRB of the FAS is positioned pass through an aperture in the MMS;
the FRH and the FRR are configured to mechanically couple elements within the MMS via the FRB and the aperture;
the TCM comprises a metallic material having a tailored thermal expansion coefficient (TTC);
the TTC is selected to compensate for thermal expansion characteristics of the FAS and at least the FRM within the MMS such that force applied by the FRH and the FRR portions of the FAS to the MMS is tailored to a specific temperature force profile (TFP) over changes in temperature of the FAS and MMS;
the TCM is constructed by manufacturing a metallic material with a tailored thermal expansion coefficient in a selected range, comprising:
plastically deforming the metallic material by applying tension in a first direction;
wherein:
the metallic material prior to the plastic deformation substantially comprises a first phase;
the application of the tension transforms at least some of the first phase into a second phase;
subsequent to the tensile plastic deformation, the metallic material comprises a coefficient of thermal expansion within a selected range;
the coefficient of thermal expansion quantifies thermal expansion of the metallic material in at least one second direction; and
the second direction is perpendicular or parallel to the first direction.

This general system summary may be augmented by the various elements described herein to produce a wide variety of invention embodiments consistent with this overall design description.

Third Alternative System Summary

A third alternative present invention system embodiment may be broadly generalized as a thermally stabilized fastener (TSF) system comprising:
    (a) fastener (FAS);
    (b) fastener retention receiver (FRR); and
    (c) mechanical member stack (MMS);
wherein:
    the FAS comprises a fastener retention head (FRH), a fastener retention body (FRB), and a fastener retention tip (FRT);
    the FRR comprises an engaging surface conforming to the FRT;
    the MMS comprises a temperature compensating member (TCM) and at least a first retention member (FRM);
    the FRB of the FAS is positioned pass through an aperture in the MMS;
    the FRH and the FRR are configured to mechanically couple elements within the MMS via the FRB and the aperture;
    the TCM comprises a metallic material having a tailored thermal expansion coefficient (TTC);
    the TTC is selected to compensate for thermal expansion characteristics of the FAS and at least the FRM within the MMS such that force applied by the FRH and the FRR portions of the FAS to the MMS is tailored to a specific temperature force profile (TFP) over changes in temperature of the FAS and MMS;
    the TCM is constructed by manufacturing a metallic material with a tailored thermal expansion coefficient in a selected range, comprising:
    plastically deforming the metallic material by applying compression in a first direction;
wherein:
    the metallic material prior to the compressive plastic deformation substantially comprises a first phase;
    the compressive plastic deformation of the metallic material transforms at least some of the first phase into a second phase using a compressive force in a first direction;
    subsequent to the compressive plastic deformation of the metallic material, the metallic material comprises a coefficient of thermal expansion within a selected range;
    the coefficient of thermal expansion quantifies thermal expansion of the metallic material in at least a second direction; and
    the second direction is perpendicular or parallel to the first direction.

This general system summary may be augmented by the various elements described herein to produce a wide variety of invention embodiments consistent with this overall design description.

Fourth Alternative System Summary

A fourth alternative present invention system embodiment may be broadly generalized as a thermally stabilized fastener (TSF) system comprising:
    (a) fastener (FAS);
    (b) fastener retention receiver (FRR); and
    (c) mechanical member stack (MMS);
wherein:
    the FAS comprises a fastener retention head (FRH), a fastener retention body (FRB), and a fastener retention tip (FRT);
    the FRR comprises an engaging surface conforming to the FRT;
    the MMS comprises a temperature compensating member (TCM) and at least a first retention member (FRM);
    the FRB of the FAS is positioned pass through an aperture in the MMS;
    the FRH and the FRR are configured to mechanically couple elements within the MMS via the FRB and the aperture;
    the TCM comprises a metallic material having a tailored thermal expansion coefficient (TTC);
    the TTC is selected to compensate for thermal expansion characteristics of the FAS and at least the FRM within the MMS such that force applied by the FRH and the FRR portions of the FAS to the MMS is tailored to a specific temperature force profile (TFP) over changes in temperature of the FAS and MMS;
    the TCM is constructed by manufacturing a metallic material with a tailored thermal expansion coefficient in a selected range, comprising:
    plastically deforming a metallic material comprising a first thermal expansion coefficient;
wherein:
    the metallic material comprises an alloy;
    the metallic material is comprised of a martensitic phase with or without the presence of other phases;
    the plastic deforming comprises mechanical deformation;
    the martensitic phase in the metallic material is oriented in at least one selected orientation in response to the mechanical deforming;
    the metallic material, subsequent to the plastic deforming, comprises a second thermal expansion coefficient due to the orientation;
    the second thermal expansion coefficient is within a selected range; and
    the second thermal expansion coefficient quantifies thermal expansion of the metallic material in at least one selected direction.

This general system summary may be augmented by the various elements described herein to produce a wide variety of invention embodiments consistent with this overall design description.

Method Summary

A preferred exemplary embodiment of the present invention method may be broadly generalized as a thermally stabilized fastener method comprising:
    (1) Selecting a fastener (FAS) type and size (this may occur from one or more FAS databases (0810)) (0801);
    (2) Selecting a fastener retention receiver (FRR) type and size (this may occur from one or more FRR databases (0820)) (0802);
    (3) Selecting the mechanical member stack (MMS) retention member(s) and thickness(es) (this may occur from one or more material databases describing the materials in the MMS (0830)) (0803);
    (4) Determining a thermal expansion rate (TER) for a combined thermal expansion differential for the FAS, the FRR, and the MMS (information for this calculation may occur from one or more FAS, FRR, and MMS databases (0810, 0820, 0830)) (0804);
    (5) Selecting a tailored CTE material with a compensating coefficient of expansion to compensate for the TER of the combination of the FAS, the FRR, and the MMS (this selection may be defined in a CTE material database (0840)) (0805);
(6) Determining the TCM thickness requirements for a desired mechanical load across a desired temperature range (0806);
(7) Fabricating the tailored CTE material to a desired form and thickness for insertion in the MMS (0807);
(8) Placing the fabricated CTE material in the MMS (0808); and
(9) Securing the CTE material and the MMS combination using the FAS and the FRR (0809).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system, method, and product-by-process may be augmented with a variety of ancillary embodiments, including but not limited to:
An embodiment wherein the metallic material comprises a material selected from a group consisting of:
(1) a material characterized by a general formula $Ti_{100-A}X_A$, wherein X is at least one of Ni, Nb, Mo, Ta, Pd, Pt, or combinations thereof, and A is in a range from 0 to 75 atomic percent composition;
(2) a material characterized by a general formula $Ti_{100-A-B}Ni_AX_B$, wherein X is at least one of Pd, Hf, Zr, Al, Pt, Au, Fe, Co, Cr, Mo, V, O or combinations thereof, and A is in a range from 0 to 55 atomic percent composition, and B is in a range from 0 to 75 atomic percent composition such that A plus B is less than 100;
(3) a material characterized by a general formula $Ti_{100-A-B}Nb_AX_B$, wherein X is at least one of Al, Sn, Ta, Hf, Zr, Al, Au, Pt, Fe, Co, Cr, Mo, V, 0, or combinations thereof, and A is in a range from 0 to 55 atomic percent composition, and B is in a range from 0 to 75 atomic percent composition such that A plus B is less than 100;
(4) a material characterized by a general formula $Ti_{100-A-B}Ta_AX_B$, wherein X is at least one of Al, Sn, Nb, Zr, Mo, Al, Au, Pt, Fe, Co, Cr, Hf, V, 0, or combinations thereof, and A is in a range from 0 to 55 atomic percent composition, and B is in a range from 0 to 75 atomic percent composition such that A plus B is less than 100;
(5) a material characterized by a general formula $Ni_{100-A-B}Mn_AX_B$, wherein X is at least one of Ga, In, Sn, Al, Sb, Co, or combinations thereof, and A is in a range from 0 to 50 atomic percent composition, and B is in a range from 0 to 50 atomic percent composition such that A plus B is less than 100;
(6) a material characterized by a general formula $Ni_{100-A-B-C}Mn_ACo_BX_C$, wherein X is at least one of Ga, In, Sn, Al, Sb, or combinations thereof, and A is in a range from 0 to 50 atomic percent composition, B is in a range from 0 to 50 atomic percent composition, and C is in a range from 0 to 50 atomic percent composition such that A plus B plus C is less than 100;
(7) a material characterized by a general formula $Ni_{100-A-B}Fe_AGa_B$ wherein A is in a range from 0 to 50 atomic percent composition, and B is in a range from 0 to 50 atomic percent composition such that A plus B is less than 100;
(8) a material characterized by a general formula $Cu_{100-A}X_A$, wherein X is at least one of Zn, Ni, Mn, Al, Be, or combinations thereof, and A is in a range from 0 to 75 atomic percent composition;
(9) a material characterized by a general formula $Cu_{100-A-B}Al_AX_B$, wherein X is at least one of Zn, Ni, Mn, Be, or combinations thereof, and A is in a range from 0 to 50 atomic percent composition, and B is in a range from 0 to 50 atomic percent composition such that A plus B is less than 100;
(10) a material characterized by a general formula $Cu_{100-A-B-C}Mn_AAl_BX_C$, wherein X is at least one of Zn, Ni, Be, or combinations thereof, and A is in a range from 0 to 50 atomic percent composition, B is in a range from 0 to 50 atomic percent composition, and C is in a range from 0 to 50 atomic percent composition such that A plus B plus C is less than 100;
(11) a material characterized by a general formula $Co_{100-A-B}Ni_AX_B$, wherein X is at least one of Al, Ga, Sn, Sb, In, or combinations thereof, and A is in a range from 0 to 50 atomic percent composition, and B is in a range from 0 to 50 atomic percent composition such that A plus B is less than 100;
(12) a material characterized by a general formula $Fe_{100-A-B}Mn_AX_B$, wherein X is at least one of Ga, Ni, Co, Al, Ta, Si, or combinations thereof, and A is in a range from 0 to 50 atomic percent composition, and B is in a range from 0 to 50 atomic percent composition such that A plus B is less than 100;
(13) a material characterized by a general formula $Fe_{100-A-B}Ni_AX_B$, wherein X is at least one of Ga, Mn, Co, Al, Ta, Si, or combinations thereof, and A is in a range from 0 to 50 atomic percent composition, and B is in a range from 0 to 50 atomic percent composition such that A plus B is less than 100;
(14) a material characterized by a general formula $Fe_{100-A-B-C}Ni_ACo_BAl_CX_D$, wherein X is at least one of Ti, Ta, Nb, Cr, W or combinations thereof, and A is in a range from 0 to 50 atomic percent composition, B is in a range from 0 to 50 atomic percent composition, C is in a range from 0 to 50 atomic percent composition, and D is in a range from 0 to 50 atomic percent composition such that such that A plus B plus C plus D is less than 100;
(15) a material characterized by a general formula $Fe_{100-A-B-C}Ni_ACo_BTi_CX_D$, wherein X is at least one of Al, Ta, Nb, Cr, W or combinations thereof, and A is in a range from 0 to 50 atomic percent composition, B is in a range from 0 to 50 atomic percent composition, C is in a range from 0 to 50 atomic percent composition, and D is in a range from 0 to 50 atomic percent composition such that such that A plus B plus C plus D is less than 100;
An embodiment wherein the deforming is achieved by at least one of:
(1) hot-rolling;
(2) cold-rolling;

(3) plain strain compression;
(4) bi-axial tension;
(5) conformal processing;
(6) bending;
(7) drawing;
(8) wire-drawing;
(9) swaging;
(10) conventional extrusion;
(11) equal channel angular extrusion;
(12) precipitation heat treatment under stress;
(13) tempering;
(14) annealing;
(15) sintering;
(16) tension processing;
(17) compression processing;
(18) torsion processing;
(19) cyclic thermal training under stress; and
(20) combinations thereof.

An embodiment wherein the predetermined range of the coefficient of thermal expansion ranges from $-150\times 10^{-6}K^{-1}$ to $+500\times 10^{-6}K^{-1}$.

An embodiment wherein the deforming of the metallic material further comprises texturing the metallic material in a direction comprising at least one of a [111], a [100], or a [001] direction.

An embodiment wherein the second thermal expansion coefficient is negative.

An embodiment wherein the sum of the first thermal expansion coefficient and the second thermal expansion coefficient is zero.

An embodiment wherein:
the deforming the metallic material comprises applying tension in at least one direction; and
the second thermal expansion characteristic subsequent to the deformation is in the at least one direction.

An embodiment wherein:
the deforming the metallic material comprises applying compression in a first direction;
the second thermal expansion characteristic subsequent to the deformation is in at least one predetermined direction; and
the at least one predetermined direction is perpendicular to the first direction.

An embodiment wherein:
the deforming the metallic material comprises applying shear in a first direction;
the second thermal expansion characteristic subsequent to deformation is in at least one predetermined direction; and
the at least one predetermined direction is 45° to the first direction.

An embodiment wherein the plastic deforming of the metallic material comprises applying tension in at least one direction, wherein the tailored thermal expansion of the metallic material subsequent to the plastic deforming of the metallic material is in the at least one direction in the metallic material.

An embodiment wherein the plastic deforming of the metallic material comprises applying compression in a first direction, wherein the tailored thermal expansion of the metallic material subsequent to the plastic deforming of the metallic material is in at least one selected direction, and wherein the selected direction is perpendicular to the first direction.

An embodiment wherein the plastic deforming of the metallic material comprises applying shear in a first direction, wherein the tailored thermal expansion of the metallic material subsequent to the plastic deforming of the metallic material is in at least one selected direction, and wherein the selected direction is 45° to the first direction.

An embodiment wherein the metallic material comprises: NiTi, NiFeGa, TiNb, TiMo, CuMnAlNi, CuMnAl, CuZnAl, CuNiAl, FeNiCoTi, CuAlBe, or is at least one of:
characterized by a general formula NiTiX, wherein X is at least one of Pd, Hf, Zr, Al, Pt, Au;
characterized by a general formula NiMnX, wherein X is at least one of Ga, In, Sn, Al, Sb;
characterized by a general formula NiCoMnX, wherein X is at least one of Ga, In, Sn, Al, Sb;
characterized by a general formula TiNbX, wherein X is at least one of Al,Sn,Ta,Zr,Mo,Hf,V,O;
characterized by a general formula CoNiX, wherein X is at least one of Al, Ga, Sn, Sb, In;
characterized by a general formula TiTaX, wherein X is at least one of Al,Sn,Nb,Zr,Mo,Hf,V,O;
characterized by a general formula FeMnX, wherein X is at least one of Ga, Mn, Ni, Co, Al, Ta, Si;
characterized by a general formula FeNiCoAlX, wherein X is at least one of Ta, Ti, Nb, Cr, W;
and combinations thereof.

An embodiment wherein the plastic deforming is achieved by at least one of hot-rolling, cold-rolling, plane strain compression, bi-axial tension, conformal processing, bending, drawing, wire-drawing, swaging, conventional extrusion, equal channel angular extrusion, precipitation heat treatment under stress, tempering, annealing, sintering, monotonic tension processing, monotonic compression processing, monotonic torsion processing, cyclic thermal training under stress, and combinations thereof.

An embodiment further comprising combining the plastically deformed metallic material with a different type of material to form a two-dimensional composite material, wherein the different type of material is at least one of a polymer and a ceramic.

An embodiment further comprising combining the plastically deformed metallic material into a different type of material to form one of a two-dimensional and a three-dimensional composite material.

An embodiment wherein the composite material comprises at least one ceramic, polymer, or second metallic material, or combinations thereof, wherein the second metallic material is different than the plastically deformed metallic material.

An embodiment wherein the thermally stabilized fastener (TSF) comprises:
(1) A tubular fastener retention body (FRB) that is internally threaded;
(2) A first fastener retention receiver (FRR) that is externally threaded and engages the internal threads of FRB;
(3) A mechanical member stack (MMS) inside the FRB that does not engage the internal threads and is in contact with the first FRR; and
(4) A second FRR that engages the internal threads of the FRB and applies a clamping force to the first FRR through the MMS.

An embodiment wherein the FAS comprises a rivet.
An embodiment wherein the FAS comprises a tubular fastener.

An embodiment wherein the FAS is a fastener selected from a group consisting of: bolt; cap screw; socket head cap screw; rivet; and tubular rod.

One skilled in the art will recognize that other embodiments are possible based on combinations of elements taught within the above invention description.

CONCLUSION

A thermally stabilized fastener system and method has been disclosed. The disclosed system/method integrates a fastener (FAS) incorporating a faster retention head (FRH), fastener retention body (FRB), and fastener retention tip (FRT) to couple a mechanical member stack (MMS) in a thermally stabilized fashion using a fastener retention receiver (FRR). The MMS includes a temperature compensating member (TCM), a first retention member (FRM), and an optional second retention member (SRM). The TCM is constructed using a tailored thermal expansion coefficient (TTC) that permits the TCM to compensate for the thermal expansion characteristics of the FAS, FRM, and SRM such that the force applied by the FRH and FRR portions of the FAS to the MMS is tailored to a specific temperature force profile (TFP) over changes in MMS/FAS temperature. The TCM may be selected with a TTC to achieve a uniform TFP over changes in MMS/FAS temperature.

What is claimed is:

1. A thermally stabilized fastener (TSF) system comprising:
   (a) fastener (FAS);
   (b) fastener retention receiver (FRR); and
   (c) mechanical member stack (MMS);
   wherein:
   said FAS comprises a fastener retention head (FRH), a fastener retention body (FRB), and a fastener retention tip (FRT);
   said FRR comprises an engaging surface conforming to said FRT;
   said MMS comprises a temperature compensating member (TCM) and at least a first retention member (FRM);
   said FRB of said FAS is positioned pass through an aperture in said MMS;
   said FRH and said FRR are configured to mechanically couple elements within said MMS via said FRB and said aperture;
   said TCM comprises a metallic material having a tailored thermal expansion coefficient (TTC);
   said TTC is selected to compensate for thermal expansion characteristics of said FAS and at least said FRM within said MMS such that force applied by said FRH and said FRR portions of said FAS to said MMS is tailored to a specific temperature force profile (TFP) over changes in temperature ($\Delta T$) of said FAS and said MMS;
   said TFP exhibits a change in said force ($\Delta F$) in response to said $\Delta T$ that is proportional to said TTC of said TCM, such that selection of said TTC of said TCM serves to increase, not change, or decrease said $\Delta F$ upon increases or decreases in said $\Delta T$;
   said TCM is constructed by manufacturing a metallic material with a tailored thermal expansion coefficient in a selected range, comprising:
   plastically deforming said metallic material comprising a first phase and a first thermal expansion coefficient;
   transforming, in response to said plastic deforming, at least some of said first phase into a second phase; and
   orienting said metallic material in at least one selected orientation;
   wherein:
   said metallic material comprises an alloy with a mixture of phases;
   said mixture of phases comprises at least one phase capable of a martensitic transformation that is embedded in another phase or phases;
   said second phase comprises martensite;
   said plastic deforming comprises mechanical deformation;
   said metallic material, subsequent to said plastic deformation, comprises a second thermal expansion coefficient;
   said second thermal expansion coefficient is within a selected range;
   said second thermal expansion coefficient quantifies thermal expansion of said metallic material in at least one selected direction; and
   wherein said metallic material comprises:
   NiTi, NiFeGa, or is at least one of:
   characterized by a general formula NiTiX, wherein X is at least one of Pd, Hf, Zr, Al, Pt, Au;
   characterized by a general formula NiMnX, wherein X is at least one of Ga, In, Sn, Al, Sb;
   characterized by a general formula NiCoMnX, wherein X is at least one of Ga, In, Sn, Al, Sb;
   and combinations thereof.

2. The system of claim 1, wherein said plastic deforming of said metallic material comprises applying tension in at least one direction, wherein the tailored thermal expansion of said metallic material subsequent to said plastic deforming of said metallic material is in the at least one direction in said metallic material.

3. The system of claim 1, wherein said plastic deforming of said metallic material comprises applying compression in a first direction, wherein the tailored thermal expansion of said metallic material subsequent to said plastic deforming of said metallic material is in at least the said one selected direction of claim 1, and wherein said selected direction is perpendicular to said first direction.

4. The system of claim 1, wherein said plastic deforming of said metallic material comprises applying shear in a first direction, wherein the tailored thermal expansion of said metallic material subsequent to said plastic deforming of said metallic material is in at least the said one selected direction of claim 1, and wherein said selected direction is 45° to said first direction.

5. The system of claim 1, wherein said plastic deforming is achieved by at least one of hot-rolling, cold-rolling, plane strain compression, bi-axial tension, conformal processing, bending, drawing, wire-drawing, swaging, extrusion, equal channel angular extrusion, precipitation heat treatment under stress, monotonic tension processing, monotonic compression processing, monotonic torsion processing, cyclic thermal training under stress, and combinations thereof.

6. The system of claim 1, further comprising a combination of said plastically deformed metallic material with a different material to form a laminated composite material, wherein said different material is at least one of a polymer, a ceramic, and a metallic material.

7. The system of claim 1, further comprising a combination of said plastically deformed metallic material with a different material to form a composite material.

8. The system of claim 7, wherein said composite material comprises at least one ceramic, polymer, or second metallic material, or combinations thereof, wherein said second metallic material is different than said plastically deformed metallic material.

9. The system of claim 1, wherein said FAS is a fastener selected from a group consisting of: bolt; cap screw; socket head cap screw; rivet; and tubular rod.

10. A thermally stabilized fastener (TSF) system comprising:
(a) fastener (FAS);
(b) fastener retention receiver (FRR); and
(c) mechanical member stack (MMS);
wherein:
said FAS comprises a fastener retention head (FRH), a fastener retention body (FRB), and a fastener retention tip (FRT);
said FRR comprises an engaging surface conforming to said FRT;
said MMS comprises a temperature compensating member (TCM) and at least a first retention member (FRM);
said FRB of said FAS is positioned pass through an aperture in said MMS;
said FRH and said FRR are configured to mechanically couple elements within said MMS via said FRB and said aperture;
said TCM comprises a metallic material having a tailored thermal expansion coefficient (TTC);
said TTC is selected to compensate for thermal expansion characteristics of said FAS and at least said FRM within said MMS such that force applied by said FRH and said FRR portions of said FAS to said MMS is tailored to a specific temperature force profile (TFP) over changes in temperature ($\Delta T$) of said FAS and said MMS;
said TFP exhibits a change in said force ($\Delta F$) in response to said $\Delta T$ that is proportional to said TTC of said TCM, such that selection of said TTC of said TCM serves to increase, not change, or decrease said $\Delta F$ upon increases or decreases in said $\Delta T$;
said TCM is constructed by manufacturing a metallic material with a tailored thermal expansion coefficient in a selected range, comprising:
plastically deforming said metallic material by applying tension in a first direction;
wherein:
said metallic material prior to said plastic deformation substantially comprises a first phase;
said application of said tension transforms at least some of said first phase into a second phase;
subsequent to said tensile plastic deformation, said metallic material comprises a coefficient of thermal expansion within a selected range;
said coefficient of thermal expansion quantifies thermal expansion of said metallic material in at least one second direction;
said second direction is perpendicular or parallel to said first direction; and
said metallic material comprises at least one of:
NiTi, NiFeGa, or is at least one of:
characterized by a general formula NiTiX, wherein X is at least one of Pd, Hf, Zr, Al, Pt, Au;
characterized by a general formula NiMnX, wherein X is at least one of Ga, In, Sn, Al, Sb;
characterized by a general formula NiCoMnX, wherein X is at least one of Ga, In, Sn, Al, Sb;
and combinations thereof.

11. The system of claim 10, wherein said selected range of said tailored thermal expansion coefficient is between $-150 \times 10^{-6}$ K$^{-1}$ and $+500 \times 10^{-6}$ K$^{-1}$.

12. The system of claim 10, further comprising applying said tension in a third direction, wherein said coefficient of thermal expansion quantifying thermal expansion of said metallic material is parallel or perpendicular to said third direction.

13. The system of claim 10, wherein said tensile plastic deformation is achieved by at least one of: hot-rolling; cold-rolling; plane strain compression; bi-axial tension; conformal processing;
bending; drawing; wire-drawing; swaging; extrusion; equal channel angular extrusion;
precipitation heat treatment under stress; monotonic tension processing; monotonic compression processing;
monotonic torsion processing; cyclic thermal training under stress; and combinations thereof.

14. The system of claim 10, wherein said tensile plastic deformation of said metallic material further comprises texturing said metallic material in a direction comprising at least one of a [111], a [100] or a [001] direction.

15. The system of claim 10, further comprising a combination of said plastically deformed metallic material with a different material to form a laminated composite material, wherein said different material is at least one of a polymer, a ceramic, and a metallic material.

16. The system of claim 10, further comprising a combination of said plastically deformed metallic material with a different material to form a composite material.

17. The system of claim 16, wherein said composite material comprises at least one ceramic, polymer, or second metallic material, or combinations thereof, wherein said second metallic material is different than said plastically deformed metallic material.

18. The system of claim 10, wherein said FAS is a fastener selected from a group consisting of: bolt; cap screw; socket head cap screw; rivet; and tubular rod.

19. A thermally stabilized fastener (TSF) system comprising:
(a) fastener (FAS);
(b) fastener retention receiver (FRR); and
(c) mechanical member stack (MMS);
wherein:
said FAS comprises a fastener retention head (FRH), a fastener retention body (FRB), and a fastener retention tip (FRT);
said FRR comprises an engaging surface conforming to said FRT;
said MMS comprises a temperature compensating member (TCM) and at least a first retention member (FRM);
said FRB of said FAS is positioned pass through an aperture in said MMS;
said FRH and said FRR are configured to mechanically couple elements within said MMS via said FRB and said aperture;
said TCM comprises a metallic material having a tailored thermal expansion coefficient (TTC);
said TTC is selected to compensate for thermal expansion characteristics of said FAS and at least said FRM within said MMS such that force applied by said FRH and said FRR portions of said FAS to said MMS is tailored to a specific temperature force profile (TFP) over changes in temperature ($\Delta T$) of said FAS and said MMS;
said TFP exhibits a change in said force ($\Delta F$) in response to said $\Delta T$ that is proportional to said TTC of said TCM, such that selection of said TTC of said TCM serves to increase, not change, or decrease said $\Delta F$ upon increases or decreases in said $\Delta T$;
said TCM is constructed by manufacturing a metallic material with a tailored thermal expansion coefficient in a selected range, comprising:

plastically deforming said metallic material by applying compression in a first direction;
wherein:
said metallic material prior to said compressive plastic deformation substantially comprises a first phase;
said compressive plastic deformation of said metallic material transforms at least some of said first phase into a second phase using a compressive force in a first direction;
subsequent to said compressive plastic deformation of said metallic material, said metallic material comprises a coefficient of thermal expansion within a selected range;
said coefficient of thermal expansion quantifies thermal expansion of said metallic material in at least a second direction;
said second direction is perpendicular or parallel to said first direction; and
said metallic material comprises at least one of:
NiTi, NiFeGa, or is at least one of:
  characterized by a general formula NiTiX, wherein X is at least one of Pd, Hf, Zr, Al, Pt, Au;
  characterized by a general formula NiMnX, wherein X is at least one of Ga, In, Sn, Al, Sb;
  characterized by a general formula NiCoMnX, wherein X is at least one of Ga, In, Sn, Al, Sb;
  and combinations thereof.

20. The system of claim 19, wherein said compressive plastic deformation is achieved by at least one of: hot-rolling; cold-rolling; plane strain compression; bi-axial tension; conformal processing; bending; drawing; wire-drawing; swaging; extrusion; equal channel angular extrusion; precipitation heat treatment under stress; monotonic tension processing; monotonic compression processing; monotonic torsion processing; cyclic thermal training under stress; and combinations thereof.

21. The system of claim 19, further comprising thermal expansion of said metallic material in a third direction, wherein said third direction is parallel or perpendicular to said first direction.

22. The system of claim 19, said plastic deformation of said metallic material further comprises texturing said metallic material in a direction comprising at least one of a [111], a [100], or a [001] direction.

23. The system of claim 19, further comprising a combination of said plastically deformed metallic material with a different material to form a laminated composite material, wherein said different material is at least one of a polymer, a ceramic, and a metallic material.

24. The system of claim 19, further comprising a combination of said plastically deformed metallic material with a different material to form a composite material.

25. The system of claim 24, wherein said composite material comprises at least one ceramic, polymer, or second metallic material, or combinations thereof, wherein said second metallic material is different than said plastically deformed metallic material.

26. The system of claim 19, wherein said selected range of said tailored thermal expansion coefficient is between $-150 \times 10^{-6}$ K$^{-1}$ and $+500 \times 10^{-6}$ K$^{-1}$.

27. The system of claim 19, wherein said FAS is a fastener selected from a group consisting of: bolt; cap screw; socket head cap screw; rivet; and tubular rod.

28. A thermally stabilized fastener (TSF) system comprising:
(a) fastener (FAS);
(b) fastener retention receiver (FRR); and
(c) mechanical member stack (MMS);

wherein:
said FAS comprises a fastener retention head (FRH), a fastener retention body (FRB), and a fastener retention tip (FRT);
said FRR comprises an engaging surface conforming to said FRT;
said MMS comprises a temperature compensating member (TCM) and at least a first retention member (FRM);
said FRB of said FAS is positioned pass through an aperture in said MMS;
said FRH and said FRR are configured to mechanically couple elements within said MMS via said FRB and said aperture;
said TCM comprises a metallic material having a tailored thermal expansion coefficient (TTC);
said TTC is selected to compensate for thermal expansion characteristics of said FAS and at least said FRM within said MMS such that force applied by said FRH and said FRR portions of said FAS to said MMS is tailored to a specific temperature force profile (TFP) over changes in temperature ($\Delta T$) of said FAS and said MMS;
said TFP exhibits a change in said force ($\Delta F$) in response to said $\Delta T$ that is proportional to said TTC of said TCM, such that selection of said TTC of said TCM serves to increase, not change, or decrease said $\Delta F$ upon increases or decreases in said $\Delta T$;
said TCM is constructed by manufacturing a metallic material with a tailored thermal expansion coefficient in a selected range, comprising:
plastically deforming a metallic material comprising a first thermal expansion coefficient;
wherein:
said metallic material comprises an alloy;
said metallic material is comprised of a martensitic phase with or without the presence of other phases;
said plastic deforming comprises mechanical deformation;
said martensitic phase in said metallic material is oriented in at least one selected orientation in response to said mechanical deforming;
said metallic material, subsequent to said plastic deforming, comprises a second thermal expansion coefficient due to said orientation;
said second thermal expansion coefficient is within a selected range;
said second thermal expansion coefficient quantifies thermal expansion of said metallic material in at least one selected direction; and
said metallic material comprises at least one of:
NiTi, NiFeGa, or is at least one of:
  characterized by a general formula NiTiX, wherein X is at least one of Pd, Hf, Zr, Al, Pt, Au;
  characterized by a general formula NiMnX, wherein X is at least one of Ga, In, Sn, Al, Sb;
  characterized by a general formula NiCoMnX, wherein X is at least one of Ga, In, Sn, Al, Sb;
  and combinations thereof.

29. The system of claim 28, wherein said plastic deforming is achieved by at least one of hot-rolling, cold-rolling, plane strain compression, bi-axial tension, conformal processing, bending, drawing, wire-drawing, swaging, extrusion, equal channel angular extrusion, precipitation heat treatment under stress, monotonic tension processing, monotonic compression processing, monotonic torsion processing, cyclic thermal training under stress, and combinations thereof.

30. The system of claim 28, wherein said alloy is oriented in a direction comprising at least one of a [111], [100], or [001] direction.

31. The system of claim 28, wherein said FAS is a fastener selected from a group consisting of: bolt; cap screw; socket head cap screw; rivet; and tubular rod.

\* \* \* \* \*